United States Patent [19]

Umehara et al.

[11] Patent Number: 4,666,810

[45] Date of Patent: May 19, 1987

[54] PHOTOSENSITIVE MEMBER FOR ELECTROPHOTOGRAPHY COMPRISING AZO PIGMENTS

[75] Inventors: Shoji Umehara, Fuchu; Masakazu Matsumoto, Yokohama; Takao Takiguchi, Tokyo; Masataka Yamashita, Kawasaki; Shozo Ishikawa, Yokohama, all of Japan

[73] Assignee: Canon Kabushiki Kaisha, Tokyo, Japan

[21] Appl. No.: 852,243

[22] Filed: Apr. 15, 1986

[30] Foreign Application Priority Data

| | | | |
|---|---|---|---|
| Apr. 17, 1985 | [JP] | Japan | 60-80248 |
| Jul. 17, 1985 | [JP] | Japan | 60-157699 |
| Jul. 17, 1985 | [JP] | Japan | 60-157700 |
| Jul. 18, 1985 | [JP] | Japan | 60-159401 |
| Jul. 18, 1985 | [JP] | Japan | 60-159402 |
| Jul. 18, 1985 | [JP] | Japan | 60-159403 |

[51] Int. Cl.$^4$ .................. G03G 5/06

[52] U.S. Cl. .................. 430/71; 430/72; 430/58; 430/76

[58] Field of Search .................. 430/72, 71, 58

[56] References Cited

U.S. PATENT DOCUMENTS 4,535,044 8/1985 Higashiguchi .................. 430/79 X

*Primary Examiner*—John D. Welsh

*Attorney, Agent, or Firm*—Fitzpatrick, Cella, Harper & Scinto

[57] ABSTRACT

An electrophotographic photosensitive member comprises a photosensitive layer containing an azo pigment selected from the general formulae (1) to (6).

5 Claims, No Drawings

PHOTOSENSITIVE MEMBER FOR ELECTROPHOTOGRAPHY COMPRISING AZO PIGMENTS

BACKGROUND OF THE INVENTION

1. Field of the Invention

This invention relates to a photosensitive member for electrophotography, and particularly to a photosensitive member for electrophotography with a photosensitive layer containing a specific azo pigment.

2. Related Background Art

Photosensitive members for electrophotography utilizing inorganic photoconductive substance such as selenium, cadmium sulfide, zinc oxide, etc. as a photoconductive component have been so far well known. On the other hand, since specific photoconductive organic compounds were found, many organic photoconductive substances have been developed. For example, organic photoconductive polymers such as poly-N-vinylcarbazole, polyvinylanthracene, etc.; low molecular weight organic photoconductive compounds such as carbazole, anthracene, pyrazolines, oxadiazoles, hydrazones, polyarylalkanes, etc.; and organic pigments and dyes such as phthalocyanine pigment, azo pigment, cyanin pigment, polycyclic quinone pigment, perylene-based pigment, indigo dye, thioindigo dye, and squarilium dyes, etc. are known. Particularly, the photoconductive organic pigments and dyes can be more readily synthesized than the inorganic substances, and have variations in selecting a suitable compound showing a photoconductivity for a desired wavelength range. Thus, many photoconductive organic pigments and dyes have been proposed. For example, photosensitive members for electrophotography utilizing a photoconductive disazo pigment as a charge-generating material in a photosensitive layer having a charge generation layer and a charge transport layer as functionally separated are known, as disclosed in U.S. Pat. Nos. 4,123,270; 4,247,614; 4,251,613; 4,251,614; 4,256,821; 4,260,672; 4,268,596; 4,278,747; 4,293,628, etc.

The photosensitive members for electrophotography utilizing such organic photoconductive compounds can be produced by coating when an appropriate binder is selected, that is, can be produced with a very high productivity at a low cost, and also have such an advantage that the photosensitive wavelength range can be controlled as desired by selecting an appropriate organic pigment. However, these photosensitive members have poor sensitivity and durability and thus only a few of them have been practically utilized.

SUMMARY OF THE INVENTION

An object of the present invention is to provide a novel photosensitive member for electrophotography.

Another object of the present invention is to provide a photosensitive member for electrophotography with practically distinguished sensitivity and durability.

The photosensitive member for electrophotography according to the present invention is characterized by a photosensitive layer containing one member selected from azo pigments represented by the following general formulae (1)-(6):

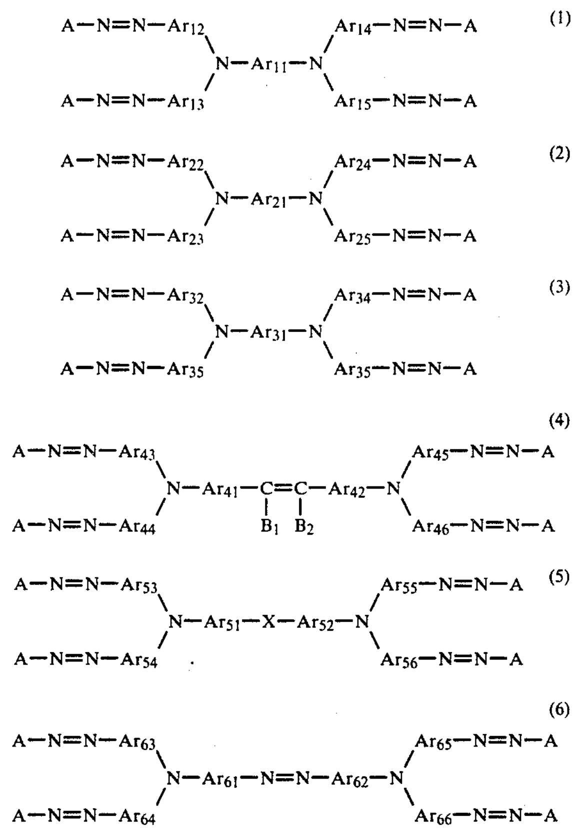
(1) (2) (3) (4) (5) (6)

wherein $Ar_{11}$ to $Ar_{15}$ each represent arylene groups which may have a substituent; $Ar_{21}$ represents a biphenylene group having a substituent, a biarylene group, a terphenylene group or a divalent condensed polycyclic aromatic ring group, each of the latter three of which may have a substituent; $Ar_{31}$ represents a divalent organic group containing a heterocyclic group, which may have a substituent; $Ar_{41}$ represents a divalent organic group containing at least one group selected from a phenylene group having a substituent (but an unsubstituted phenylene group when one of $B_1$ and $B_2$ is a halogen atom, a trifluoromethyl group, or an alkyl group, an aryl group or an aralkyl group, each of the latter three of which may have a substituent, another arylene group other than phenylene group which may have a substituent, a divalent condensed polycyclic group and a divalent heterocyclic group; $Ar_{22}$ to $Ar_{25}$, $Ar_{32}$ to $Ar_{35}$, $Ar_{42}$ to $Ar_{46}$, $Ar_{51}$ to $Ar_{56}$, and $Ar_{61}$ to $Ar_{66}$ represent divalent organic groups containing at least one group selected from an arylene group a divalent condensed aromatic ring groups and a divalent heterocyclic groups, each of which may have a substituent; A represents a coupler residue having a phenolic OH group; $B_1$ and $B_2$ each represent a hydrogen atom, a halogen atom, a trifluoromethyl group, a cyano group, an alkyl group, an anyl group or an aralkyl group, each of the latter three of which may have a substituent; X represents NR, O, S, $SO_2$ or C═O; R represents a hydrogen atom, a nitroso group, an alkyl group, an aralkyl group, an aryl group, an acyl group or a heterocyclic group, each of the latter five of which may have a substituent.

DESCRIPTION OF THE PREFERRED EMBODIMENTS

In the formulae, $Ar_{11}$, $Ar_{12}$, $Ar_{13}$, $Ar_{14}$ and $Ar_{15}$ represent arylene groups, each of which may have a substituent, and the arylene groups include, for example, phenylene, biphenylene, naphthylene, anthylene, etc. $Ar_1$ to $Ar_5$ may have a further substituent. Such further substituent includes a halogen atom (fluorine, chlorine, bromine, and iodine), an alkyl group (methyl, ethyl, propyl, etc.), an alkoxy group (methoxy, ethoxy, propoxy, etc.), a thioalkyl group (thiomethyl, thioethyl, thiopropyl, etc.), nitro, cyano, trifluoromethyl, etc.

$Ar_{21}$ is a biphenylene group having a substituent, a biarylene group, a terphenylene group or a divalent condensed polycyclic aromatic ring group, each of the latter three of which may have a substituent, and includes, for example, biphenylene groups having a substituent such as alkyl, alkoxy, aralkyl, aryl, halogen atom, acyl, nitro or amino; biaryl groups such as phenylnaphthalene, binaphthalene, phenylanthracene, naphthylanthracene, etc., which may have said substituent; terphenylene groups which may have said substituent, or divalent condensed polycyclic aromatic ring groups such as indene, fluorene, acenaphthene, perylene, fluorenone, anthrone, anthraguinone, benzanthrone, isocumalin, etc. These divalent condensed, polycyclic aromatic ring groups may be substituted with said substituent such as alkyl, alkoxy, aralkyl, aryl, halogen atom, acyl, nitro, cyano or amino.

$Ar_{31}$ includes organic groups containing a divalent heterocycle, such as pyridine, quinoline, benzoxazole, benzthiazole, benzimidazole, benztriazole, phenylbenzoxazole, phenylbenzthiazole, phenylbenzimidazole, dibenzfuran, carbazole, xanthene, phenothiazine, diphenyloxadiazole, etc. These groups may be substituted with said substituent.

Examples of the arylene groups other than phenylene group, divalent condensed polycyclic groups or divalent heterocyclic groups of $Ar_{41}$ are the same as $Ar_{43}$ to $Ar_{46}$ which follow.

Examples of $Ar_{22}$ to $Ar_{25}$, $Ar_{32}$ to $Ar_{35}$, $Ar_{42}$ to $Ar_{46}$, $Ar_{51}$ to $Ar_{56}$ and $Ar_{61}$ to $Ar_{66}$ include arylene groups such as phenylene, naphthalene, anthrylene, bipherylene, etc.; divalent condensed polycyclic aromatic ring groups such as indene, fluorene, acenaphthene, perylene, fluorenone, anthrone, anthraquinone, benzanthrone, isocumarin, etc. These arylene groups or divalent condensed polycyclic aromatic ring groups may be substituted with said substituent such as alkyl, alkoxy, aralkyl, aryl, halogen atom, acyl, nitro, cyano or amino. Furthermore, the following divalent heterocyclic groups can be included: pyridine, quinoline, oxadiazole, benzoxazole, benzimidazole, benzthiazole, benztriazole, dibenzfuran, carbazole, xanthene, etc. These groups may be substituted with said substituent.

In case X is NR, an alkyl as R includes, for example, methyl, ethyl, propyl, butyl, etc.; an aralkyl as R includes, for example, benzyl, phenethyl, naphthylmethyl, etc.; an aryl as R includes, for example, phenyl, diphenyl, naphthyl, anthryl, etc.

In the foregoing general formulae (1) to (6), the coupler residue having a phenolic OH group as A can be represented, for example, by the following general formulae (7) to (13):

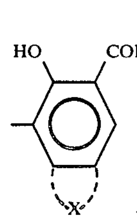
(7)

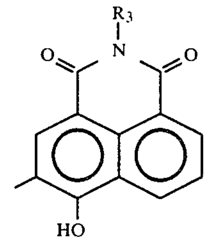
(8)

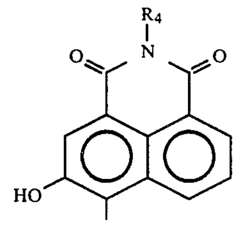
(9)

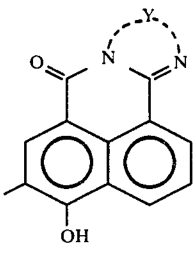
(10)

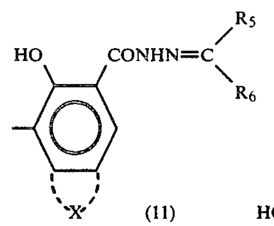
(11)

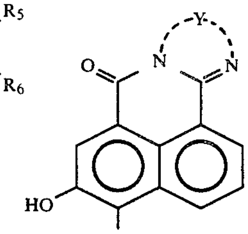
(12)

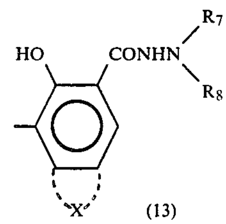
(13)

wherein X is a residue capable of forming a polycyclic aromatic ring or a heterocyclic ring through condensation with a benzene ring; $R_1$ and $R_2$ are hydrogen atoms, alkyls, aralkyls, aryls and heterocyclic ring groups, each of which may have a substituent, or residues forming conjointly a cyclic amino group together with a nitrogen atom; $R_3$ and $R_4$ are alkyls, aralkyls, and aryls, each of which may have a substituent; Y is a divalent aromatic hydrocarbon group or a residue forming a divalent heterocyclic group therewith through a nitrogen atom; $R_5$ and $R_6$ are hydrogen atoms, alkyls, aralkyls, aryls and heterocyclic groups, each of which may have a substituent, or are residues forming a 5 or 6-members ring together with a bonding carbon atom, $R_7$ and $R_8$ are hydrogen atoms, alkyls, aralkyls, aryls or heterocyclic groups, each of which may have a substituent or a residue forming a 5 or 6-membered ring therefrom together with the bonding nitrogen atom.

The polycyclic aromatic ring and heterocyclic represented by said X includes, for example, naphthalene, anthracene, carbazole, benzcarbazole, dibenzfuran, benznaphthofuran, diphenylene sulfide, etc.

In case of $R_1$ and $R_2$, the alkyls include, for example, methyl, ethyl, propyl, butyl, etc.; the aralkyls include, for example, benzyl, phenethyl, naphthylmethyl, etc.; the aryls include, for example, phenyl, diphenyl, naphthyl, anthryl, etc. Particularly preferable are compounds whose $R_1$ is hydrogen atom and whose $R_2$ is a phenyl group having an electro-attractive group such as a halogen atom, nitro, cyano, trifluoromethyl, etc. and having an alkyl group such as ethyl, methyl and butyl, etc. at the O-position.

The heterocyclic group includes, for example, carbazole, dibenzfuran, benzimidazolone, benzthiazole, thiazole, pyridin, etc.

Examples of $R_3$ and $R_4$ are the same as given in said exemplification of $R_1$ and $R_2$.

The alkyl groups, aralkyl groups, aryl groups and heterocyclic groups in the foregoing $R_1$, $R_2$, $R_3$ and $R_4$ may be further substituted with another substituent, for example, said alkyl groups, alkoxy groups such as methoxy, ethoxy, propoxy, etc.; halogen atoms, nitro, cyano, or substituted amino groups such as dimethylamino, diethylamino, dibenzylamino, diphenylamino, morpholino, piperidino, pyrrolidino, etc.

In the definition of Y, the divalent aromatic hydrocarbon group includes, for example, monocyclic aromatic hydrocarbon groups, such as o-phenylene, and condensed polycyclic aromatic hydrocarbon groups such as o-naphthylene, perinaphthylene, 1,2-anthrylene, 9,10-phenanthrylene, etc. Examples of the divalent heterocyclic group formed together with the nitrogen atom are divalent, 5 or 6-membered heterocyclic groups such as 3,4-pyrazolediyl group, 2,3-pyridinediyl group, 4,5-pyrimidinediyl group, 6,7-indazolediyl group, 5,6-benzimidazolediyl group, 6,7-quinolinediyl group, etc.

The alkyls, aralkyls, and aryls as $R_5$ and $R_6$ are the same as exemplified in $R_1$ to $R_4$.

The heterocyclic groups represented by said $R_5$ and $R_6$ include, for example, pyridyl, thienyl, furyl, carbazolyl, etc., and may be substituted by said substituents.

Furthermore, $R_5$ and $R_6$ represent residues forming 5 or 6-membered rings together, and the 5 or 6-membered ring may have a condensed aromatic ring. Examples of the residues include cyclopenthylidene, cyclohexylidene, 9-fluorenylidene, 9-xanthenylidene, etc.

Examples of alkyls, aryls and aralkyls in $R_7$ and $R_8$ are the same as in the foregoing exemplifications. The heterocyclic groups include, for example carbazole, dibenzfuran, benzimidazolone, benzthiazole, thiazole, pyridine, etc., each of which may have said substituent.

X in the formulae (12) and (13) are the same as X in said formula (7). Particularly preferable X-bonded rings are an anthracene ring, a benzcarbazole ring and a carbazole ring. Particularly, the benzcarbazole ring has a high effect of expanding the spectral sensitivity region over to the long wavelength region, and is suitable for preparing a photosensitive member having a high sensitivity in the semi conductor laser region.

Either carrier generation efficiency or carrier transport efficiency, or both can be improved by using the present azo pigments, and consequently the sensitivity of a photosensitive member using a photosensitive layer containing the azo pigment can be improved and potential stability in a prolonged use can be assured. Thus, a higher sensitivity can be obtained, and application of the present photosensitive member to a laser beam printer, an LED printer, a liquid crystal printer, etc. becomes possible, and a stable potential can be assured, irrespective of the previous use of photosensitive members. That is, a stable, beautiful image can be obtained.

Typical examples of the present azo pigments will be given in Tables 1 to 6.

TABLE 1
Examples of azo pigment represented by the general formula (1)
1-(1)
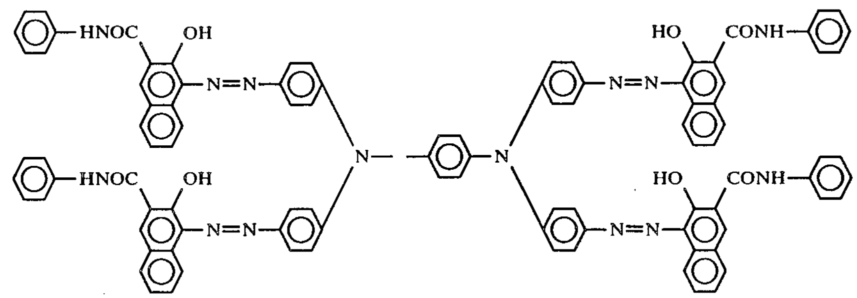
1-(2)
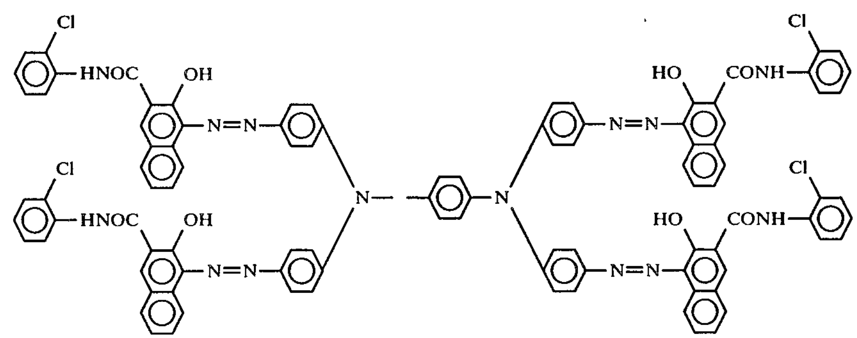

TABLE 1-continued
1-(3)
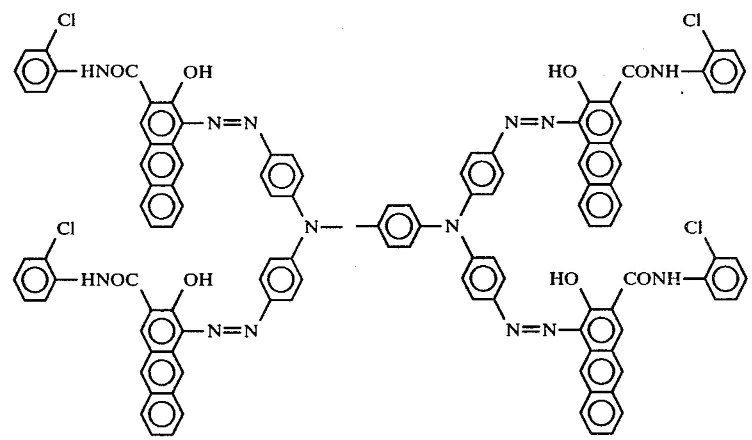
1-(4)
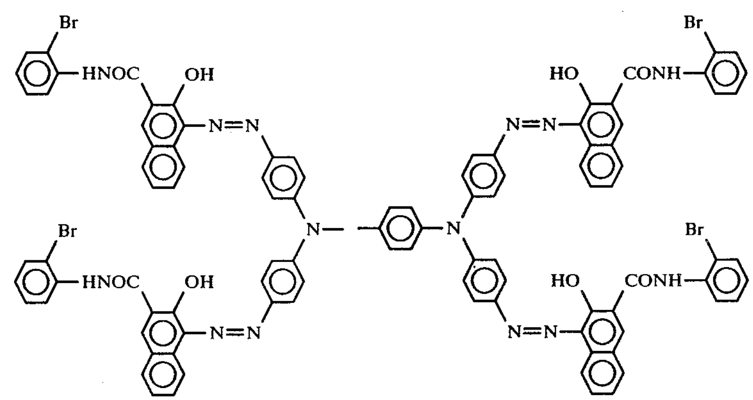

TABLE 1-continued
1-(5)
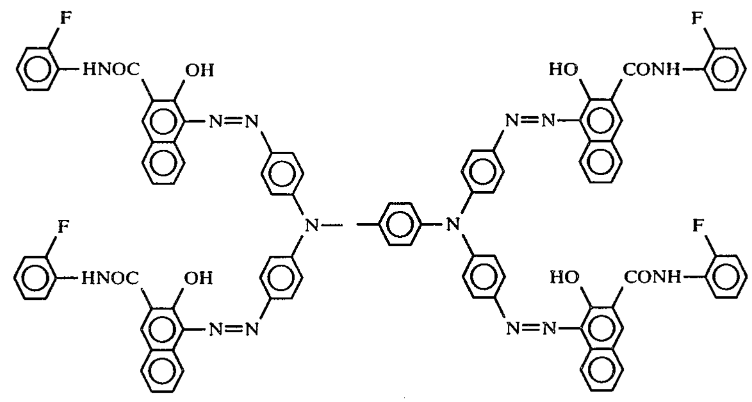
1-(6)
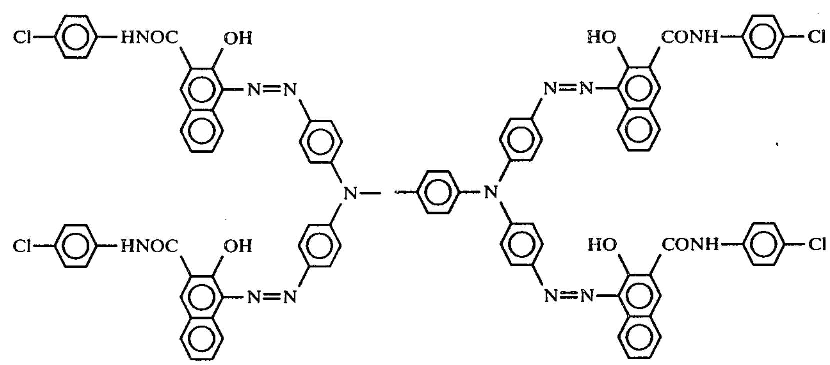

TABLE 1-continued
1-(7)
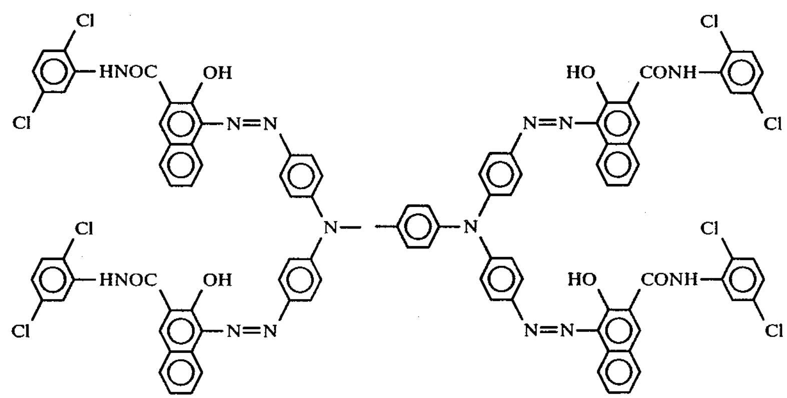
1-(8)
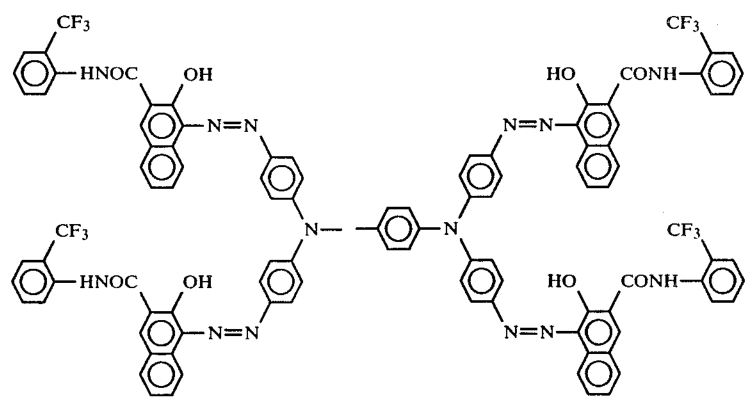

TABLE 1-continued
1-(9)
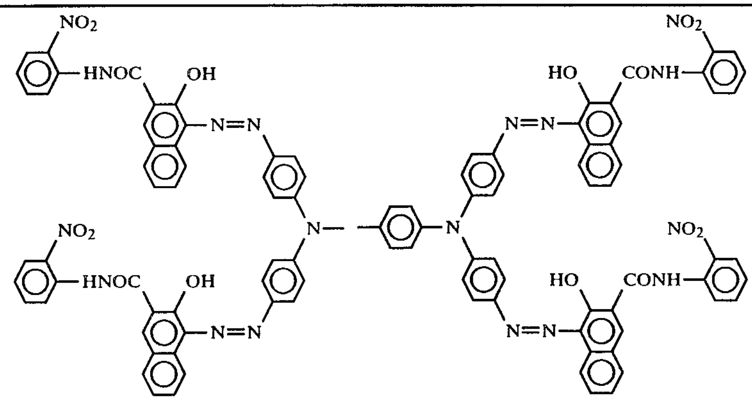
1-(10)
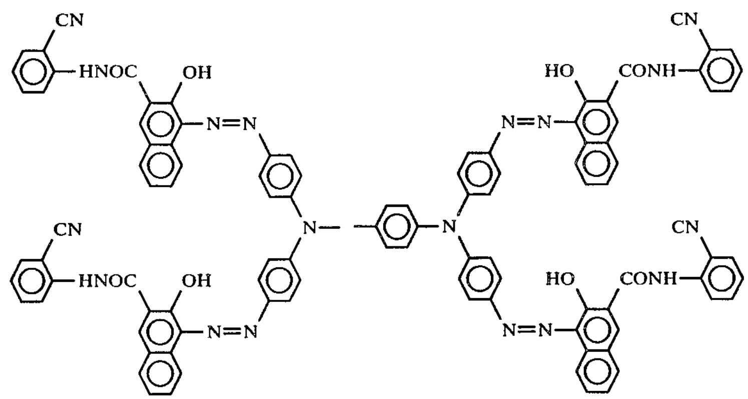

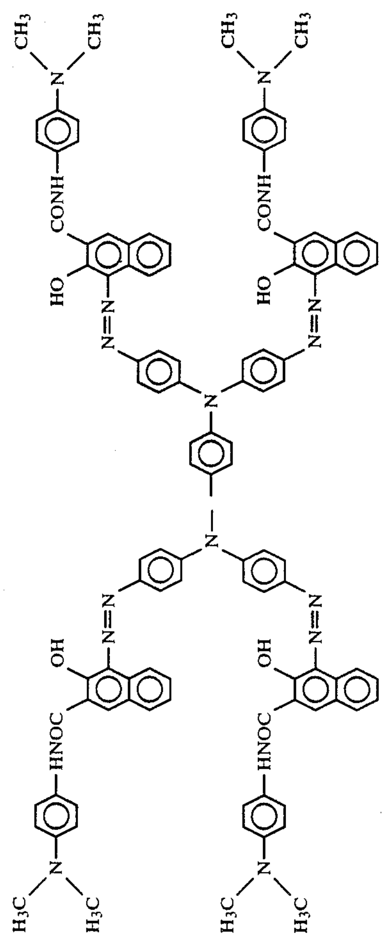
1-(11)
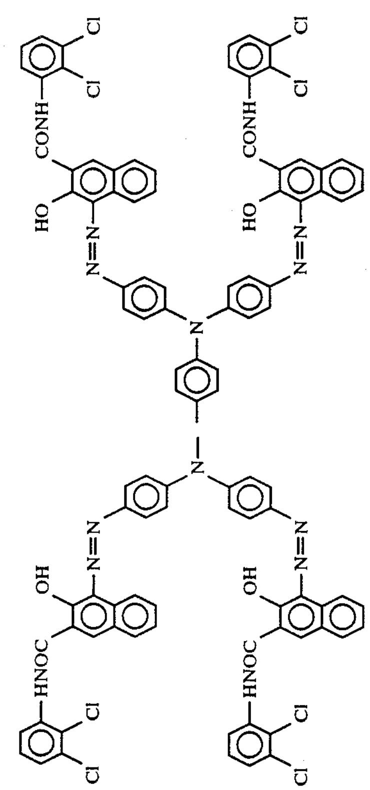
1-(12)
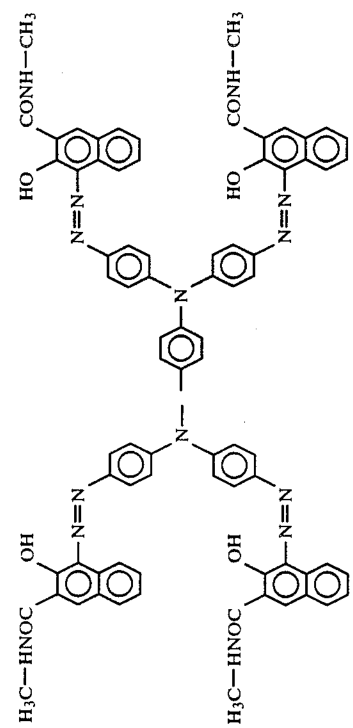
1-(13)

-continued
1-(14)
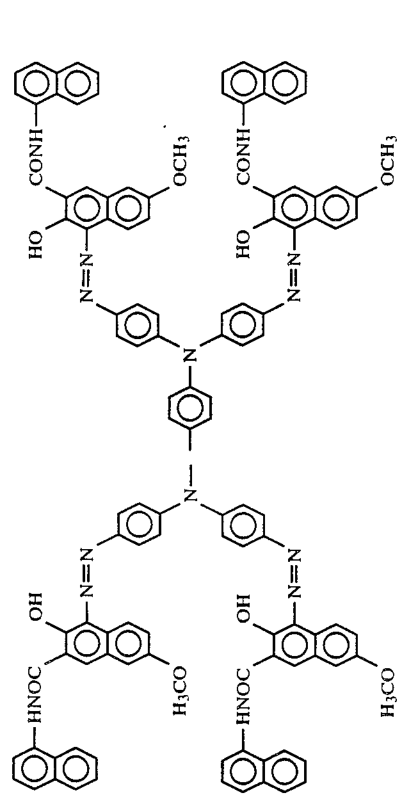
1-(15)
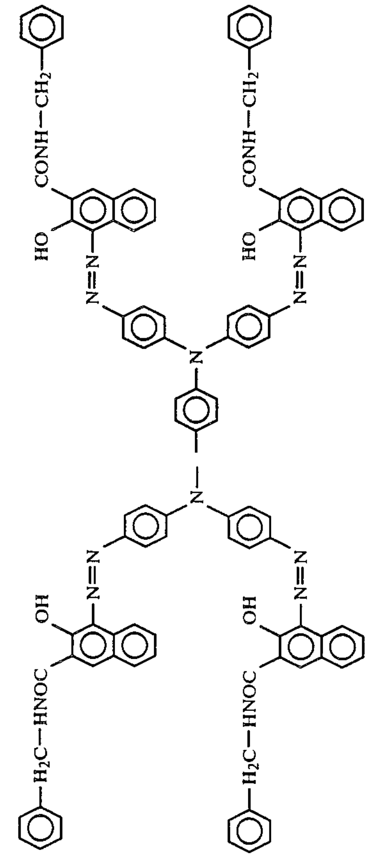

-continued
1-(16)
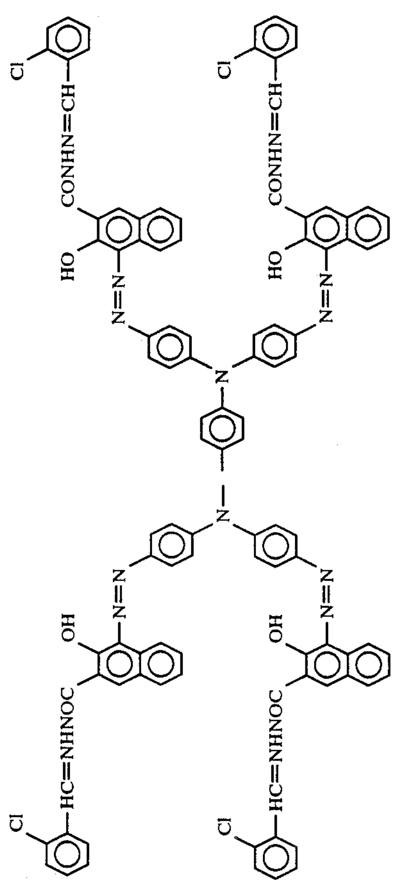
1-(17)
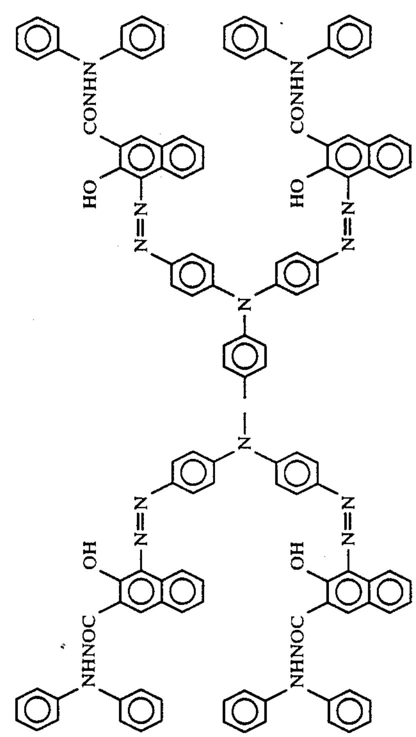

-continued
1-(18)
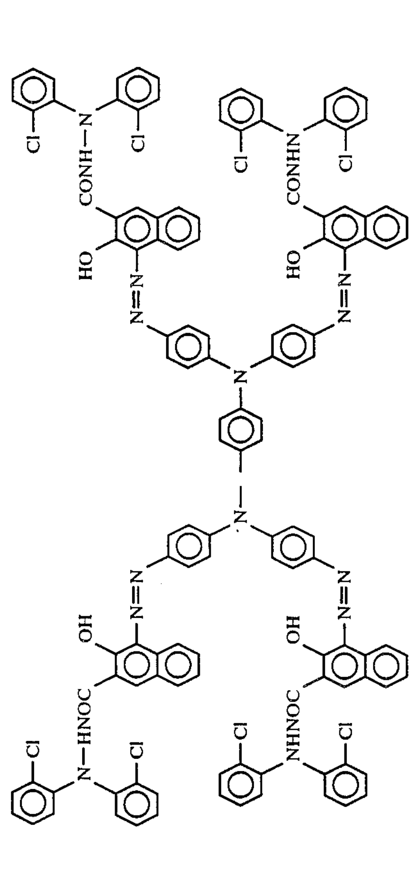
1-(19)
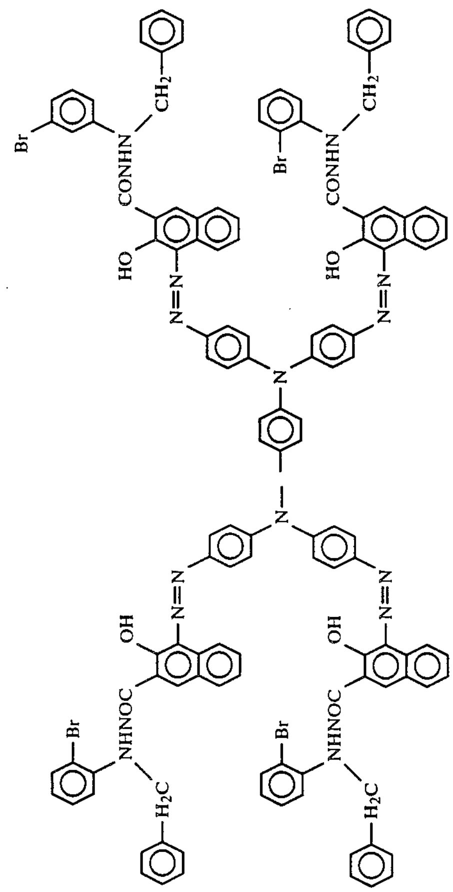

-continued
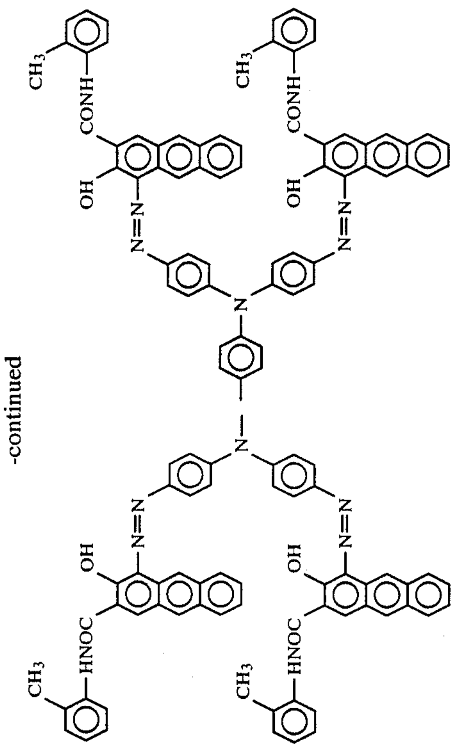
1-(20)
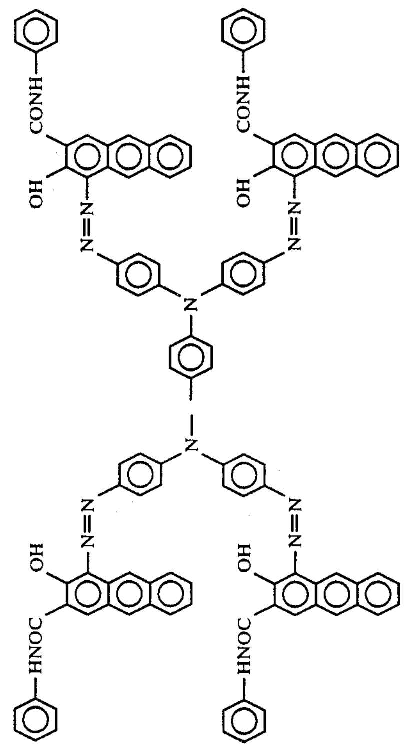
1-(21)

1-(22)
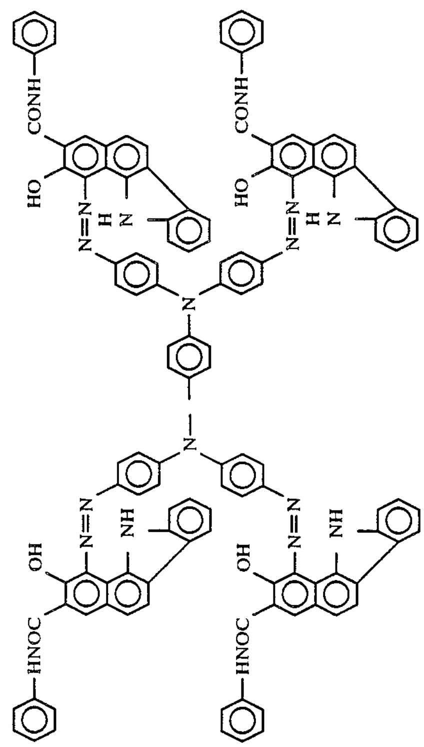
1-(23)
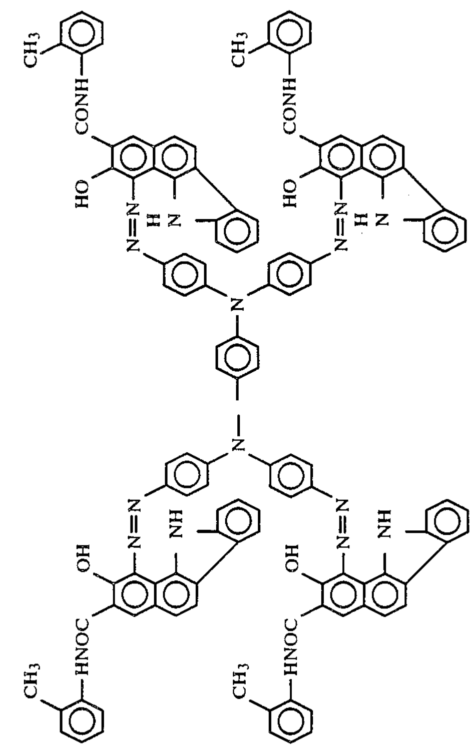

-continued
1-(24)
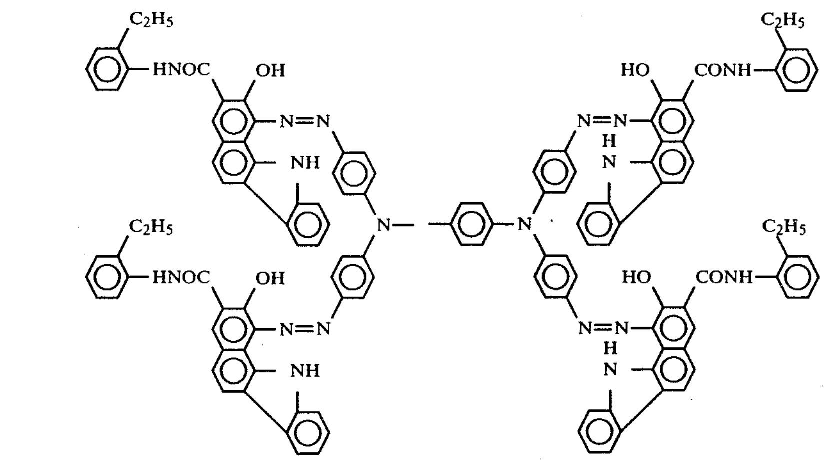
1-(25)
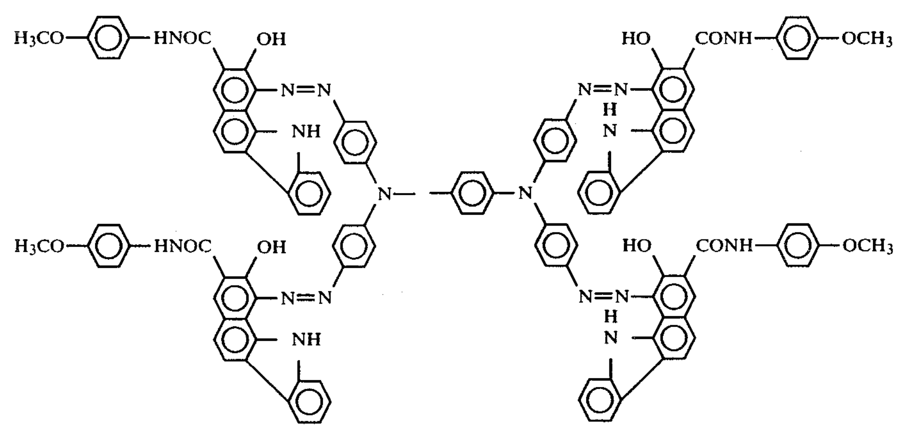

-continued
1-(26)
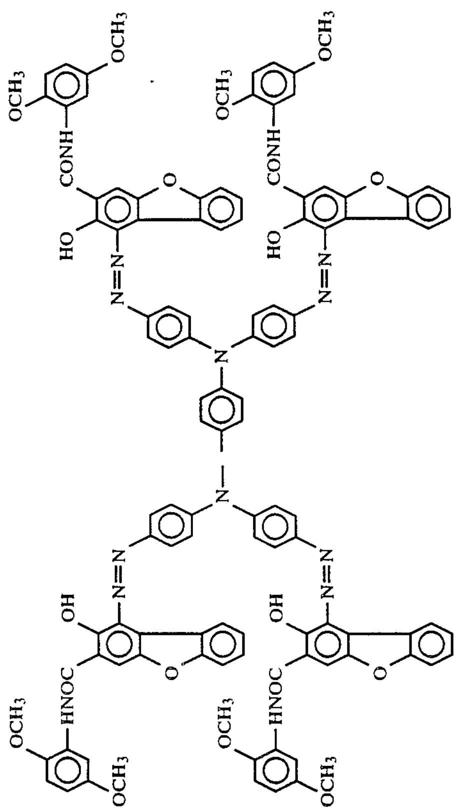
1-(27)
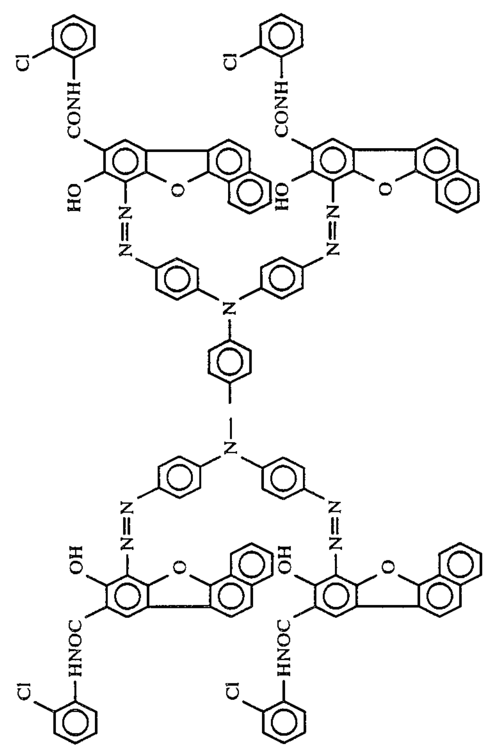

-continued
1-(28)
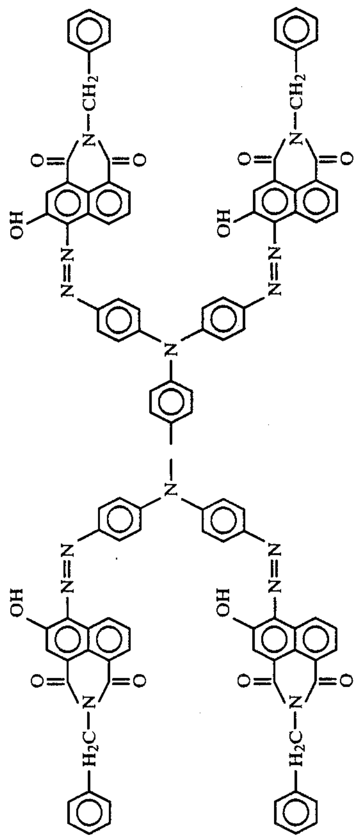
1-(29)
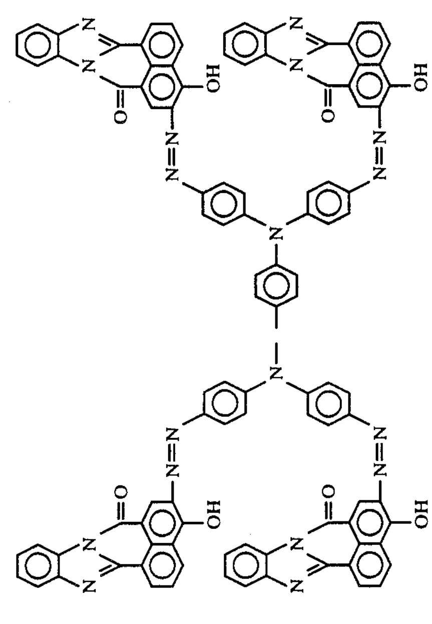

-continued
1-(30)
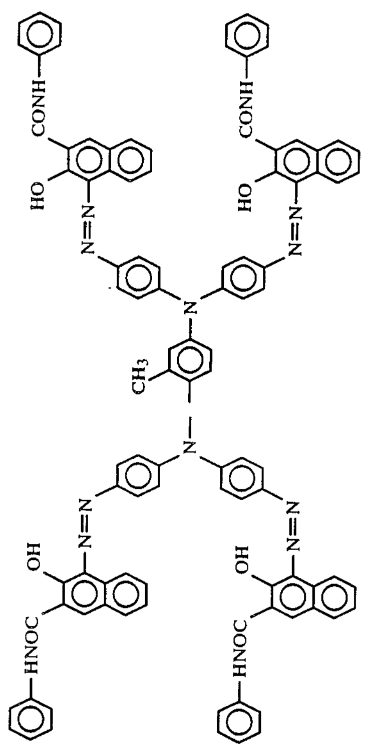
1-(31)
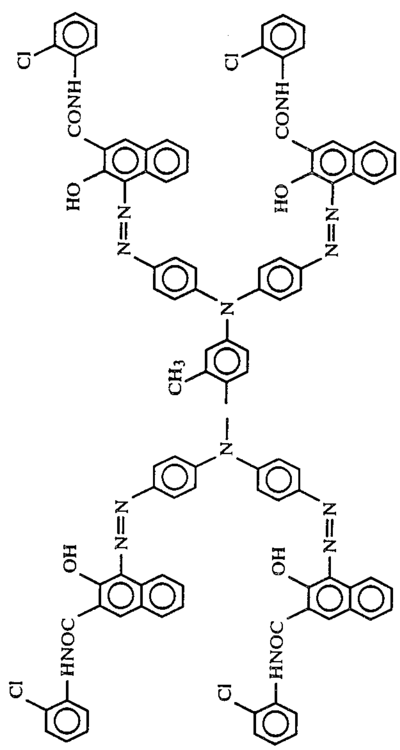

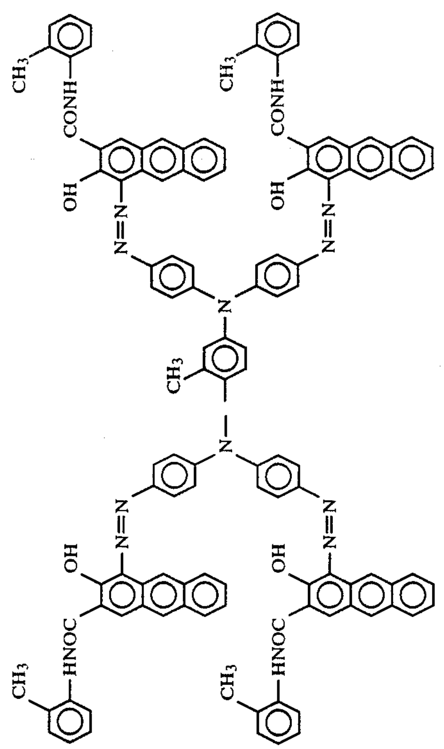
1-(32)
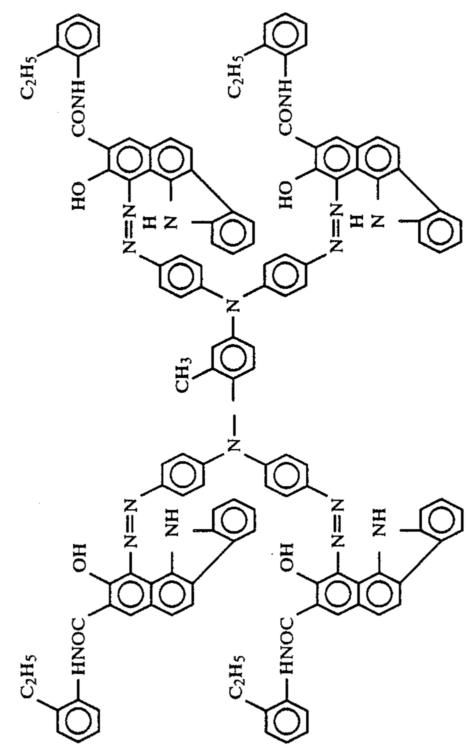
1-(33)

-continued
1-(34)
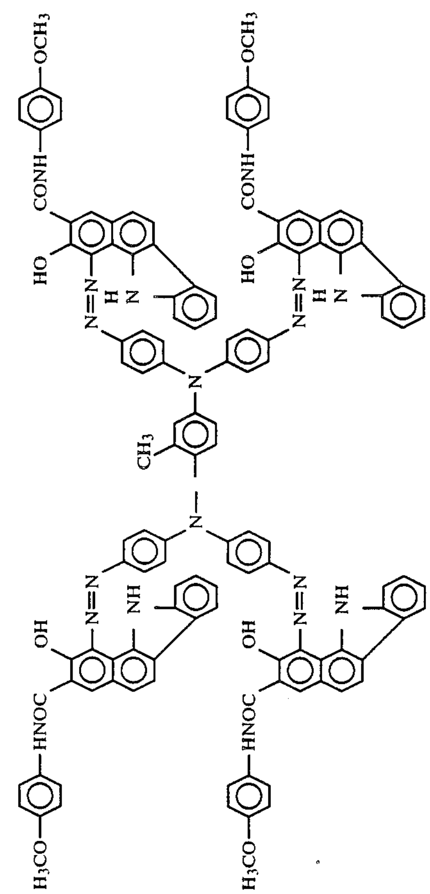
1-(35)
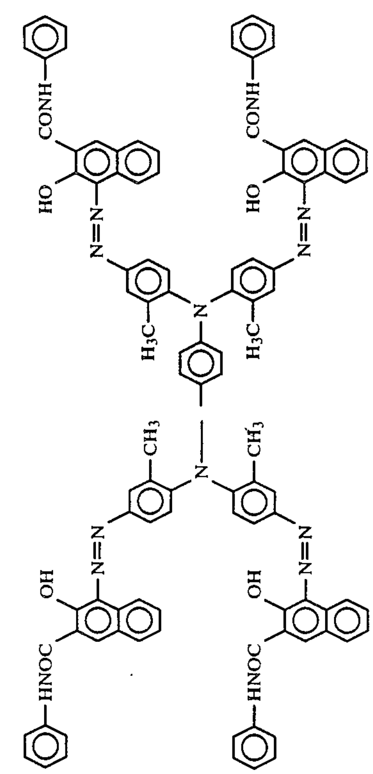

-continued
1-(36)
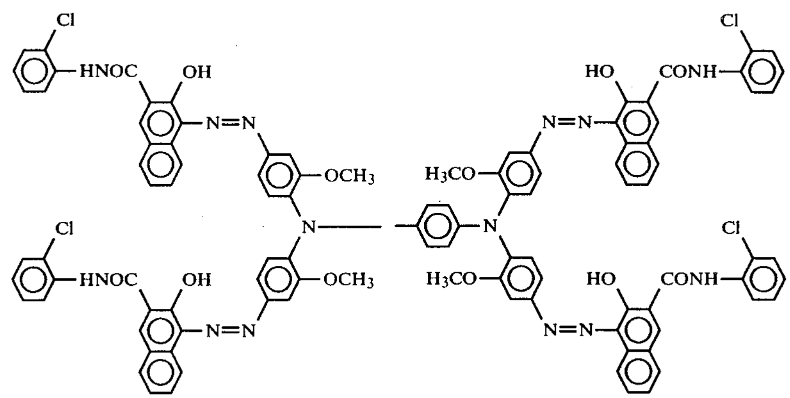
1-(37)
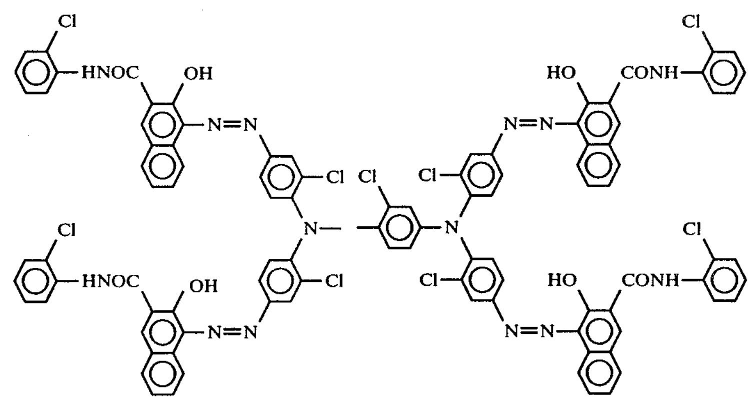

-continued
1-(38)
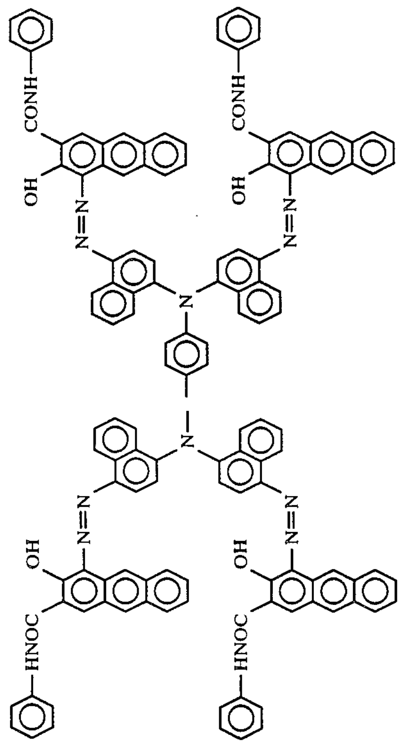
1-(39)
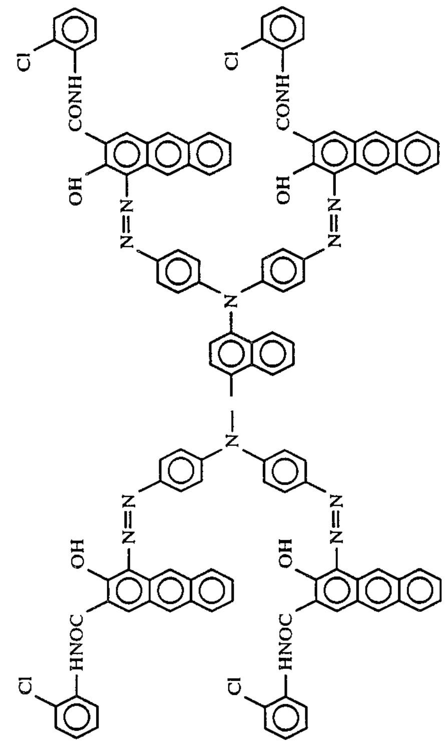

-continued
1-(40)
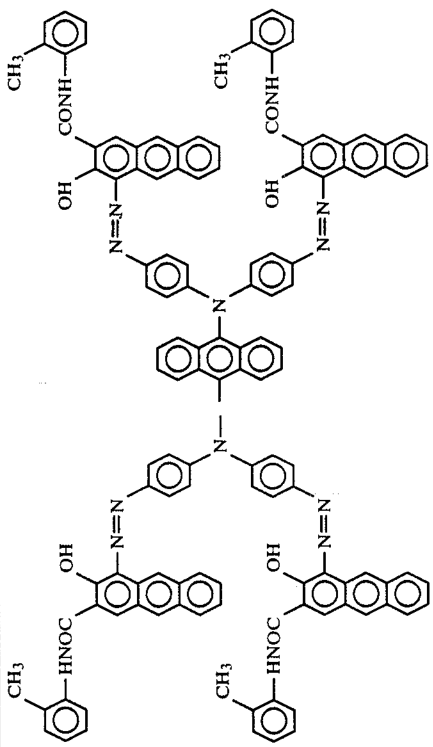
1-(41)
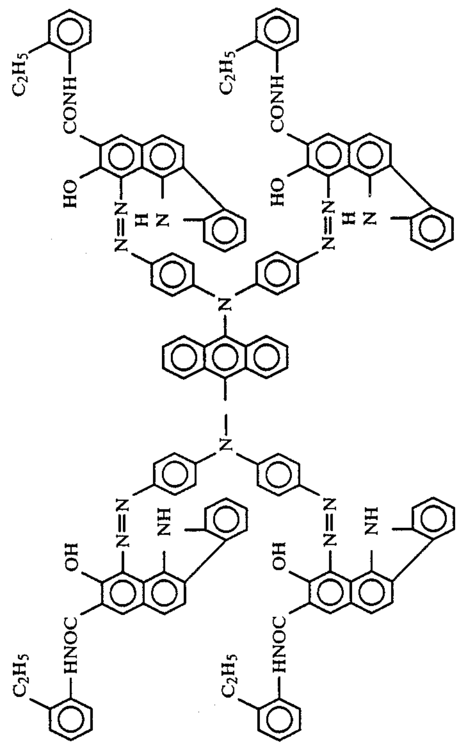

TABLE 2
Examples of azo pigment represented by the general formula (2) Tetrakis-azo Pigment
| No. | |
|---|---|
| 2-(1) | 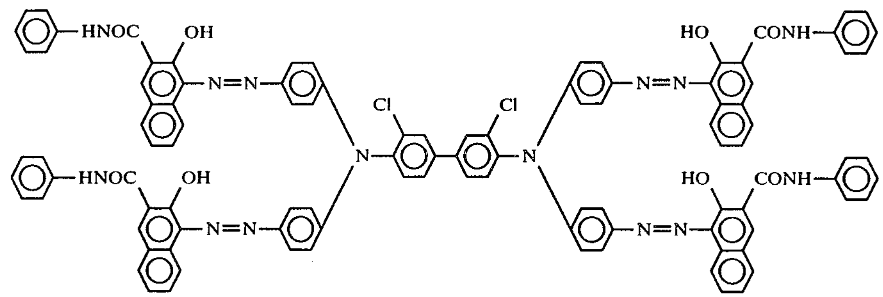 |
| 2-(2) | 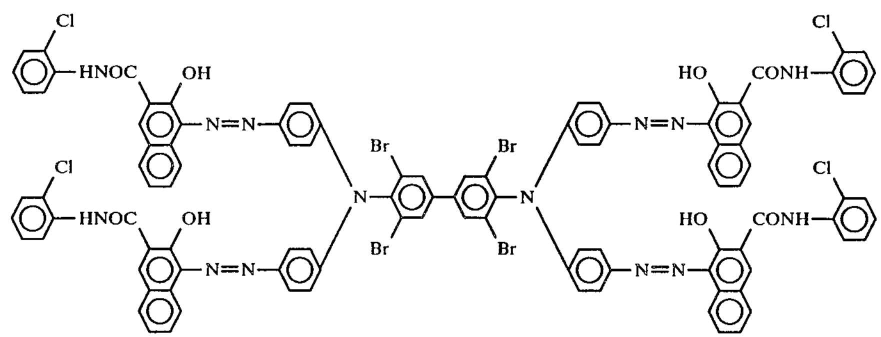 |
| 2-(3) | 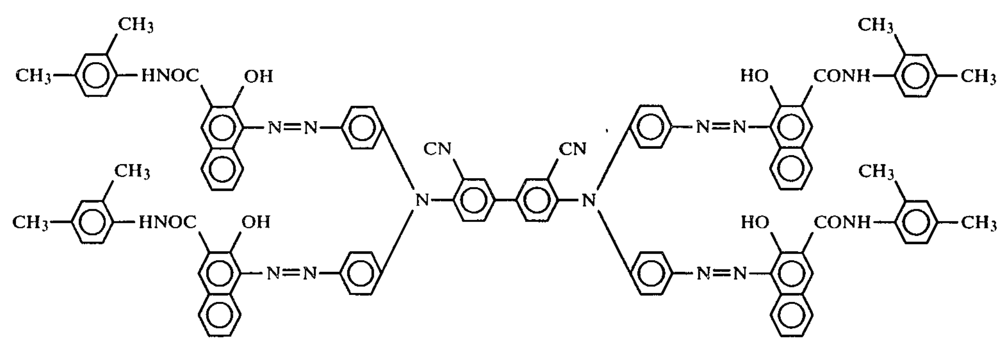 |

TABLE 2-continued
2-(4)
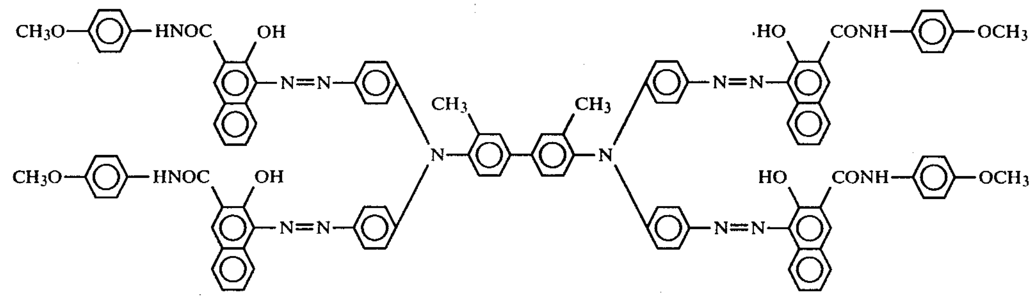
2-(5)
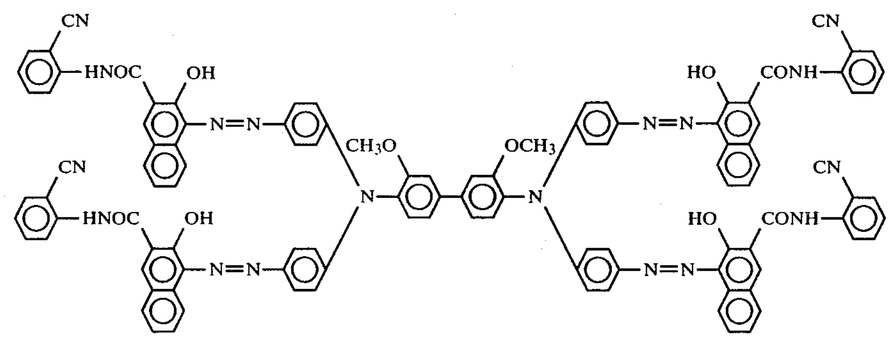
2-(6)
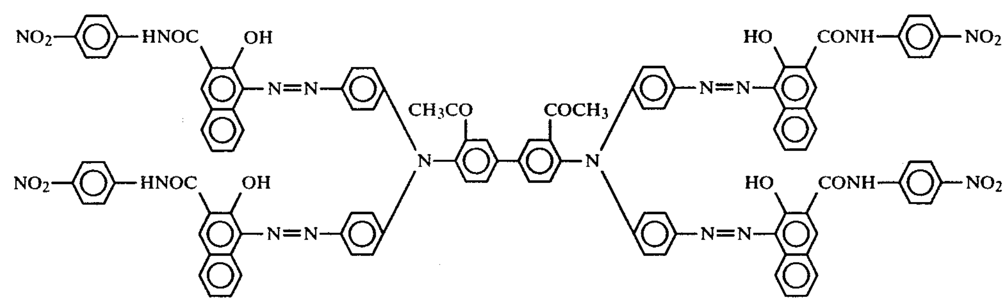

TABLE 2-continued
2-(7)
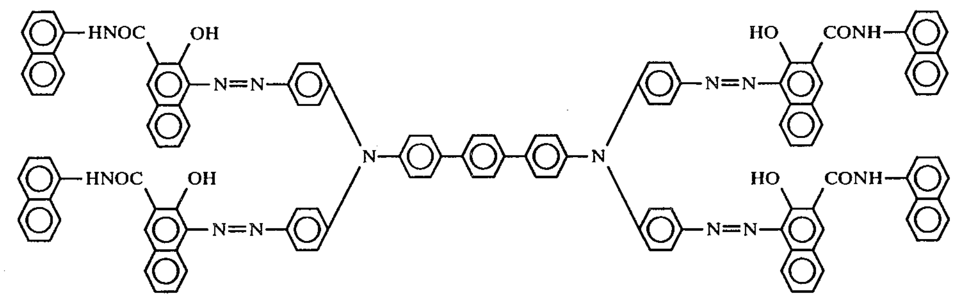
2-(8)
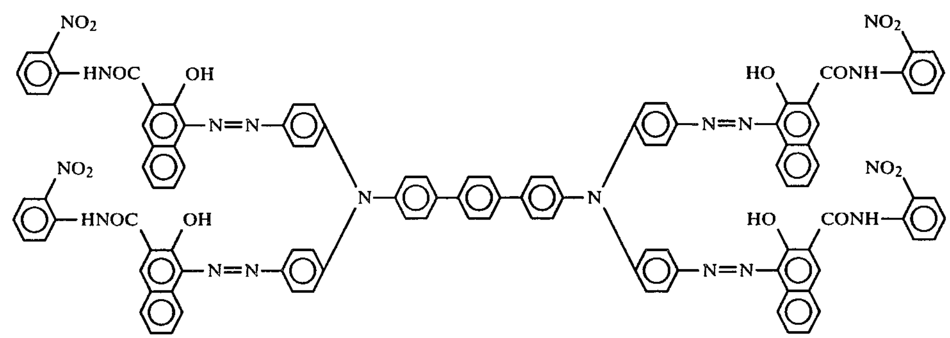
2-(9)
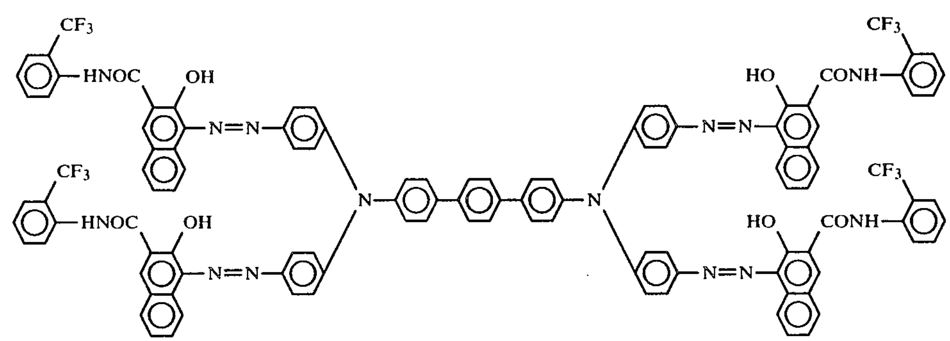

TABLE 2-continued
2-(10)
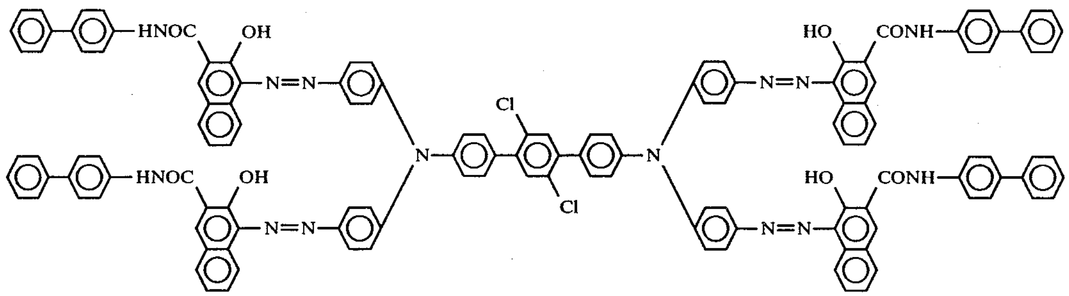
2-(11)
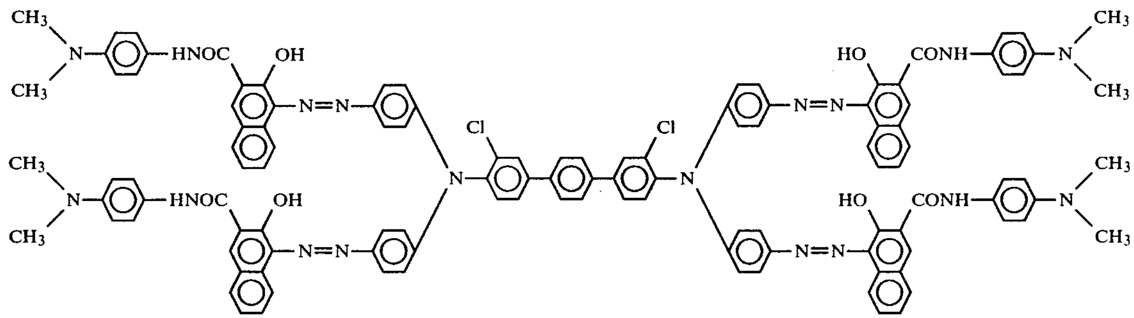
2-(12)
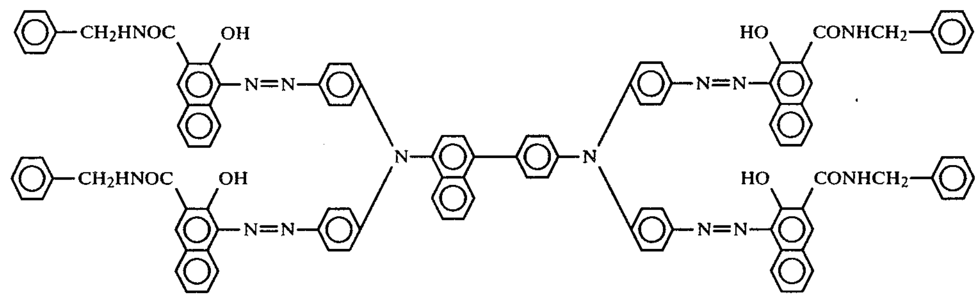

TABLE 2-continued
2-(13)
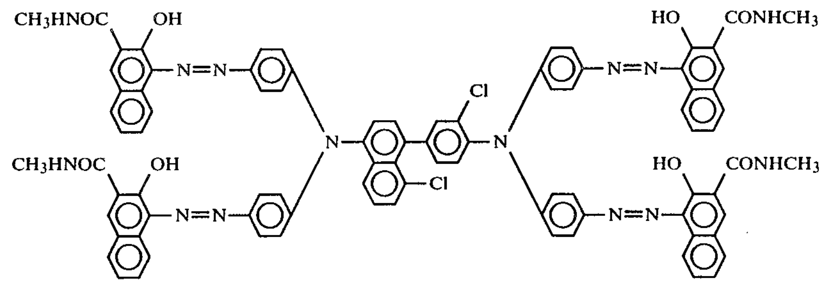
2-(14)
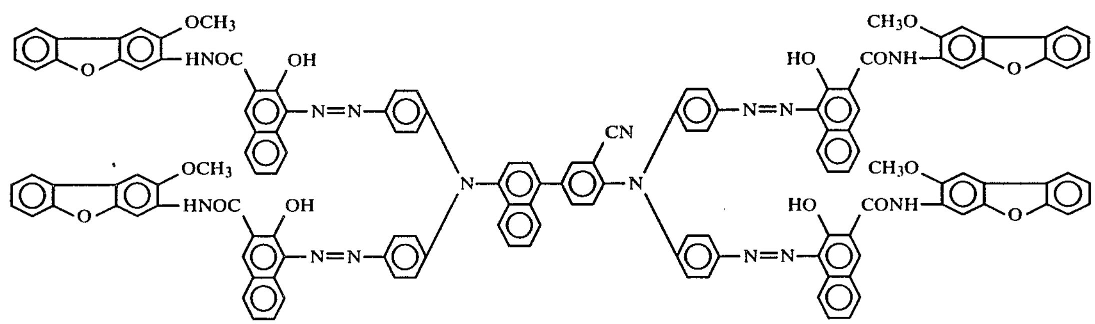
2-(15)
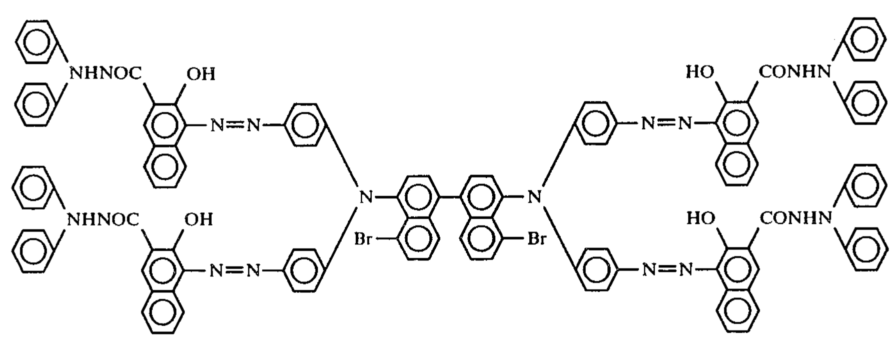

TABLE 2-continued
2-(16)
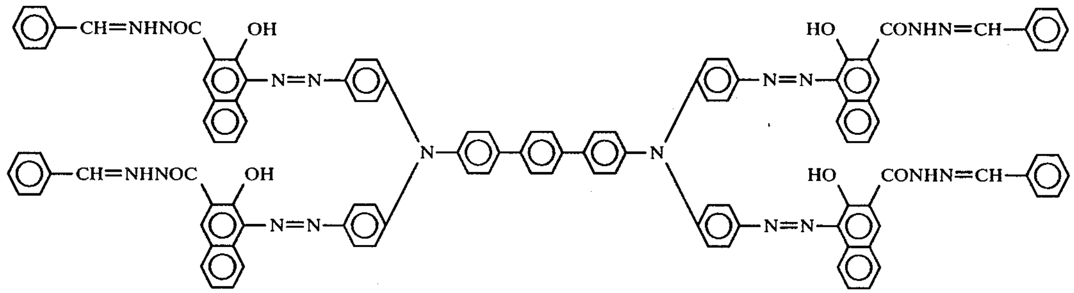
2-(17)
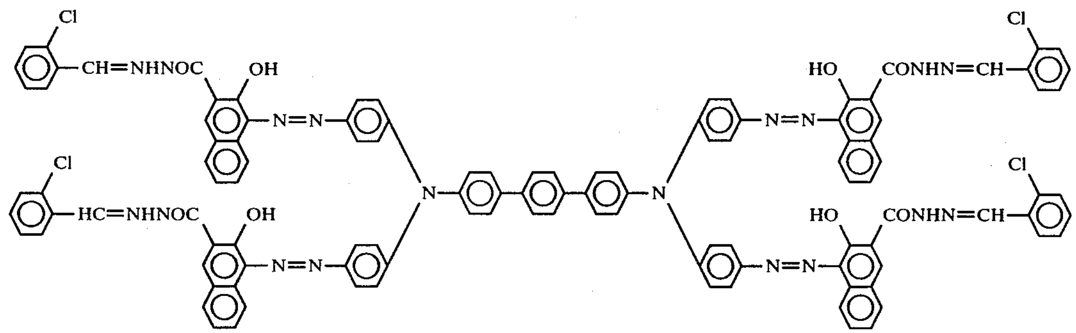
2-(18)
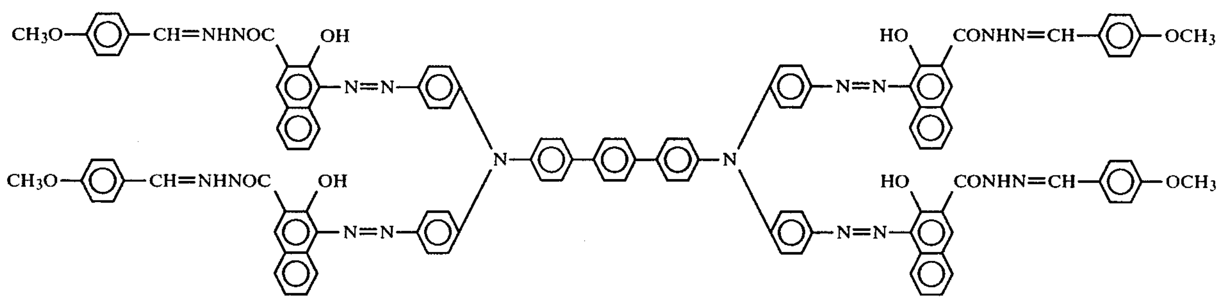

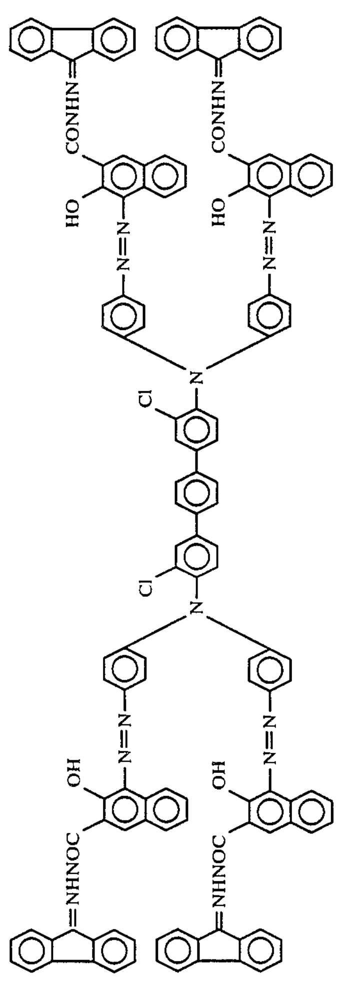
2-(19)
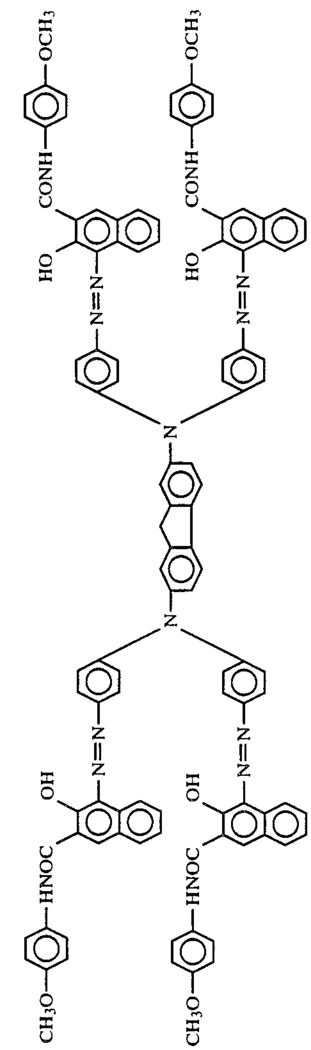
2-(20)
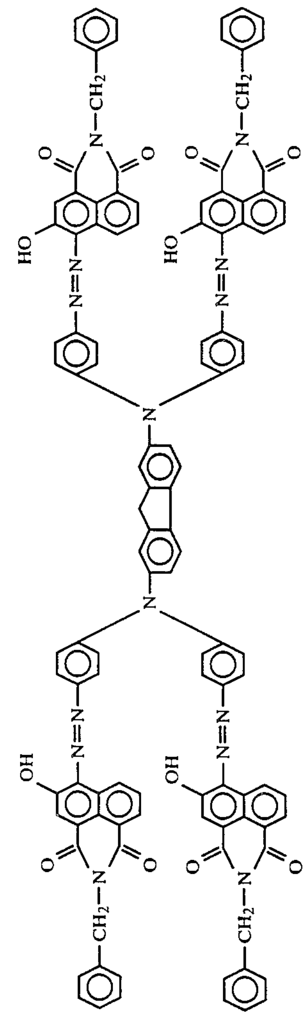
2-(21)

-continued
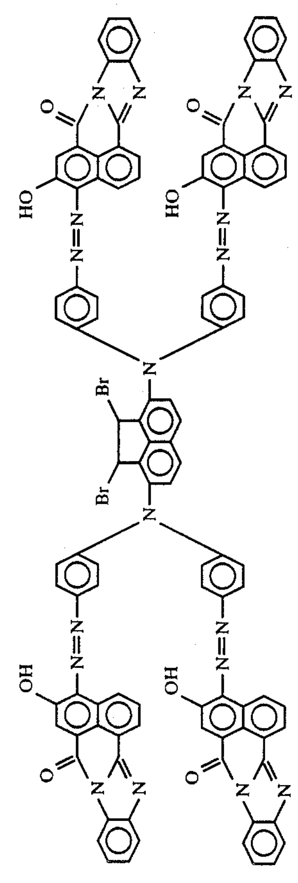
2-(22)
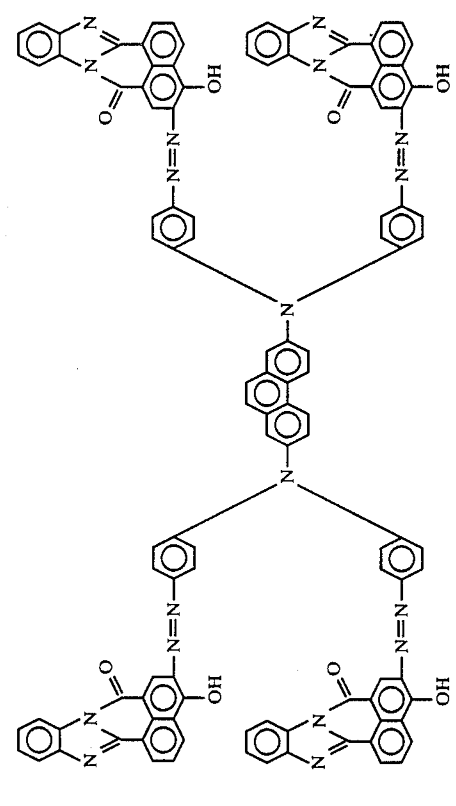
2-(23)

-continued
2-(24)
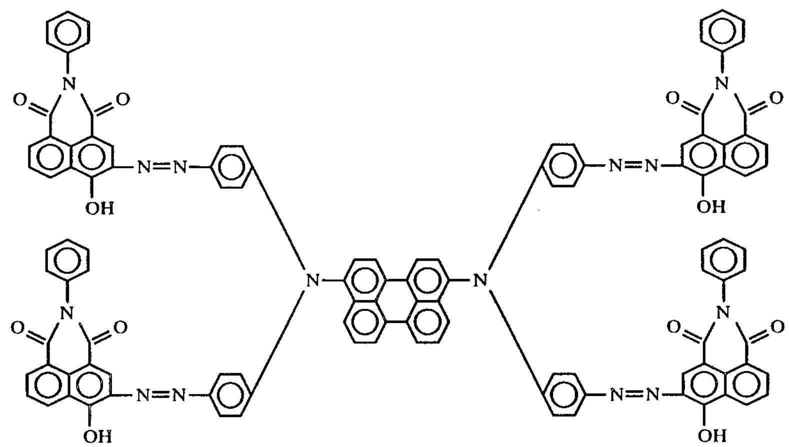
2-(25)
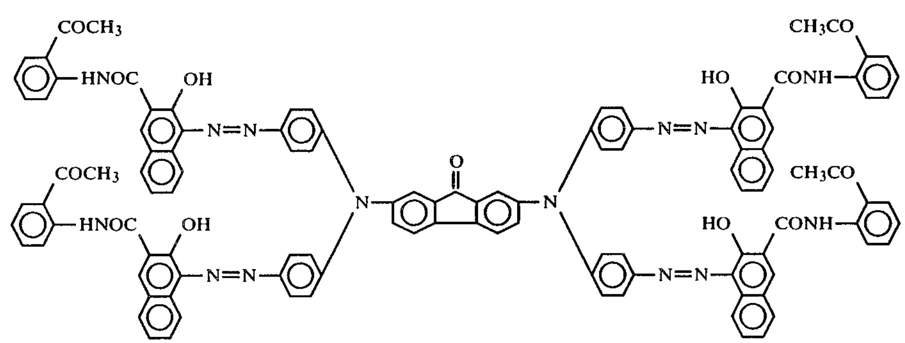

-continued
2-(26)
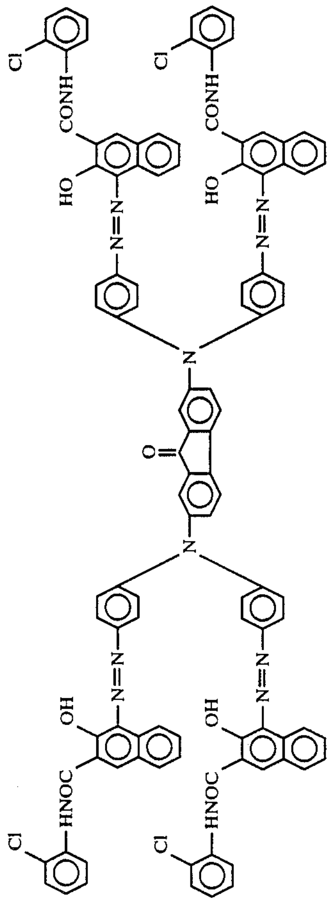
2-(27)
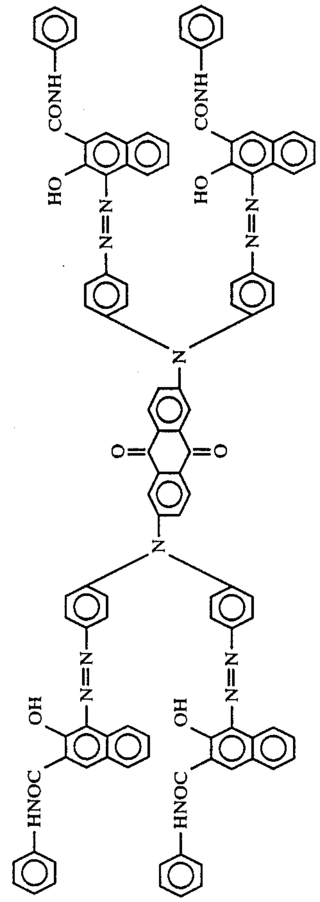
2-(28)
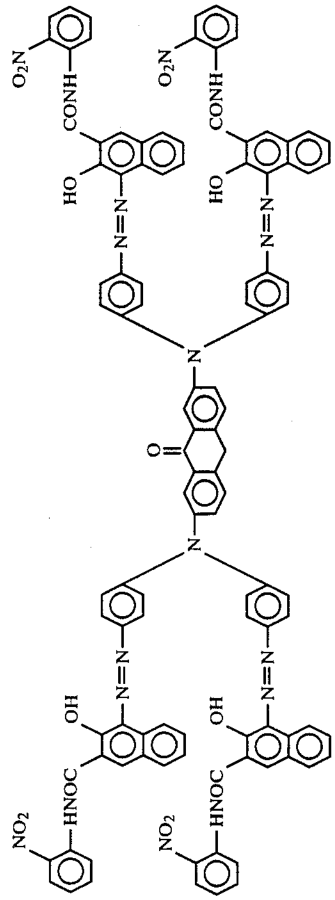

-continued
2-(29)
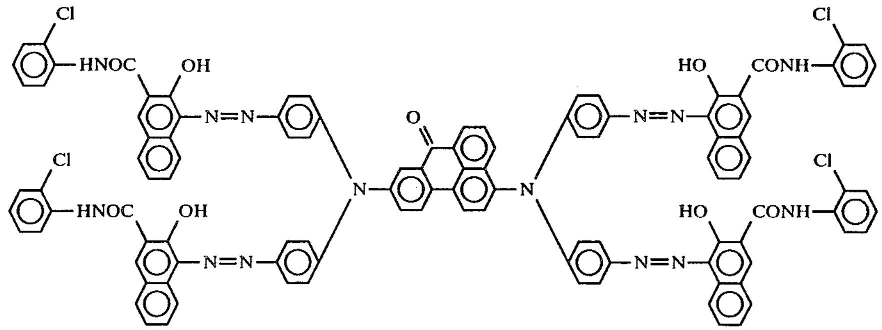
2-(30)
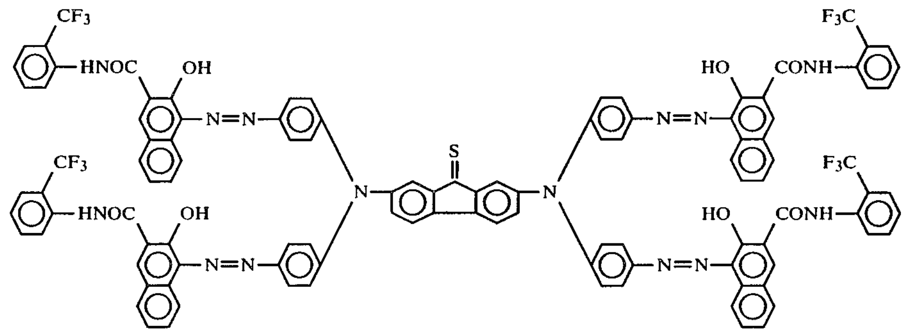
2-(31)
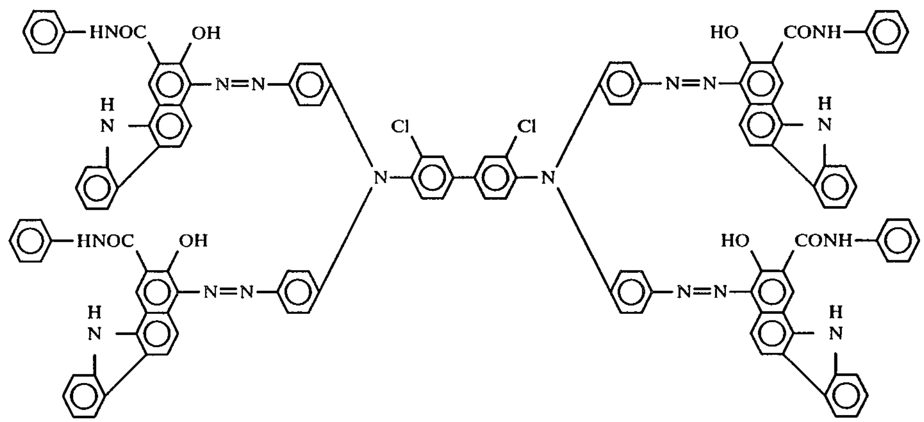

-continued
2-(32)
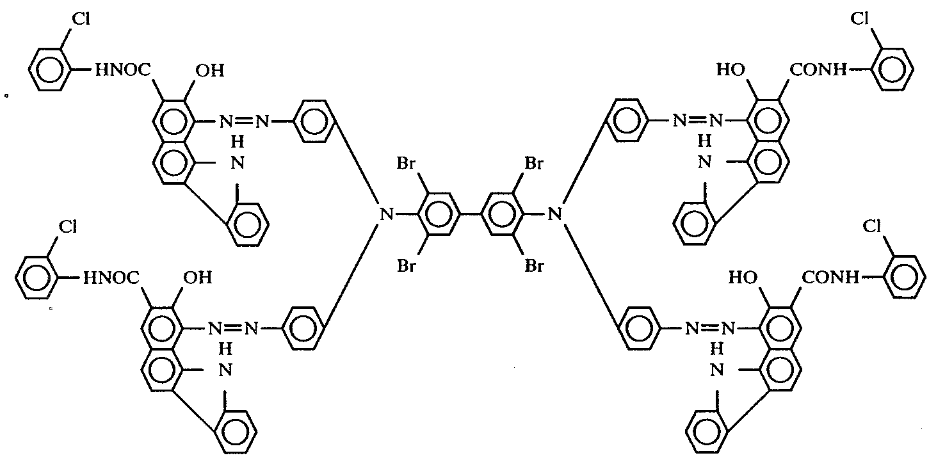
2-(33)
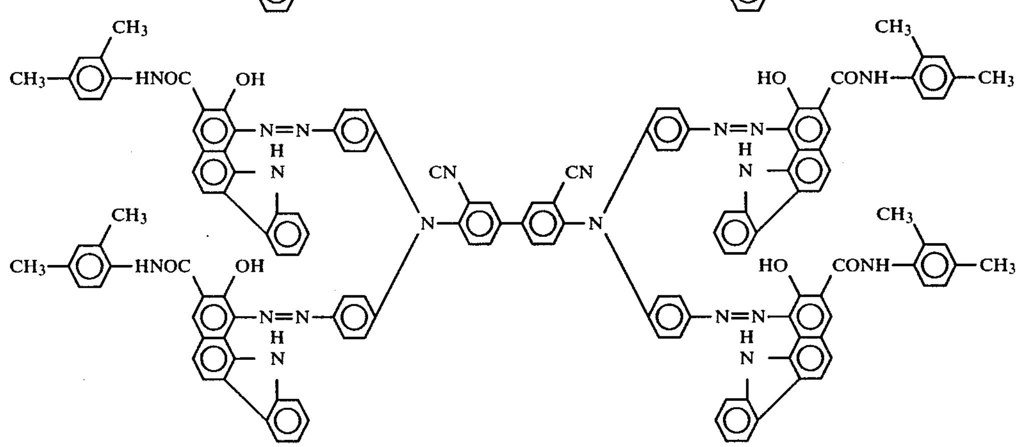

2-(34)
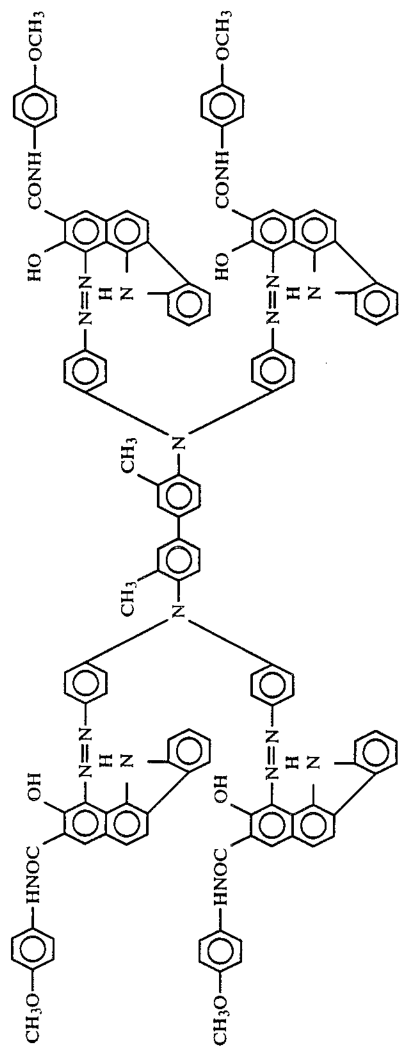
2-(35)
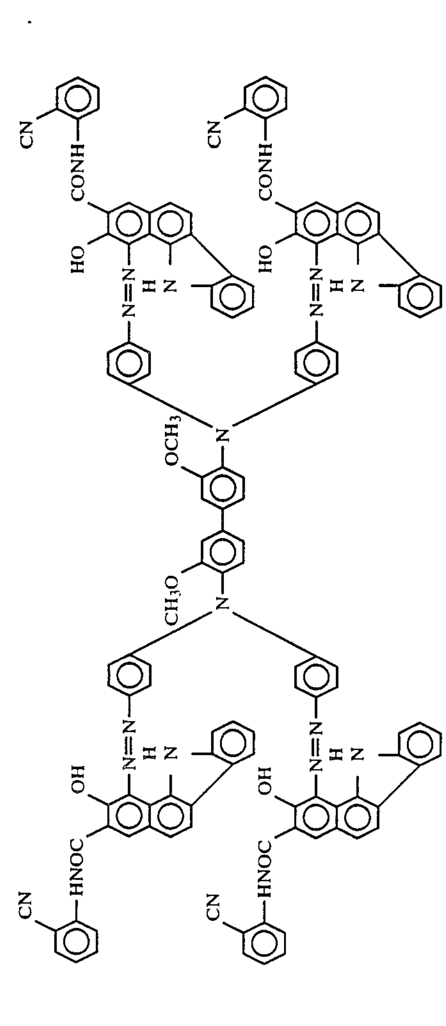

-continued
2-(36)
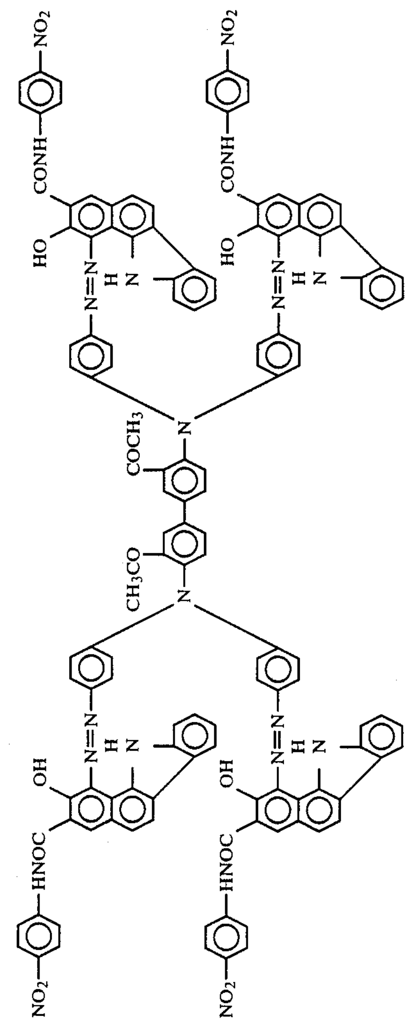
2-(37)
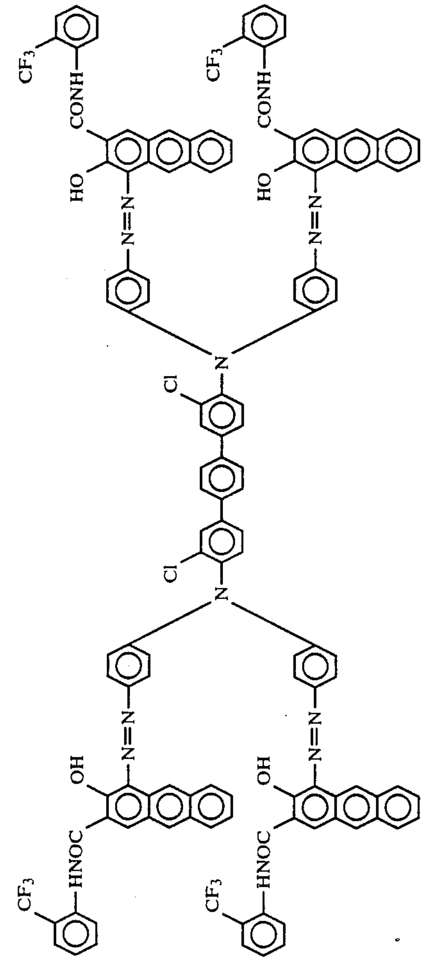

-continued
2-(38)
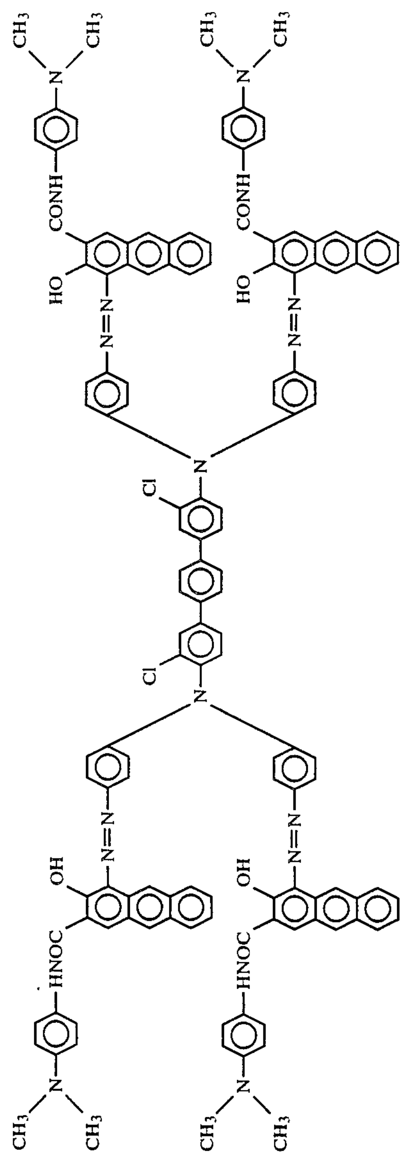
2-(39)
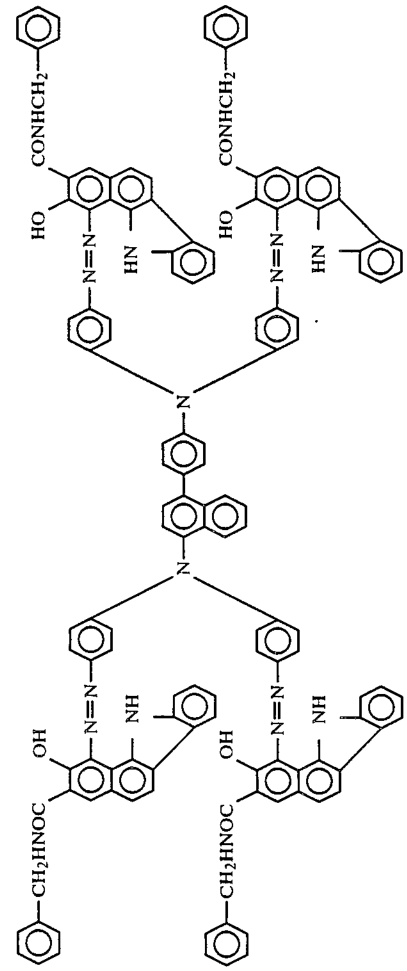

-continued
2-(40)
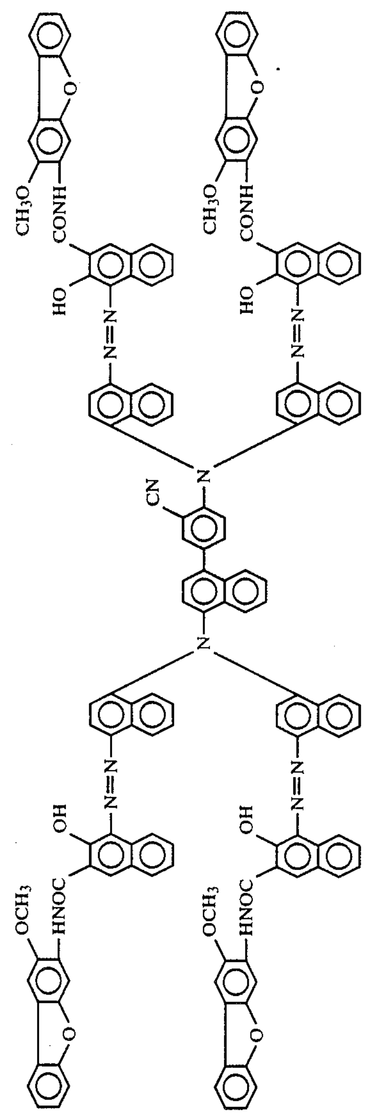
2-(41)
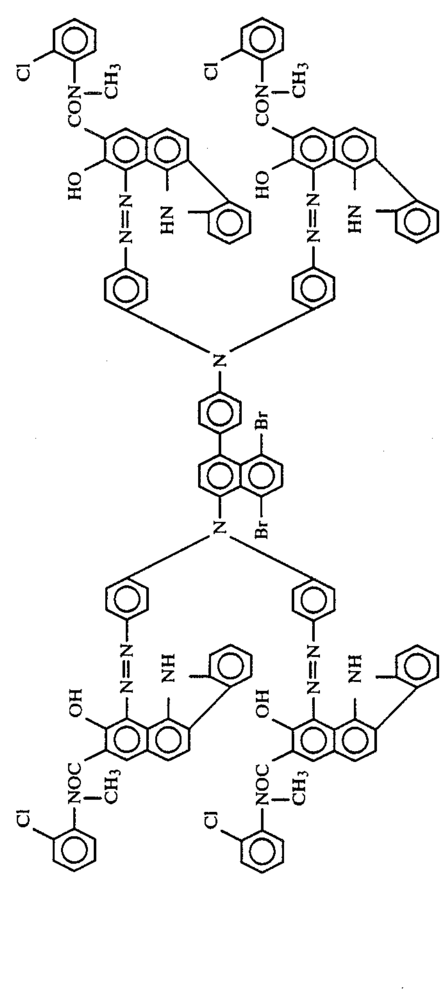

-continued
2-(42)
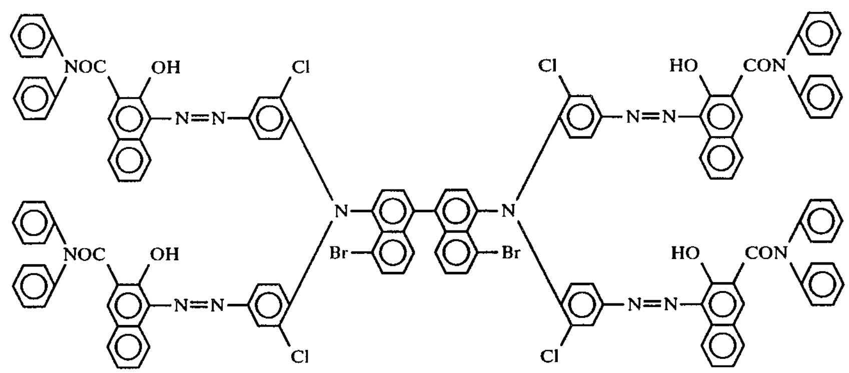
2-(43)
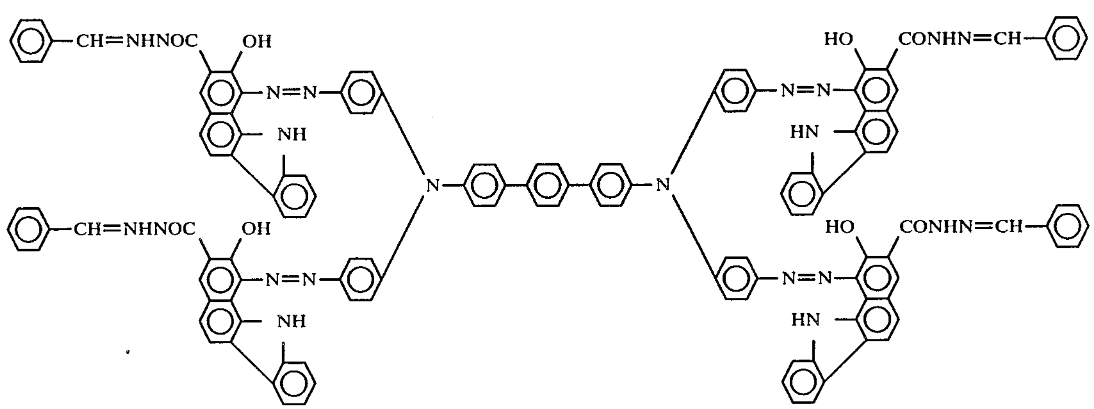

-continued
2-(44)
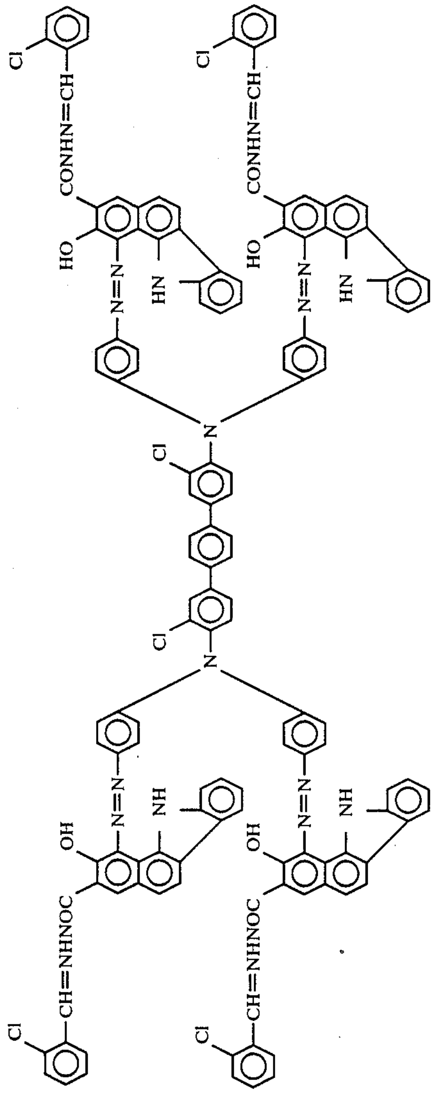
2-(45)
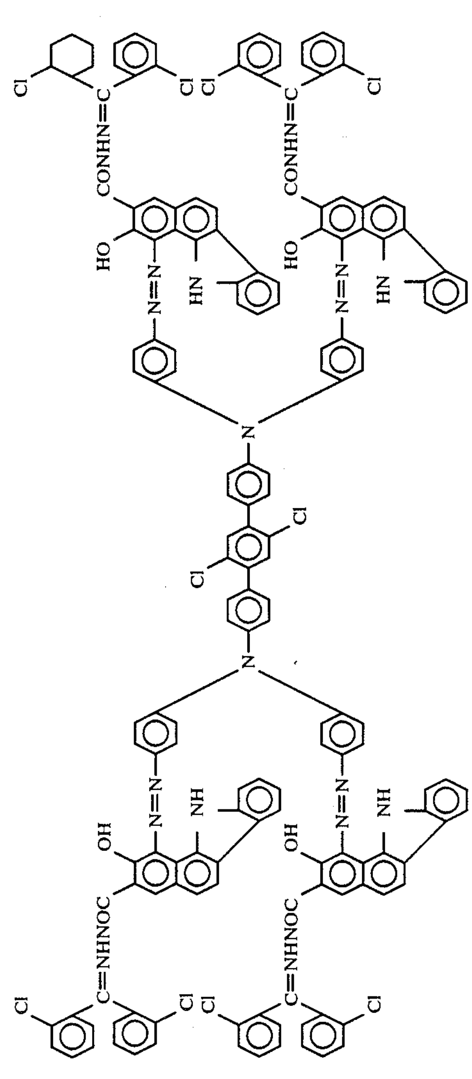

-continued
2-(46)
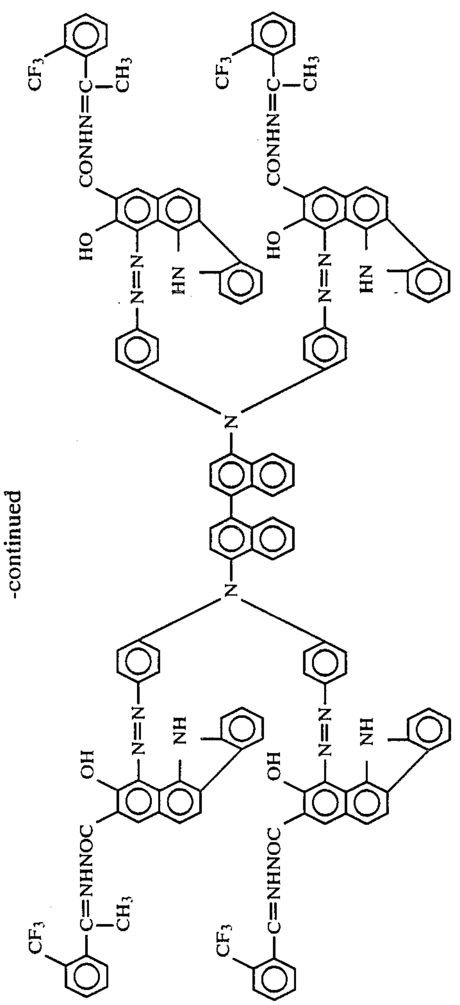
2-(47)
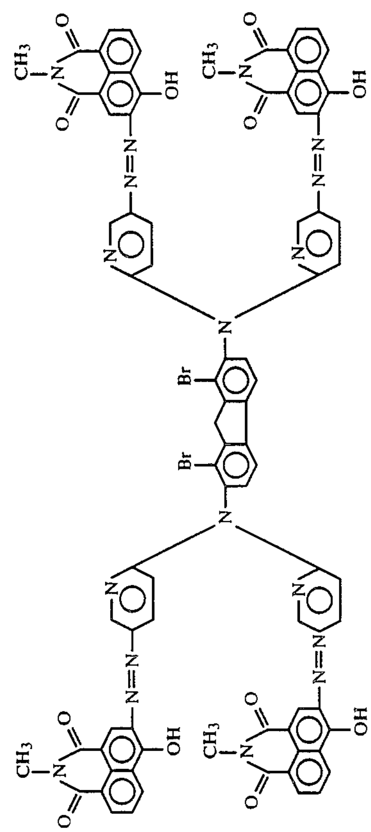

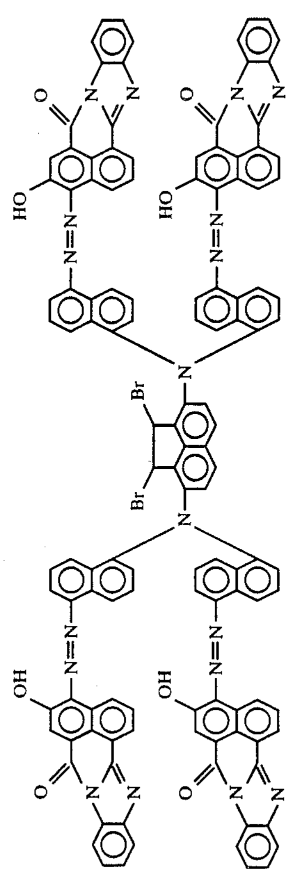
2-(48)
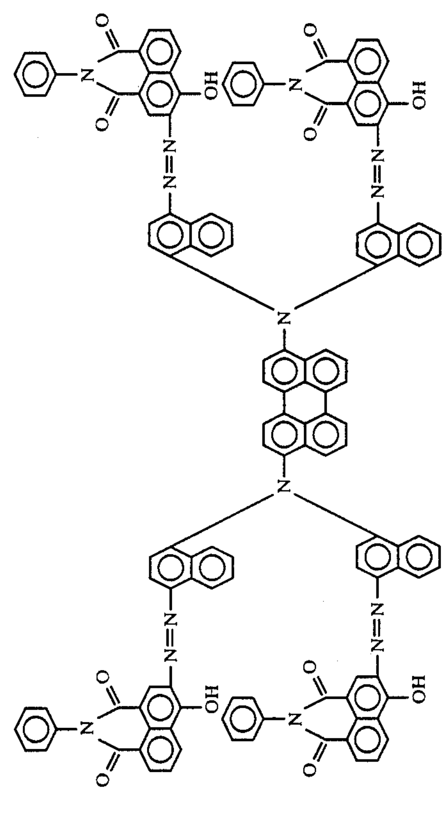
2-(49)

-continued
2-(50)
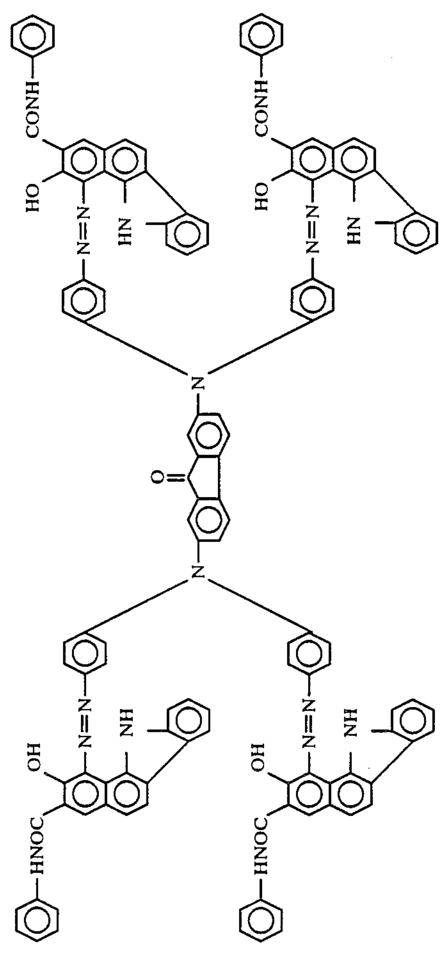
2-(51)
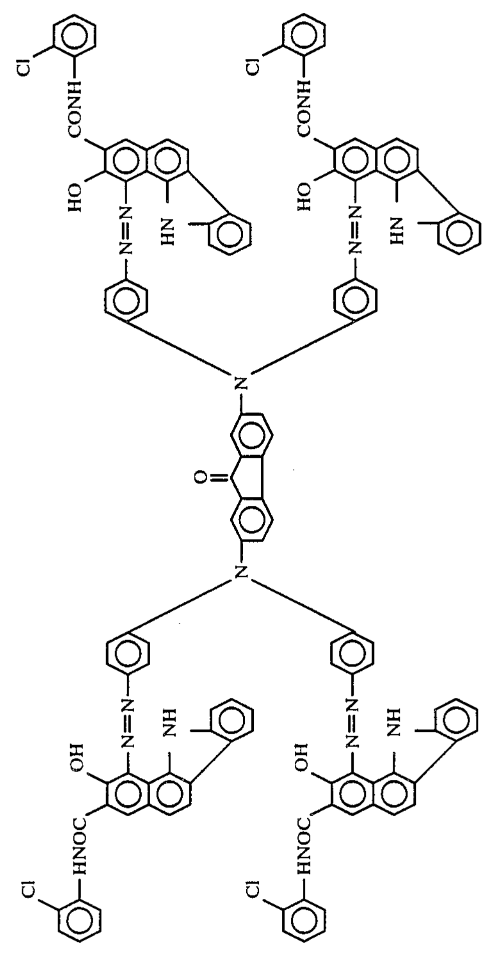

-continued
2-(52)
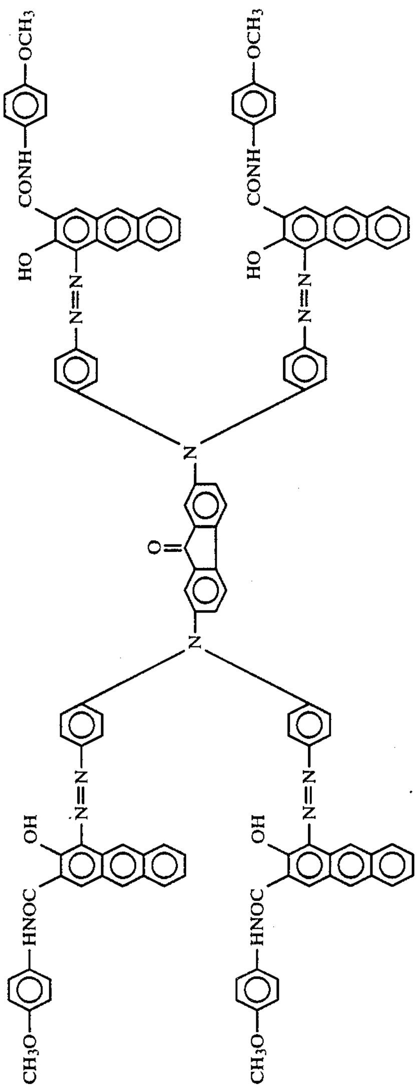
2-(53)
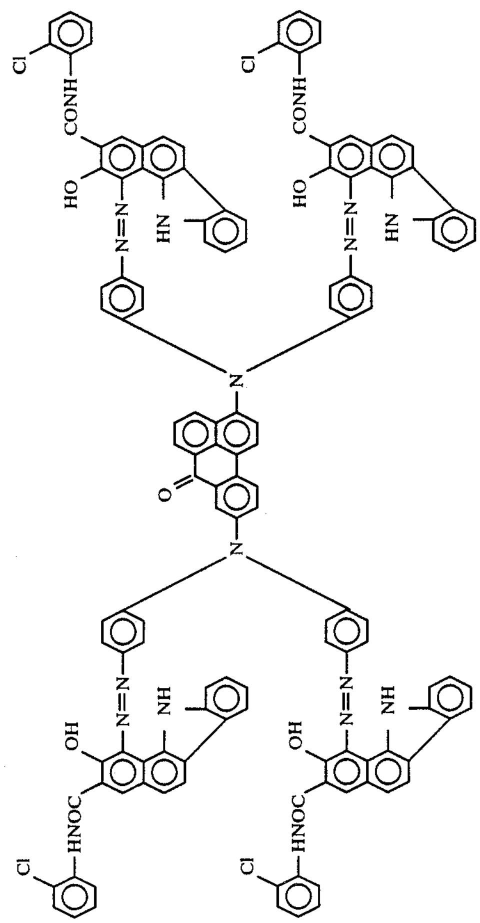

-continued
2-(54)
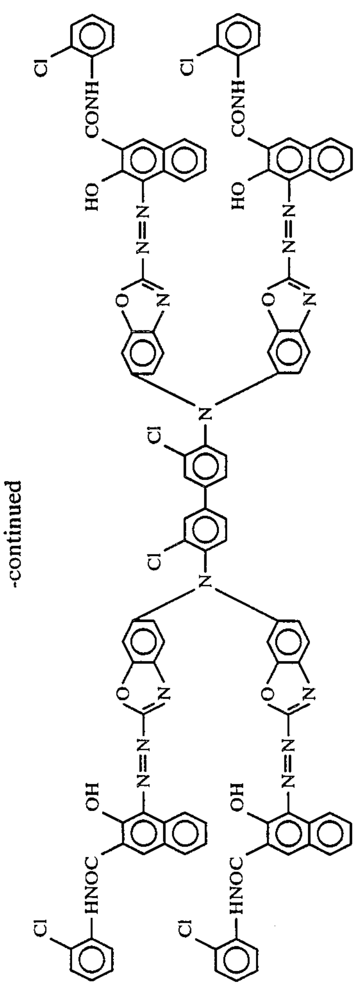
2-(55)
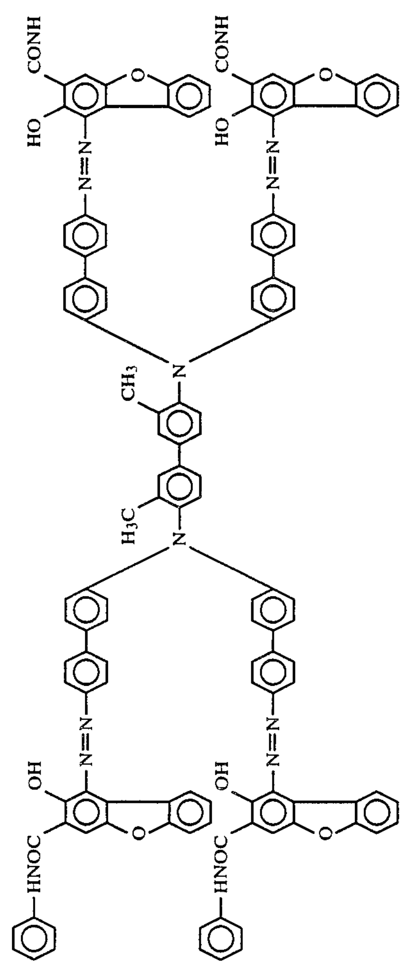
2-(56)
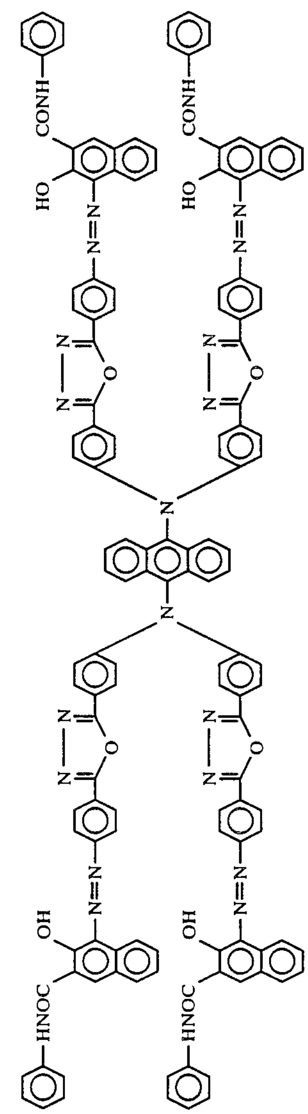

-continued
2-(57)
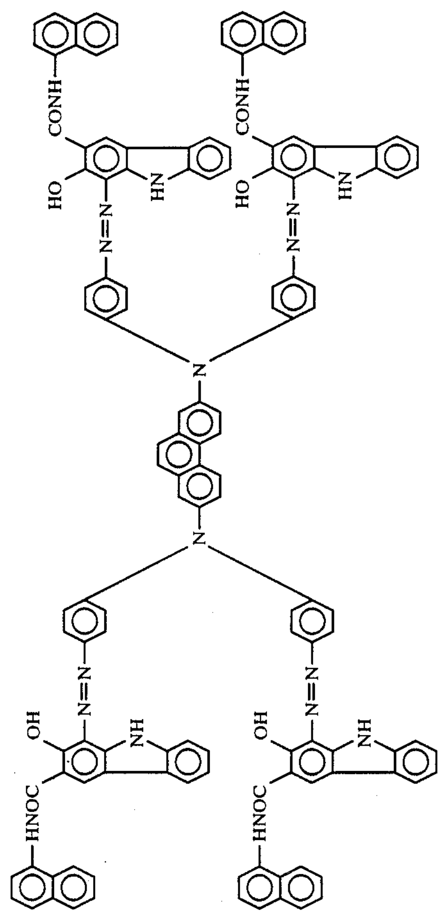
2-(58)
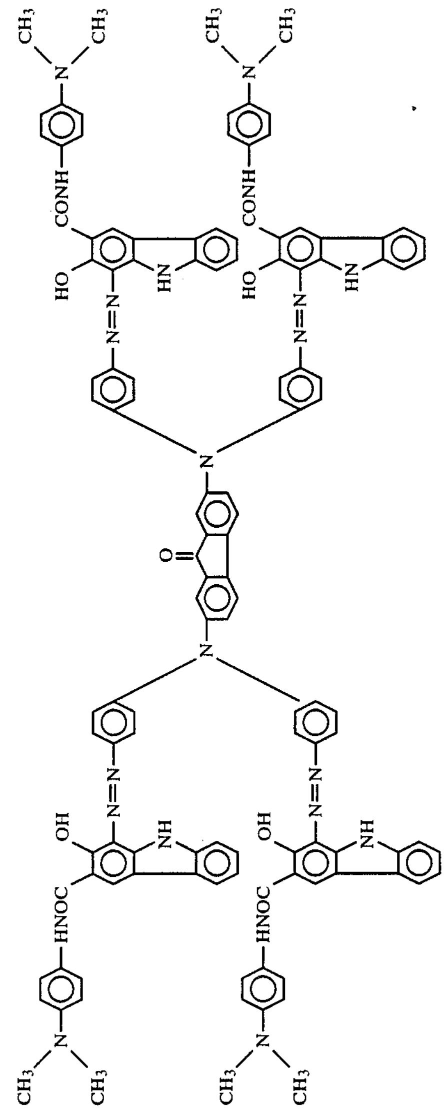

-continued
2-(59)
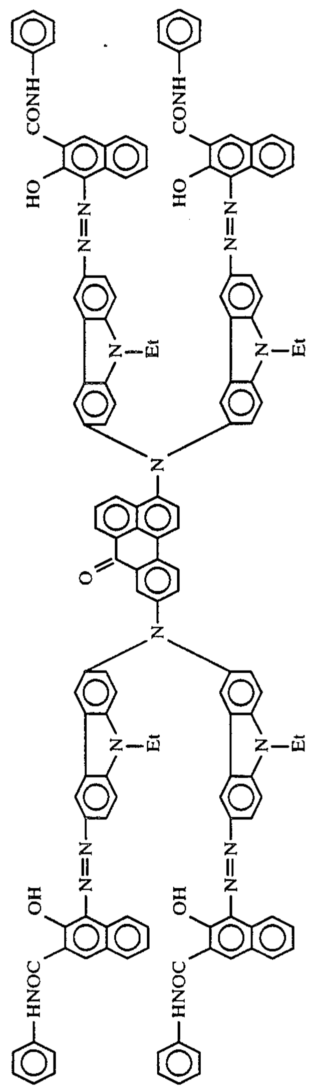
2-(60)
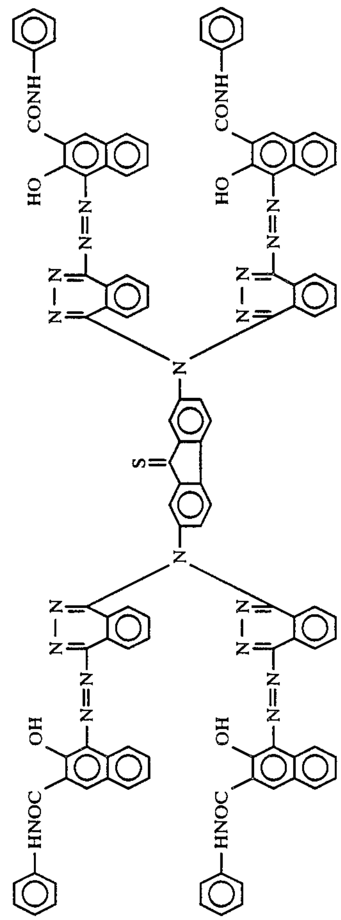
2-(61)
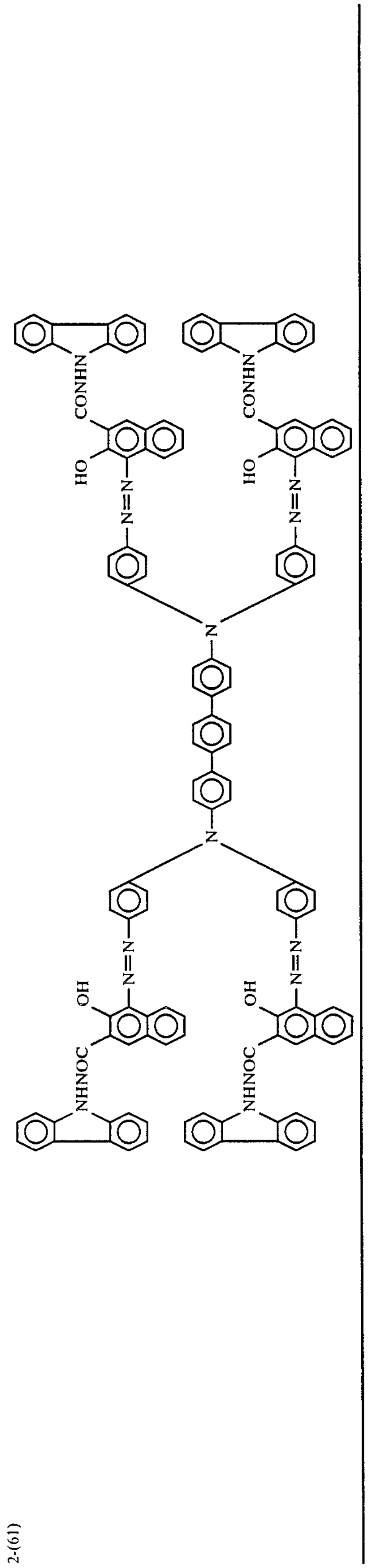

TABLE 3
Examples of azo pigment represented by the general formula (3)
| No. | |
|---|---|
| 3-(1) | 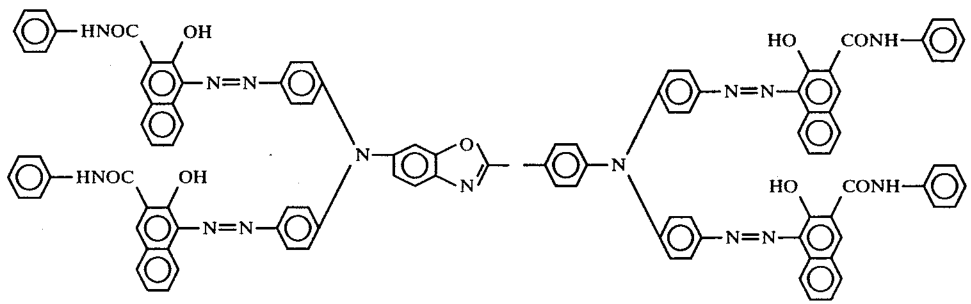 |
| 3-(2) | 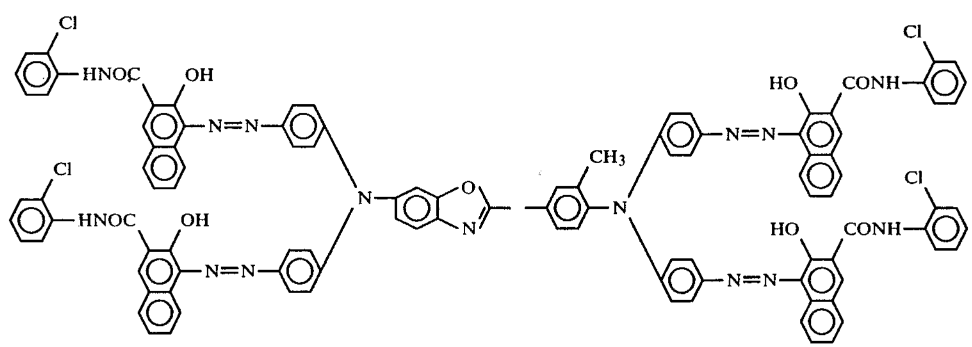 |

TABLE 3-continued
3-(3)
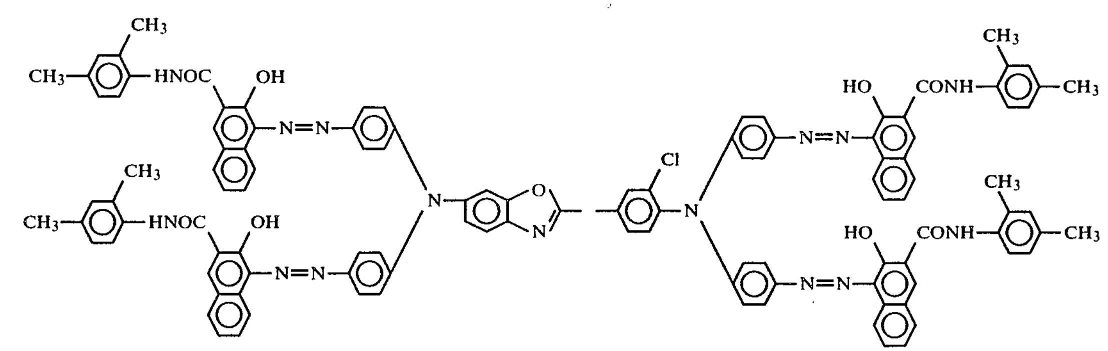
3-(4)
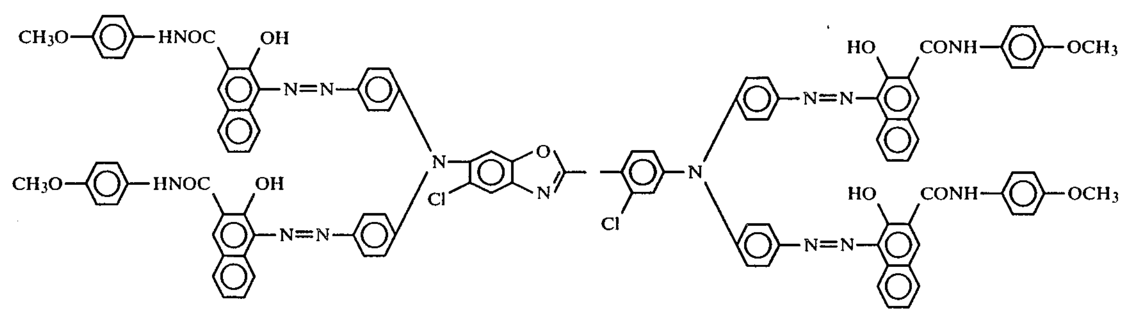

TABLE 3-continued
3-(5)
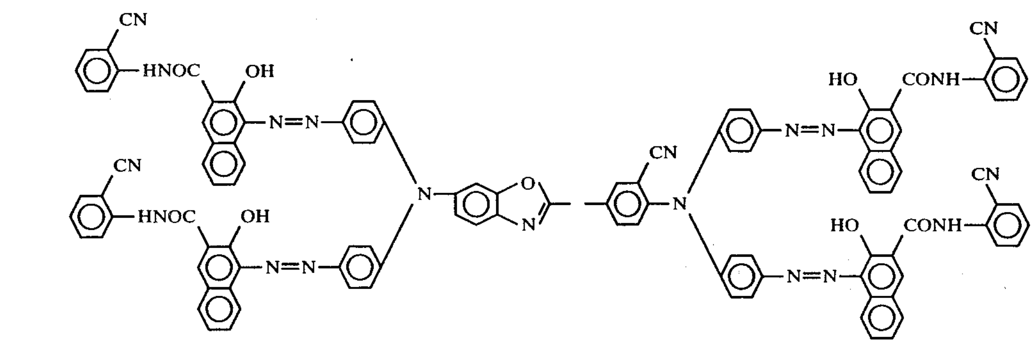
3-(6)
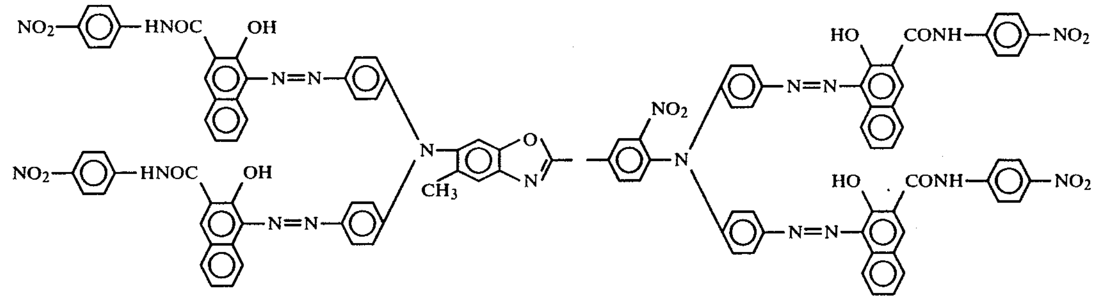

TABLE 3-continued
3-(7)
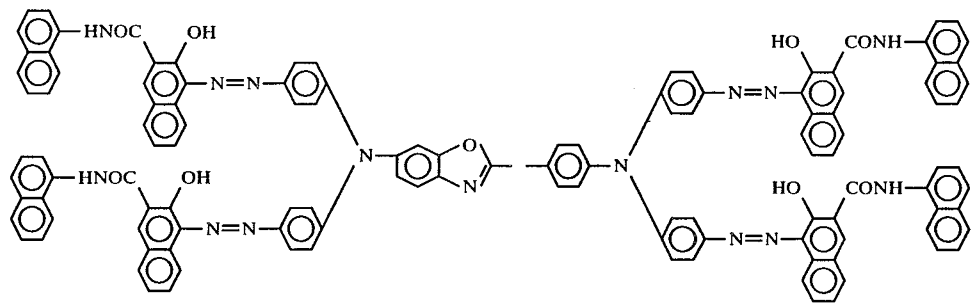
3-(8)
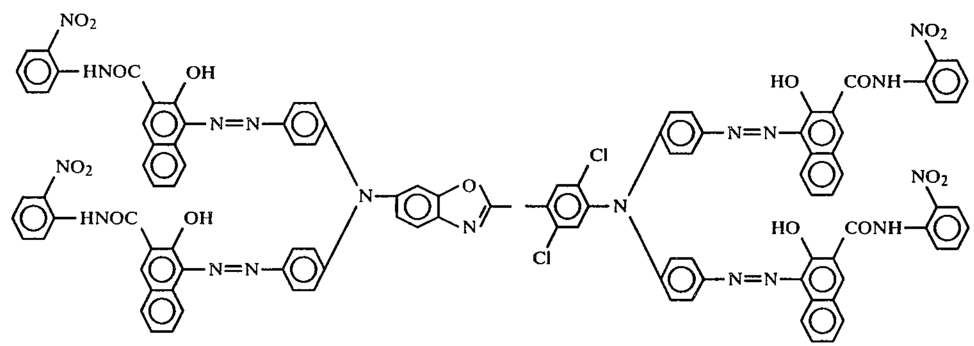

TABLE 3-continued
3-(9)
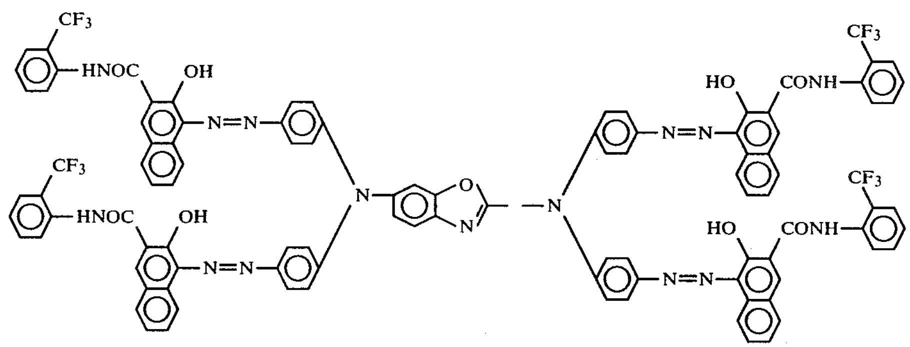
3-(10)
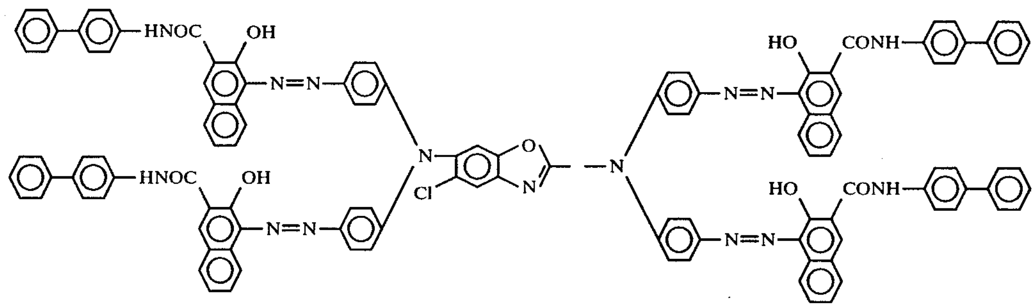

TABLE 3-continued
3-(11)
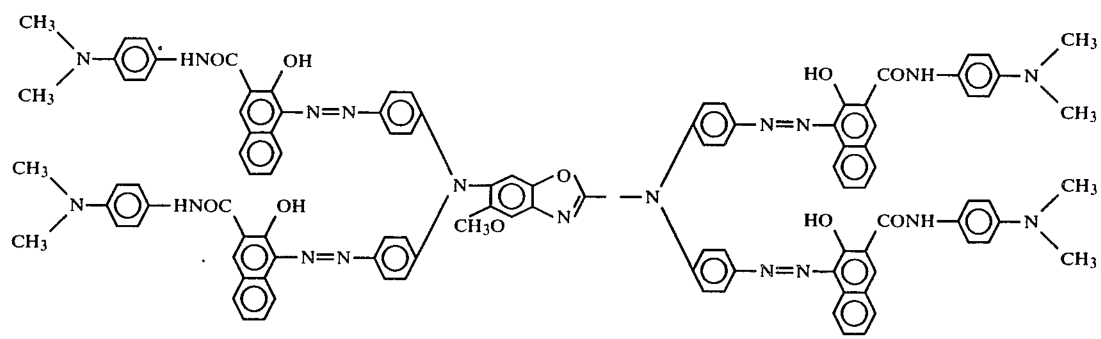
3-(12)
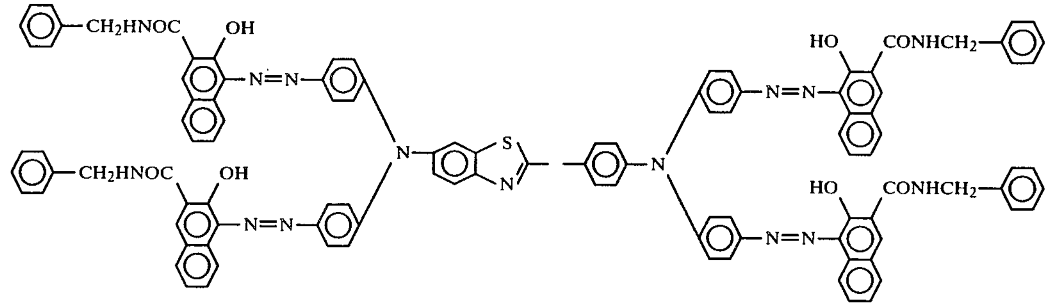

TABLE 3-continued
3-(13)
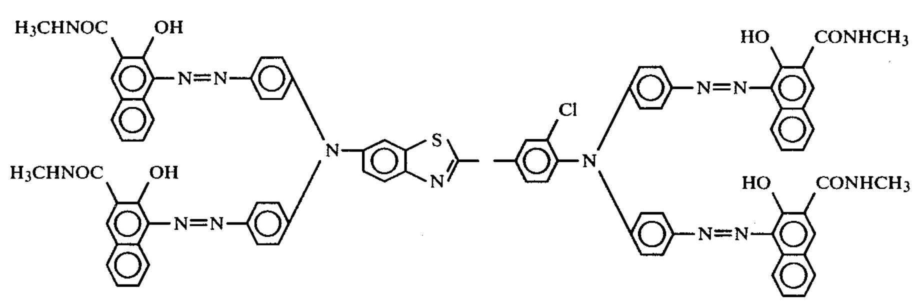
3-(14)
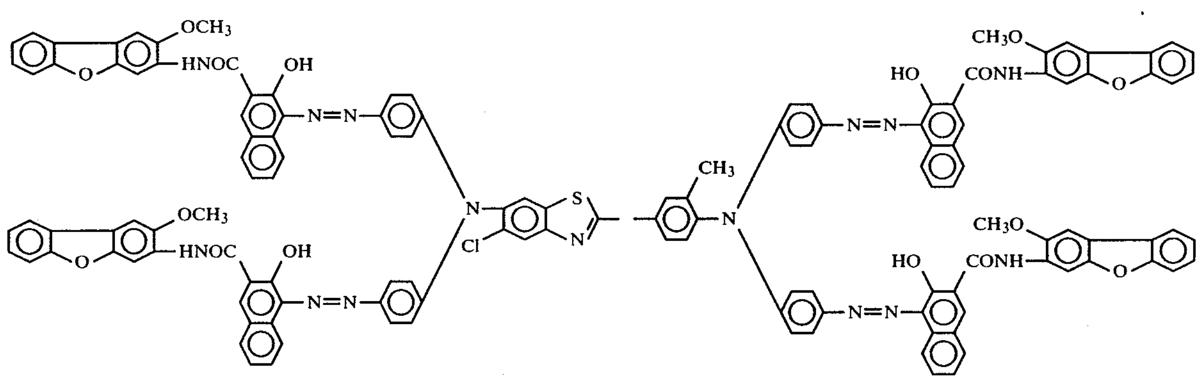

TABLE 3-continued
3-(15)
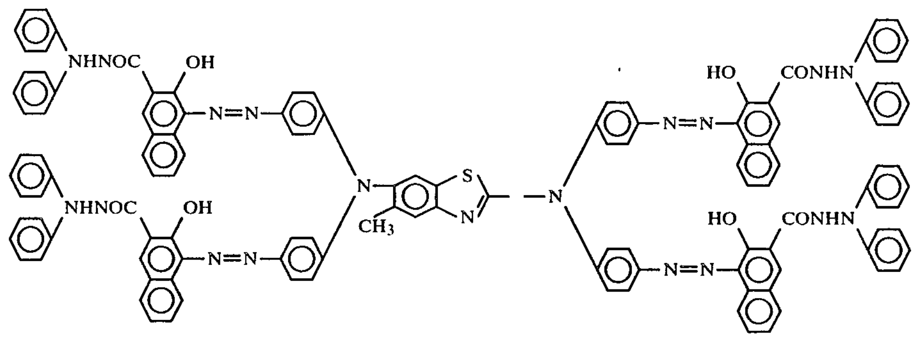
3-(16)
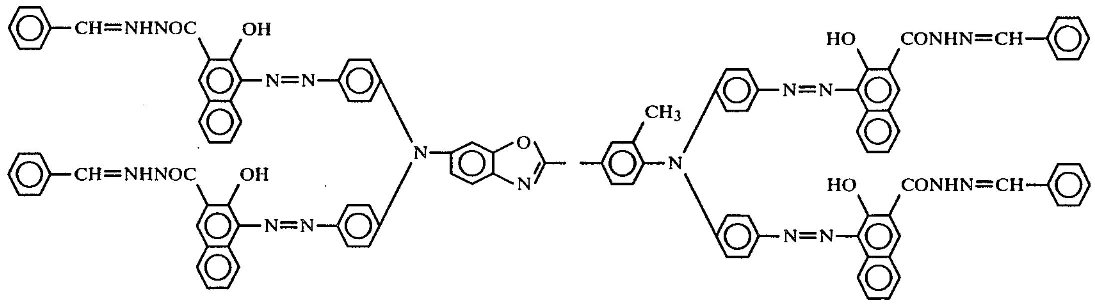

TABLE 3-continued
3-(17)
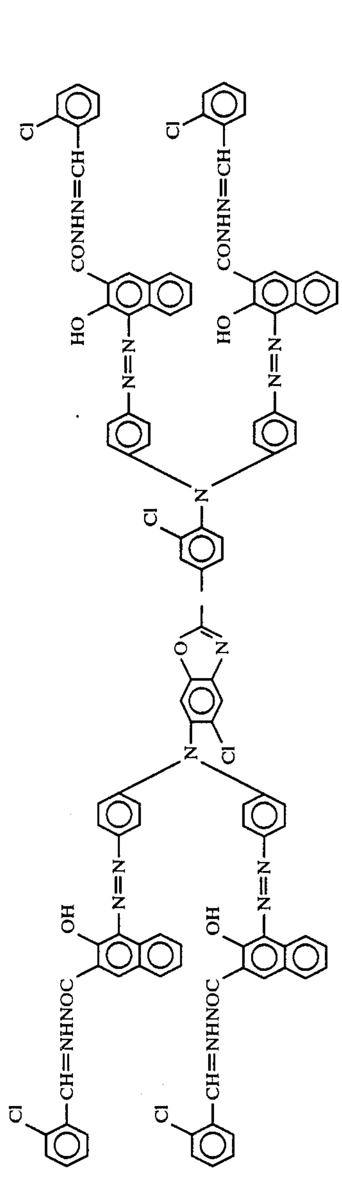
3-(18)
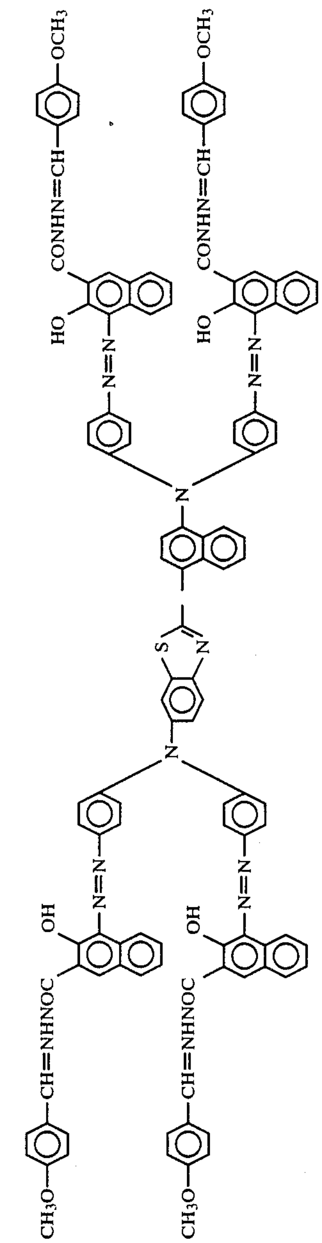

3-(19)
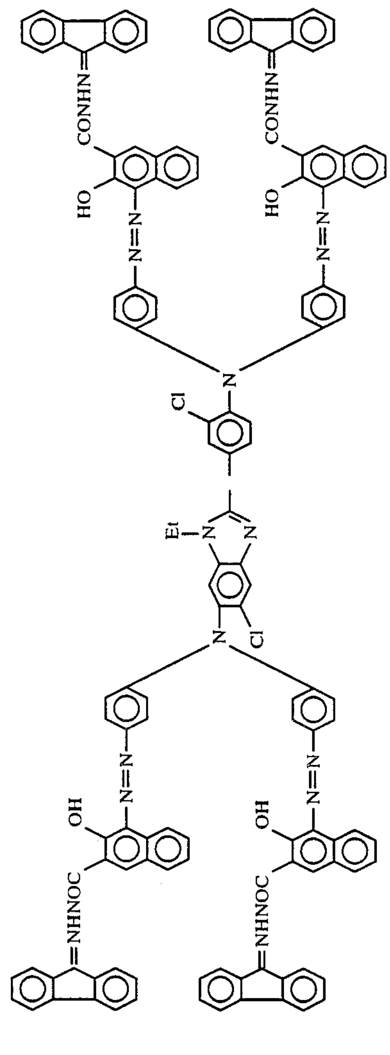
3-(20)
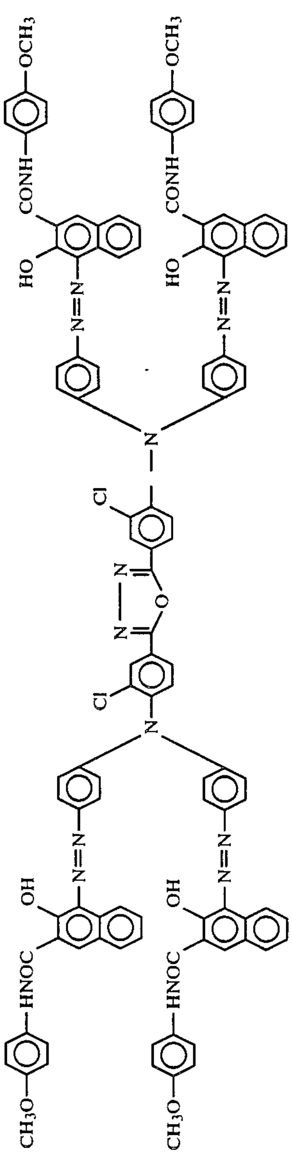

-continued
3-(21)
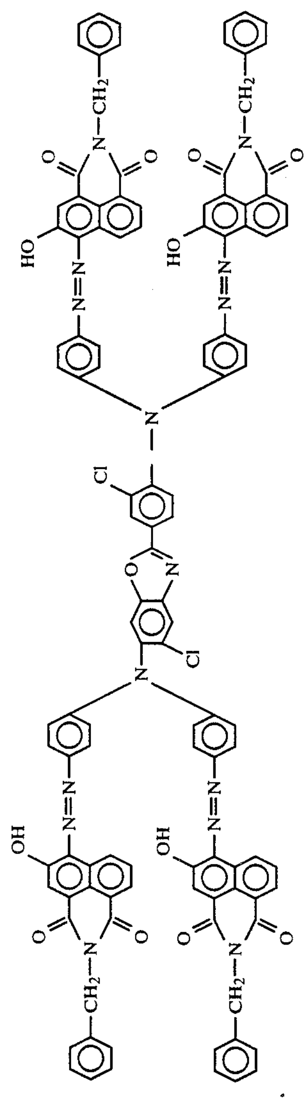
3-(22)
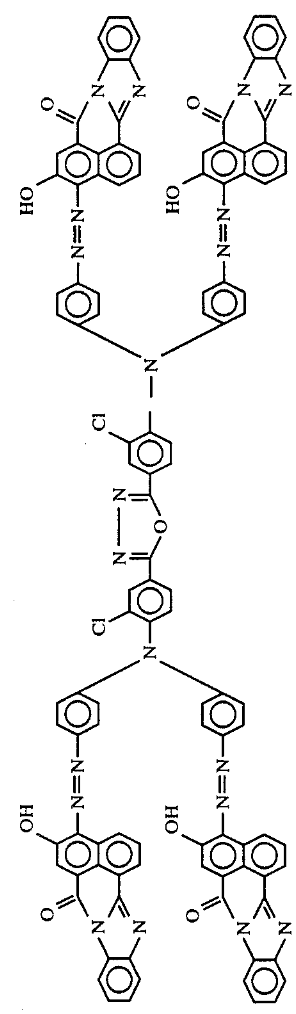

-continued
3-(23)
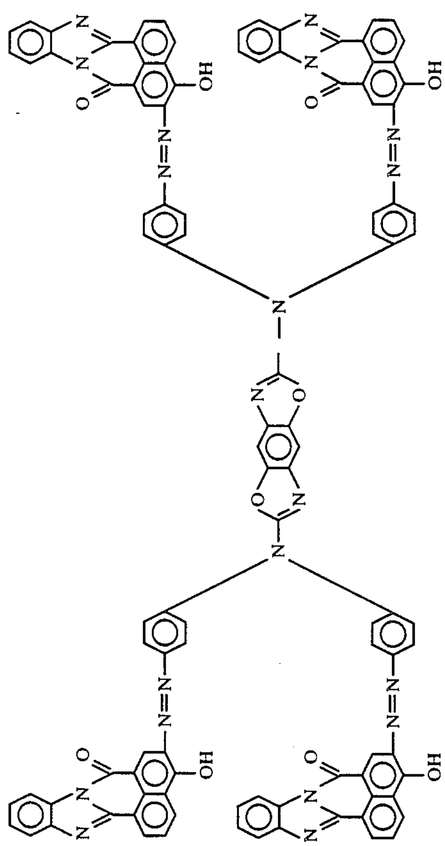
3-(24)
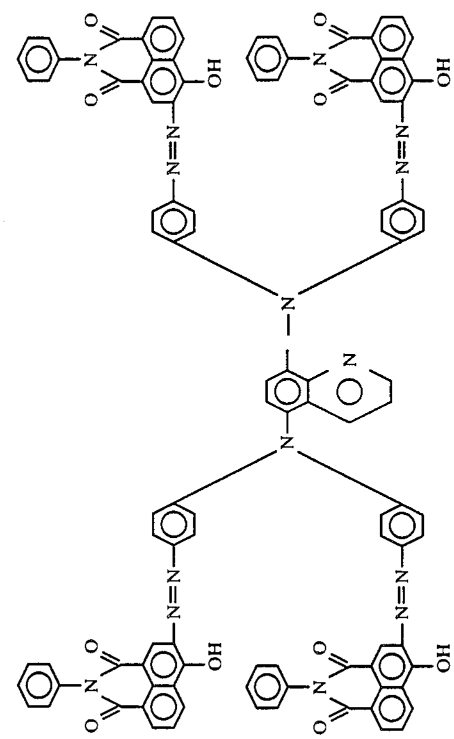

-continued
3-(25)
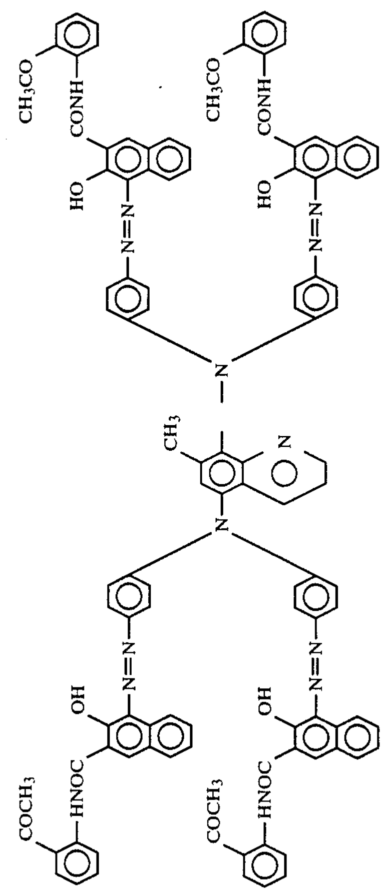
3-(26)
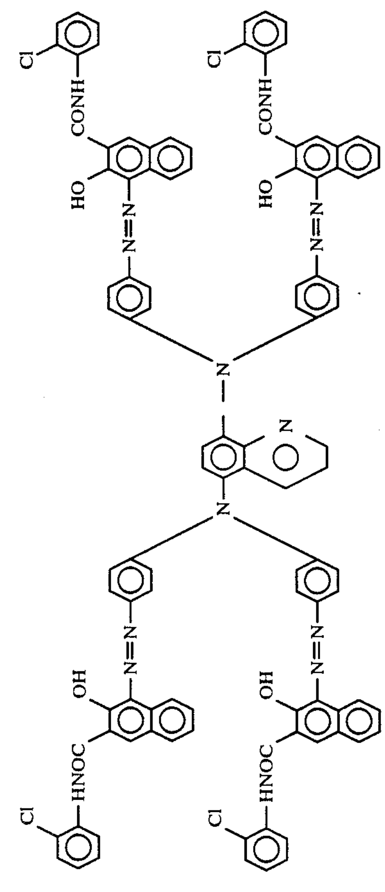

-continued
3-(27)
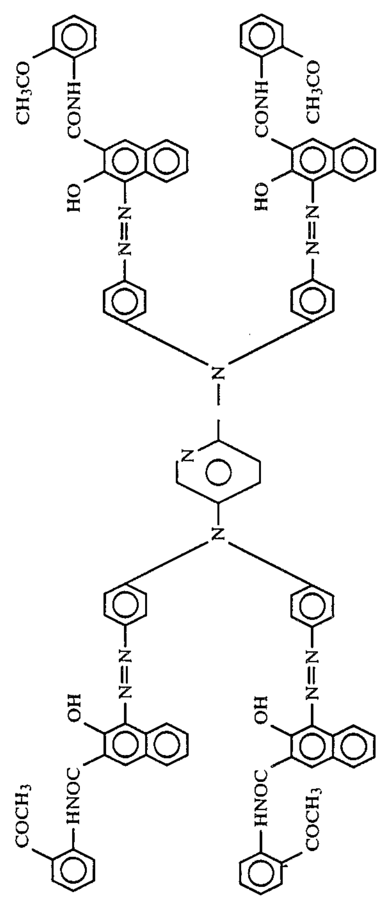
3-(28)
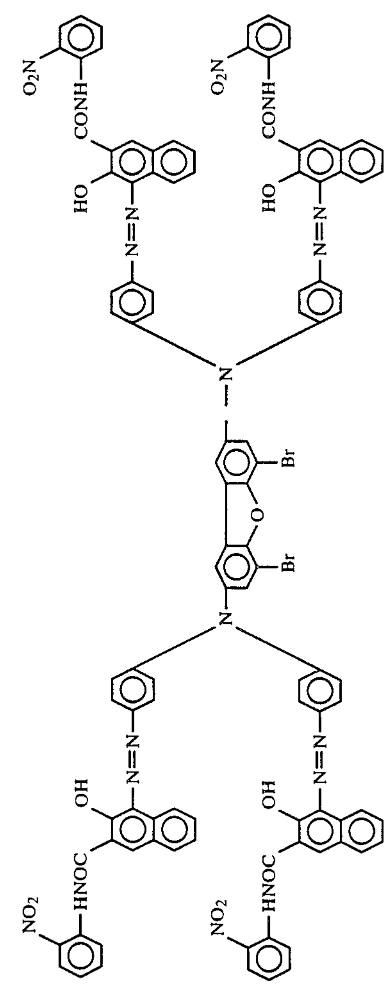

-continued
3-(29)
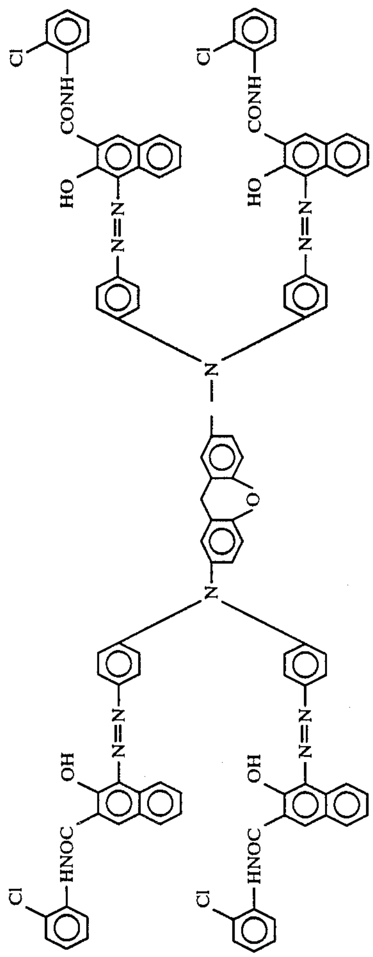
3-(30)
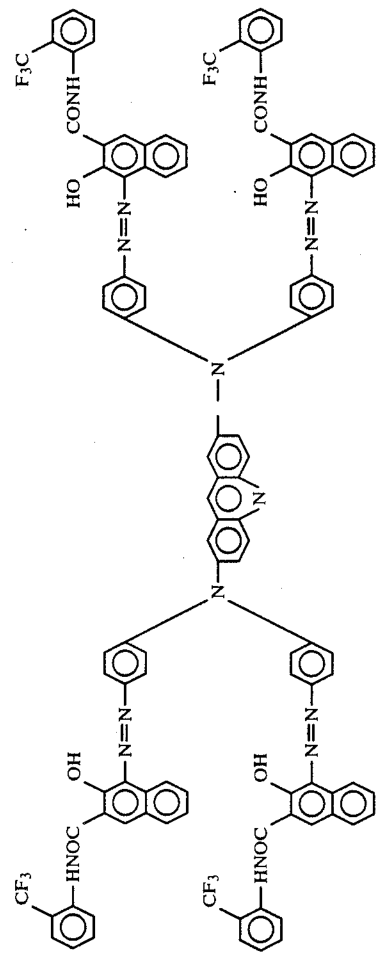

-continued
3-(31)
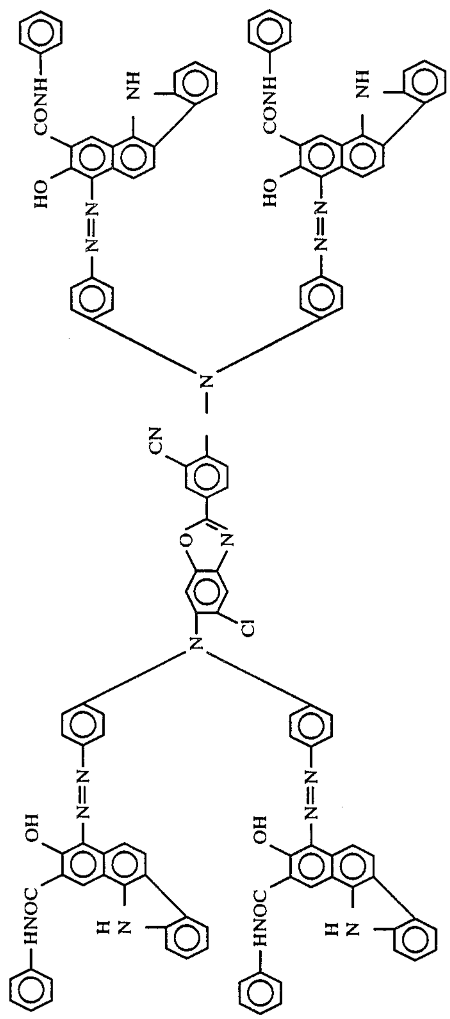
3-(32)
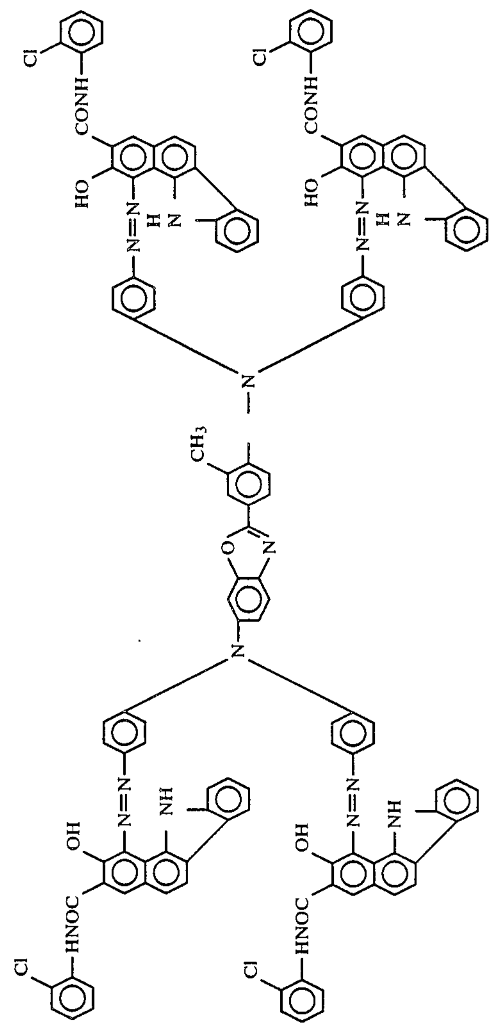

-continued
3-(33)
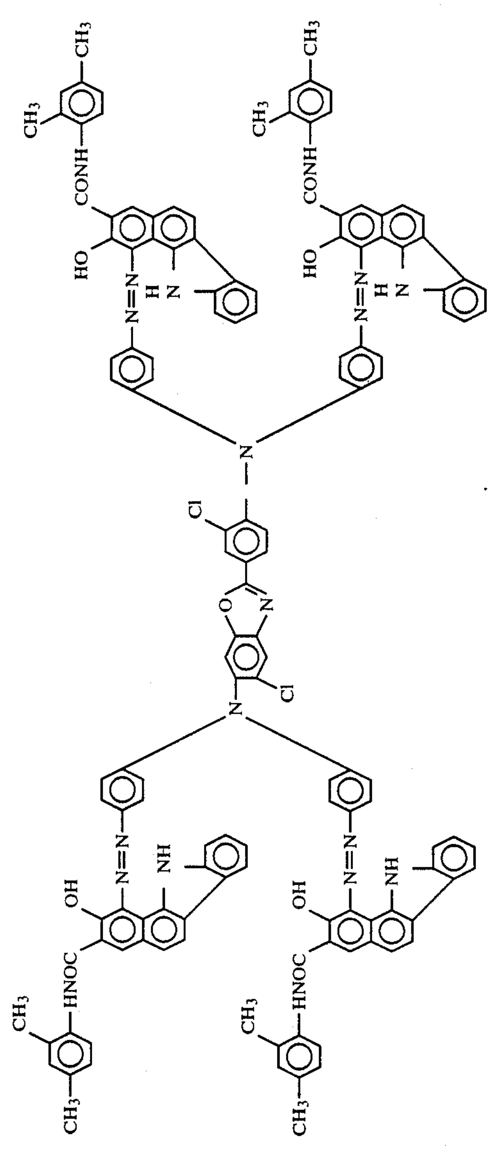
3-(34)
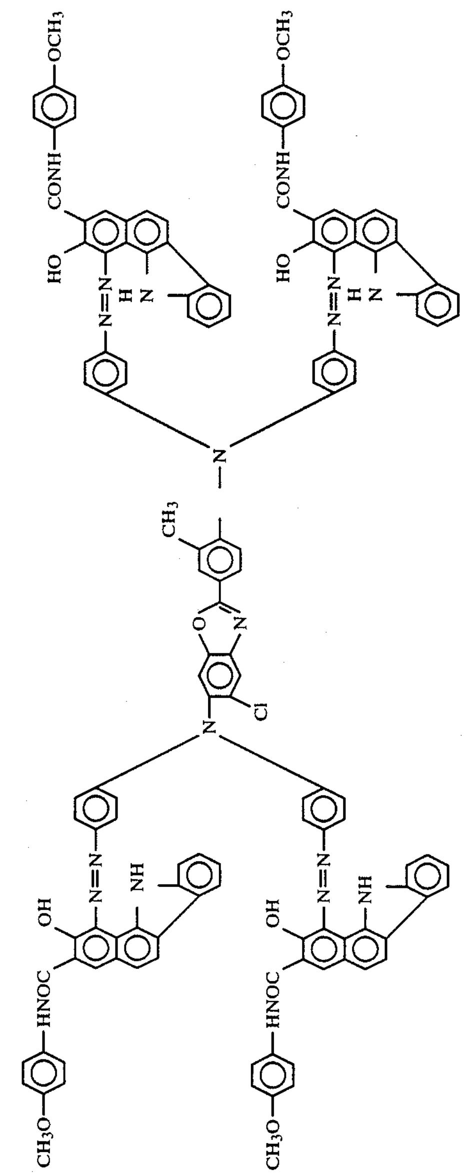

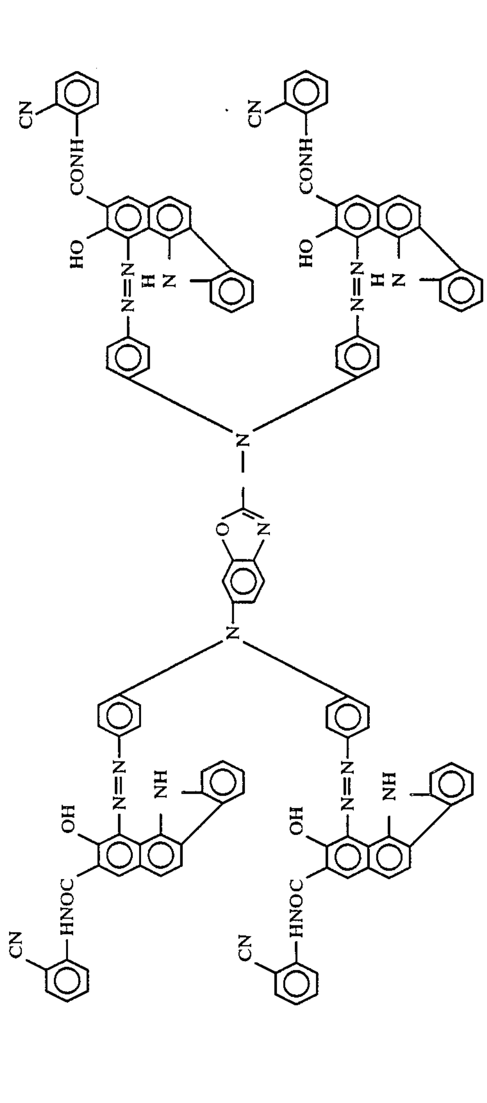
3-(35)
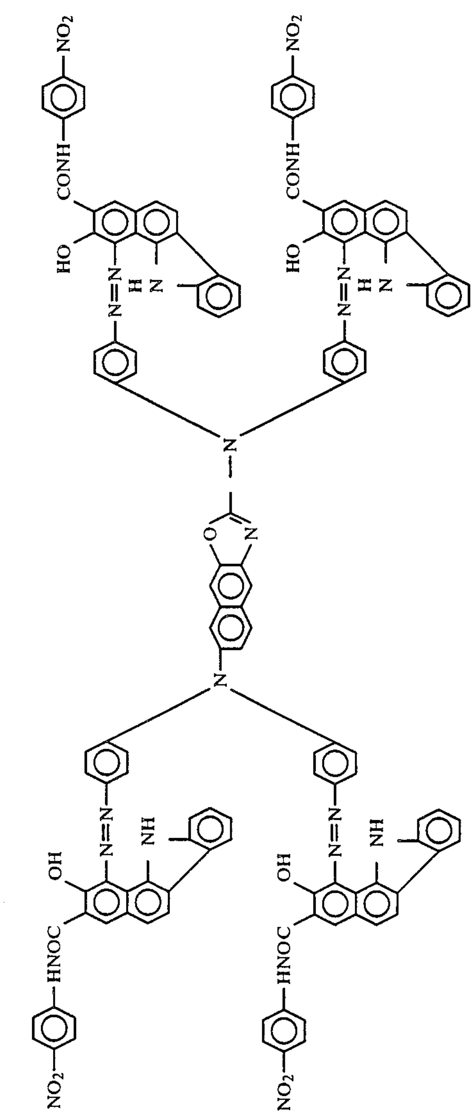
3-(36)

-continued
3-(37)
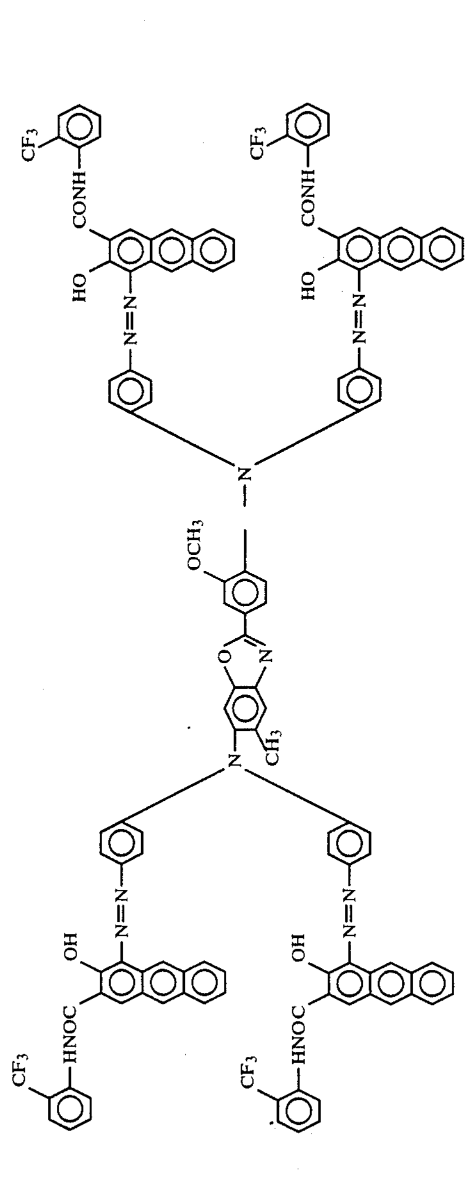
3-(38)
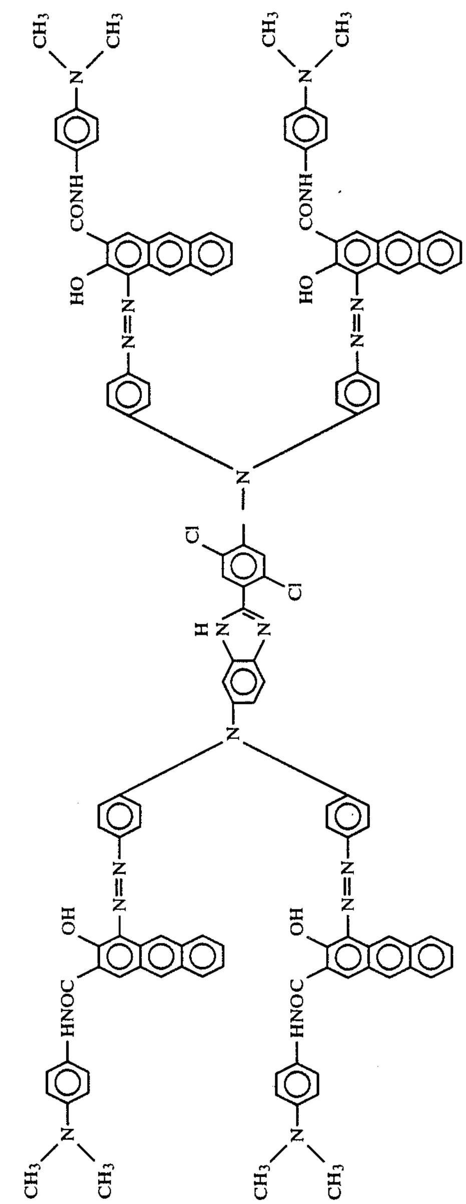

-continued
3-(39)
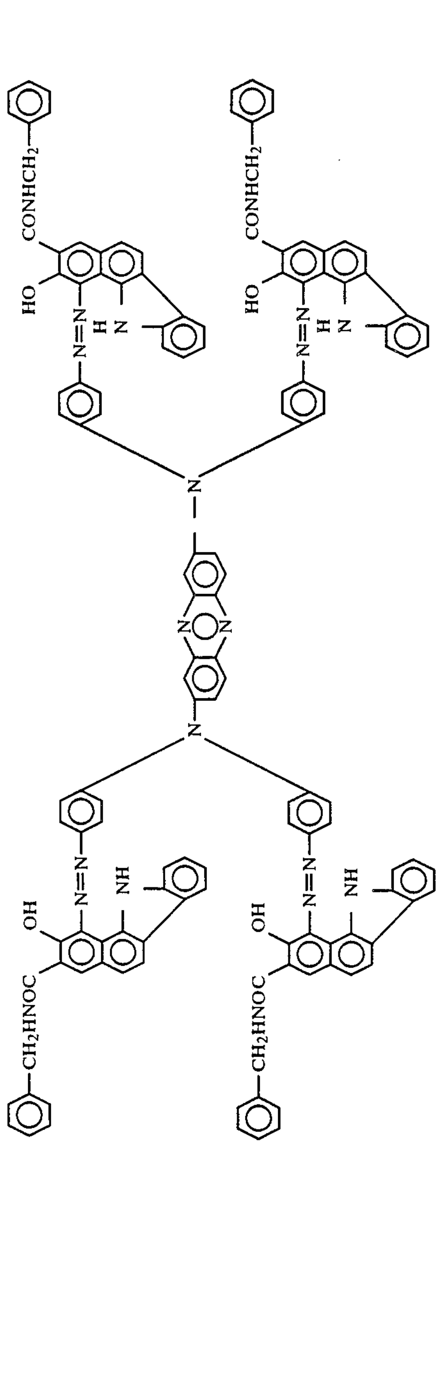
3-(40)
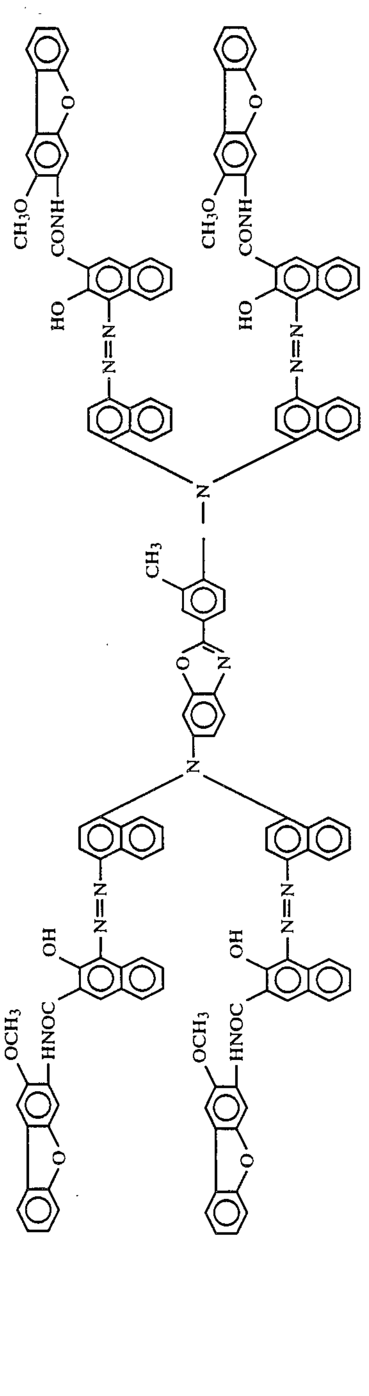

-continued
3-(41)
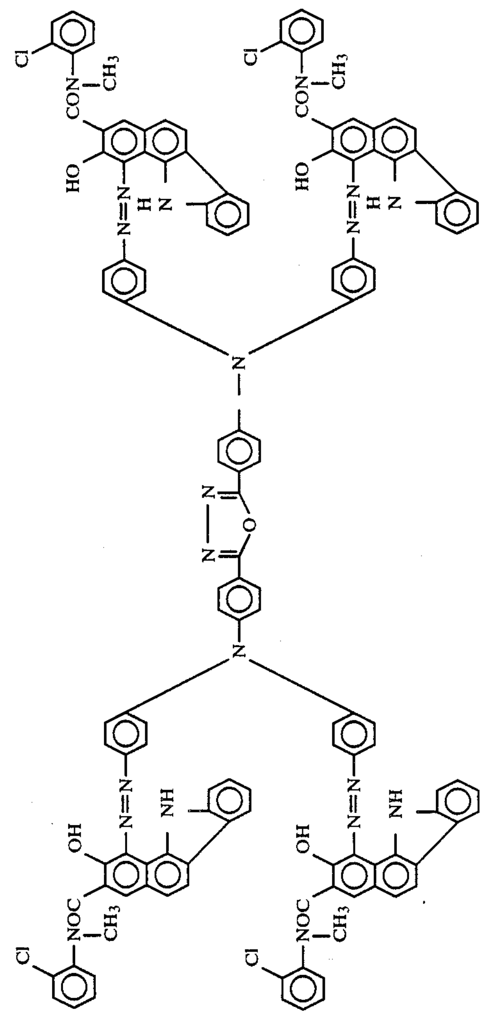
3-(42)
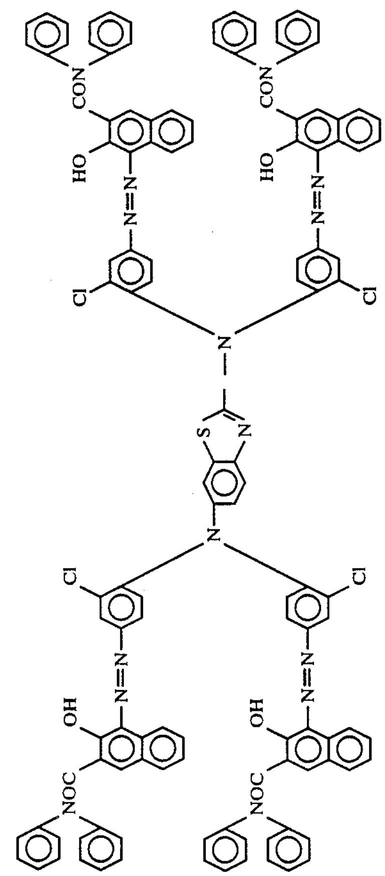

-continued
3-(43)
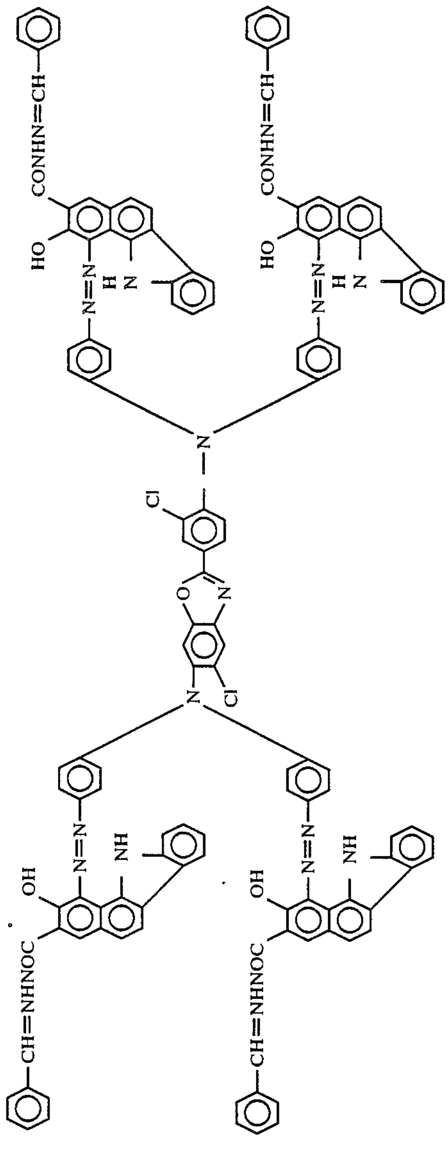
3-(44)
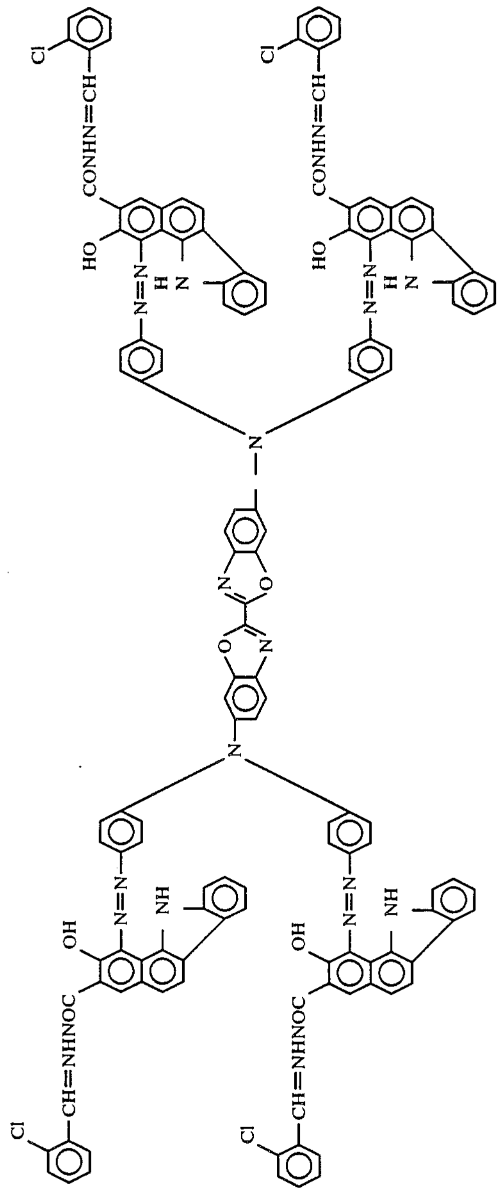

-continued
3-(45)
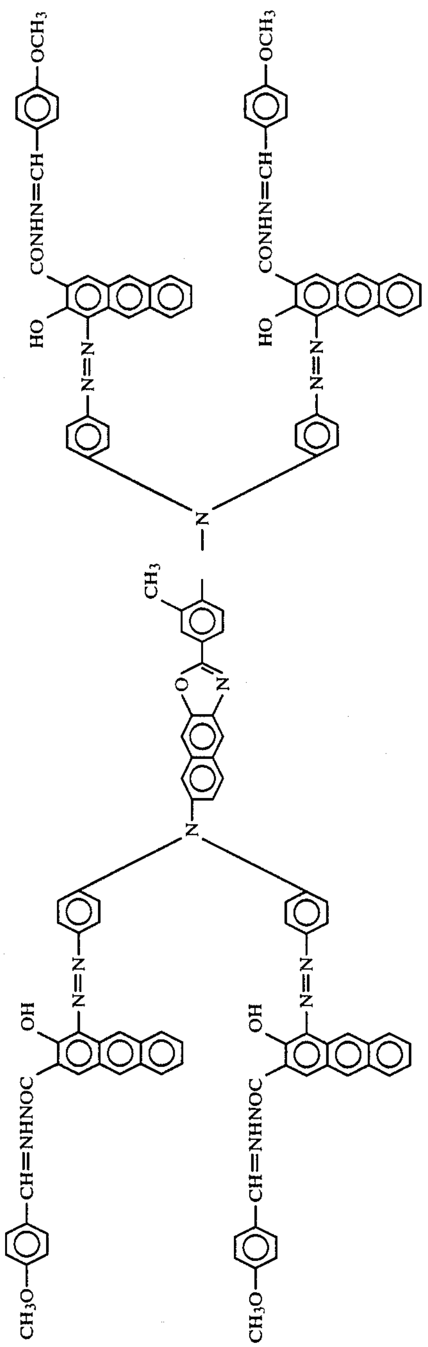
3-(46)
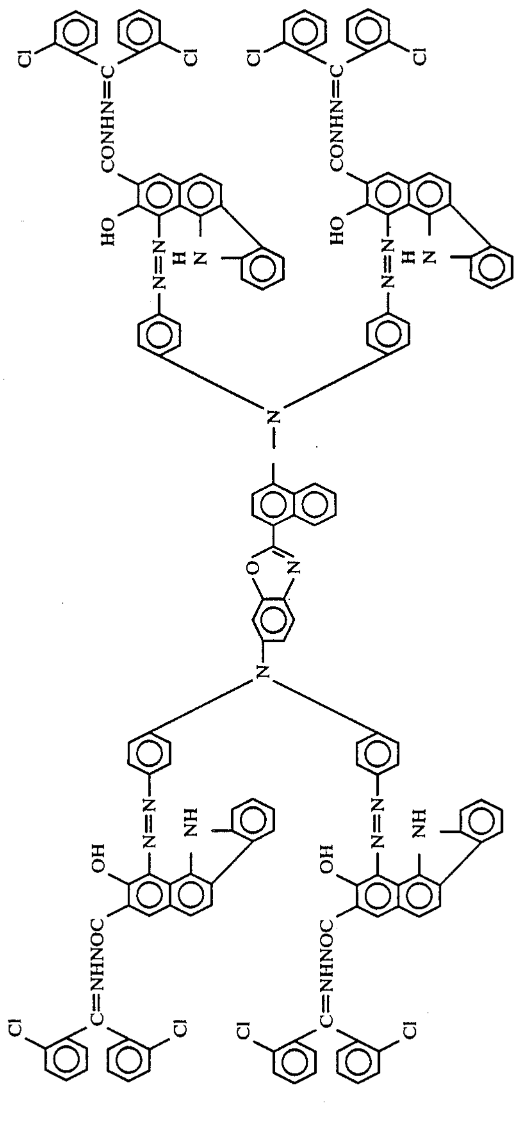

3-(47)
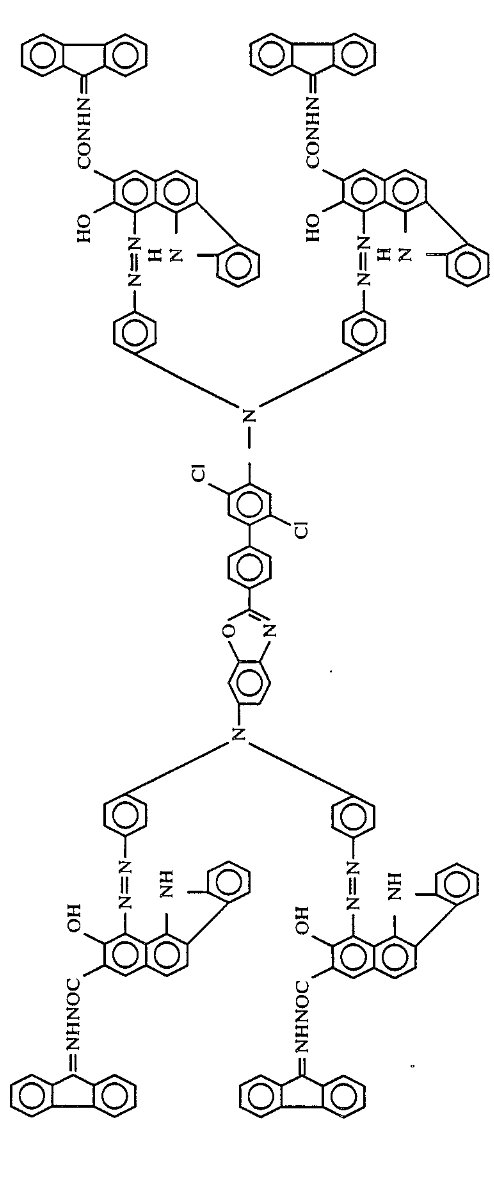
3-(48)
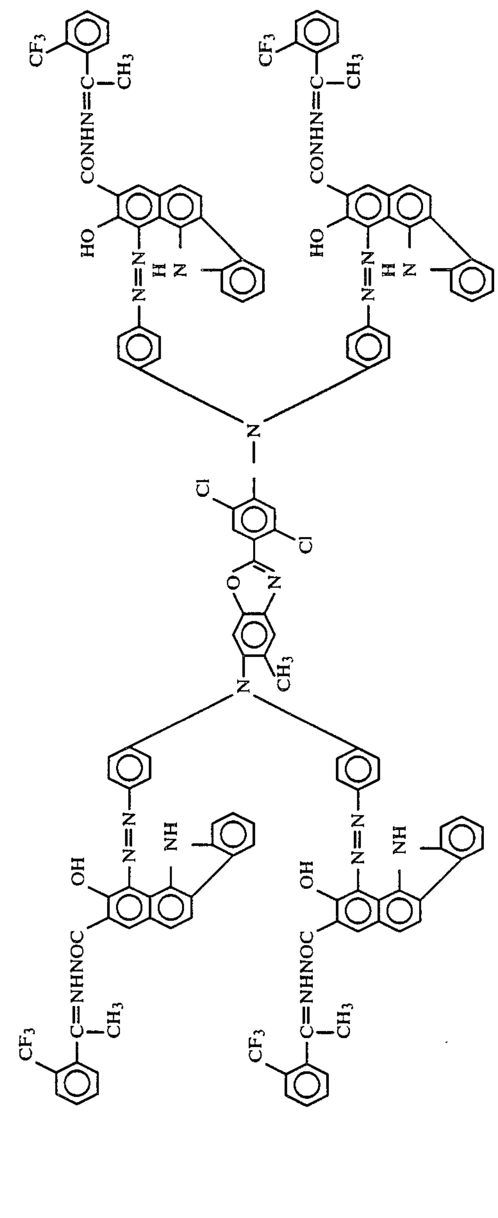

-continued
3-(49)
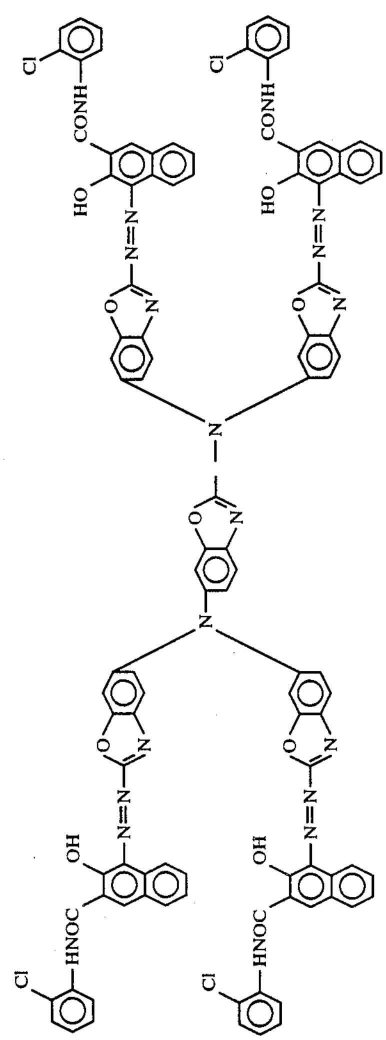
3-(50)
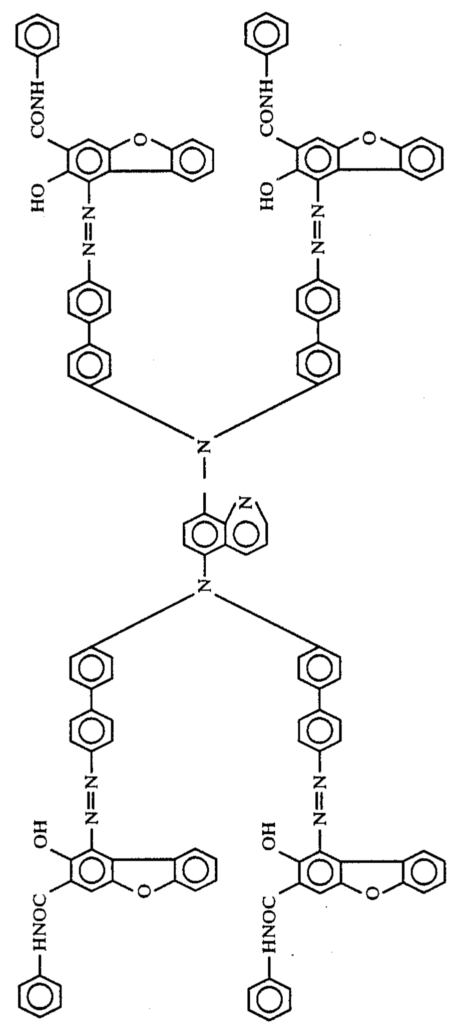

-continued
3-(51)
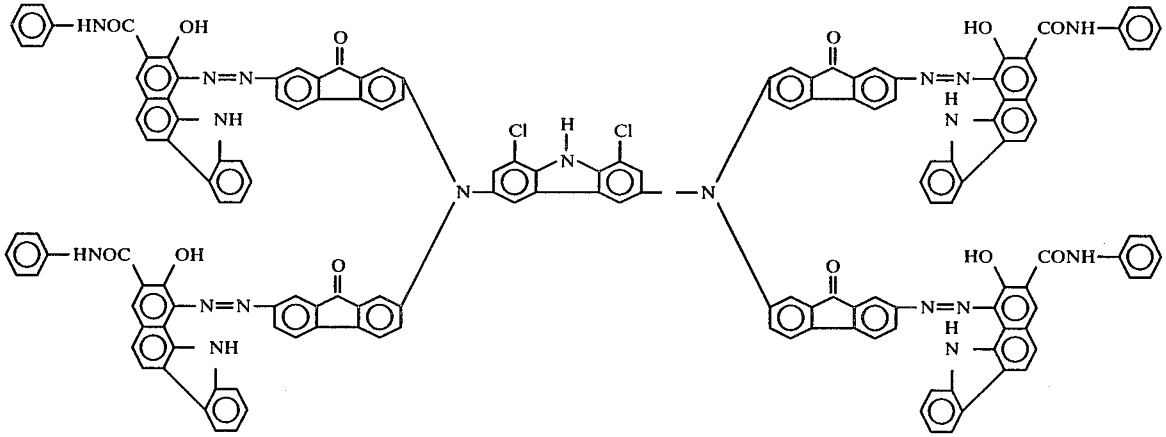
3-(52)
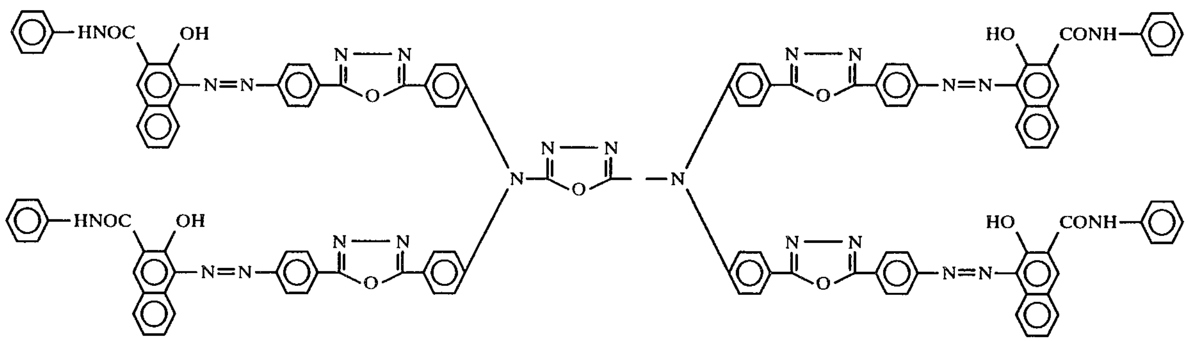

-continued
3-(53)
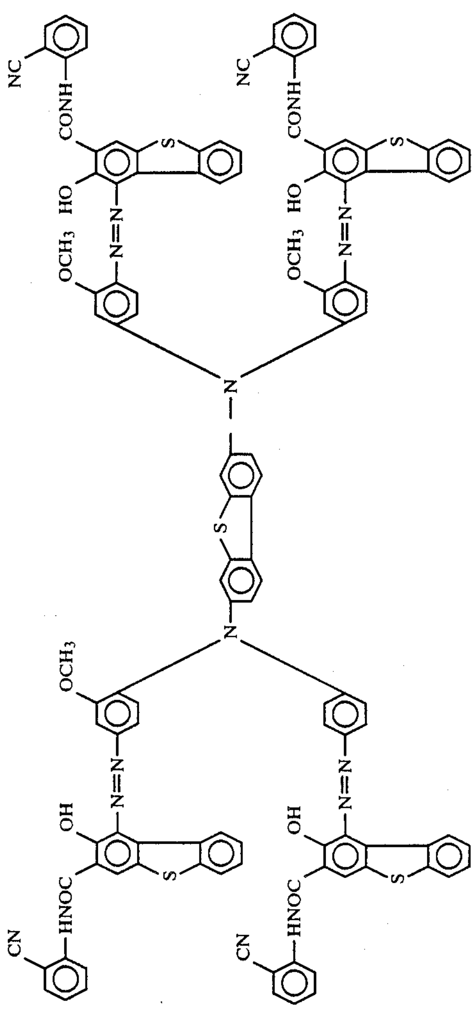
3-(54)
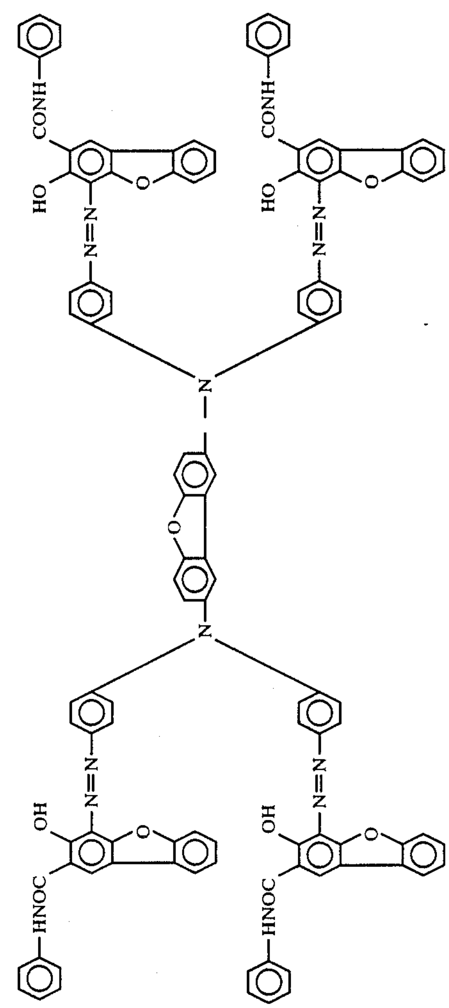

-continued
3-(55)
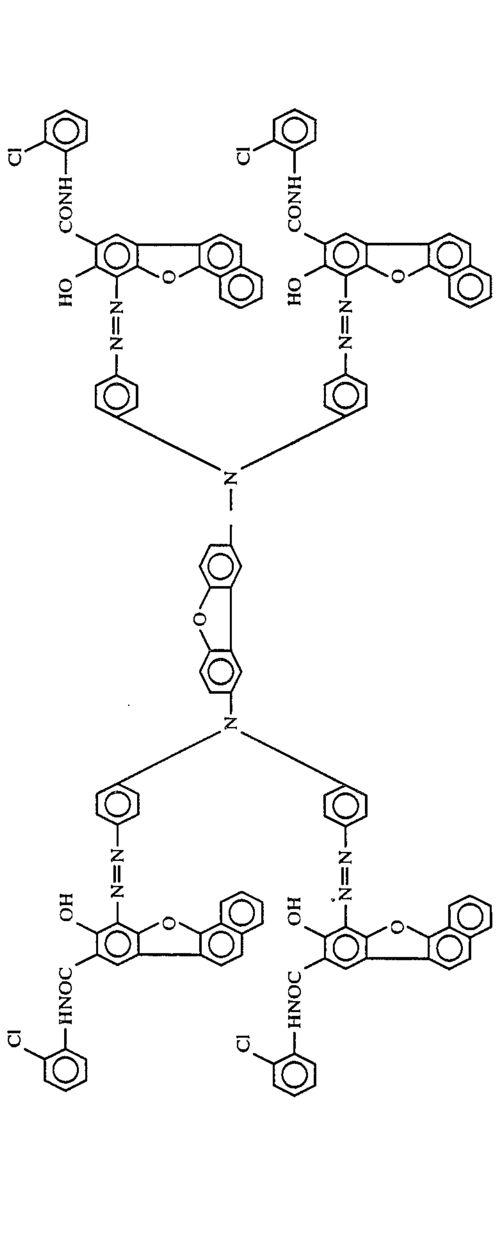
3-(56)
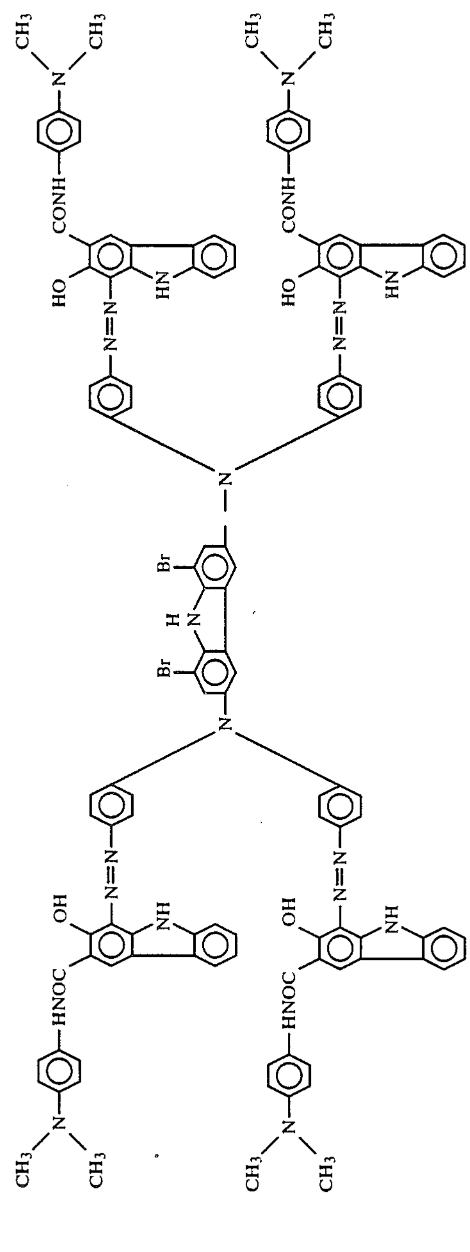

-continued
3-(57)
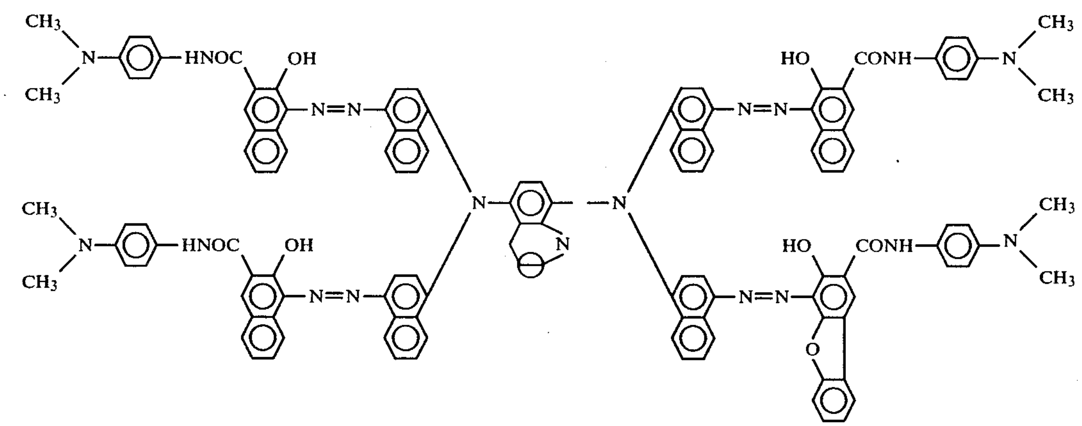
3-(58)
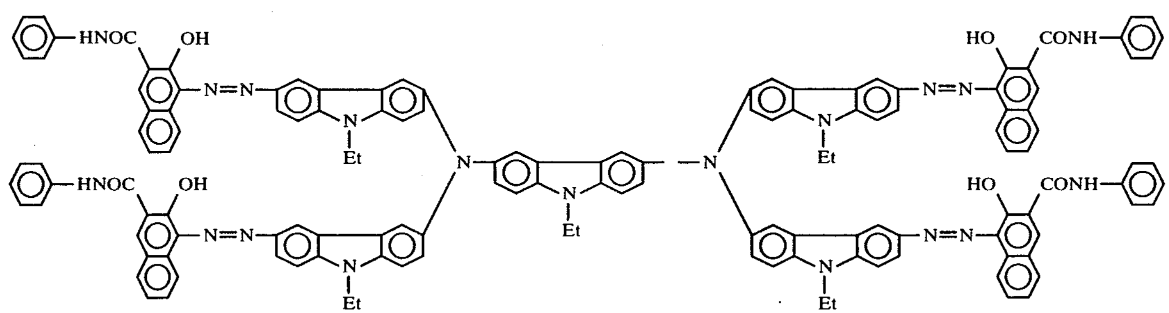

-continued
3-(59)
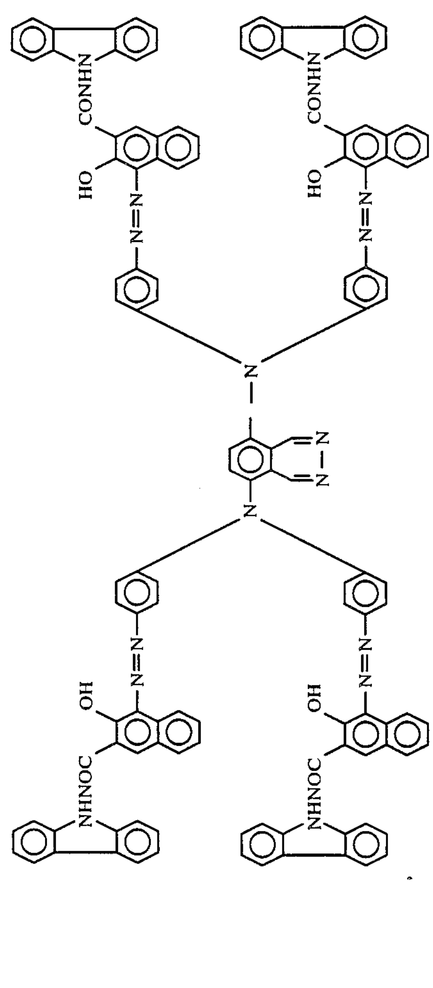
3-(60)
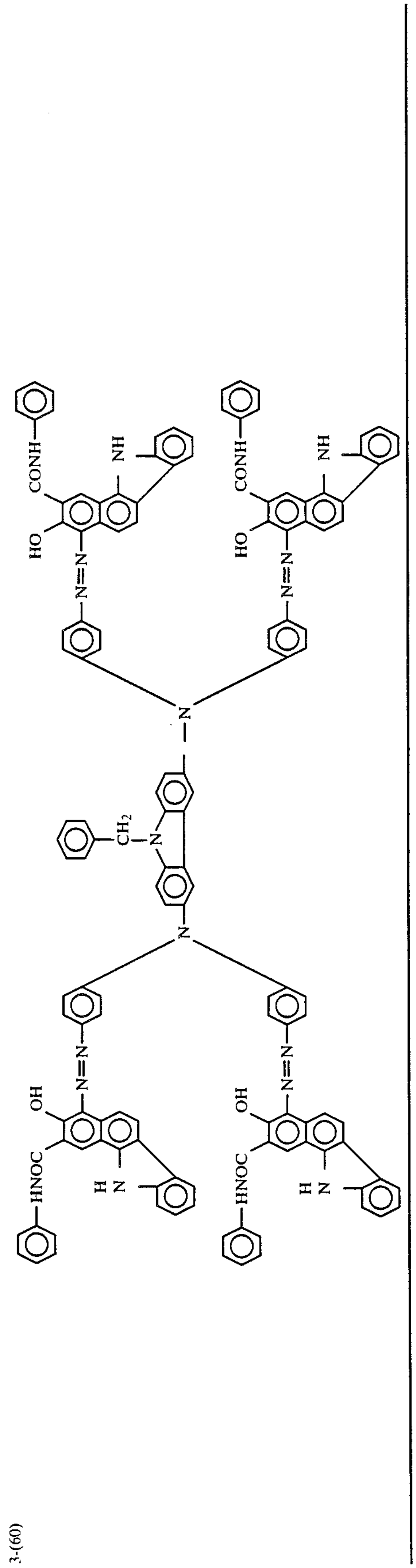

TABLE 4
Examples of azo pigment represented by the general formula (4)
| No. | |
|---|---|
| 4-(1) | 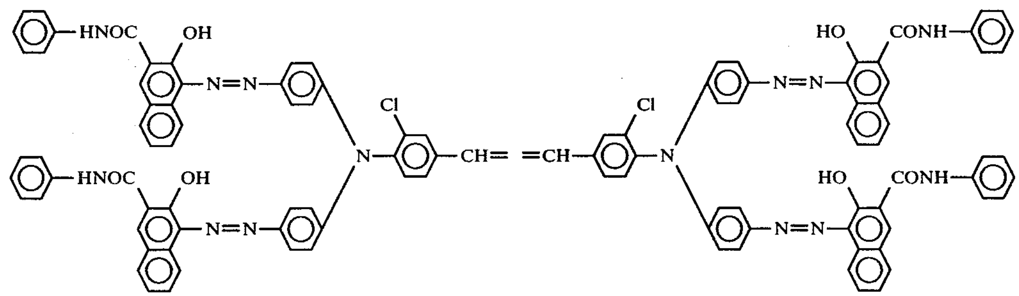 |
| 4-(2) | 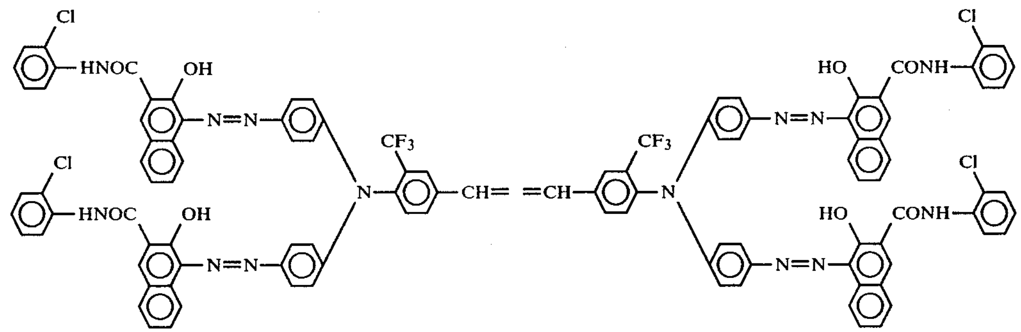 |
| 4-(3) | 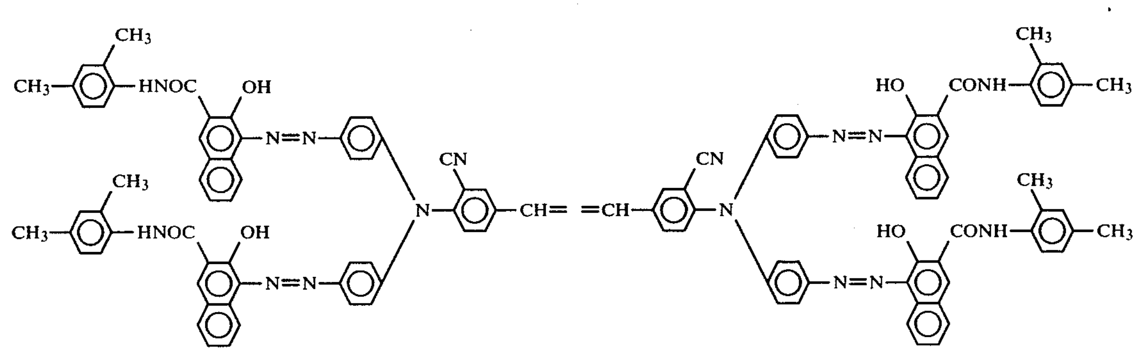 |

TABLE 4-continued
4-(4)
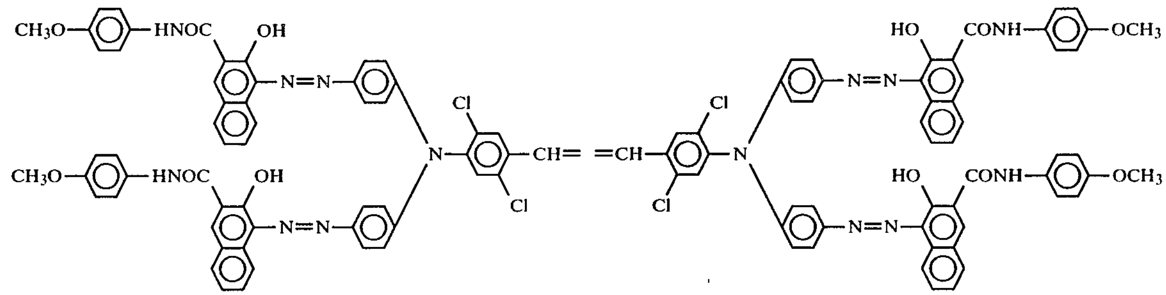
4-(5)
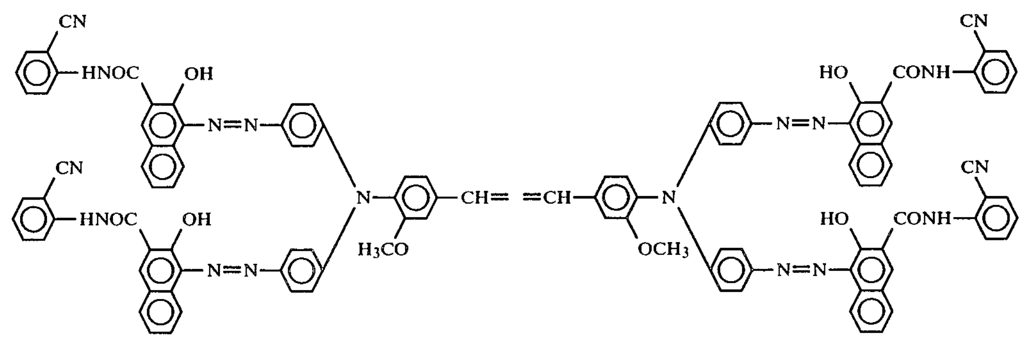
4-(6)
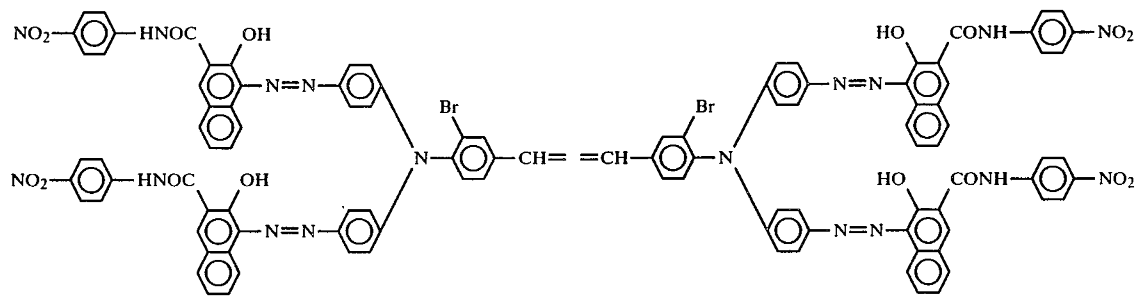

TABLE 4-continued
4-(7)
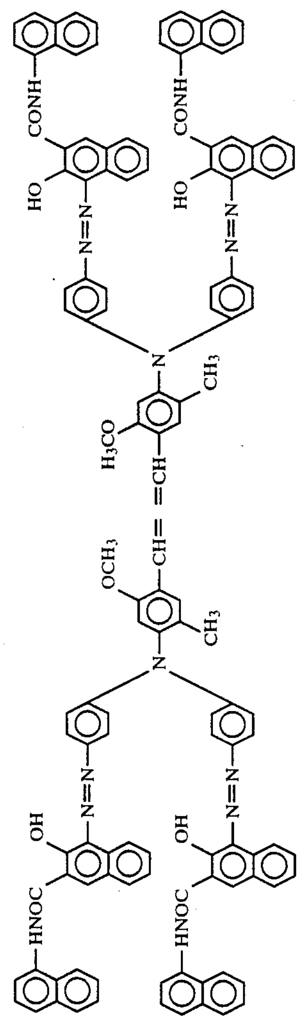
4-(8)
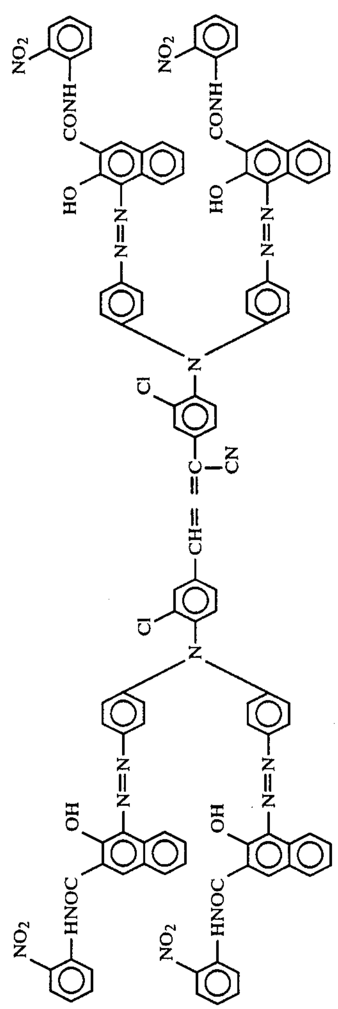
4-(9)
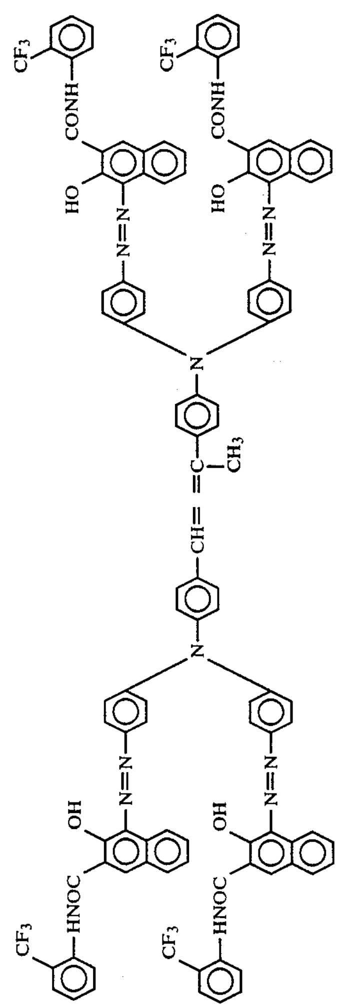

TABLE 4-continued
4-(10)
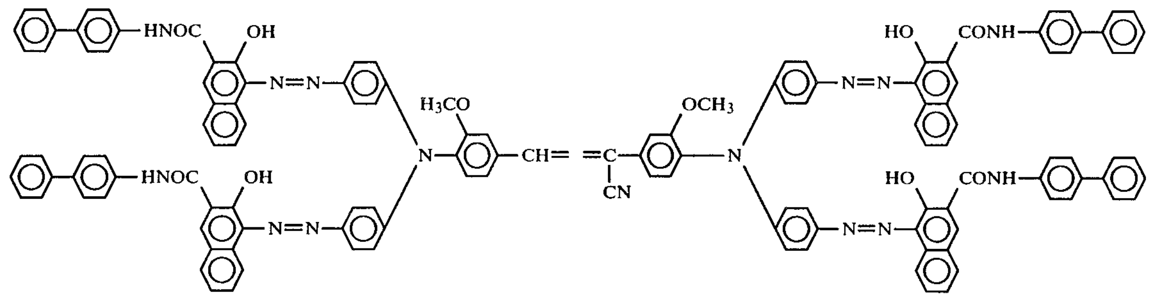
4-(11)
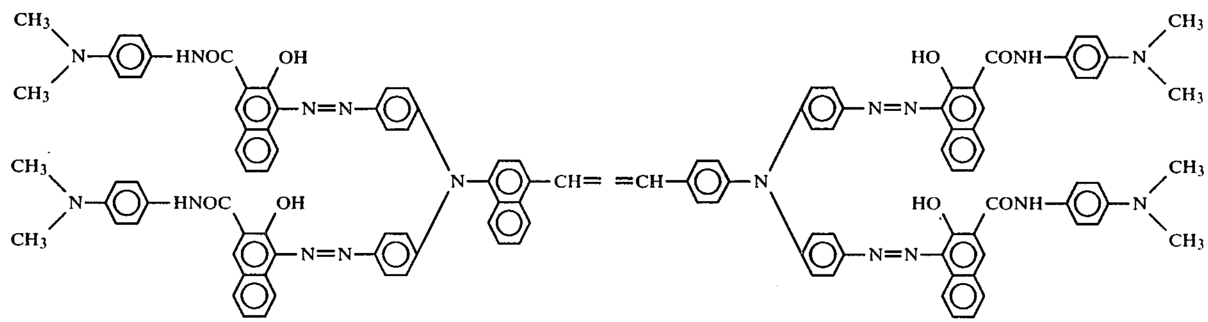
4-(12)
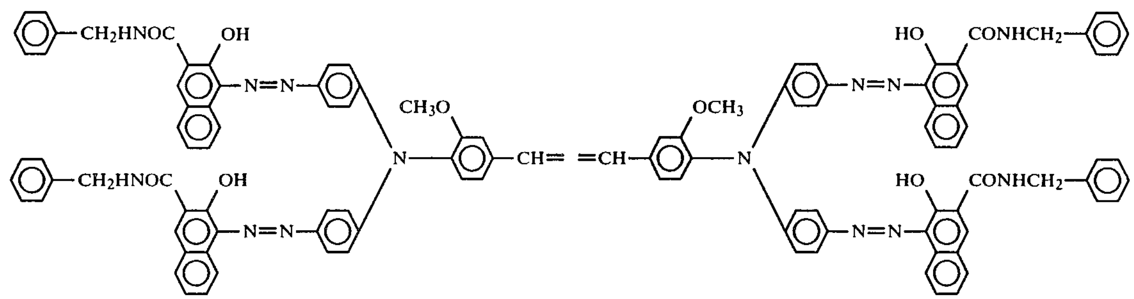

TABLE 4-continued
4-(13)
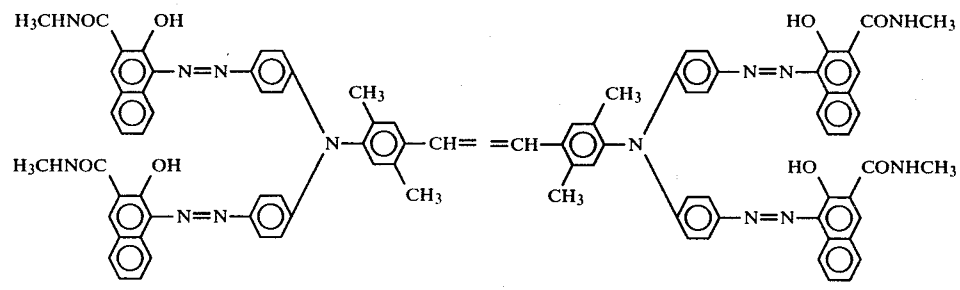
4-(14)
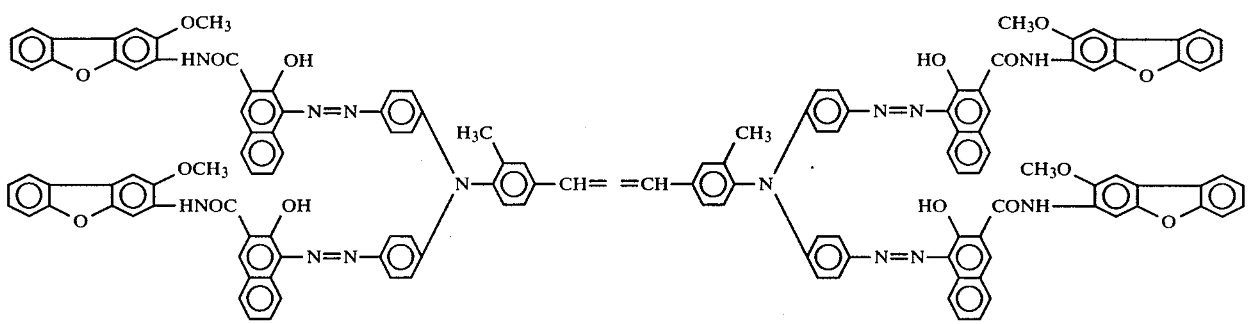
4-(15)
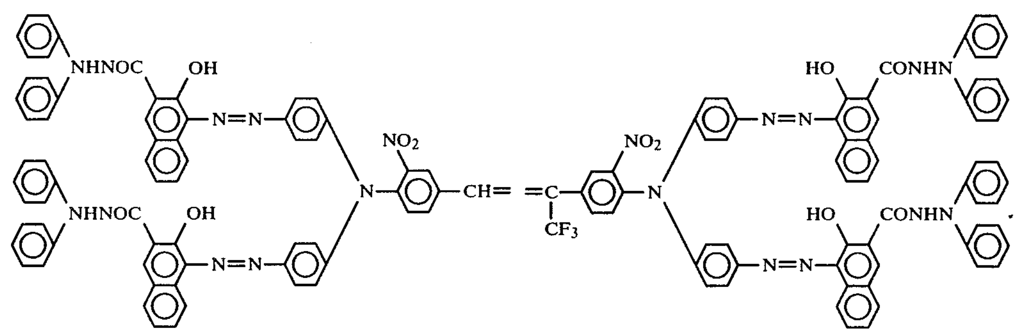

TABLE 4-continued
4-(16)
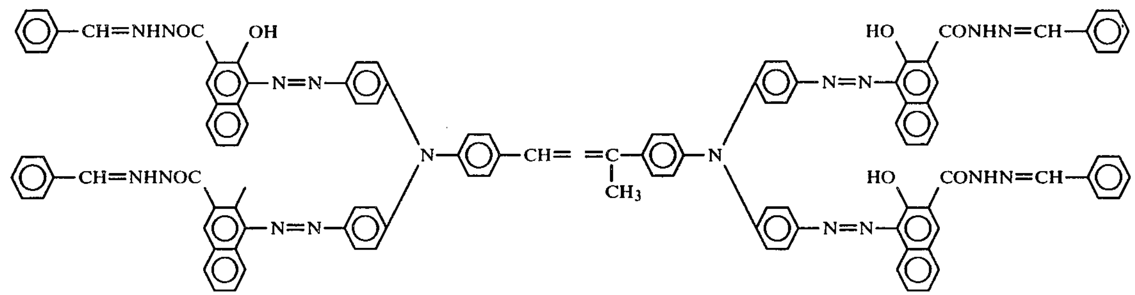
4-(17)
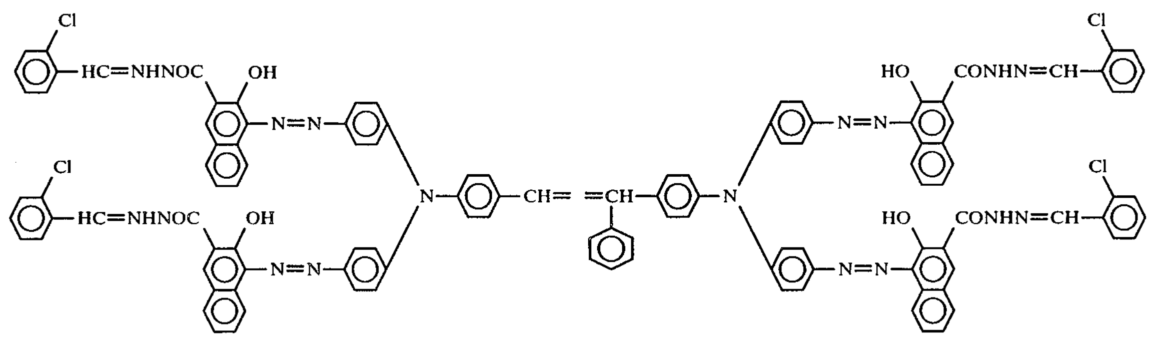
4-(18)
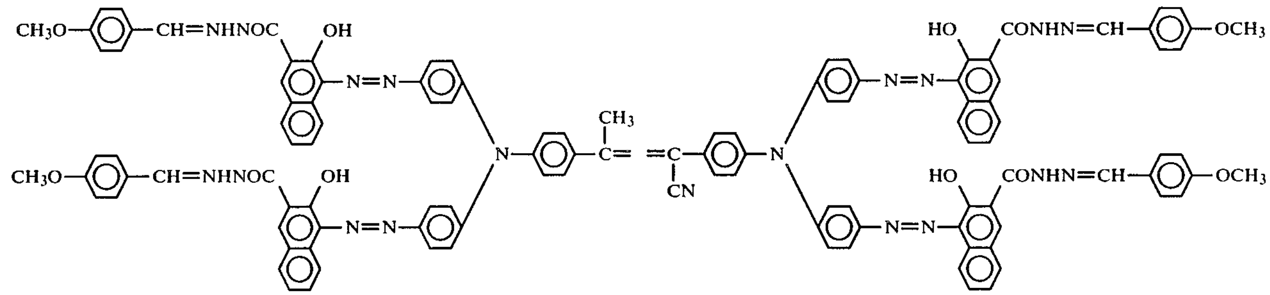

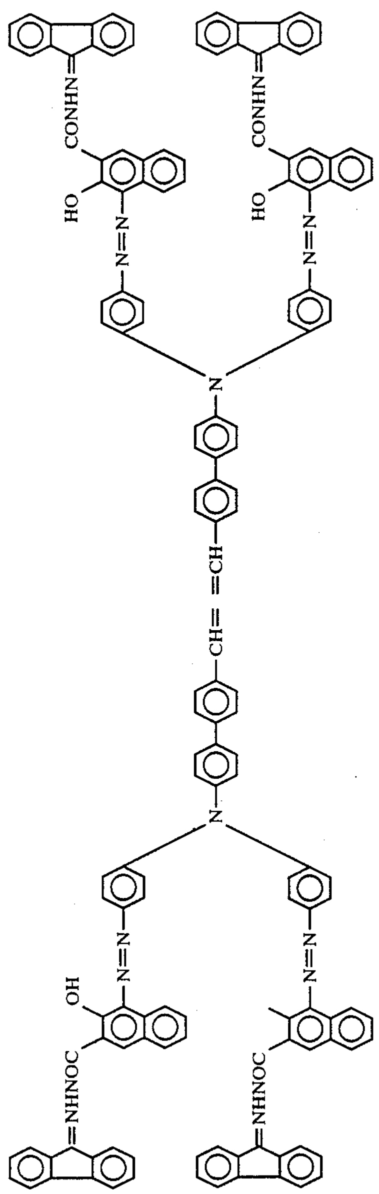
4-(19)
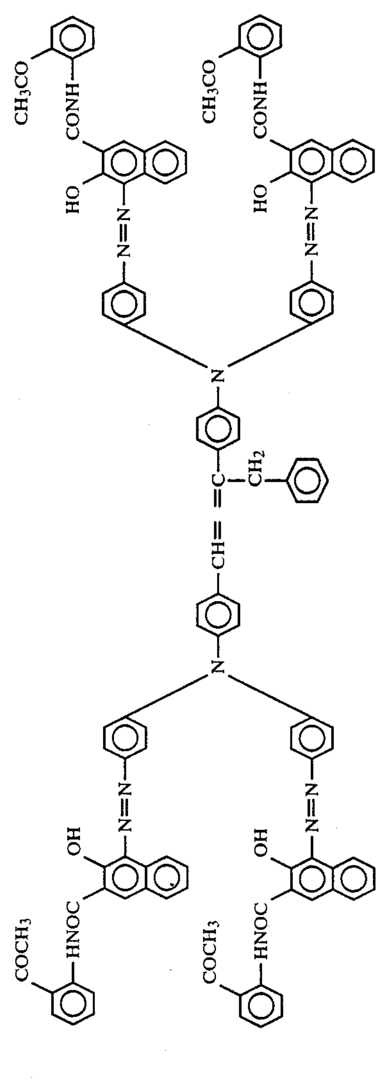
4-(20)
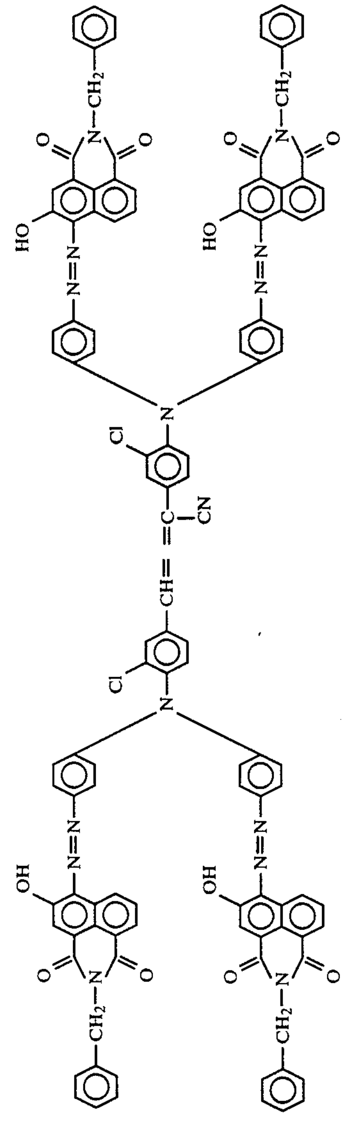
4-(21)

-continued
4-(22)
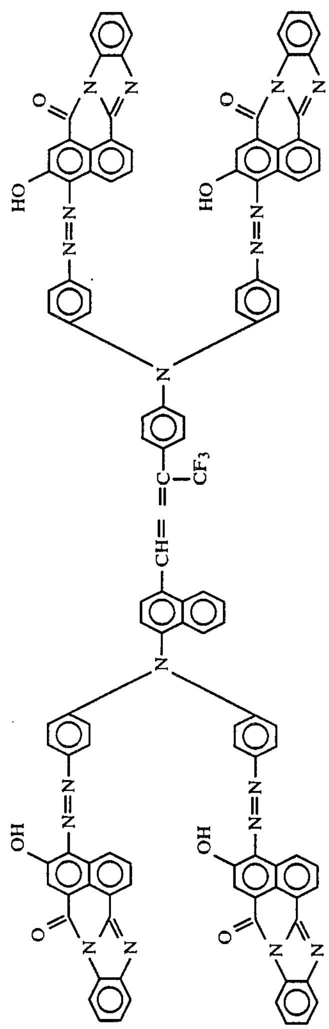
4-(23)
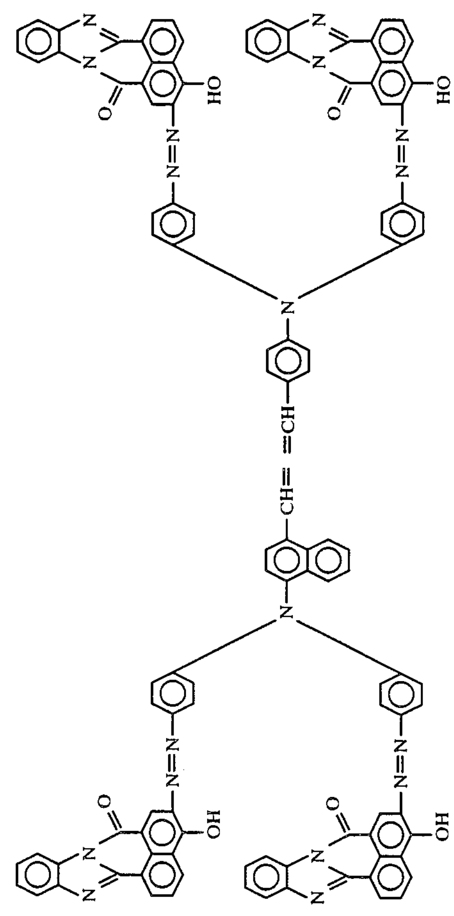

-continued
4-(24)
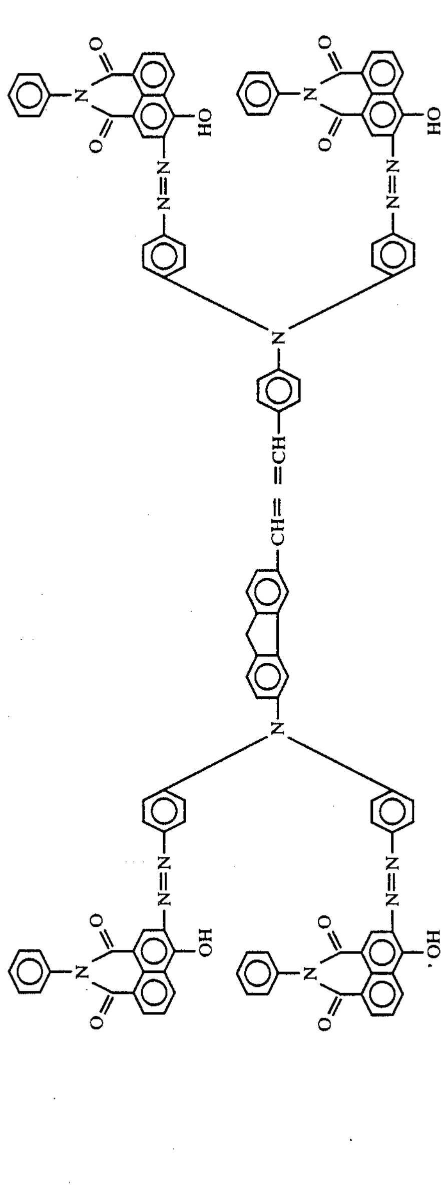
4-(25)
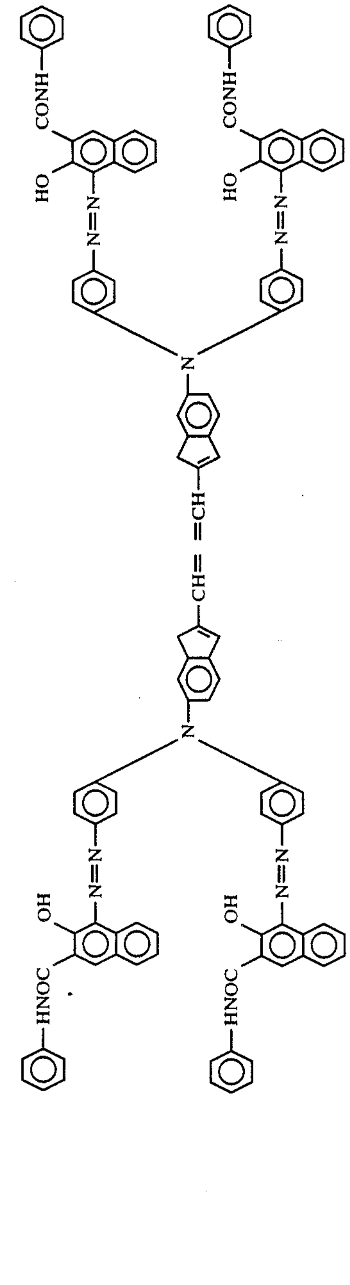

-continued
4-(26)
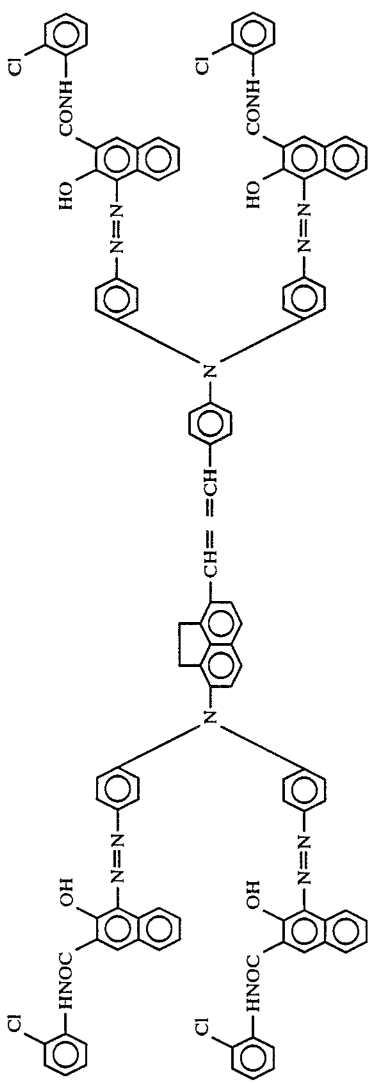
4-(27)
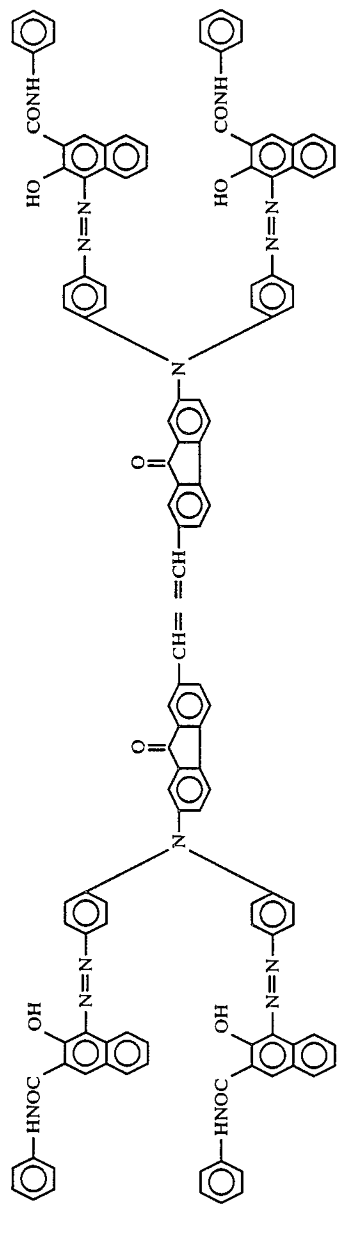
4-(28)
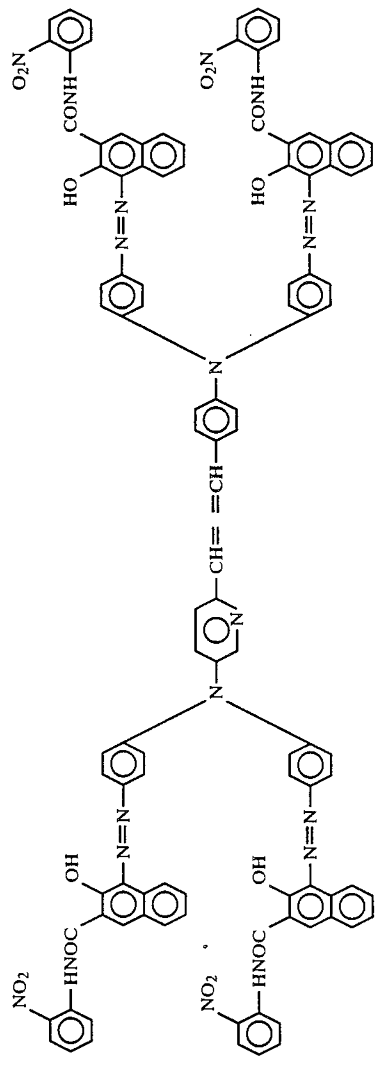

-continued
4-(29)
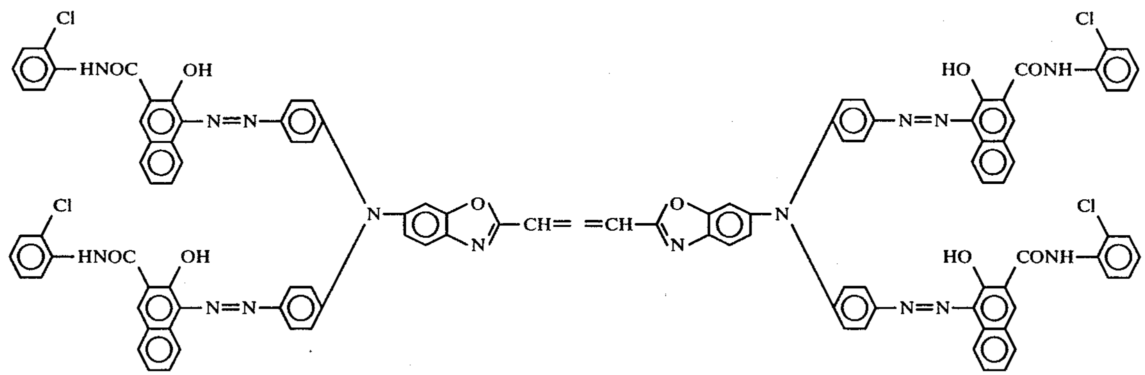
4-(30)
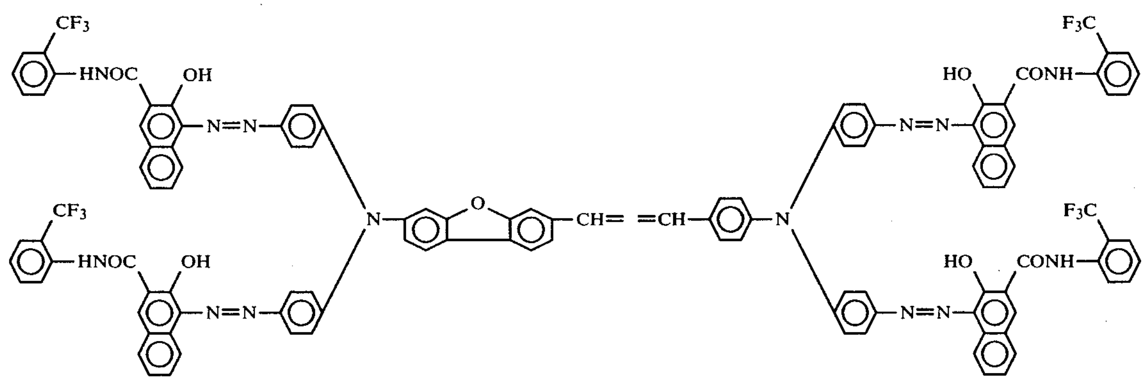

4-(31)
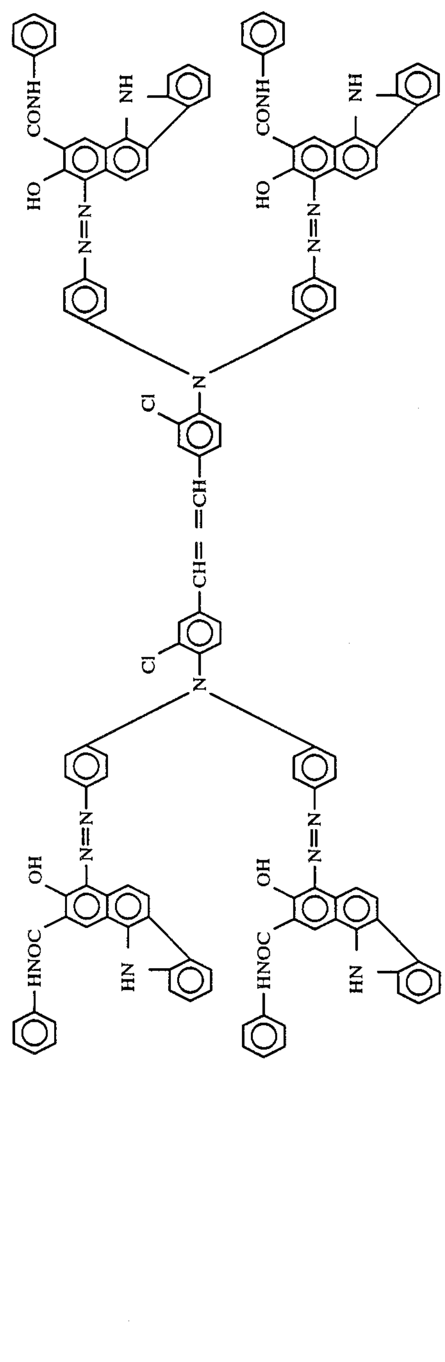
4-(32)
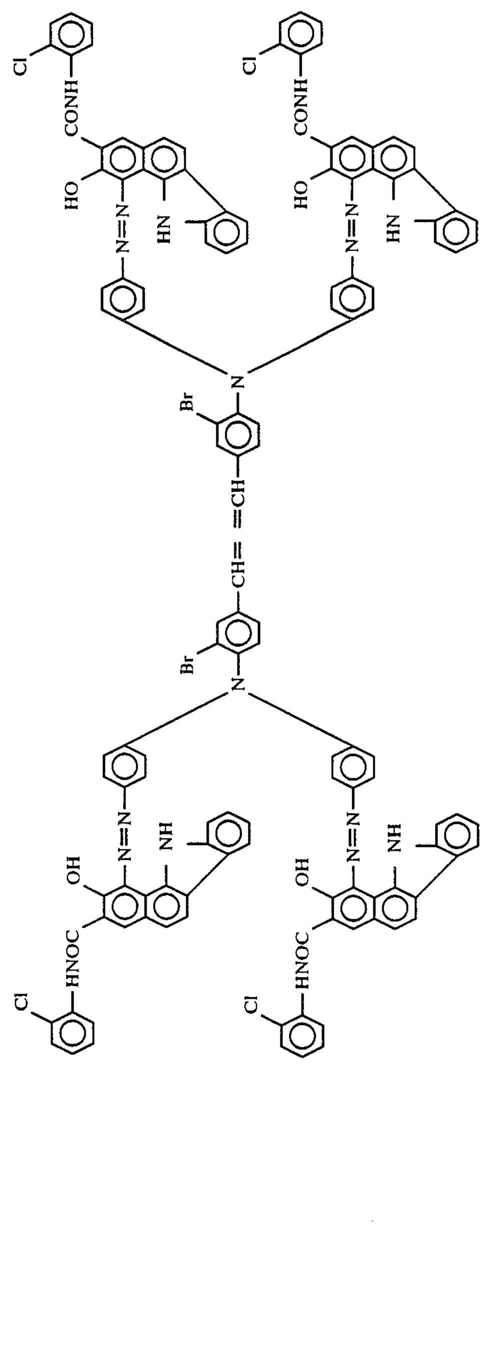

-continued
4-(33)
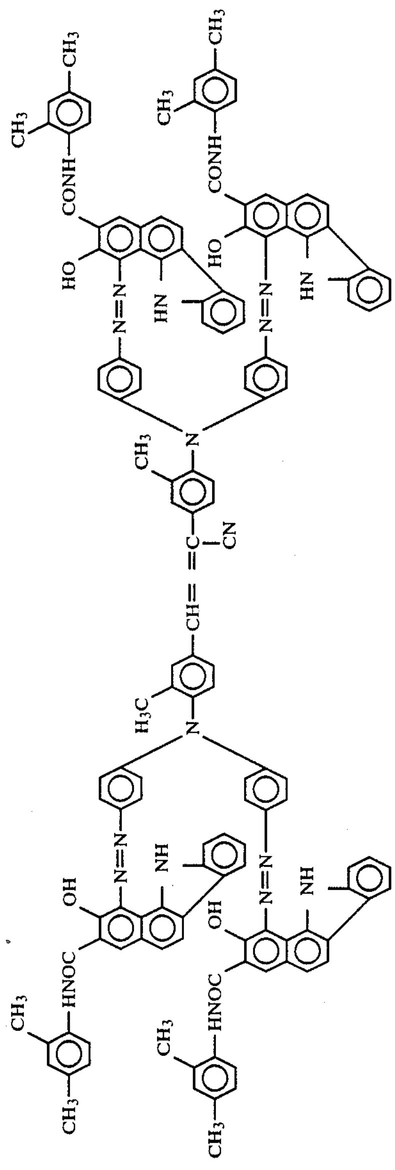
4-(34)
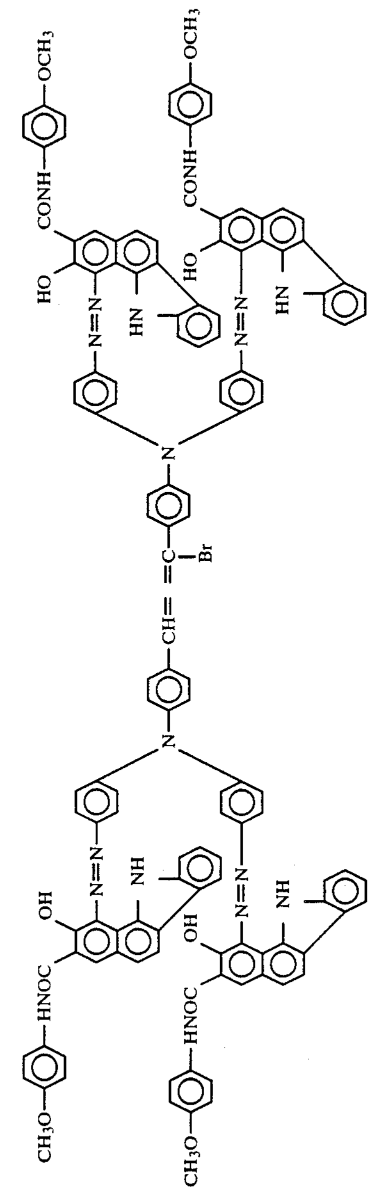

-continued
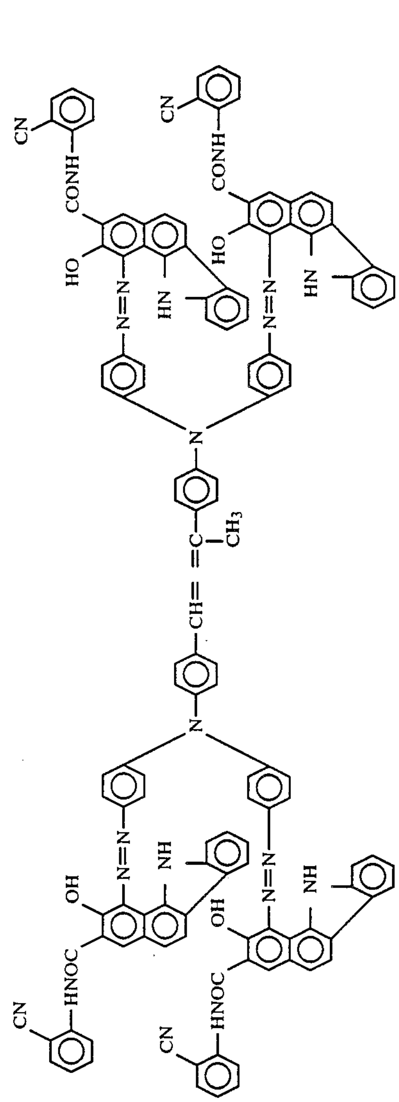
4-(35)
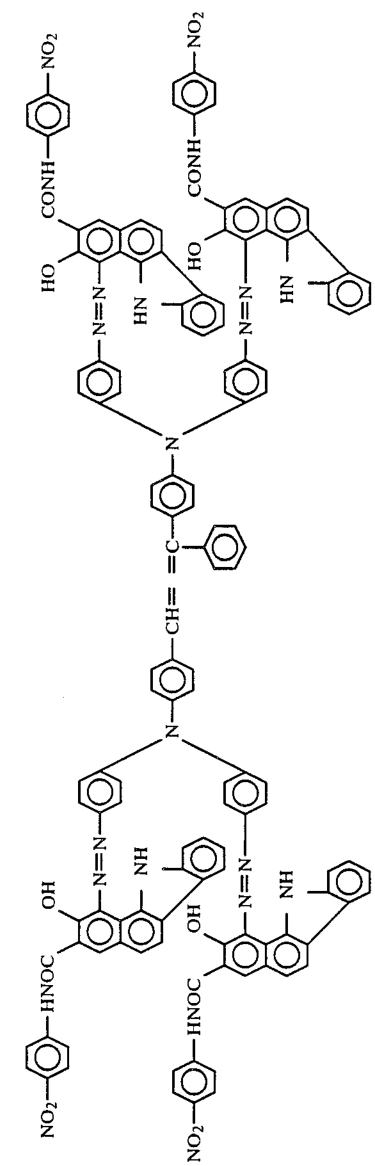
4-(36)

-continued
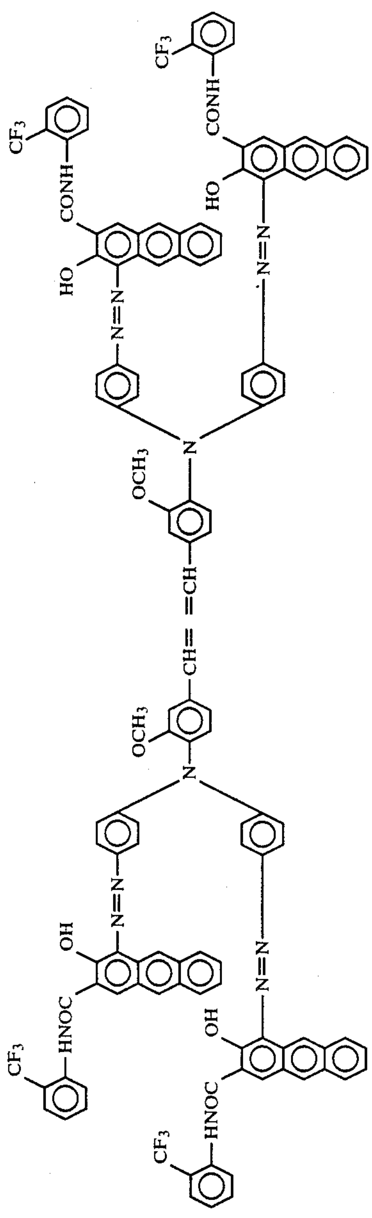
4-(37)
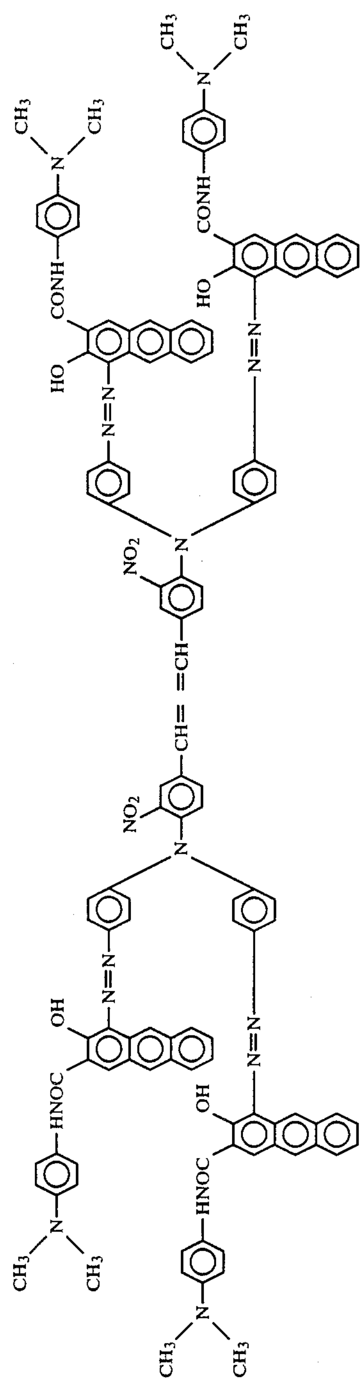
4-(38)
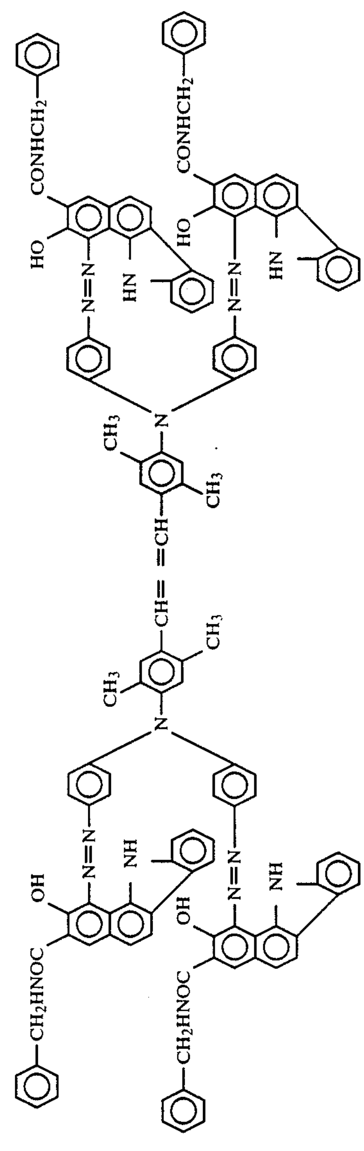
4-(39)

-continued
4-(40)
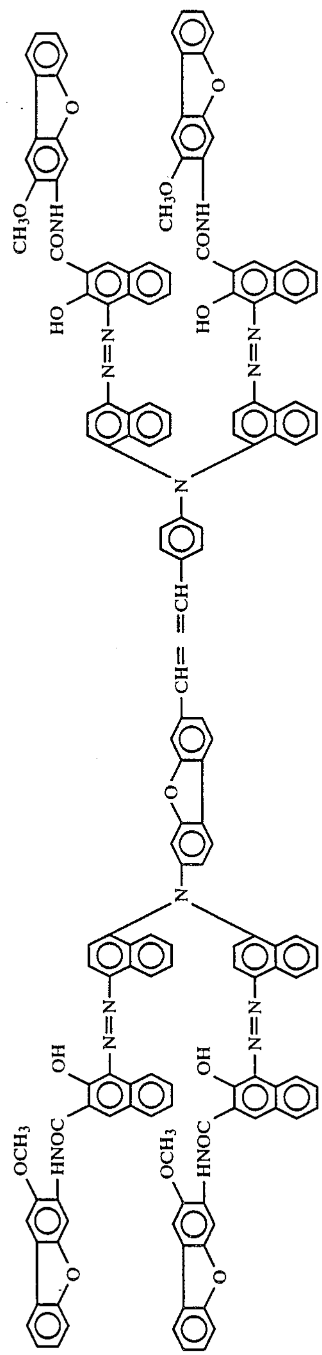
4-(41)
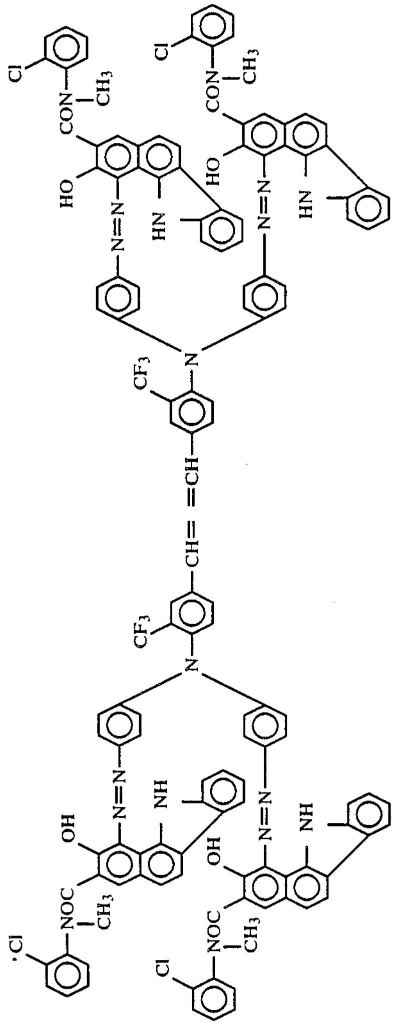
4-(42)
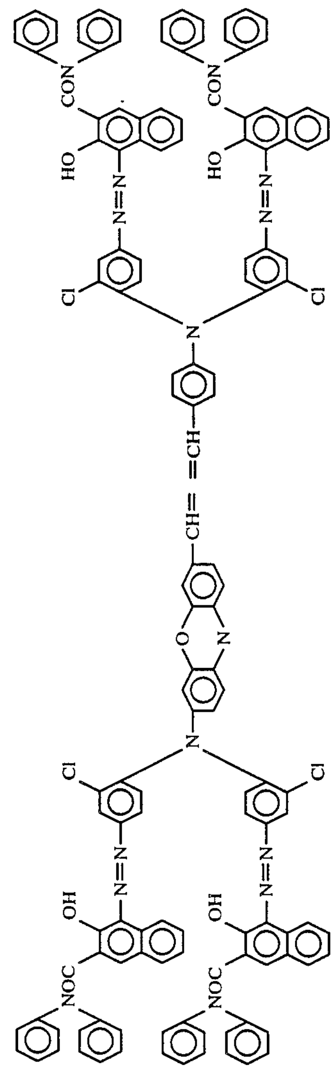

-continued
4-(43)
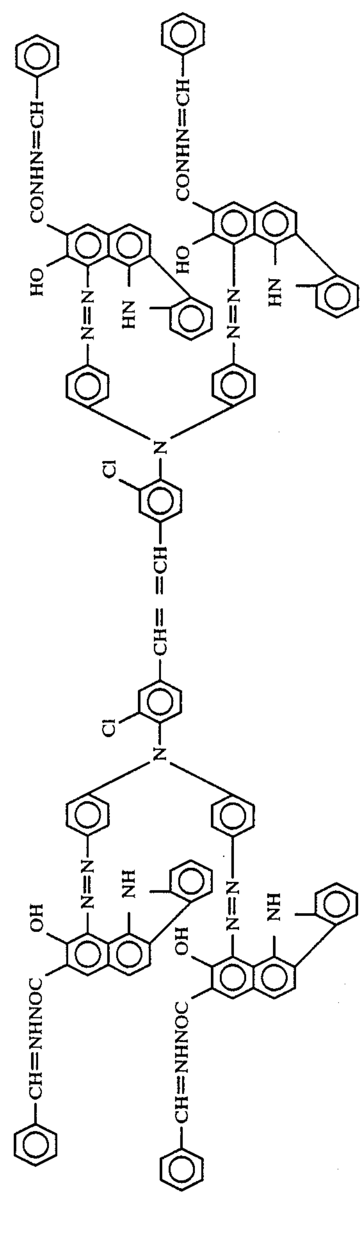
4-(44)
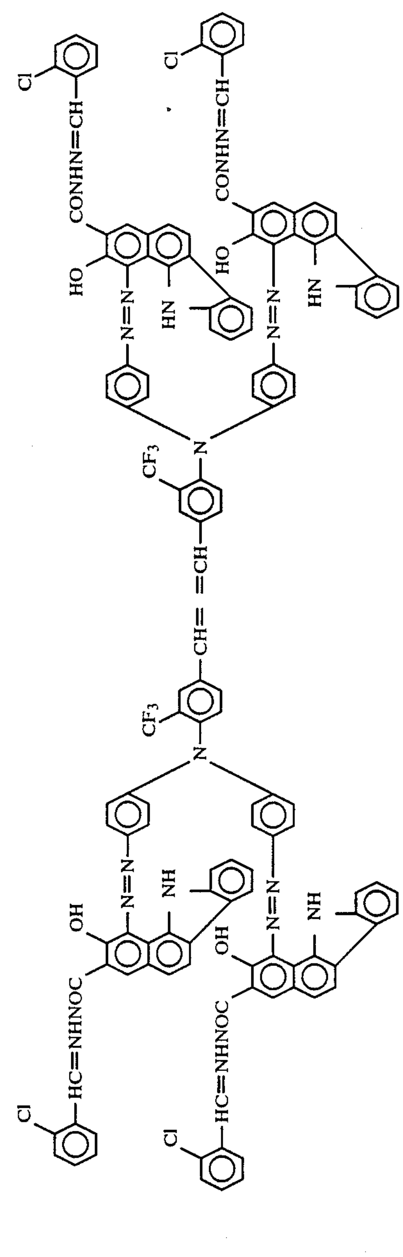

-continued
4-(45)
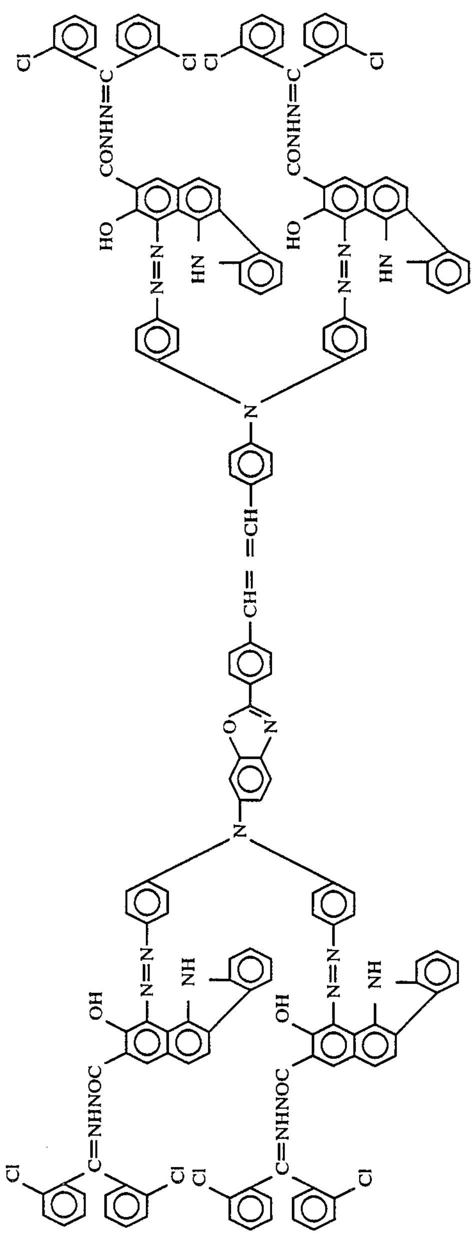
4-(46)
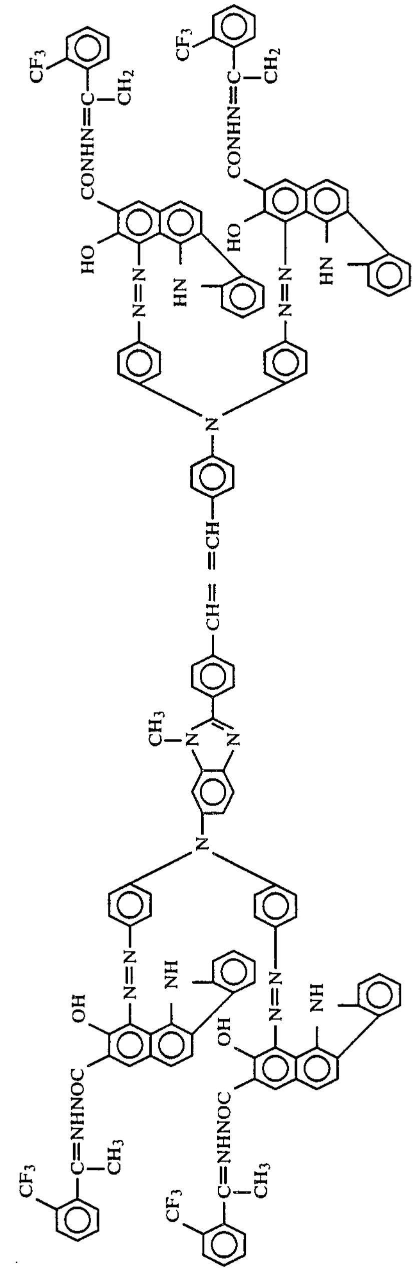

4-(47)
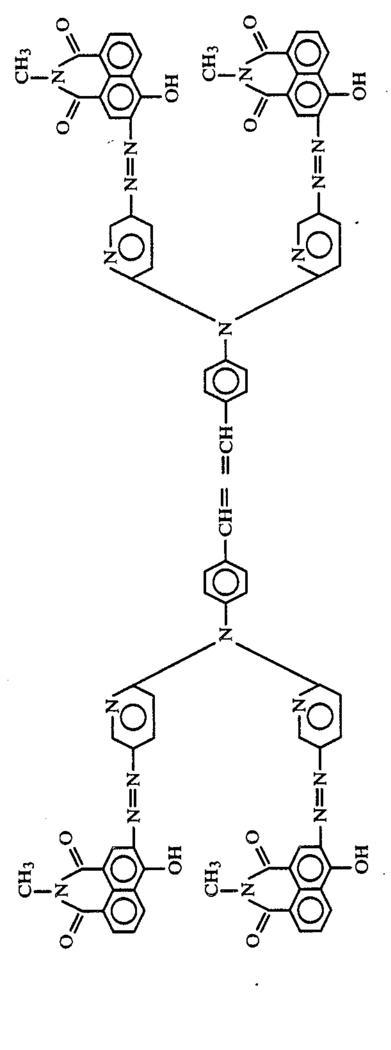
4-(48)
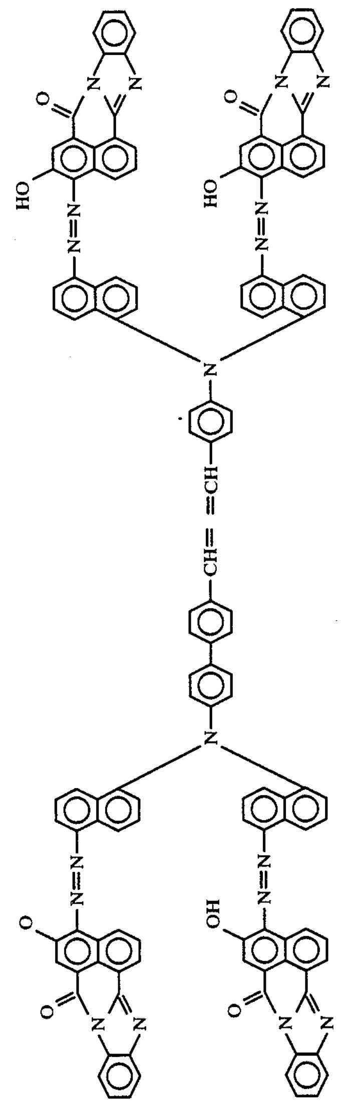

-continued
4-(49)
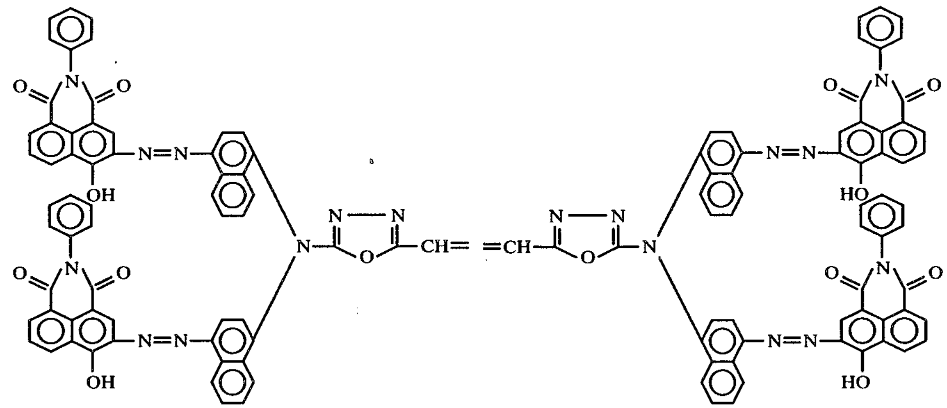
4-(50)
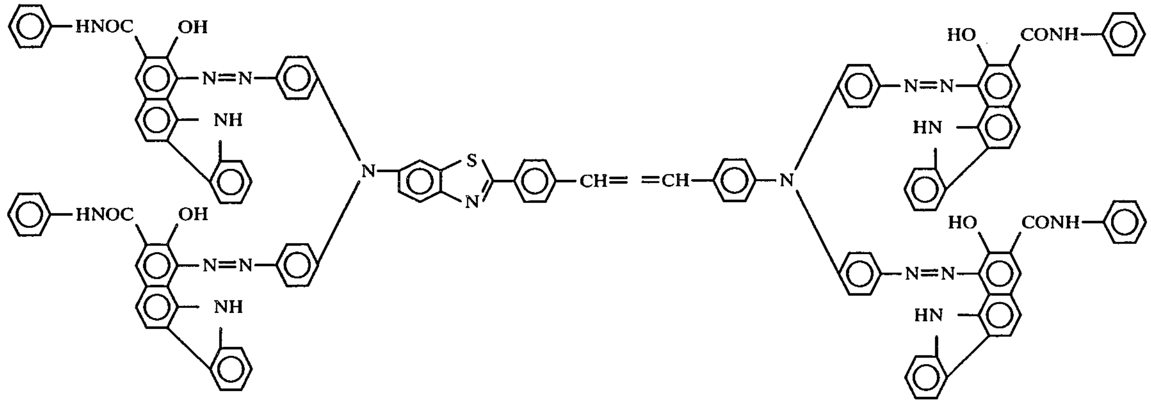

-continued
4-(51)
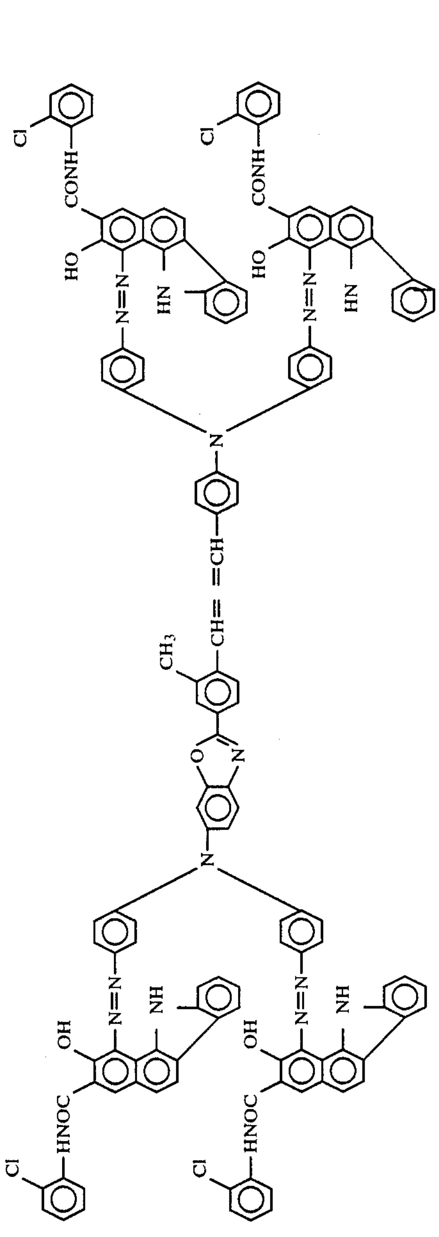
4-(52)
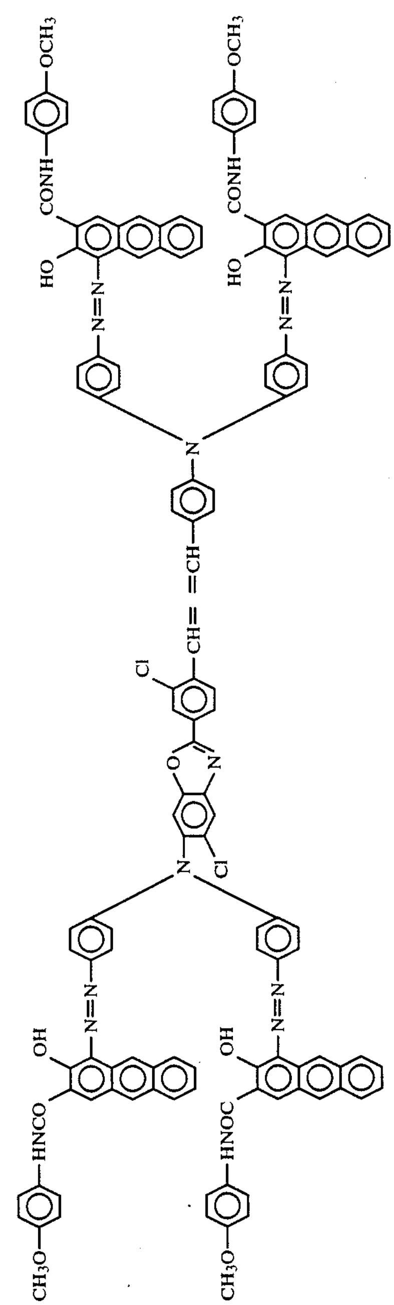

-continued
4-(53)
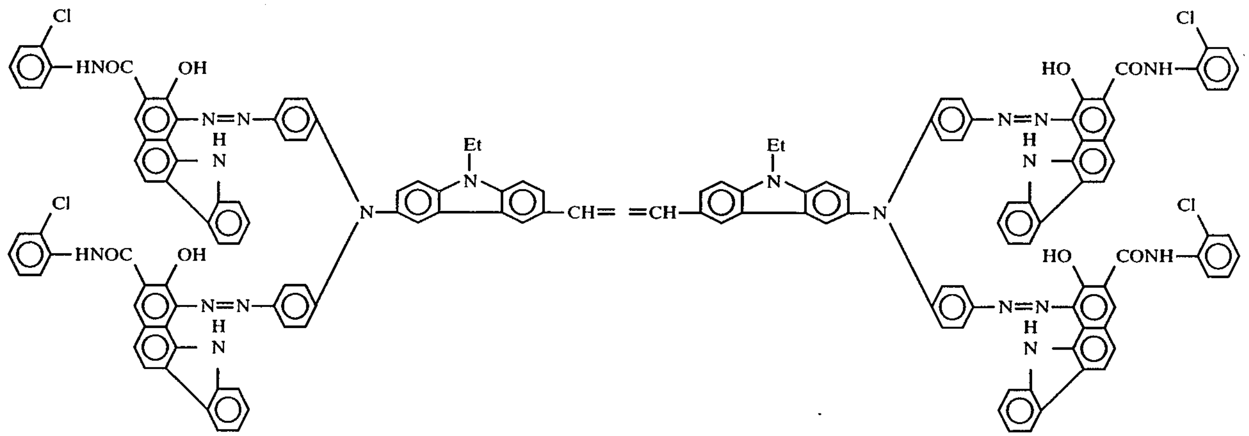
4-(54)
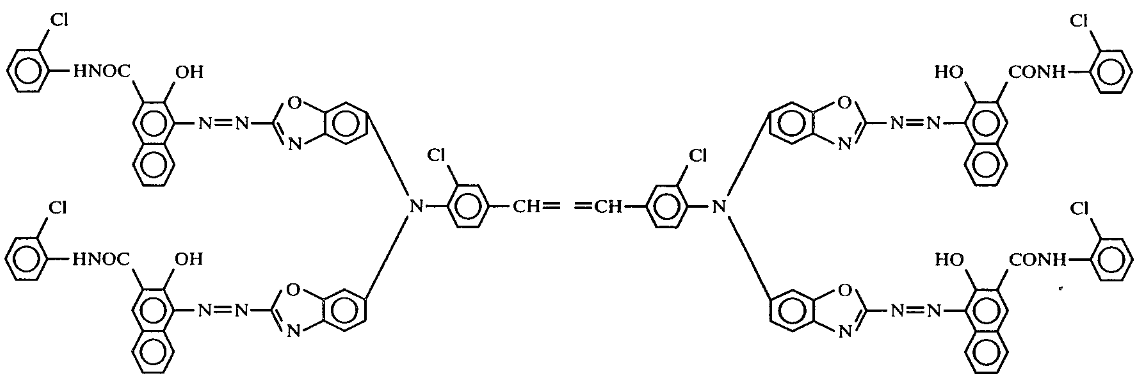

-continued
4-(55)
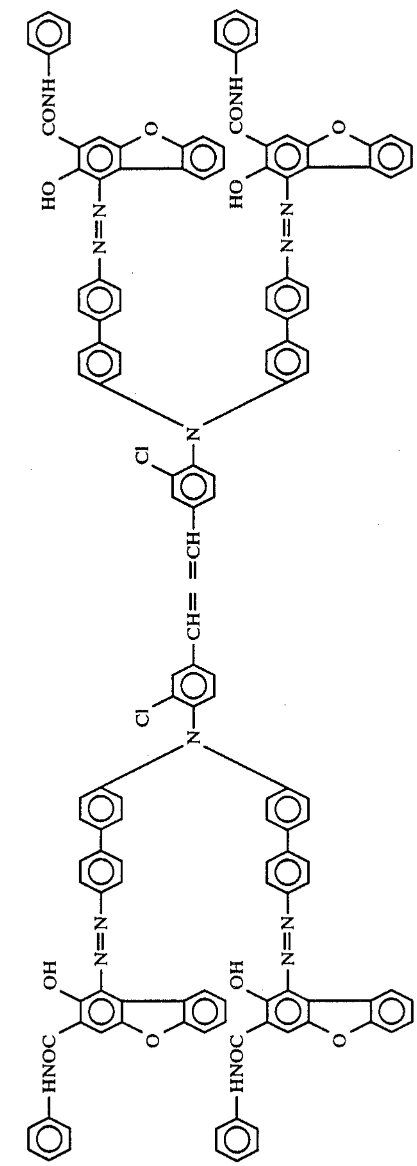
4-(56)
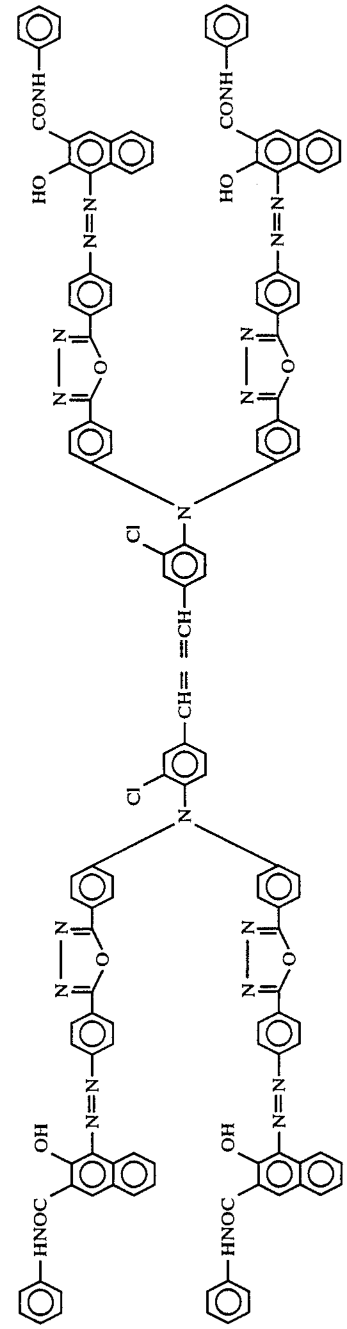

-continued
4-(57)
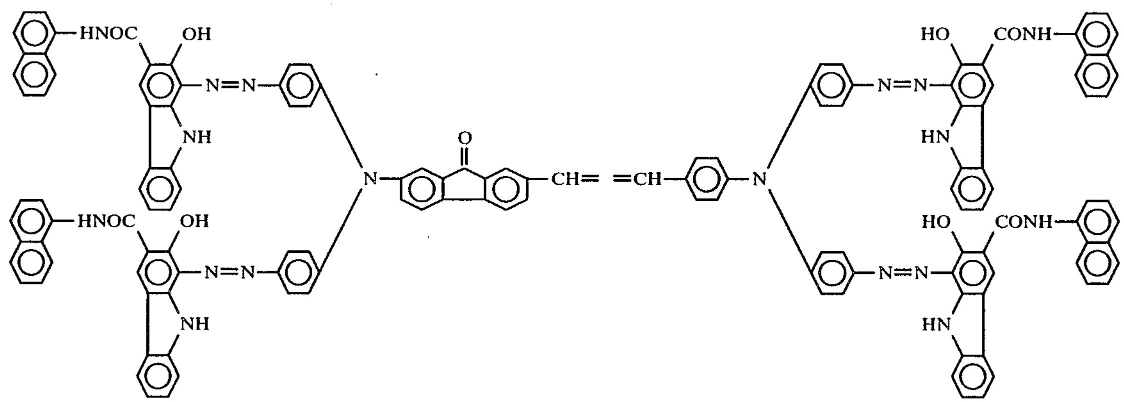
4-(58)
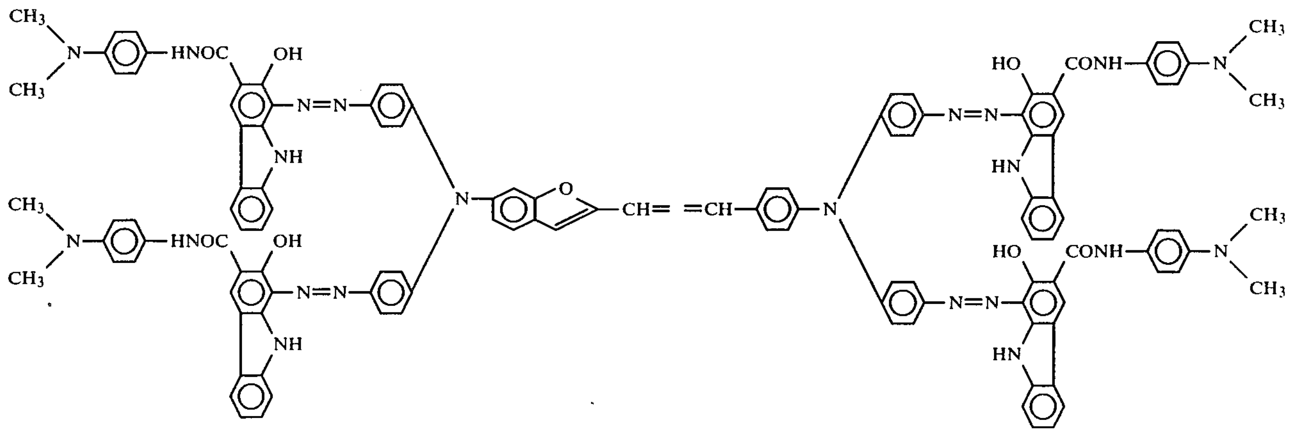

-continued
4-(59)
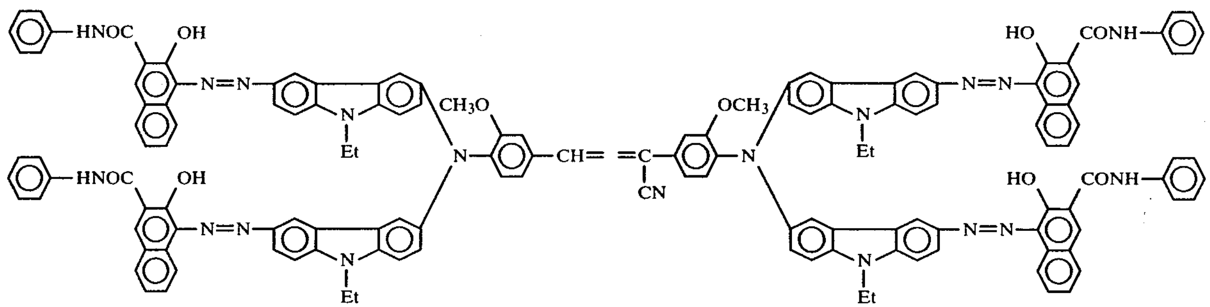
4-(60)
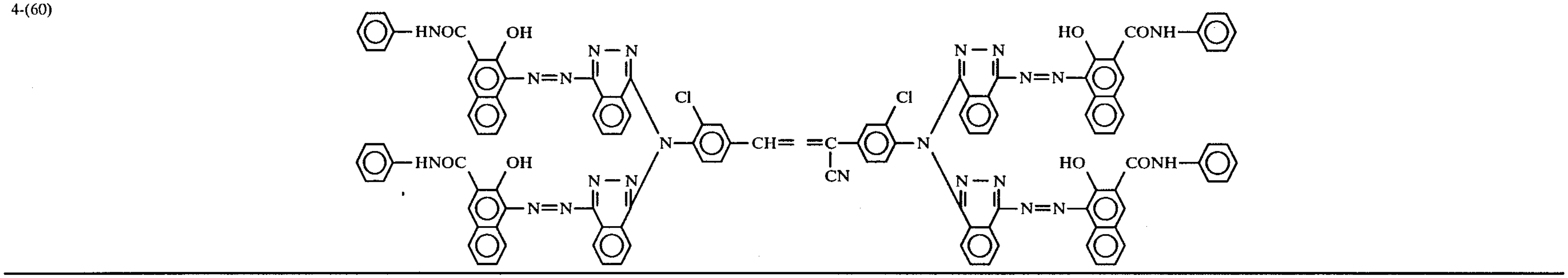

TABLE 5
Examples of azo pigment represented by the general formula (5)
| No. | |
|---|---|
| 5-(1) | 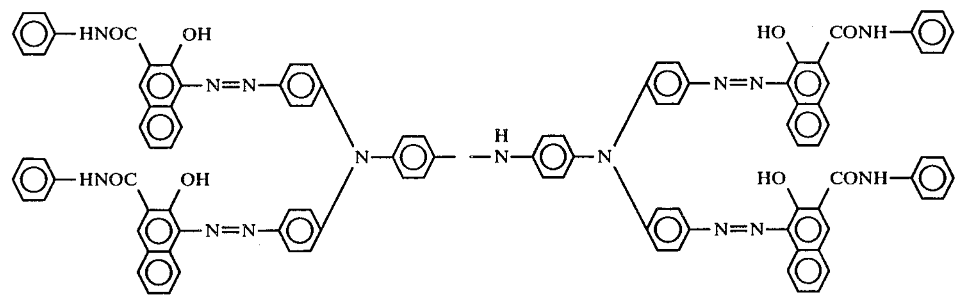 |
| 5-(2) | 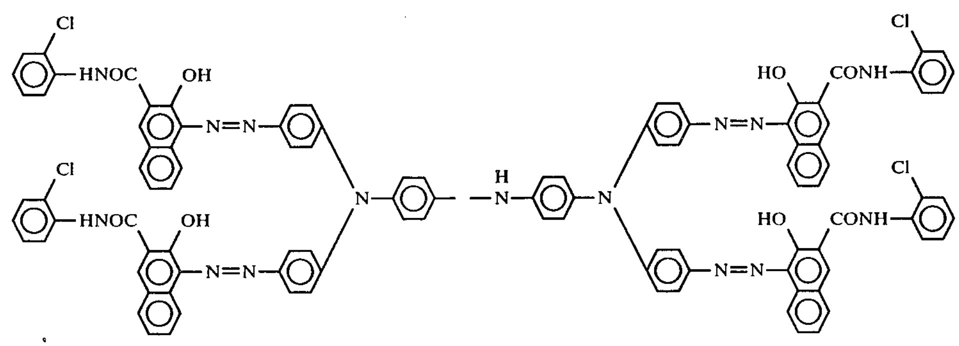 |
| 5-(3) | 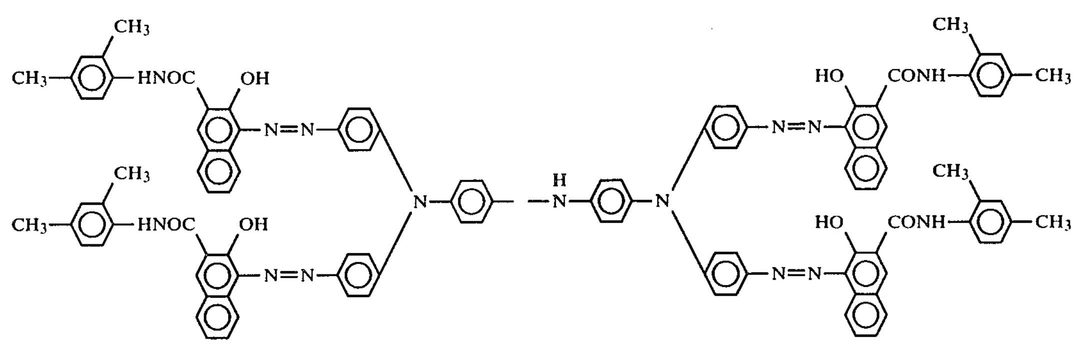 |

TABLE 5-continued
5-(4)
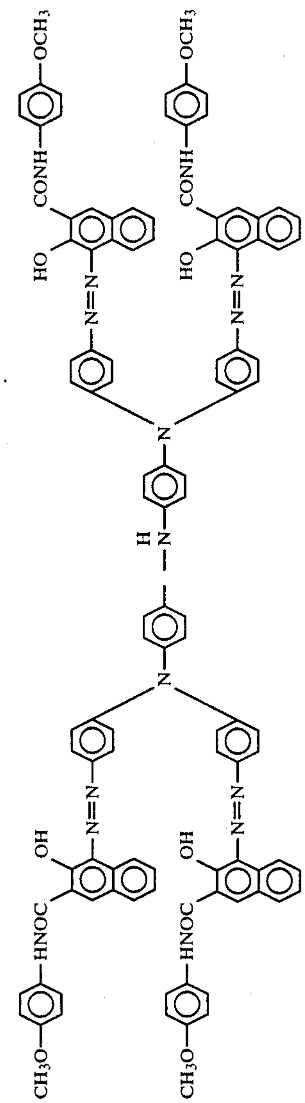
5-(5)
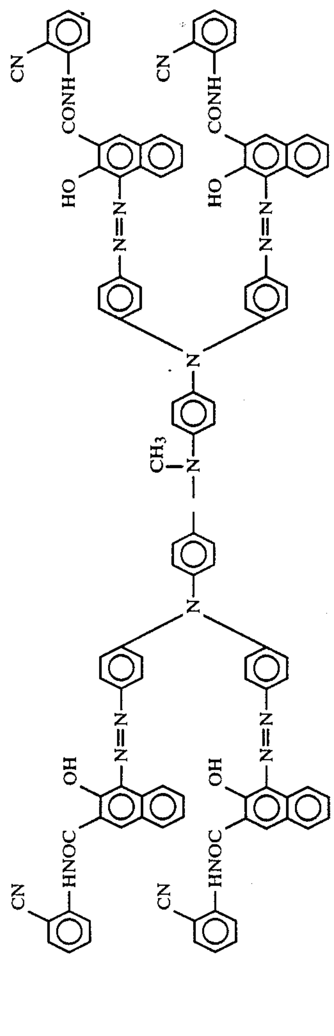
5-(6)
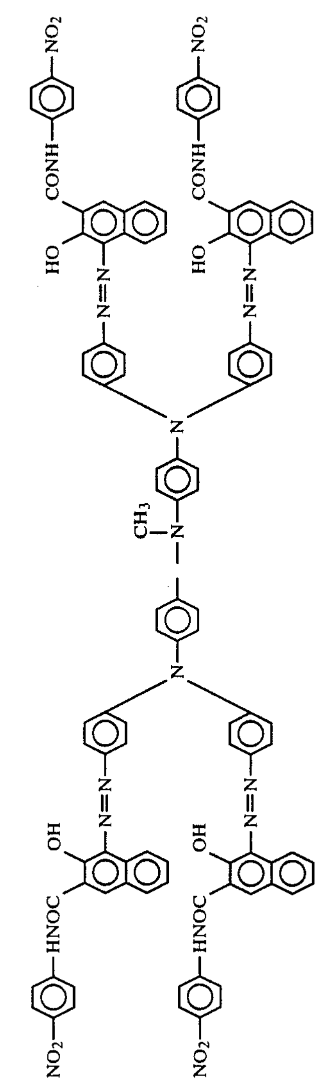

TABLE 5-continued
5-(7)
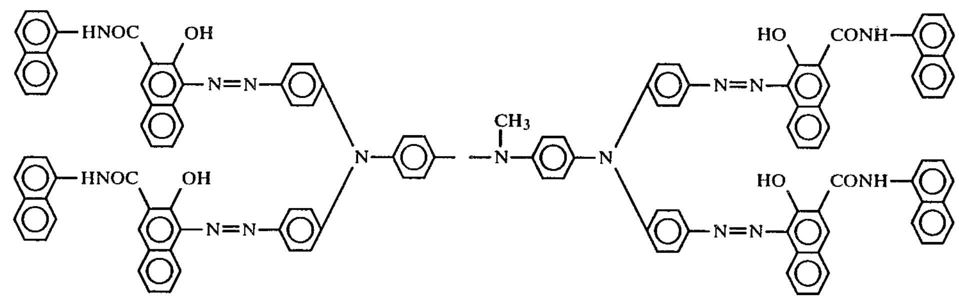
5-(8)
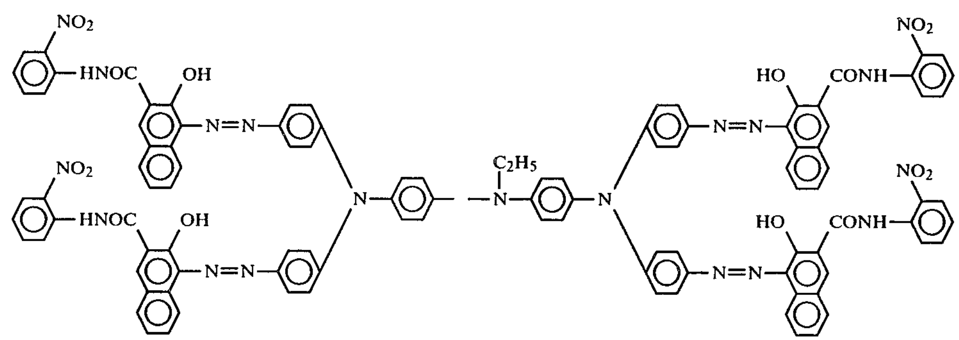
5-(9)
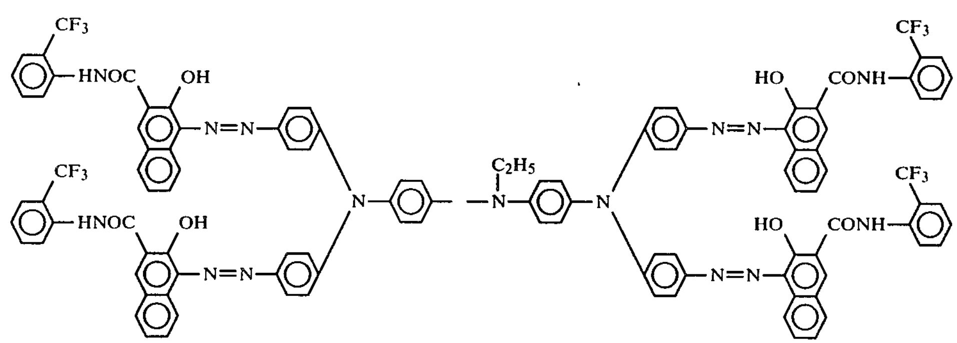

TABLE 5-continued
5-(10)
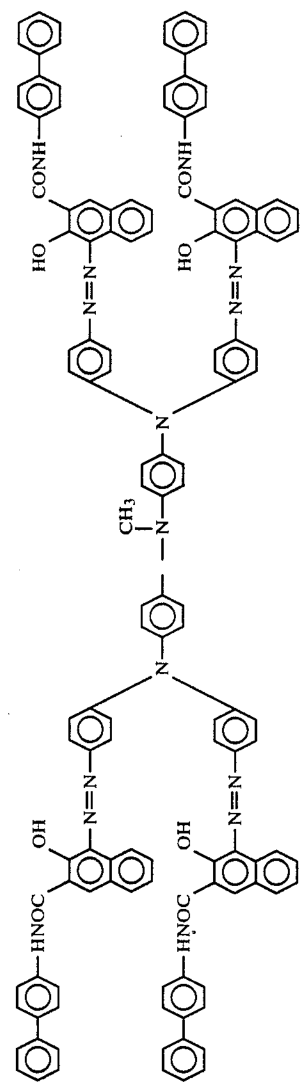
5-(11)
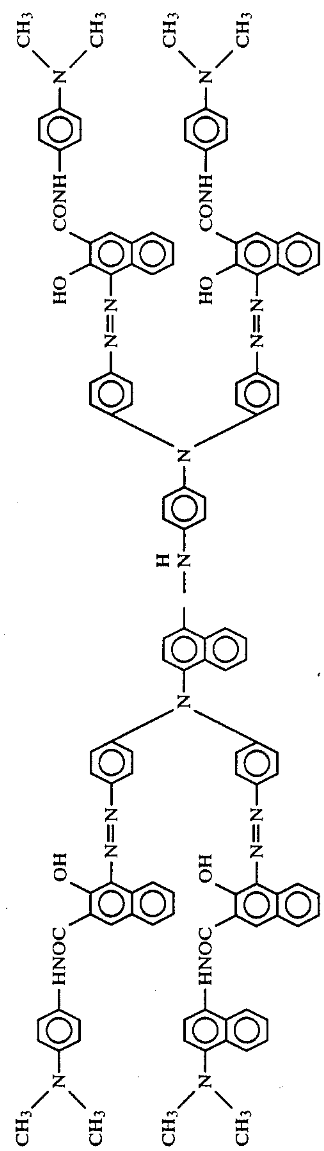
5-(12)
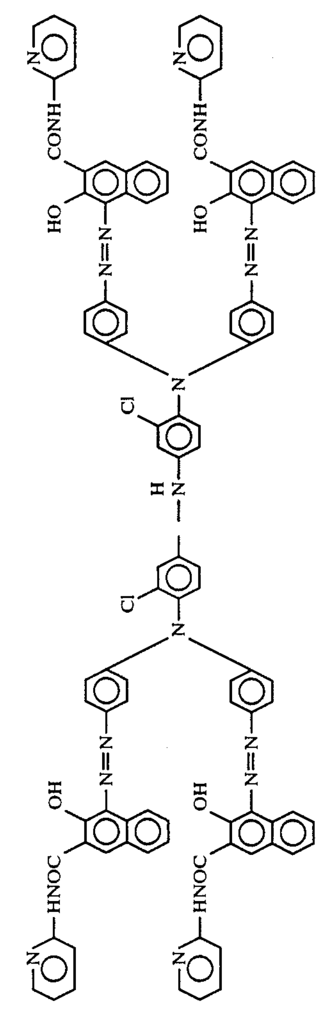

TABLE 5-continued
5-(13)
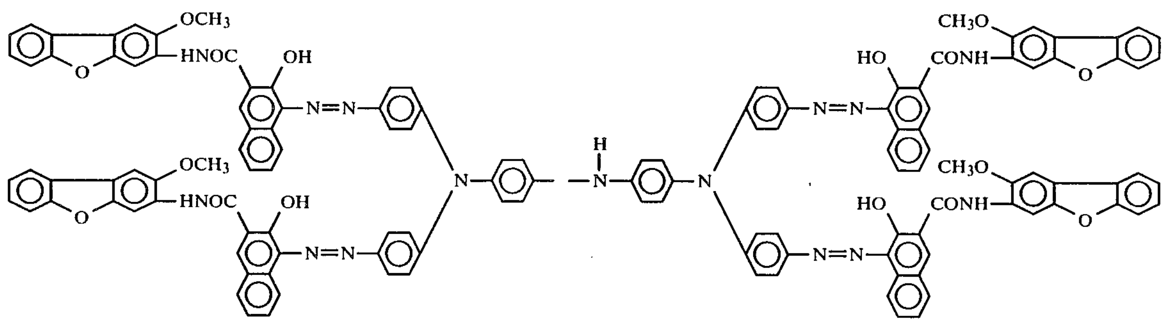
5-(14)
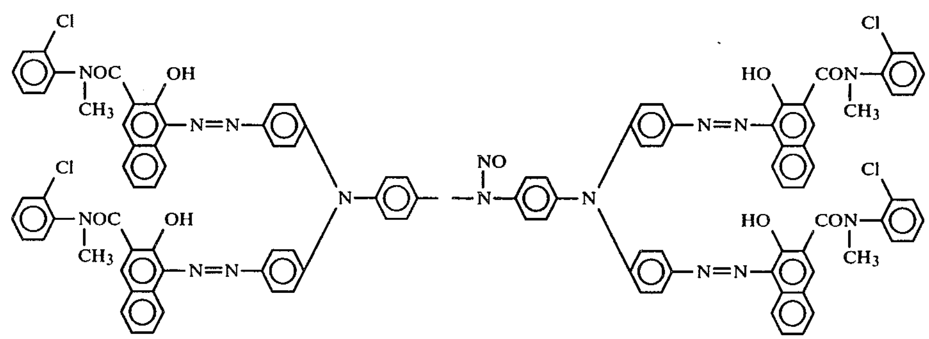
5-(15)
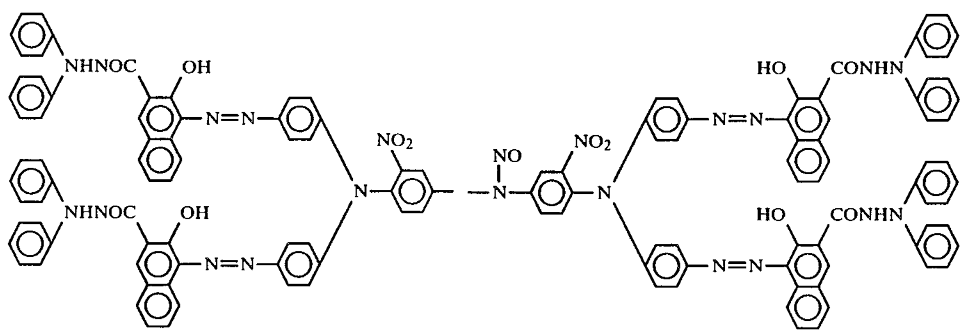

TABLE 5-continued
5-(16)
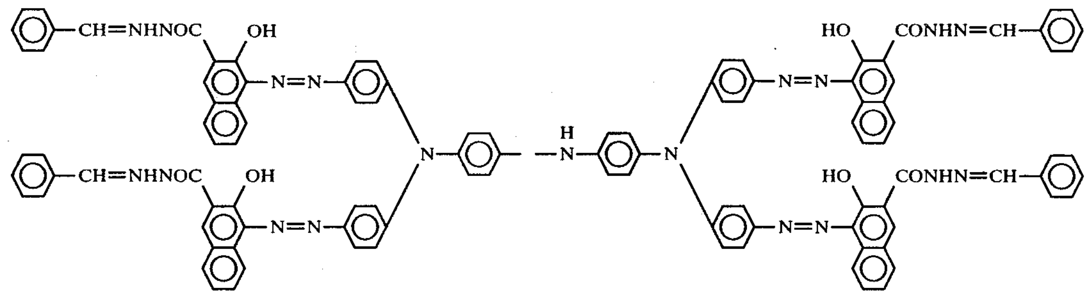
5-(17)
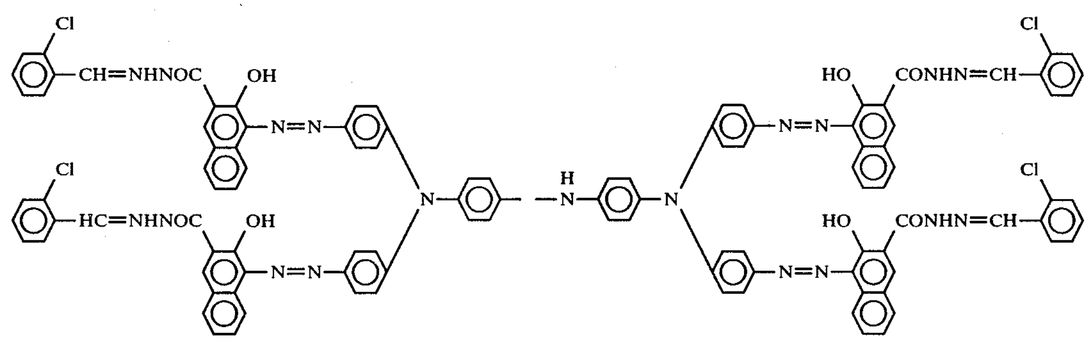
5-(18)
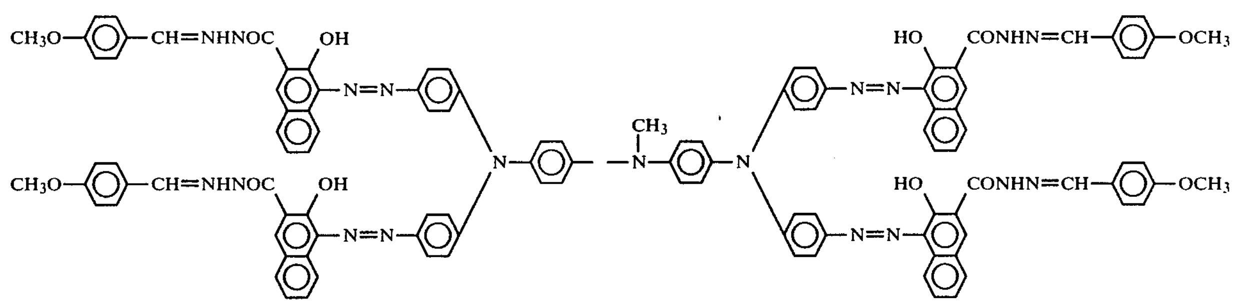

TABLE 5-continued
5-(19)
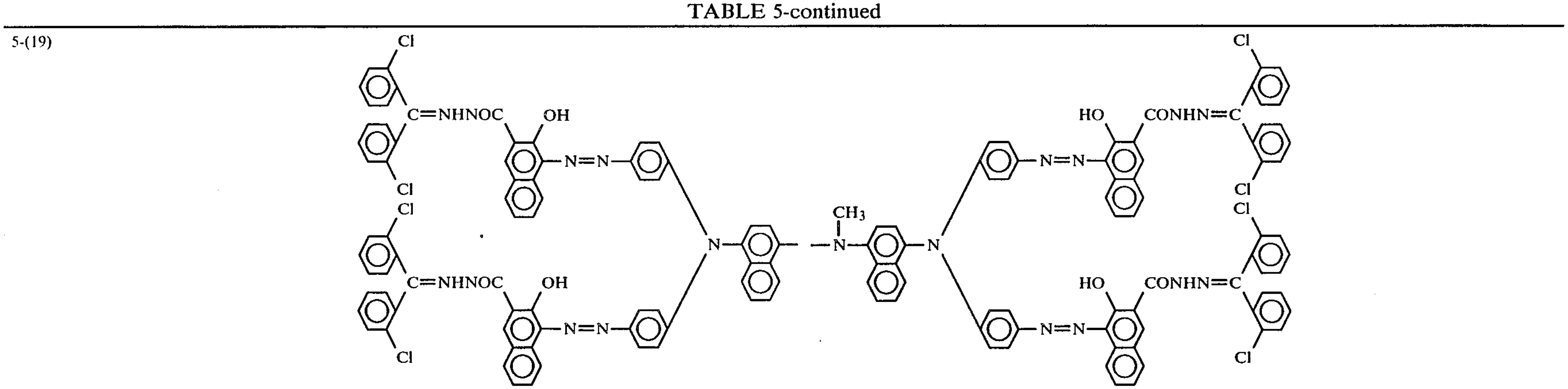
5-(20)
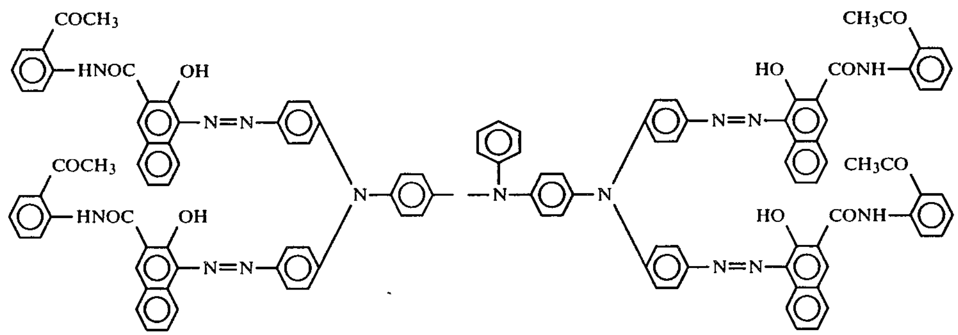

5-(21)
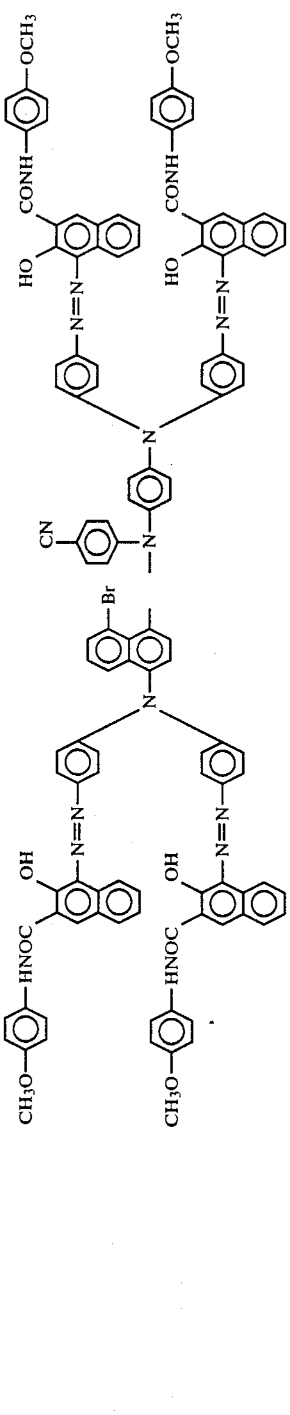
5-(22)
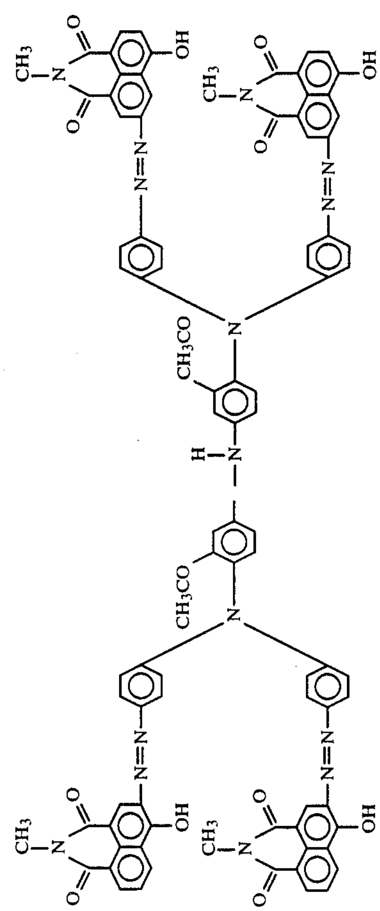
5-(23)
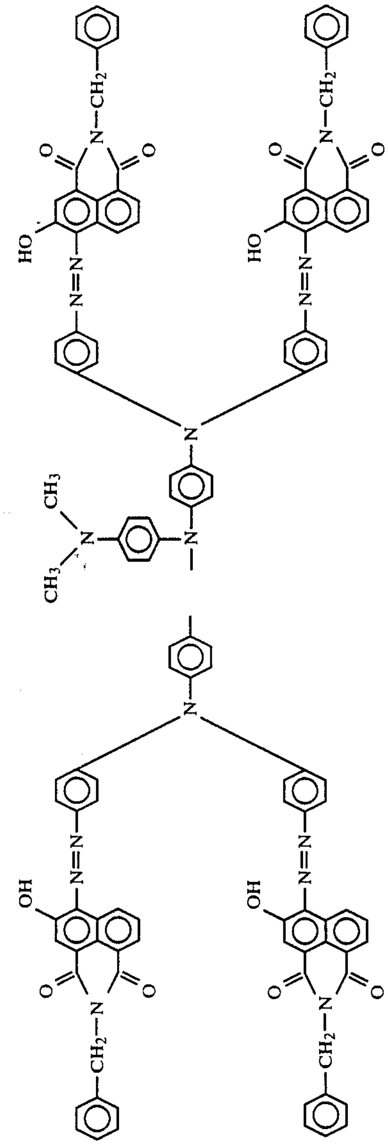

-continued
5-(24)
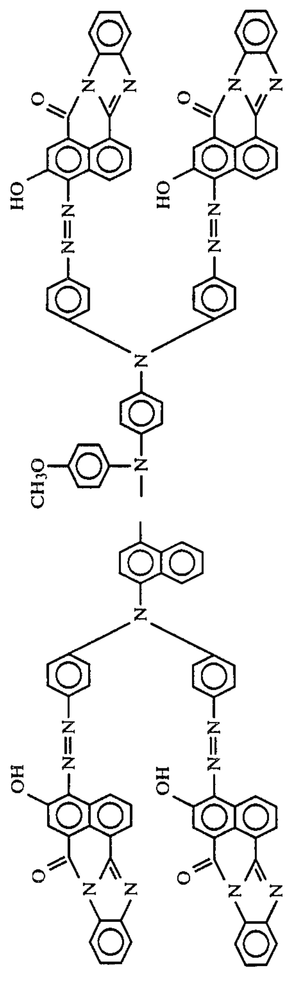
5-(25)
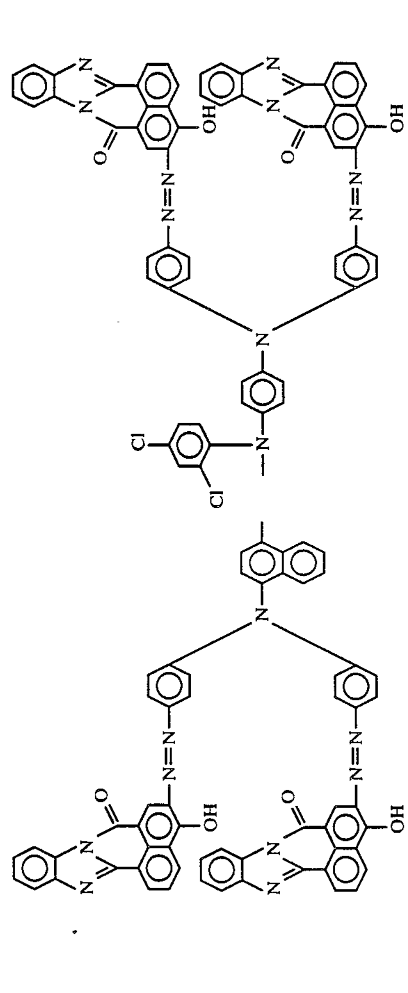
5-(26)
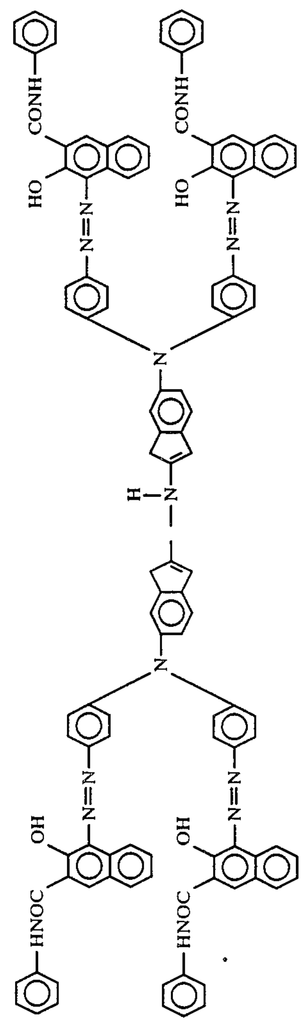

-continued
5-(27)
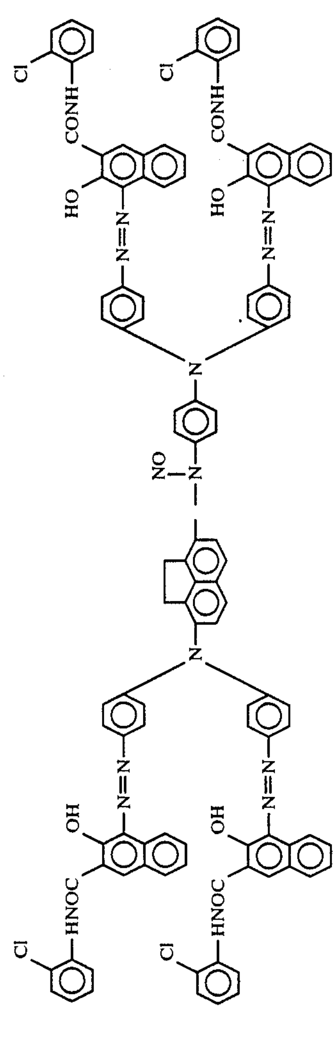
5-(28)
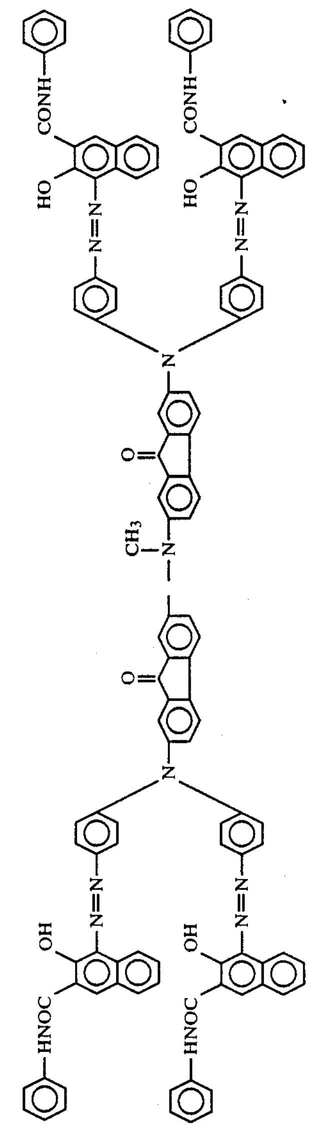
5-(29)
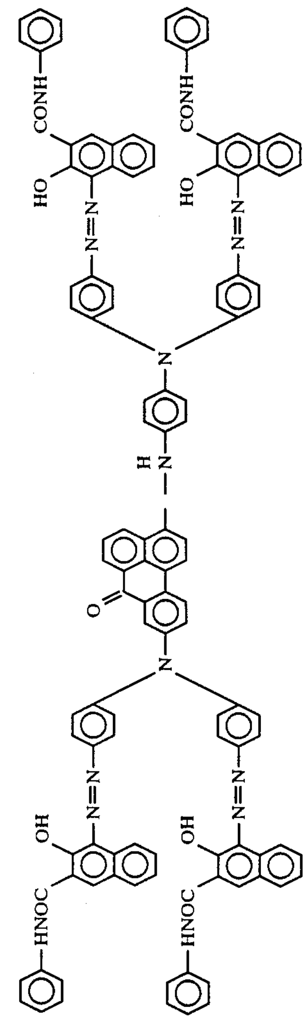

-continued
5-(30)
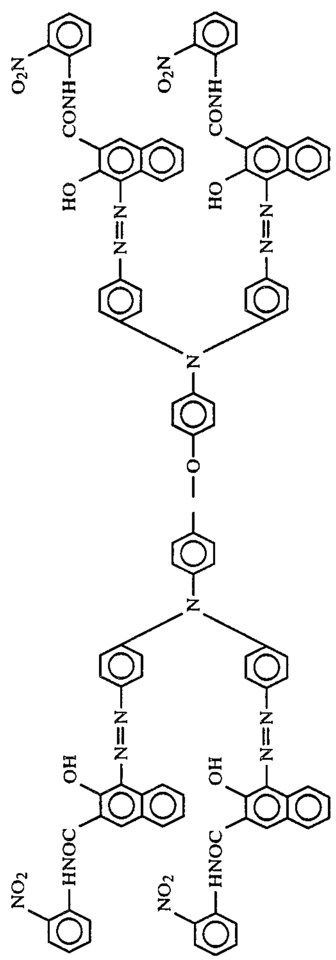
5-(31)
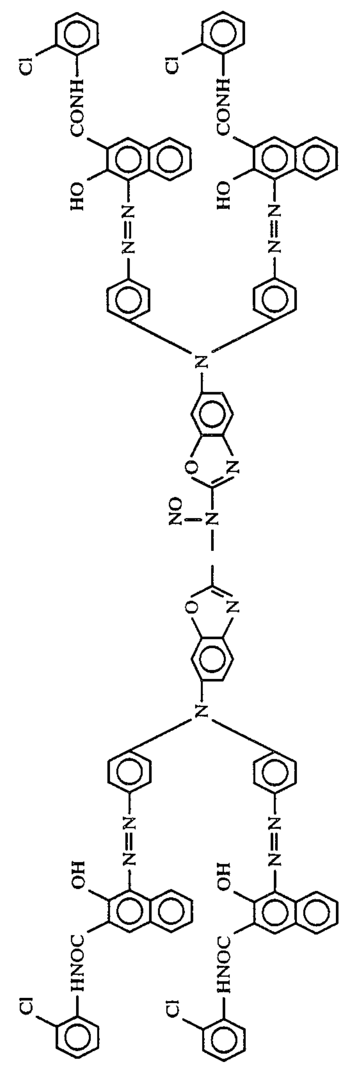
5-(32)
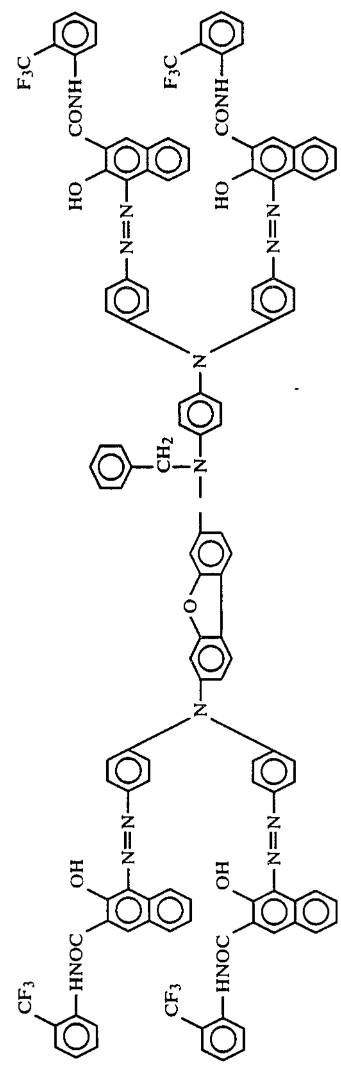

-continued
5-(33)
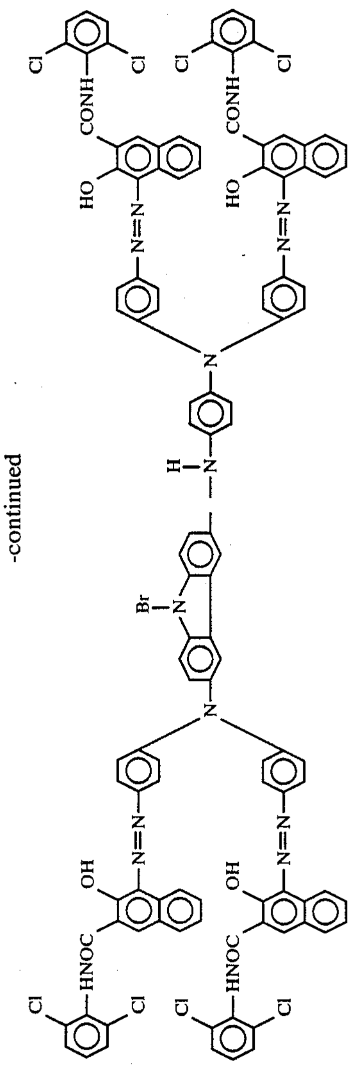
5-(34)
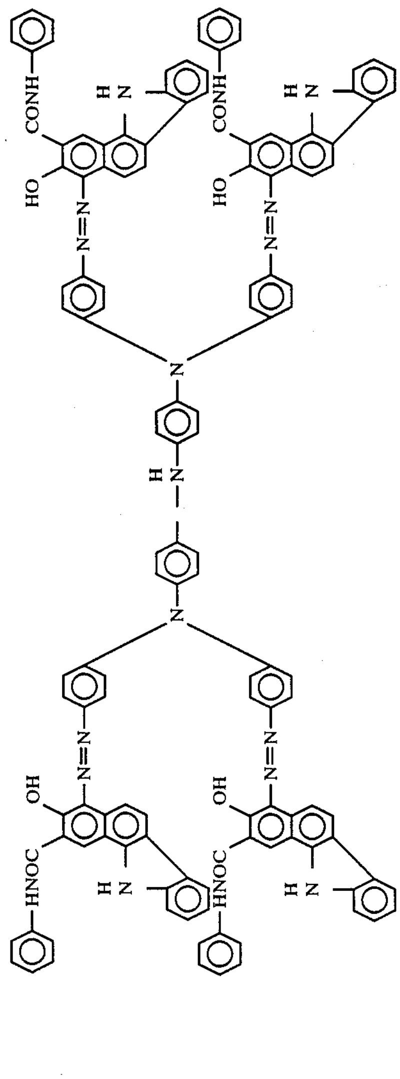

5-(35)
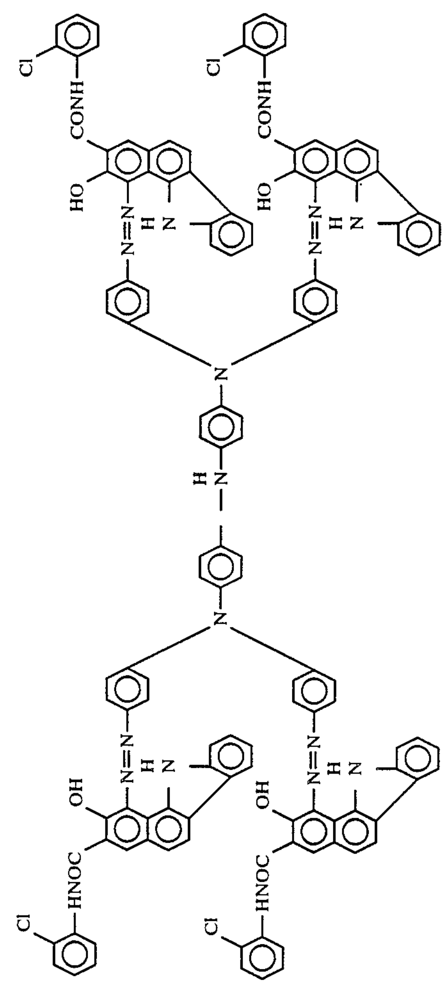
5-(36)
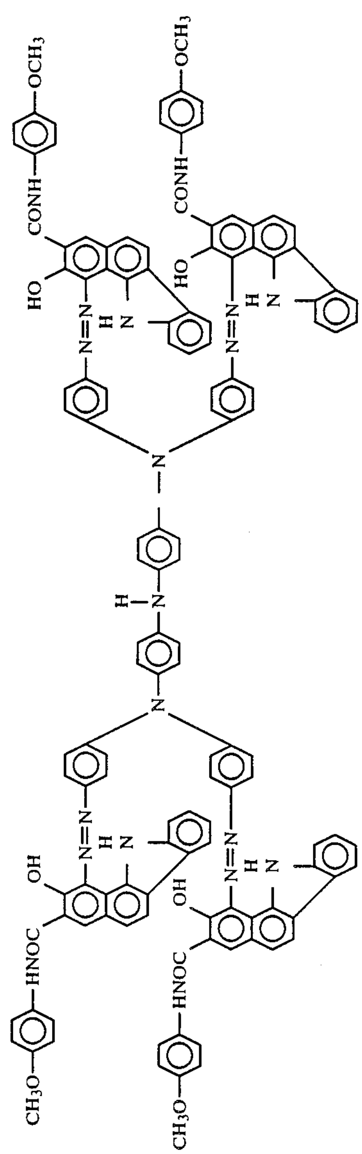

-continued
5-(37)
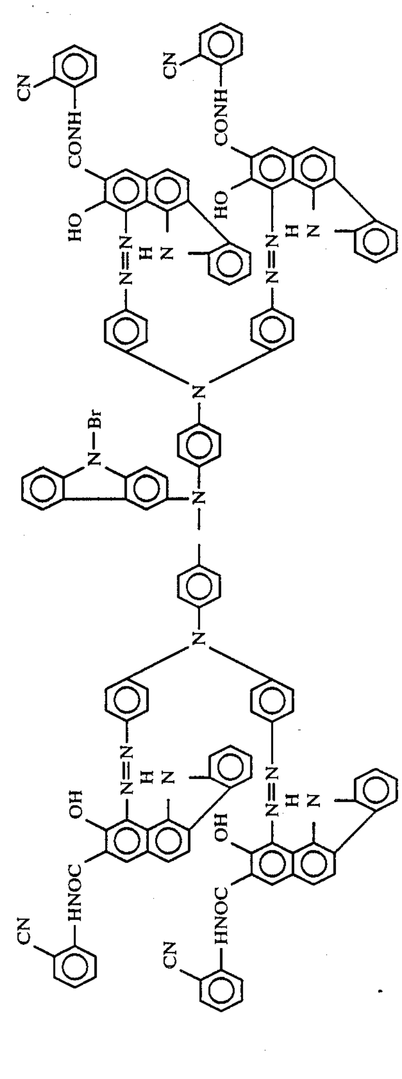
5-(38)
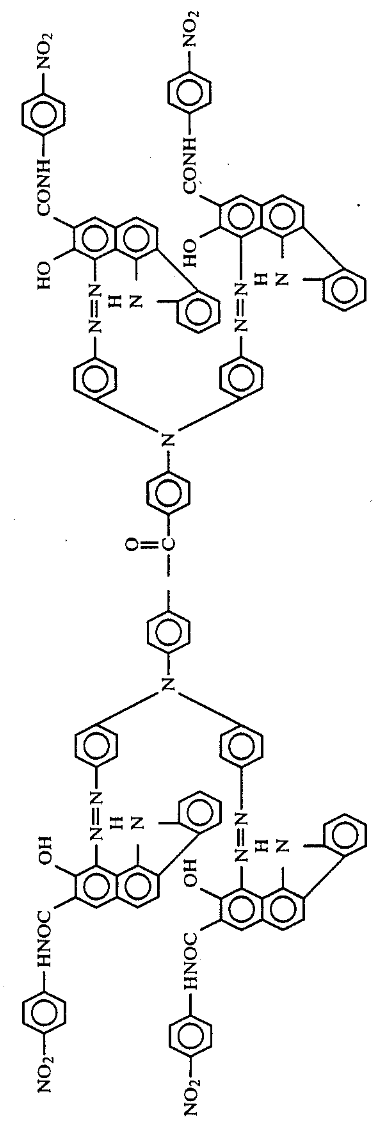

-continued
5-(39)
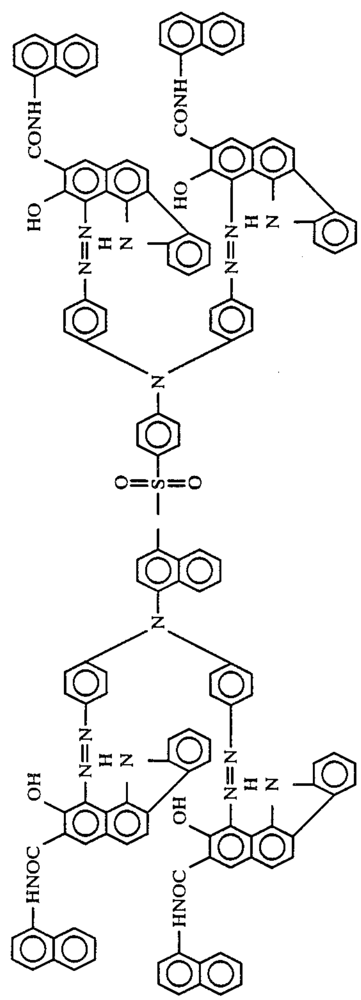
5-(40)
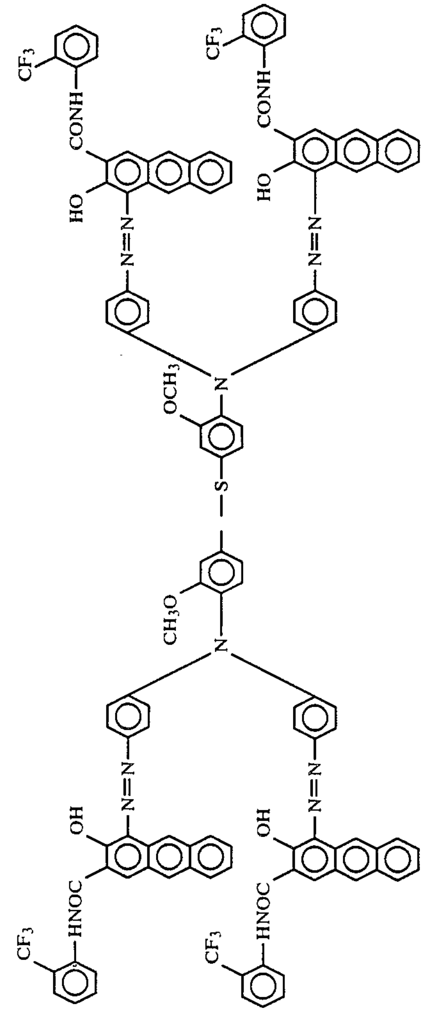

-continued
5-(41)
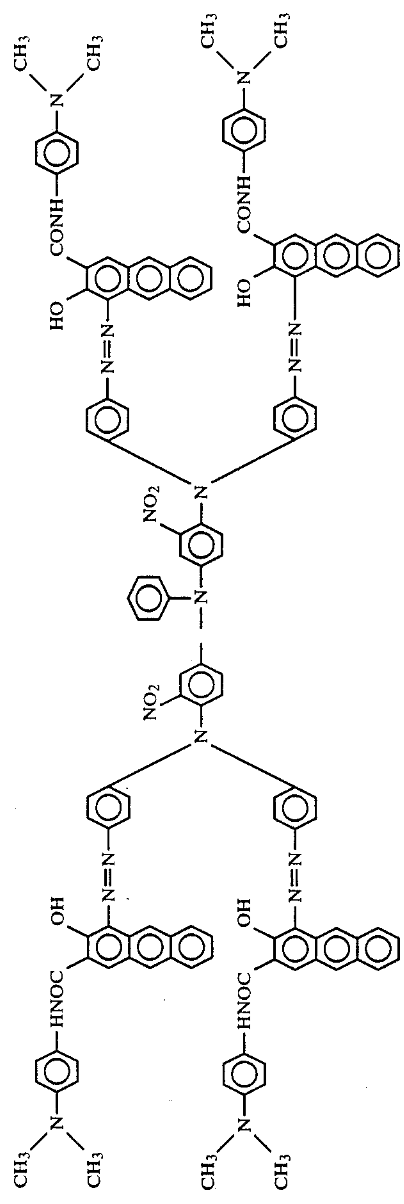
5-(42)
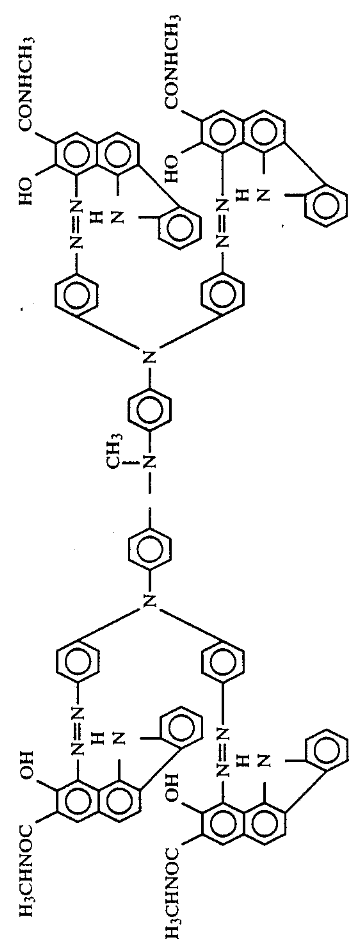

-continued
5-(43)
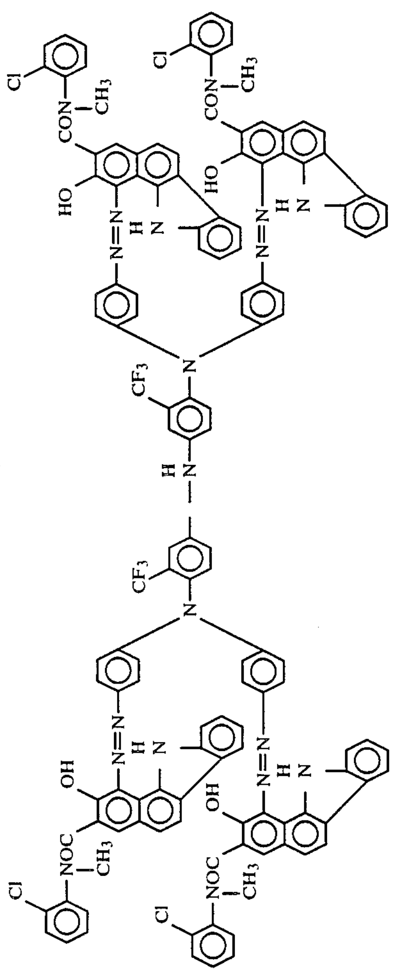
5-(44)
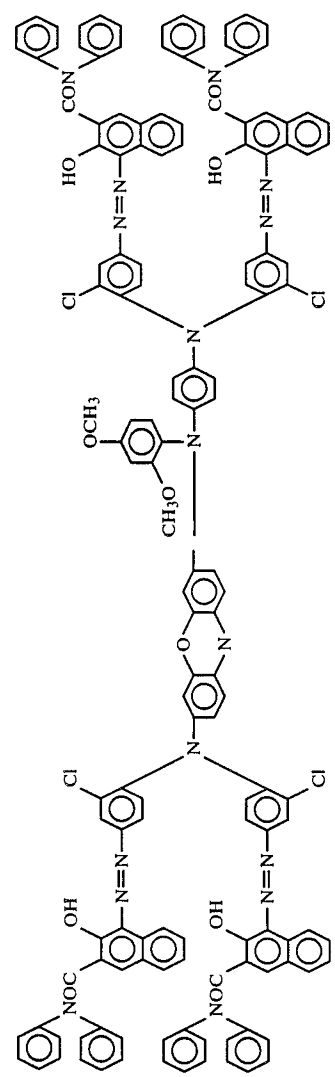
5-(45)
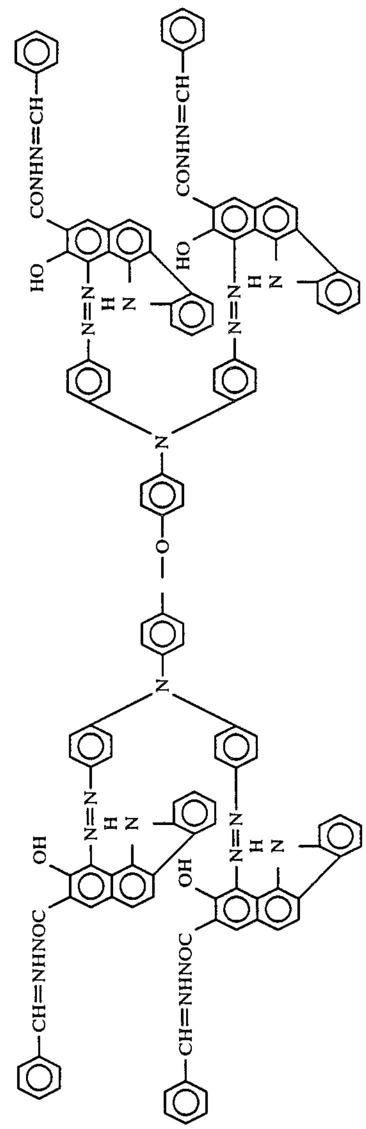

-continued
5-(46)
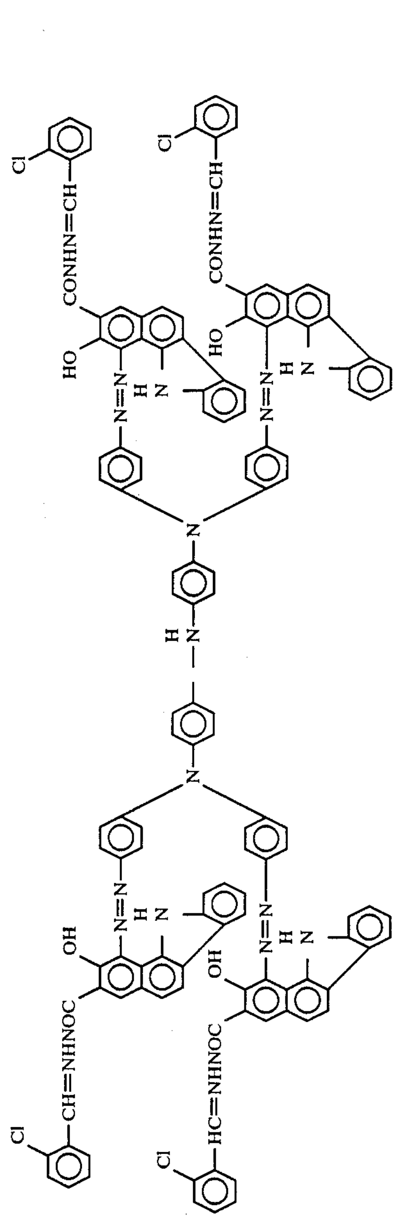
5-(47)
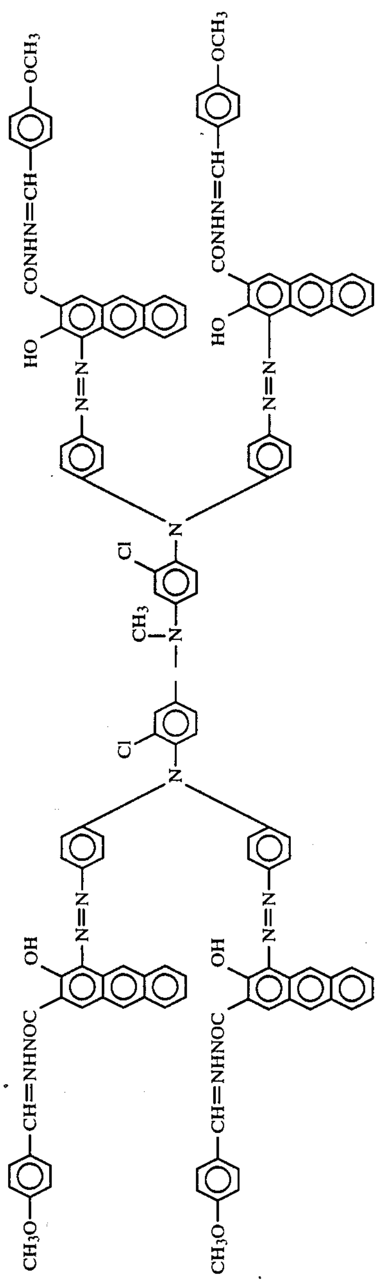

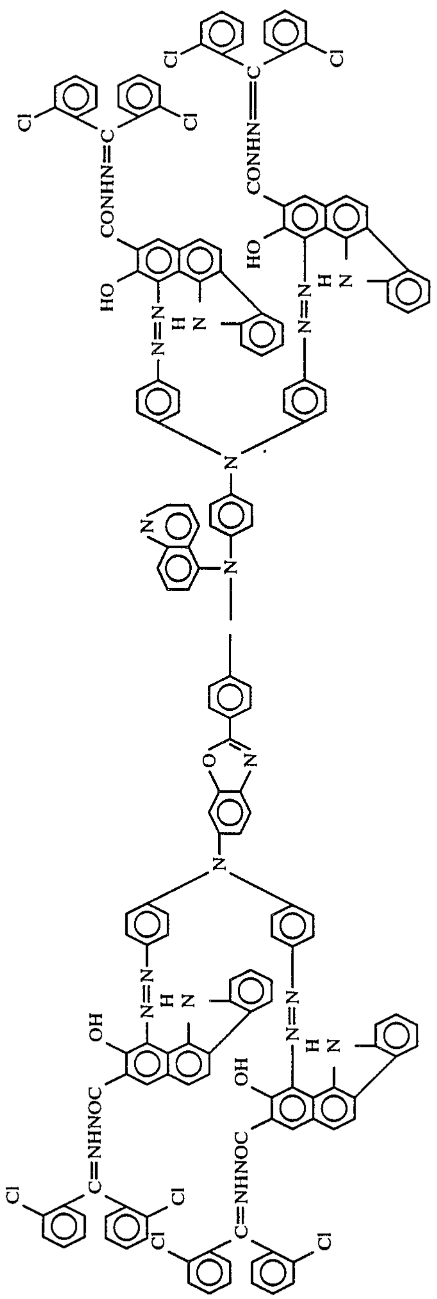
5-(48)
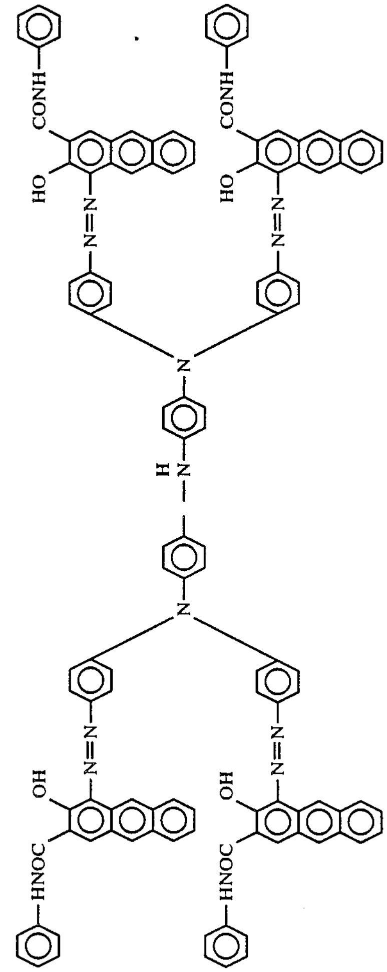
5-(49)

-continued
5-(50)
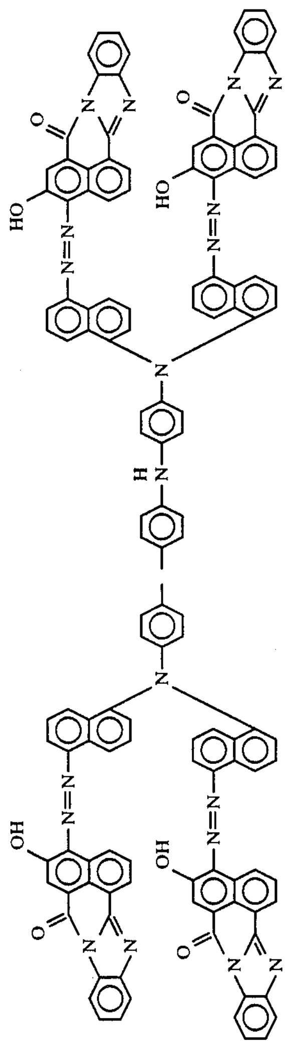
5-(51)
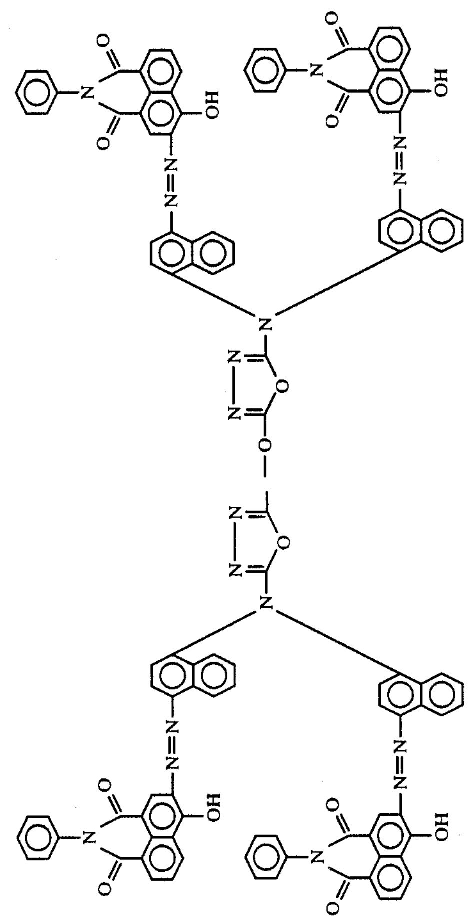

-continued
5-(52)
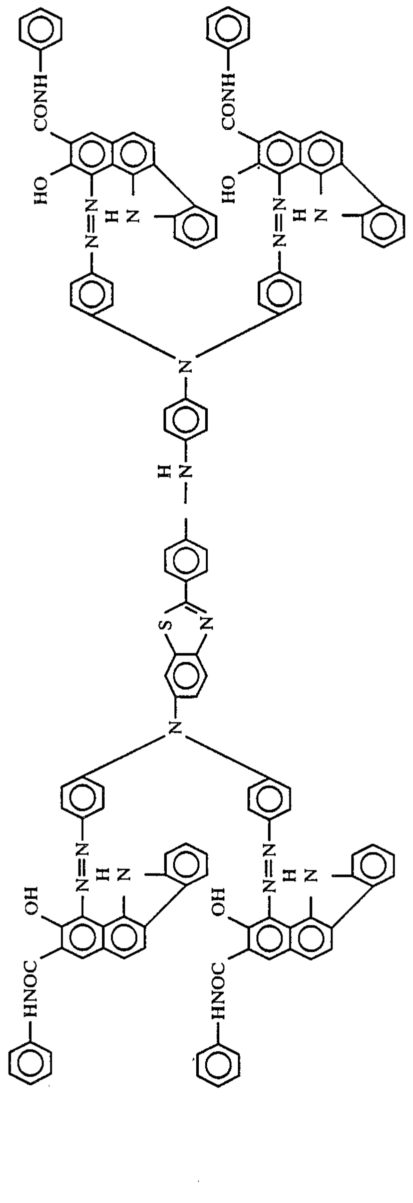
5-(53)
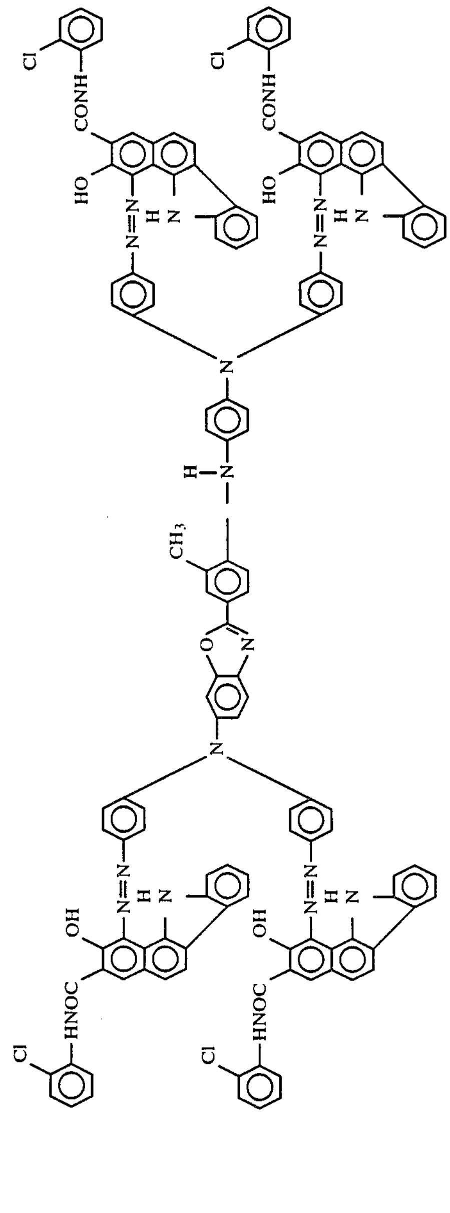

-continued
5-(54)
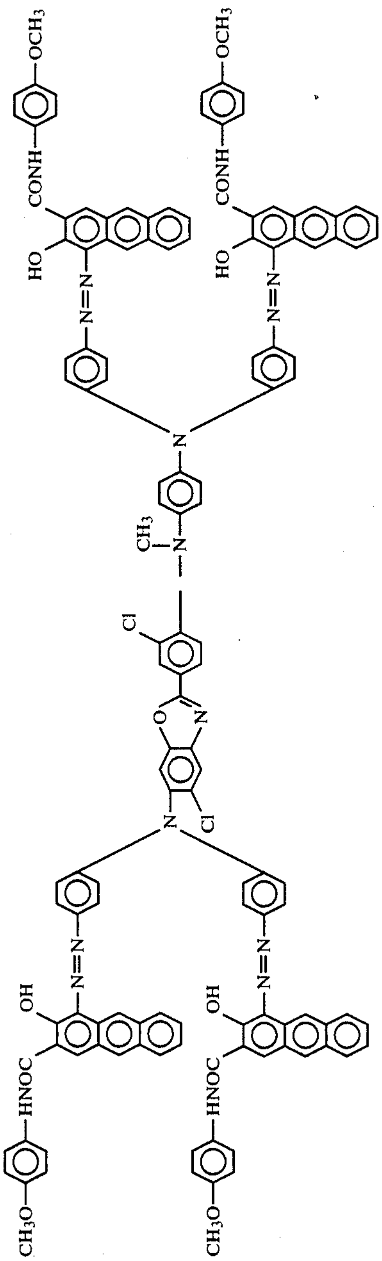
5-(55)
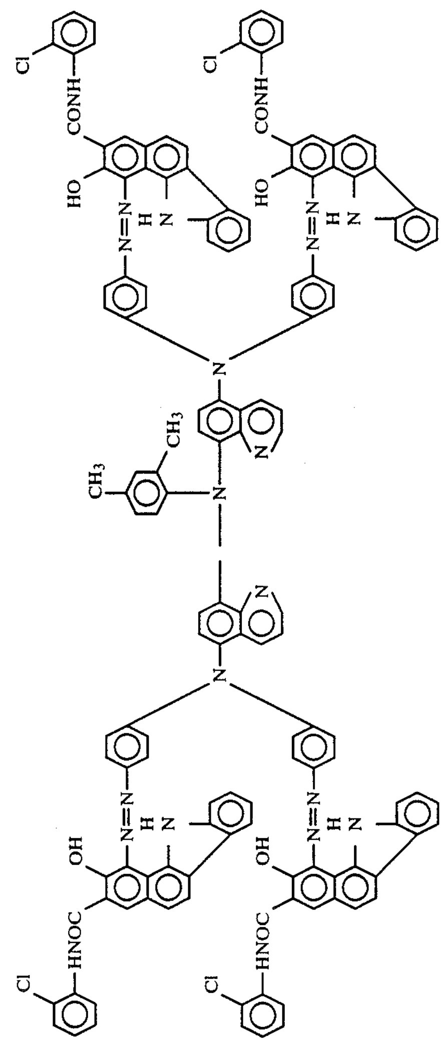

-continued
5-(56)
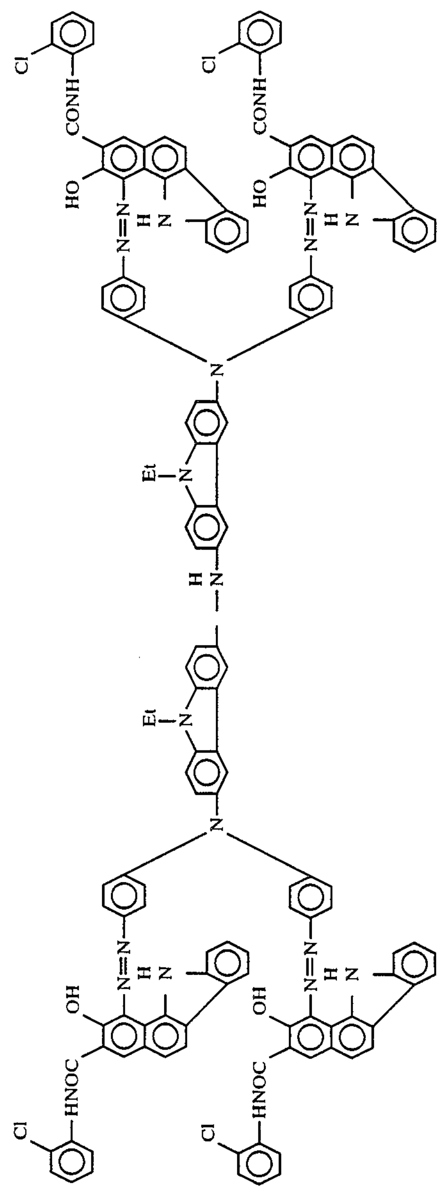
5-(57)
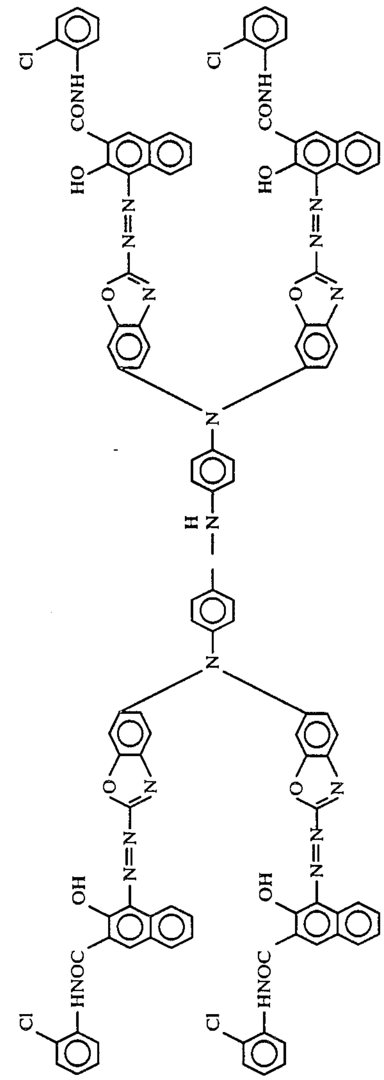

-continued
5-(58)
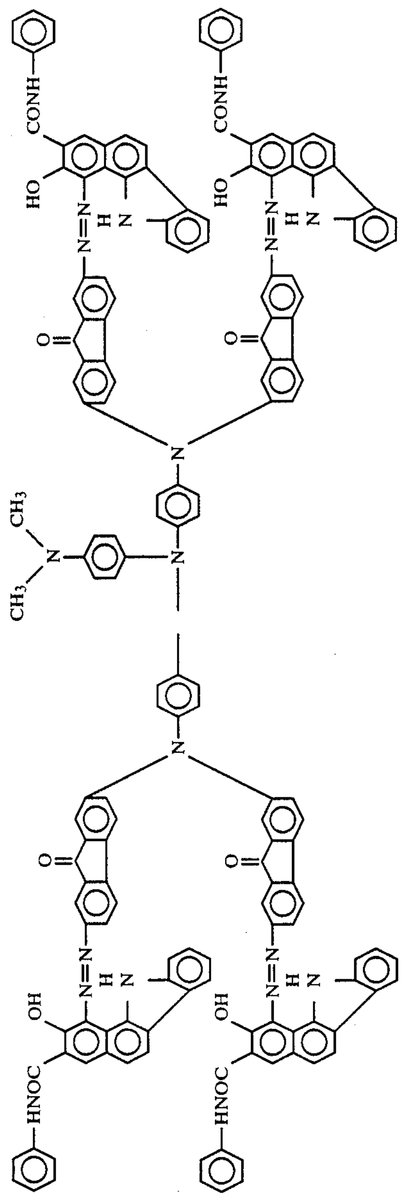
5-(59)
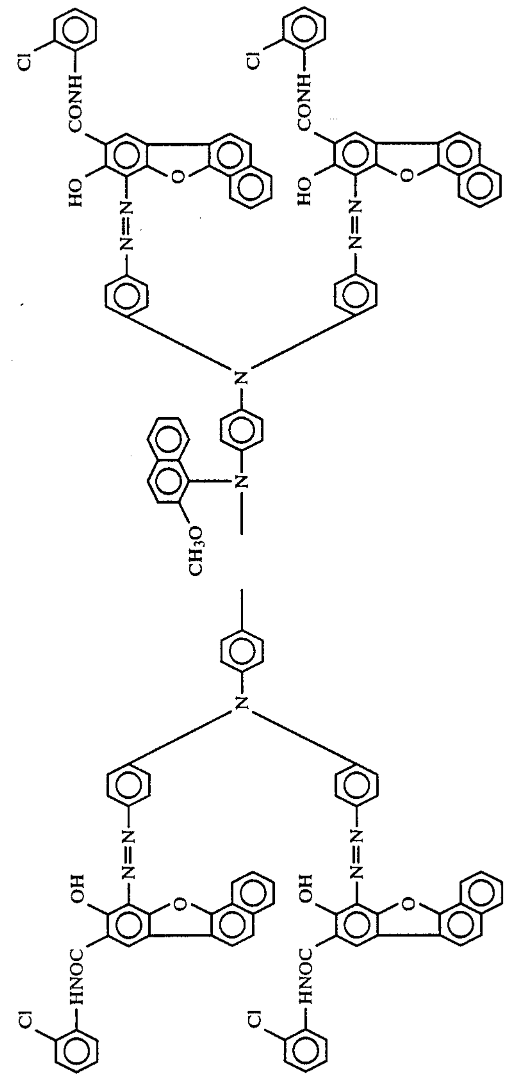

-continued
5-(60)
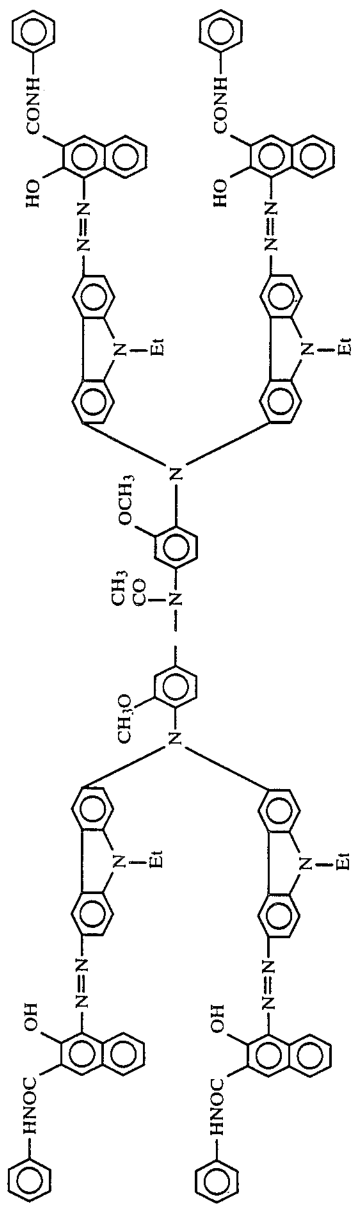
5-(61)
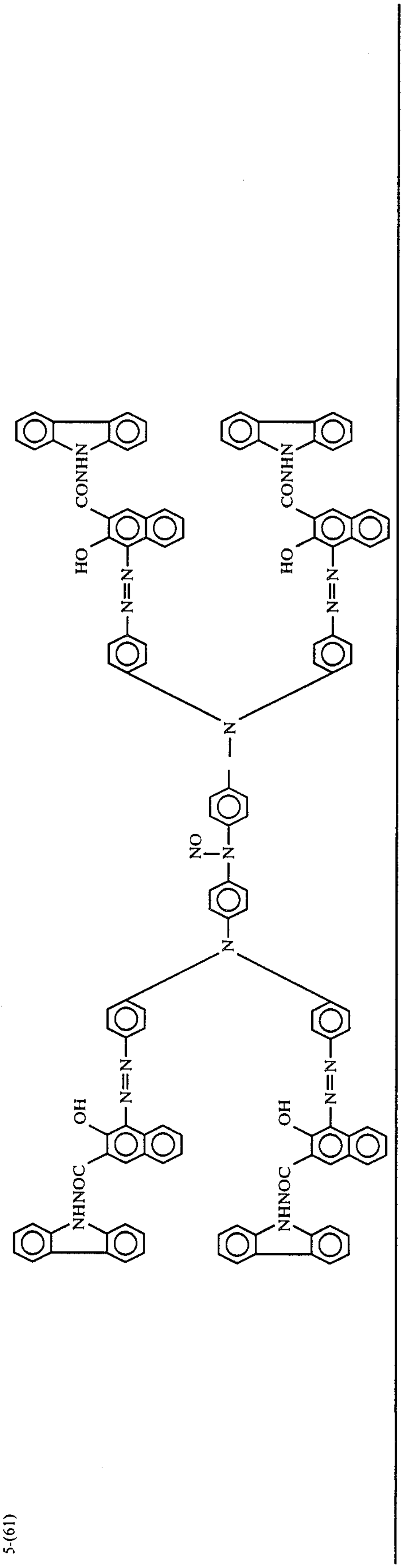

TABLE 6
| No. | Examples of azo pigment represented by the general formula (6) |
|---|---|
| 6-(1) | 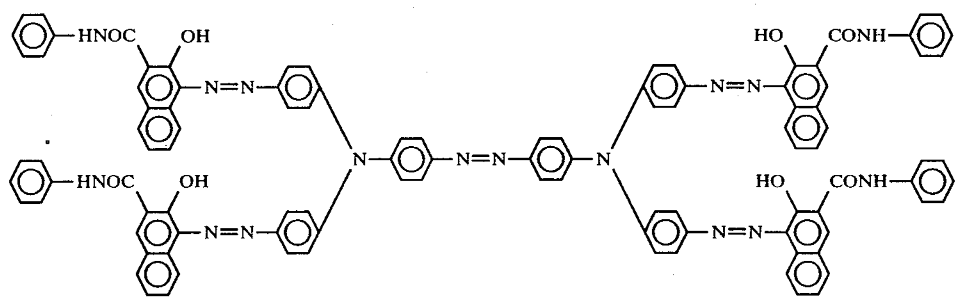 |
| 6-(2) | 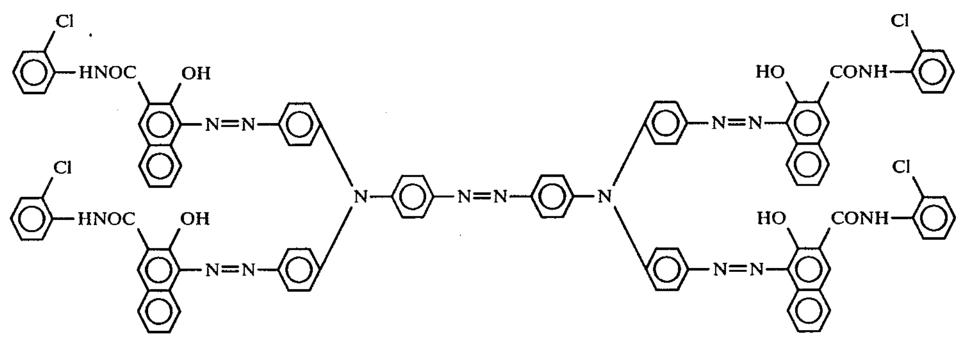 |
| 6-(3) | 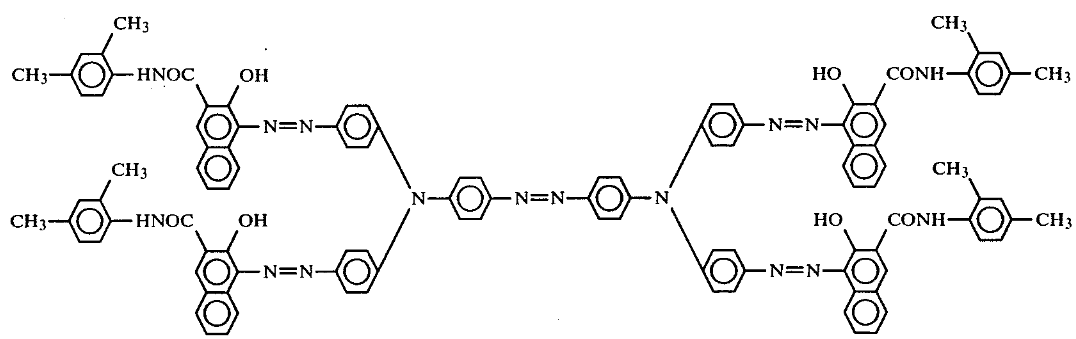 |

TABLE 6-continued
6-(4)
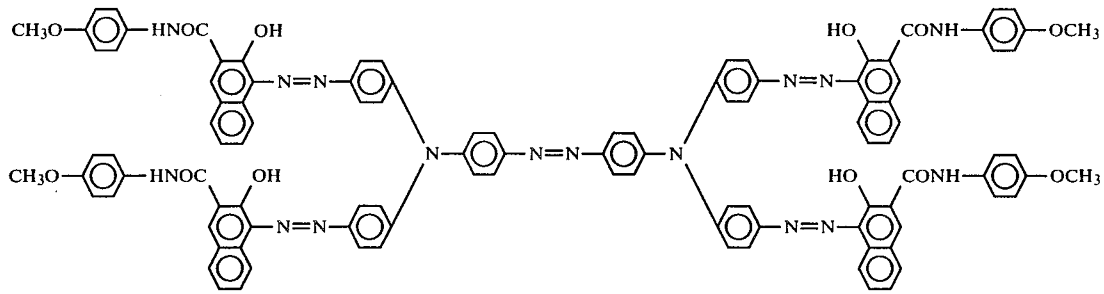
6-(5)
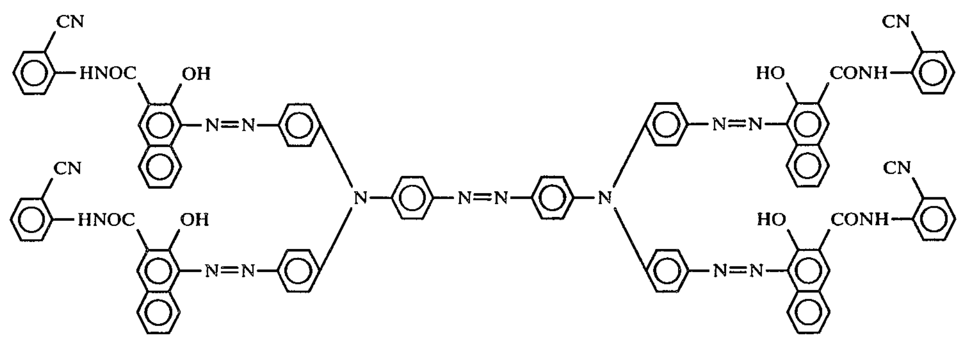
6-(6)
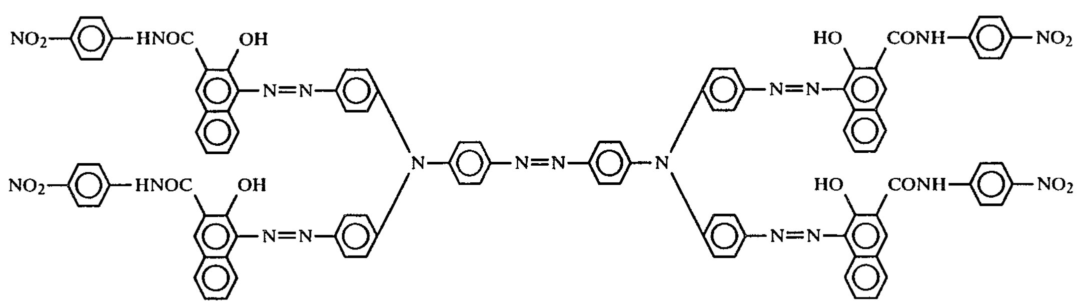

TABLE 6-continued
6-(7)
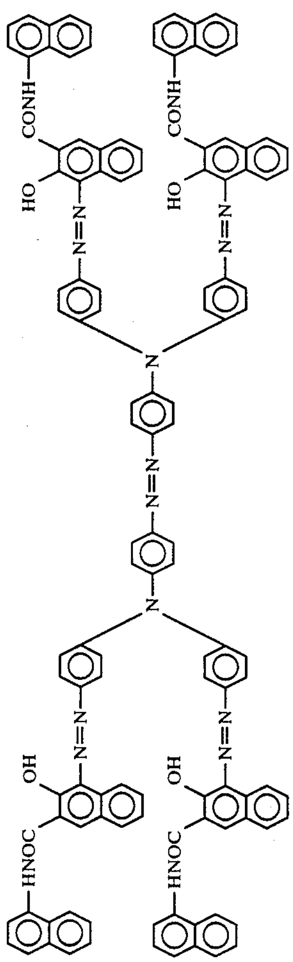
6-(8)
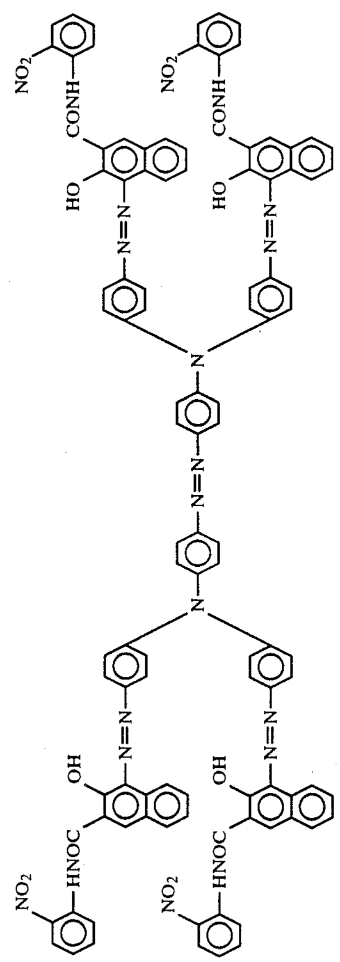
6-(9)
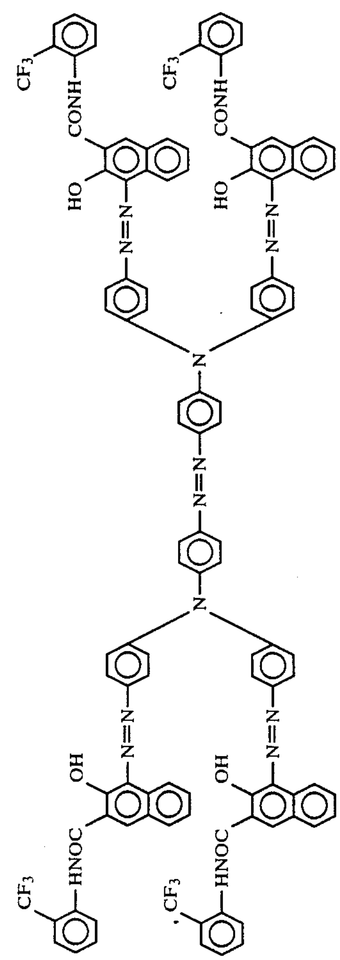

TABLE 6-continued
6-(10)
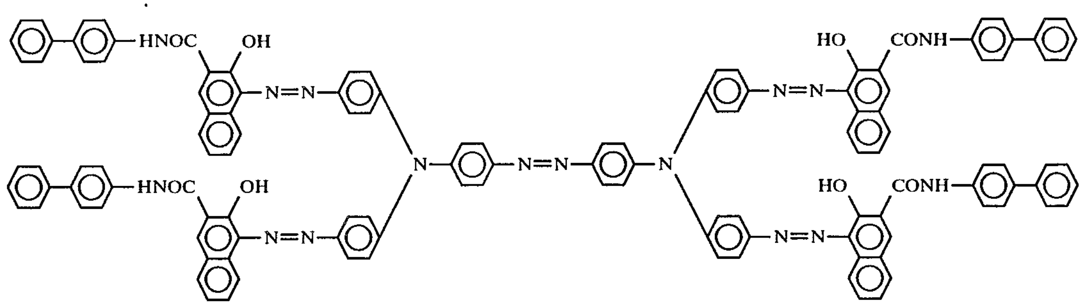
6-(11)
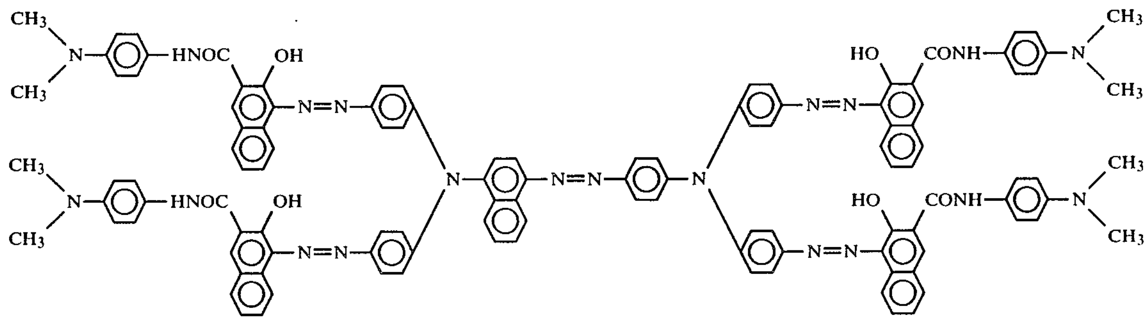
6-(12)
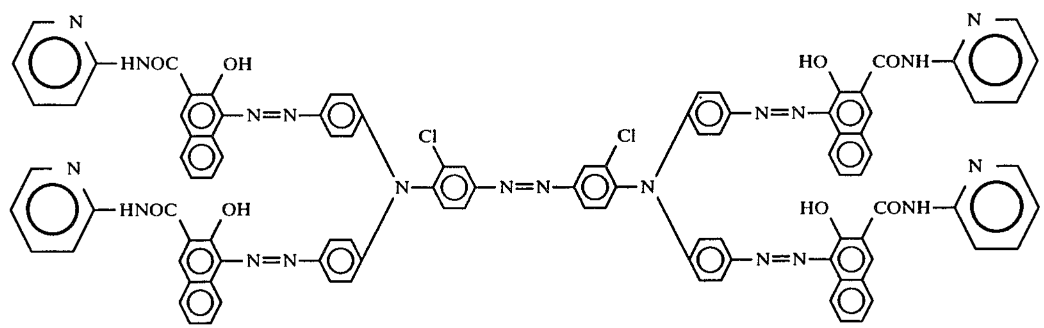

TABLE 6-continued
6-(13)
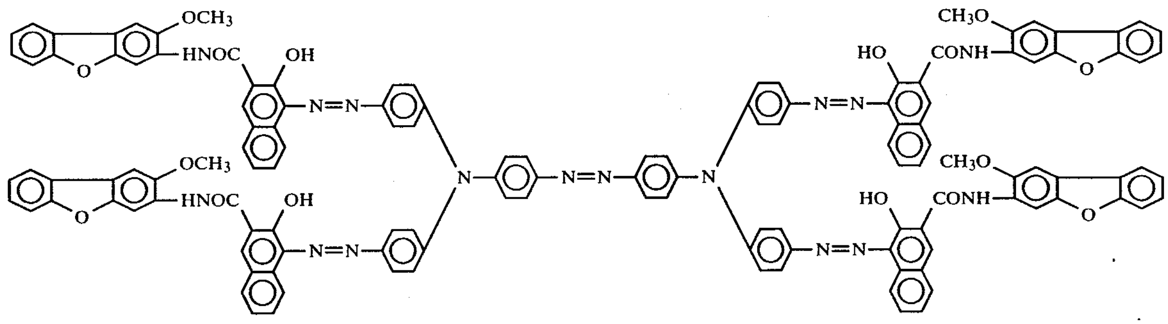
6-(14)
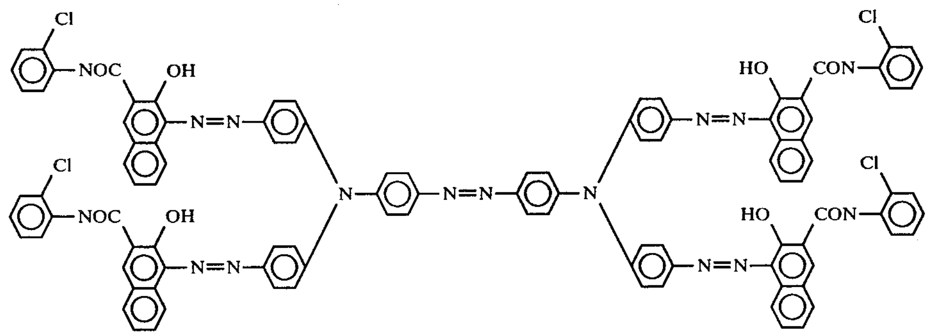
6-(15)
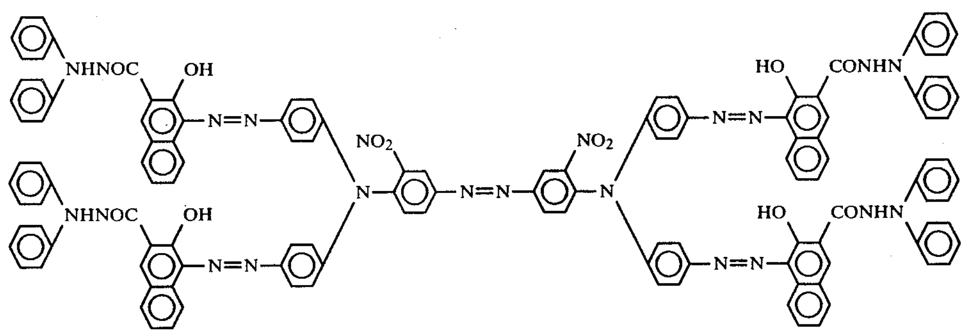

TABLE 6-continued
6-(16)
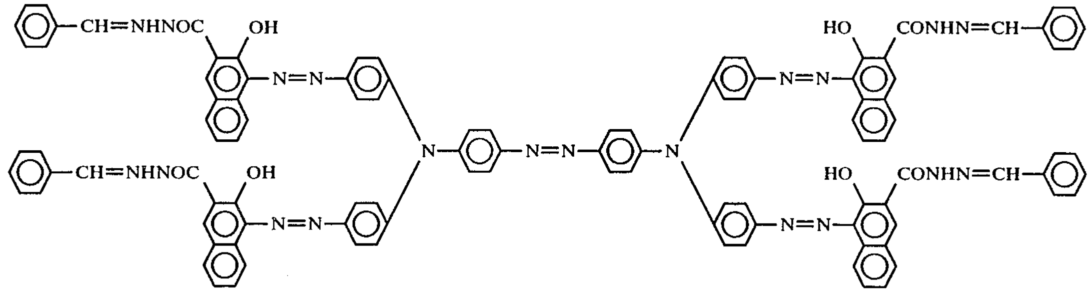
6-(17)
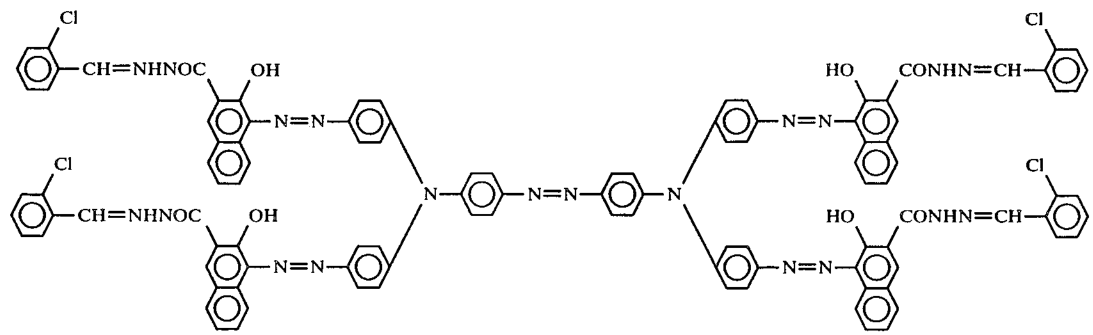
6-(18)
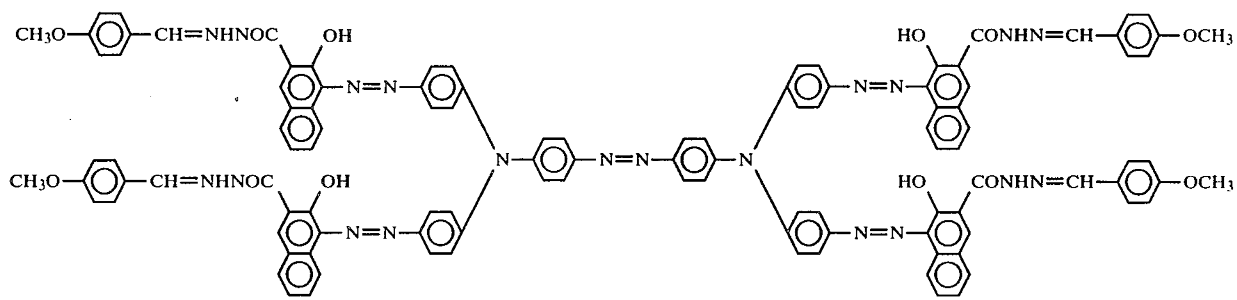

TABLE 6-continued
6-(19)
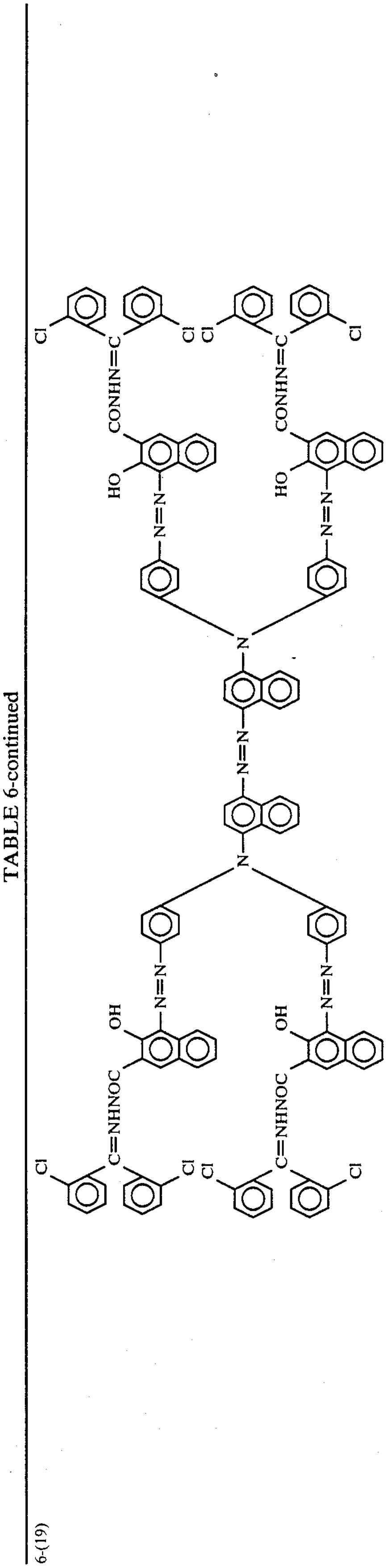
6-(20)
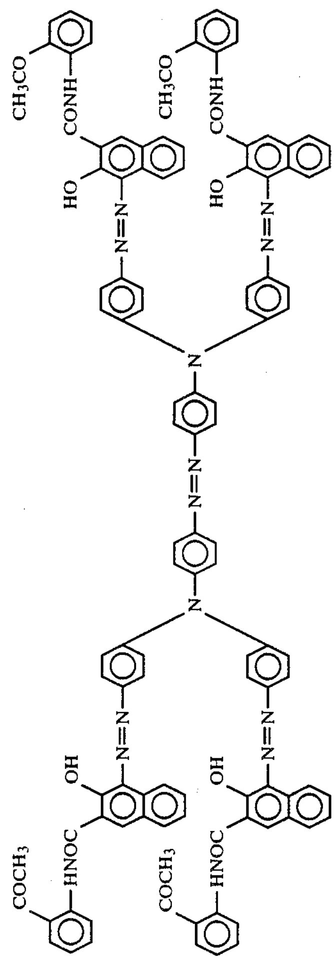
6-(21)
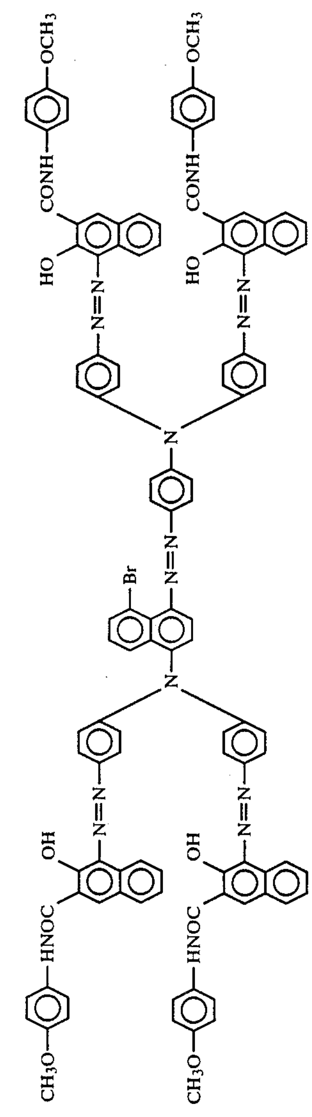

6-(22)
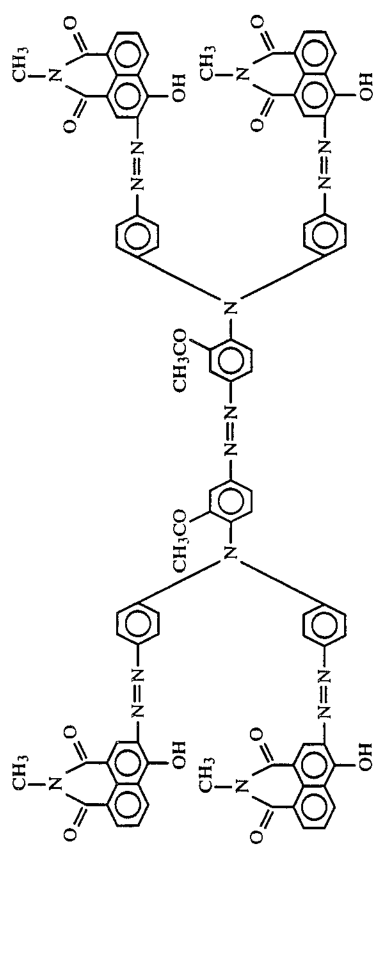
6-(23)
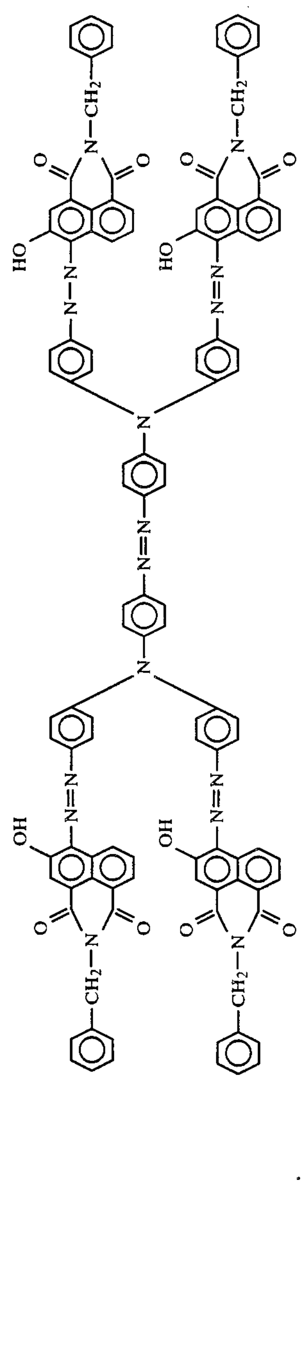
6-(24)
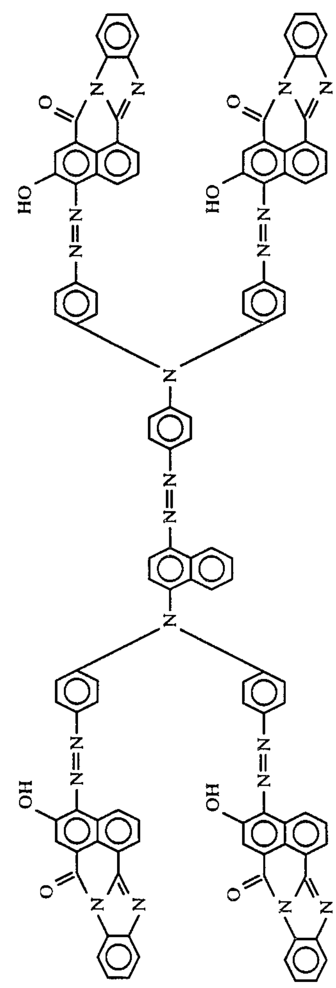

-continued
6-(25)
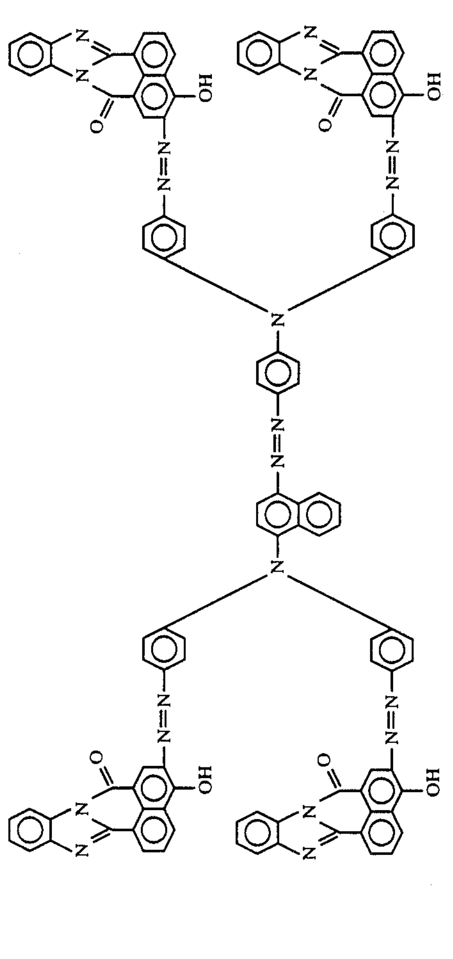
6-(26)
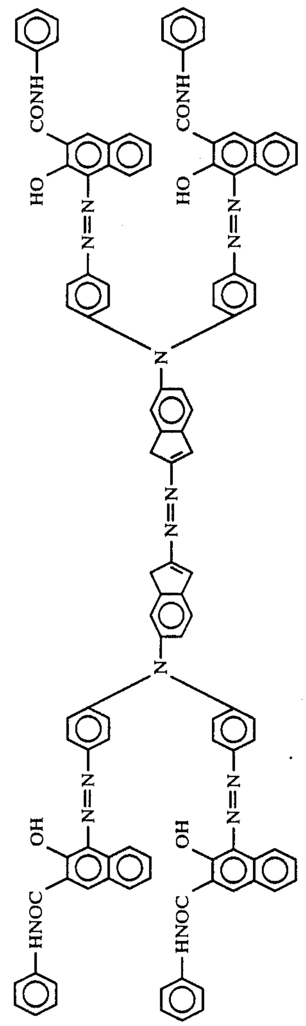
6-(27)
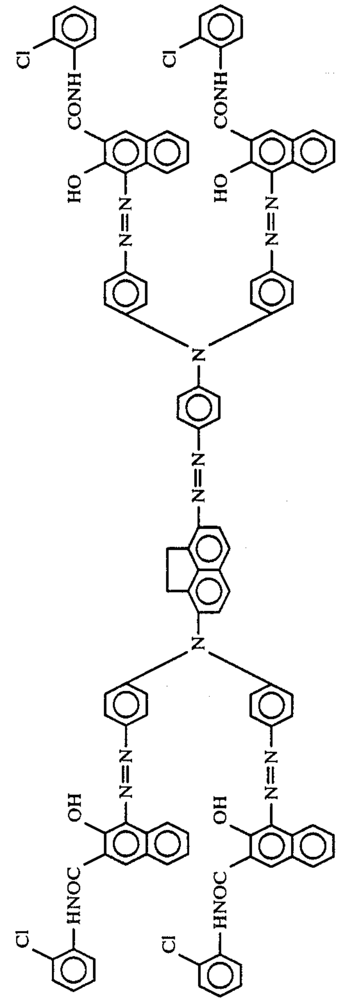

-continued
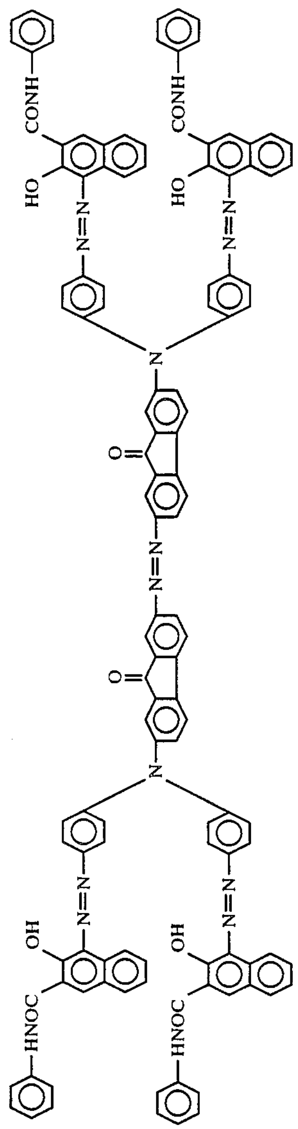
6-(28)
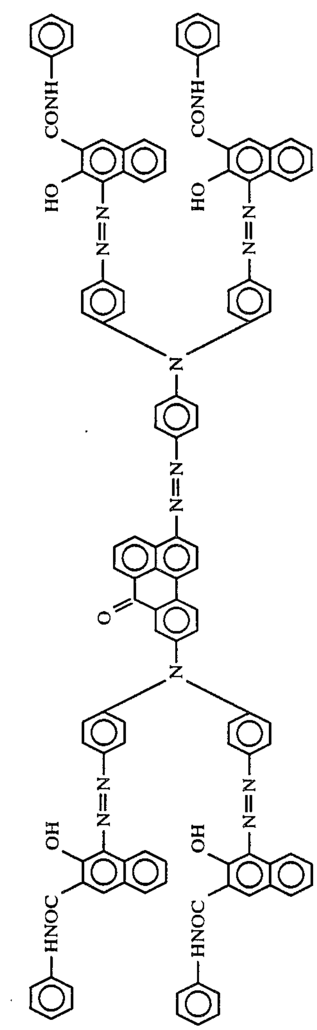
6-(29)
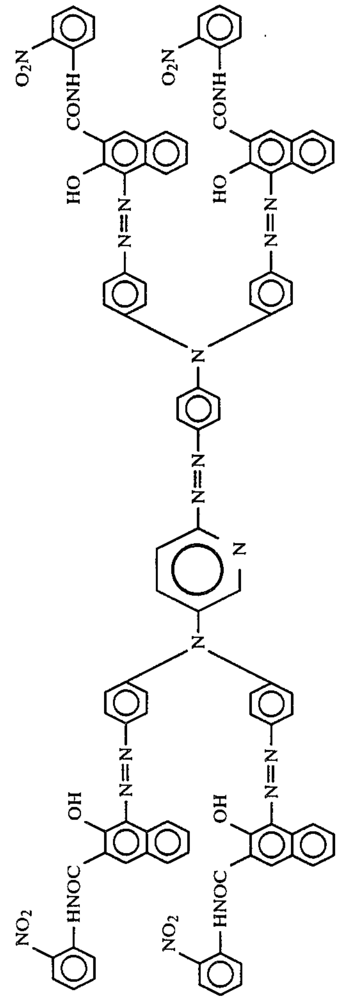
6-(30)

-continued
6-(31)
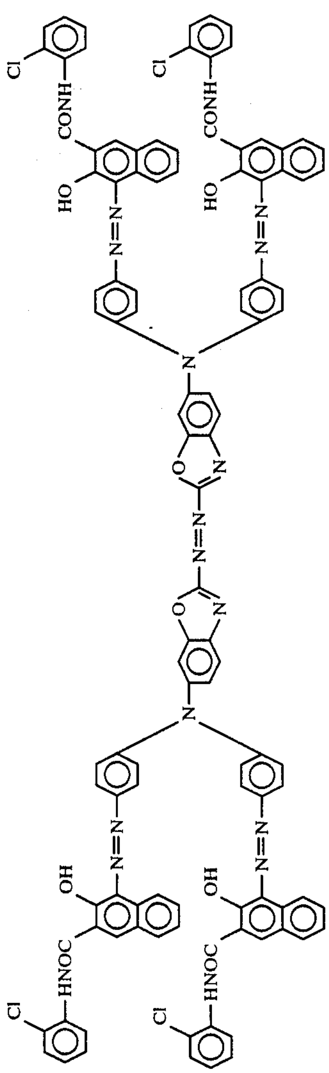
6-(32)
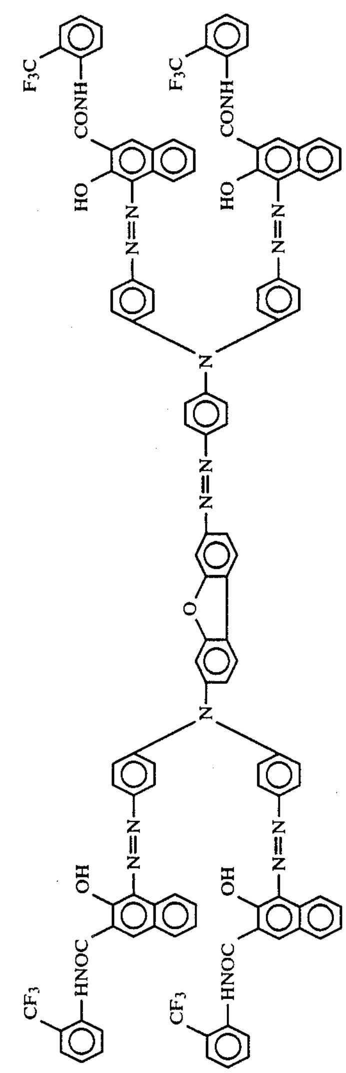
6-(33)
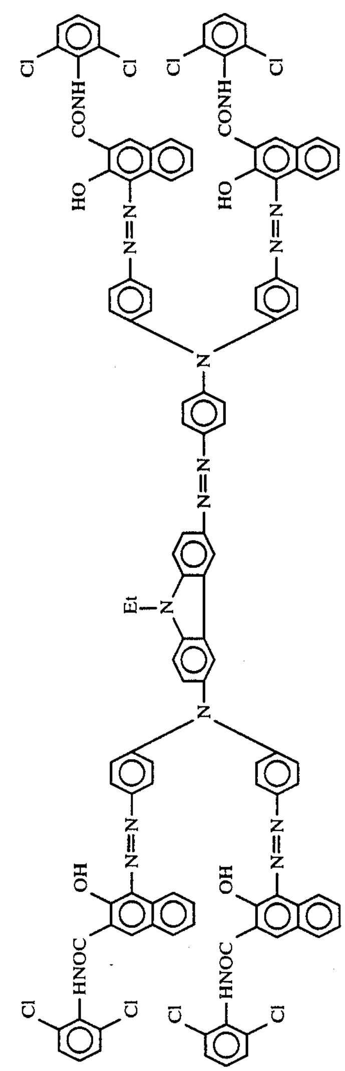

-continued
6-(34)
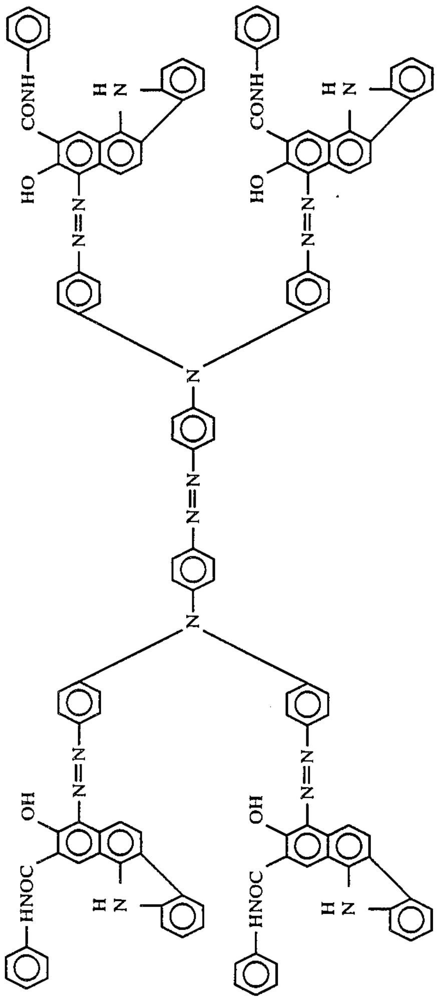
6-(35)
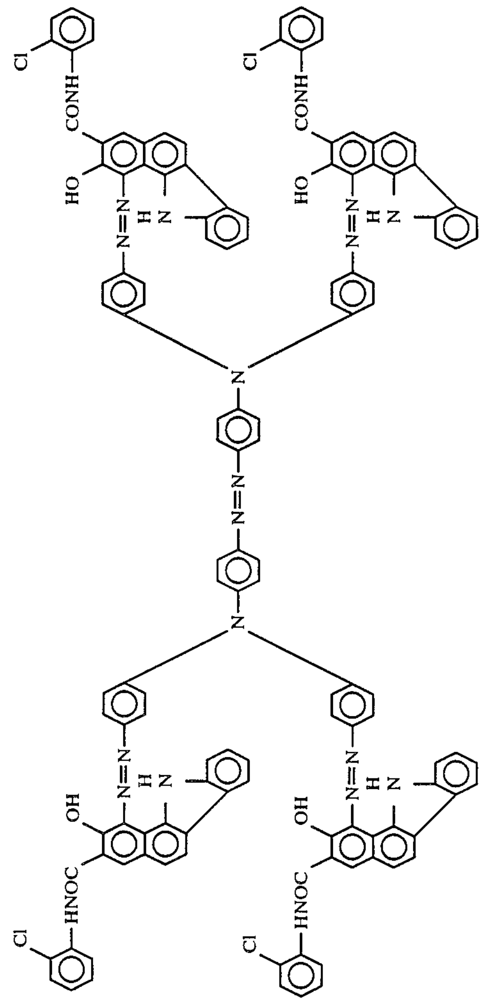

-continued
6-(36)
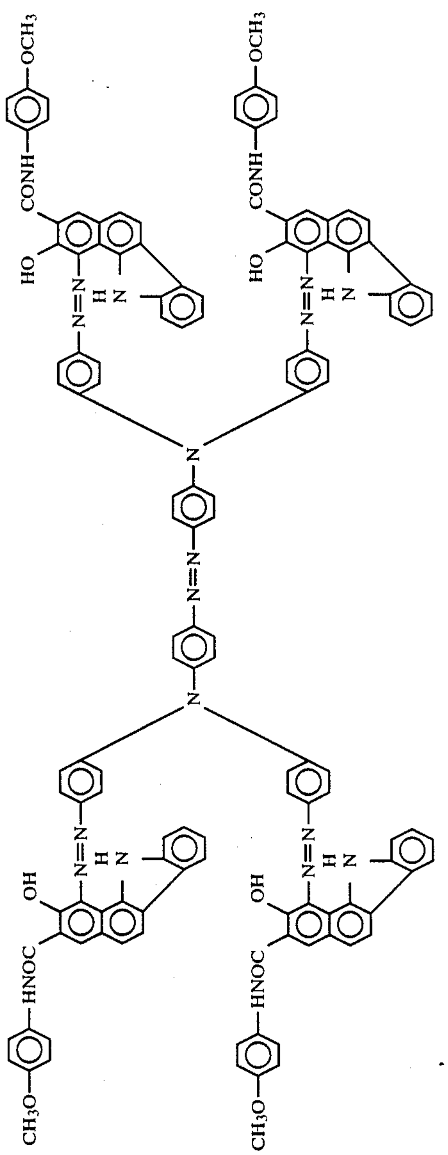
6-(37)
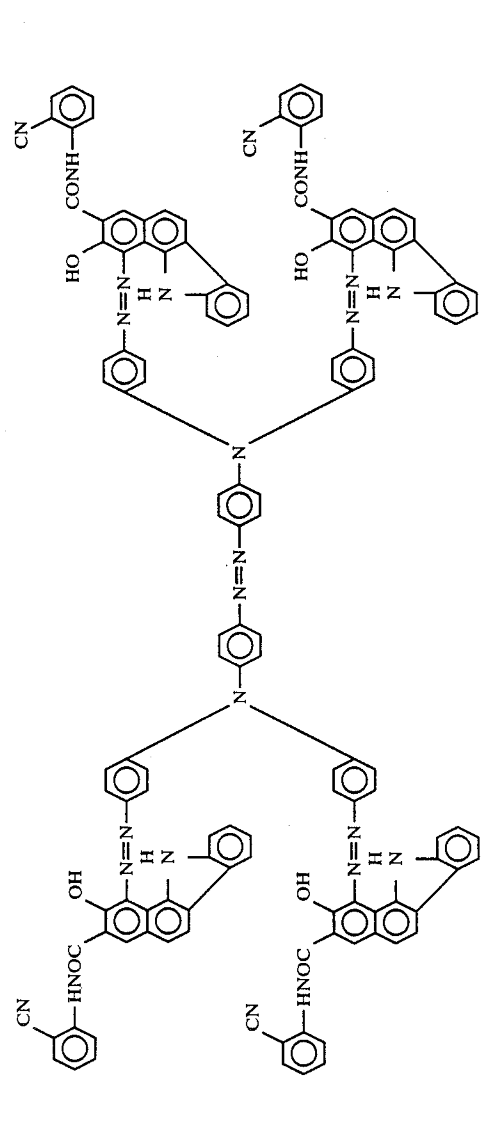

6-(38)
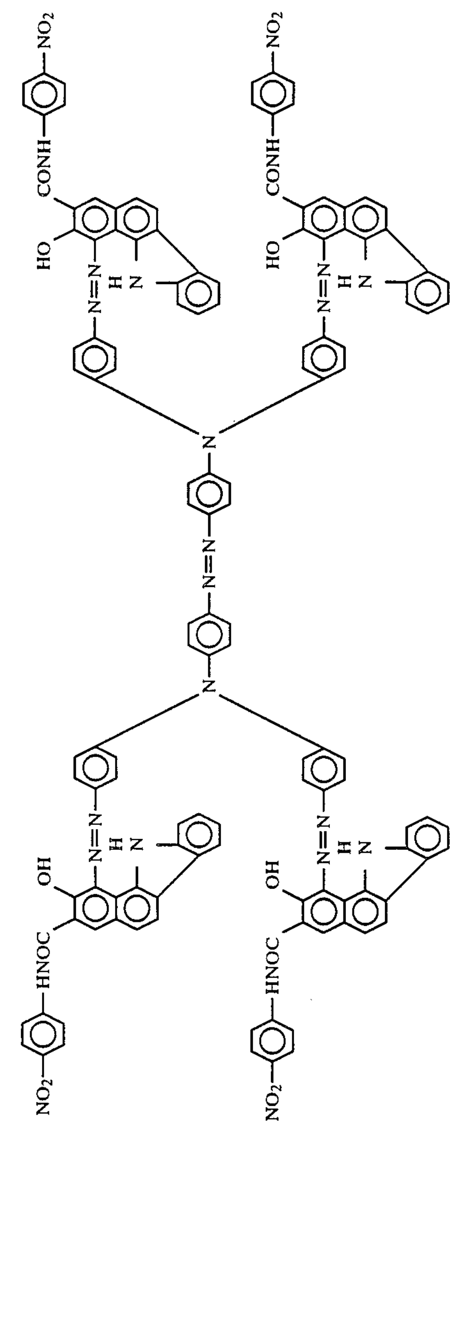
6-(39)
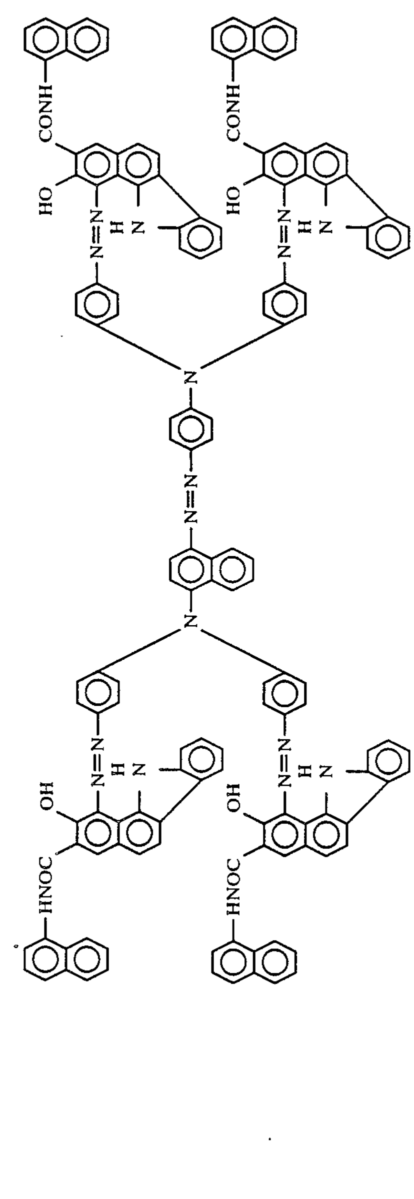

-continued
6-(40)
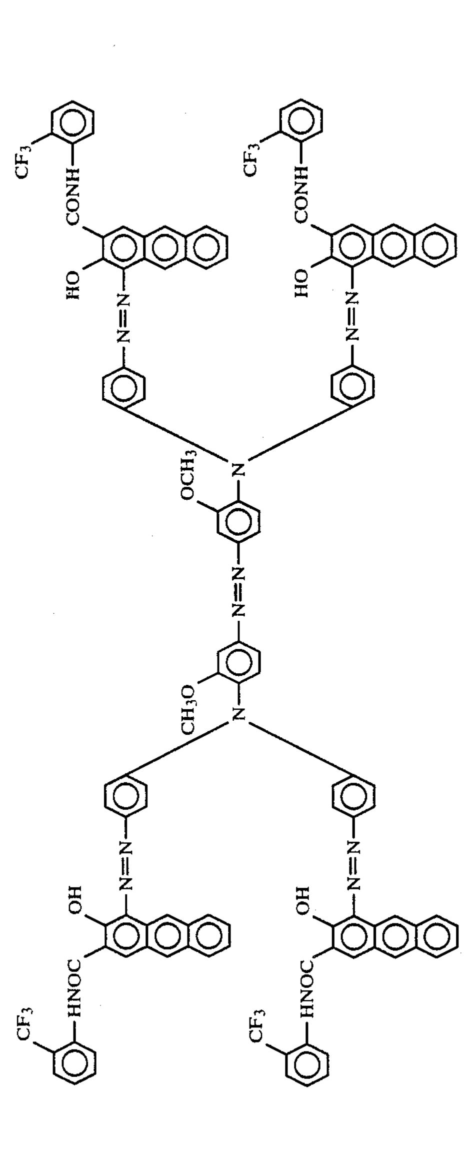
6-(41)
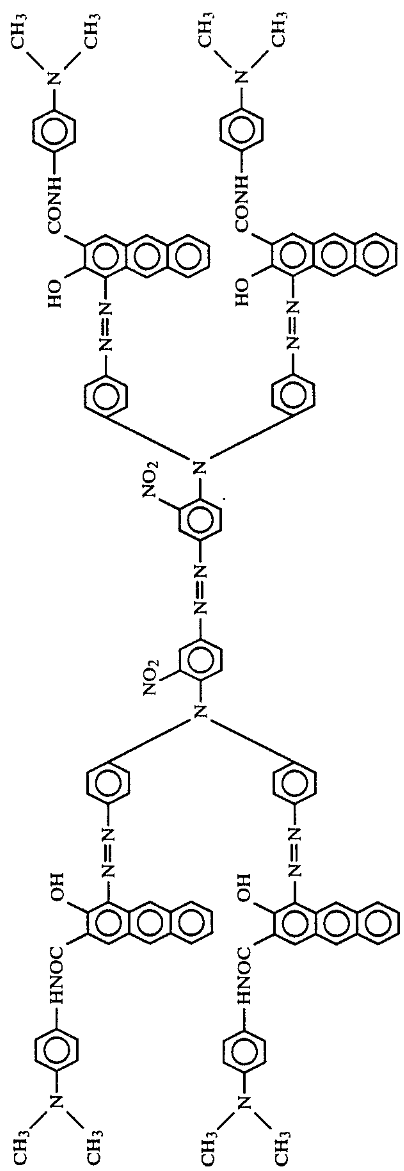

-continued
6-(42)
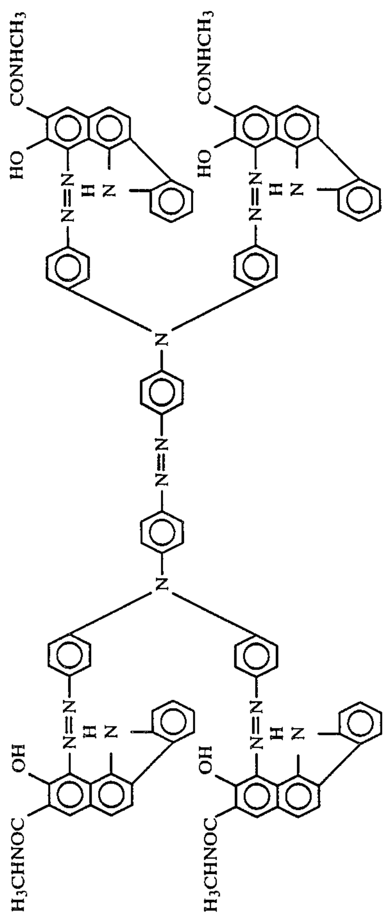
6-(43)
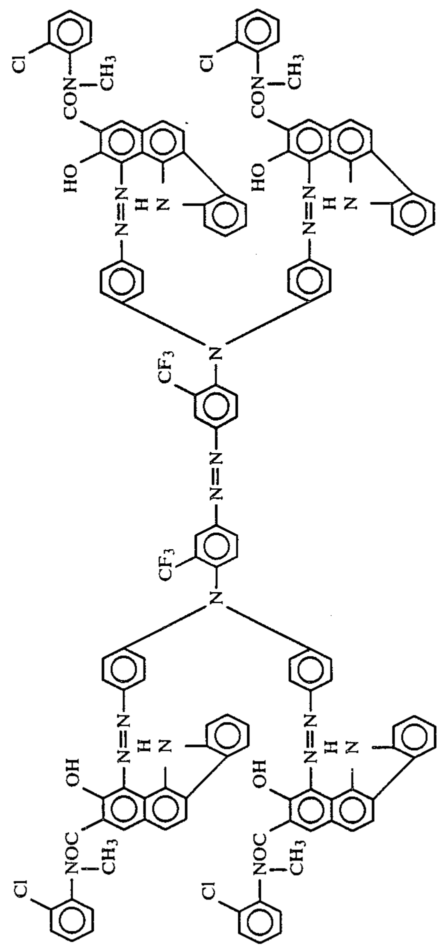

-continued
6-(44)
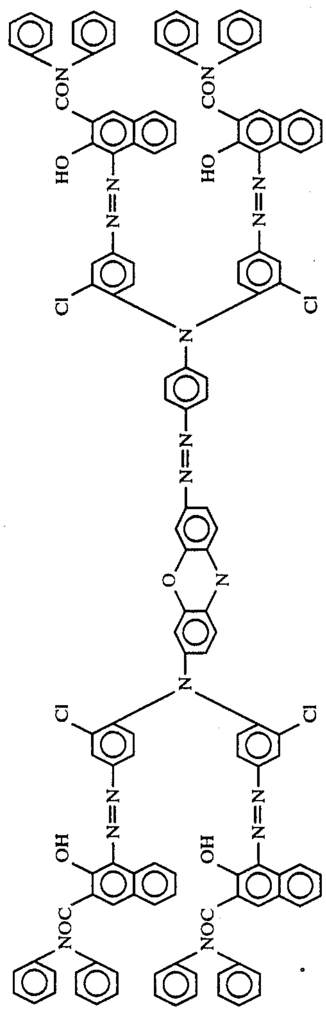
6-(45)
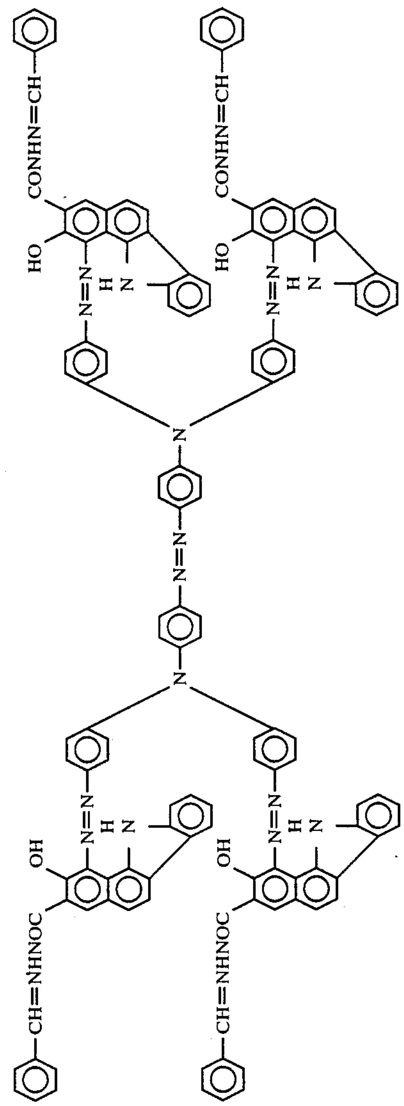

-continued
6-(46)
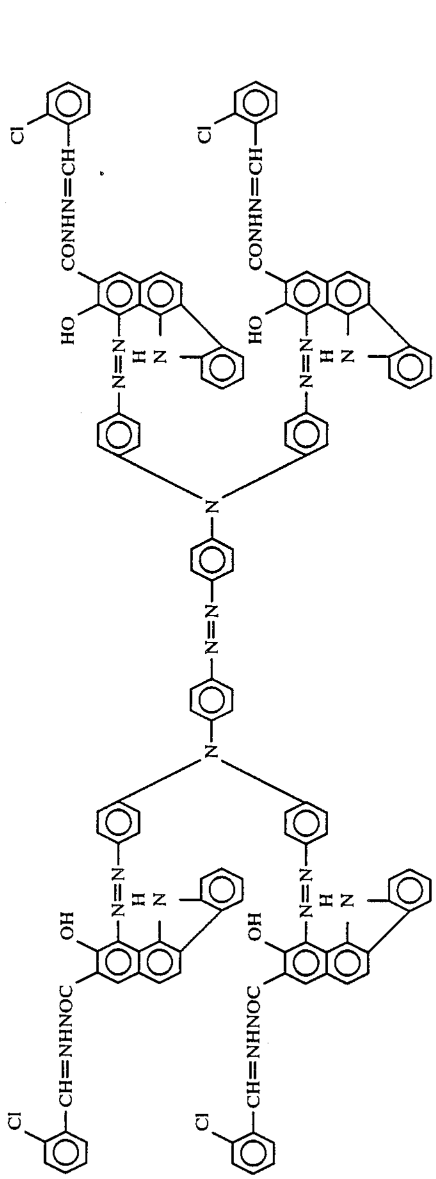
6-(47)
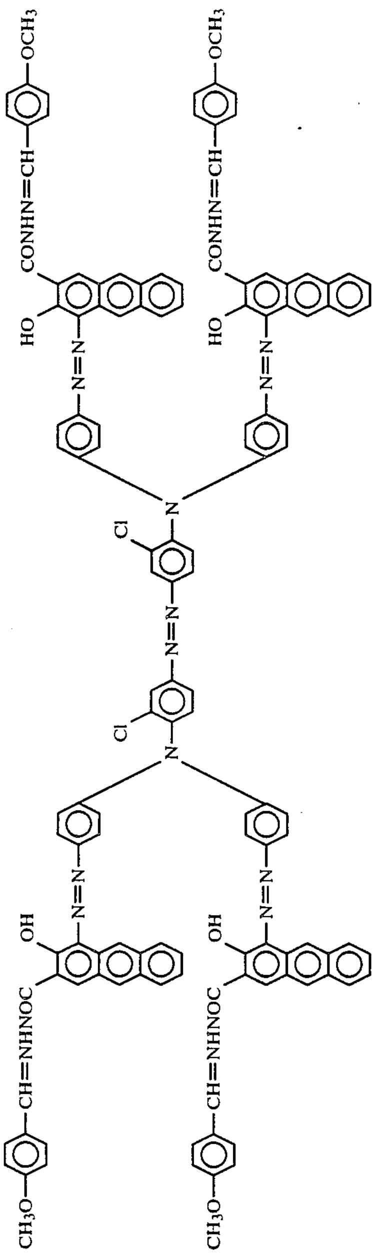

-continued
6-(48)
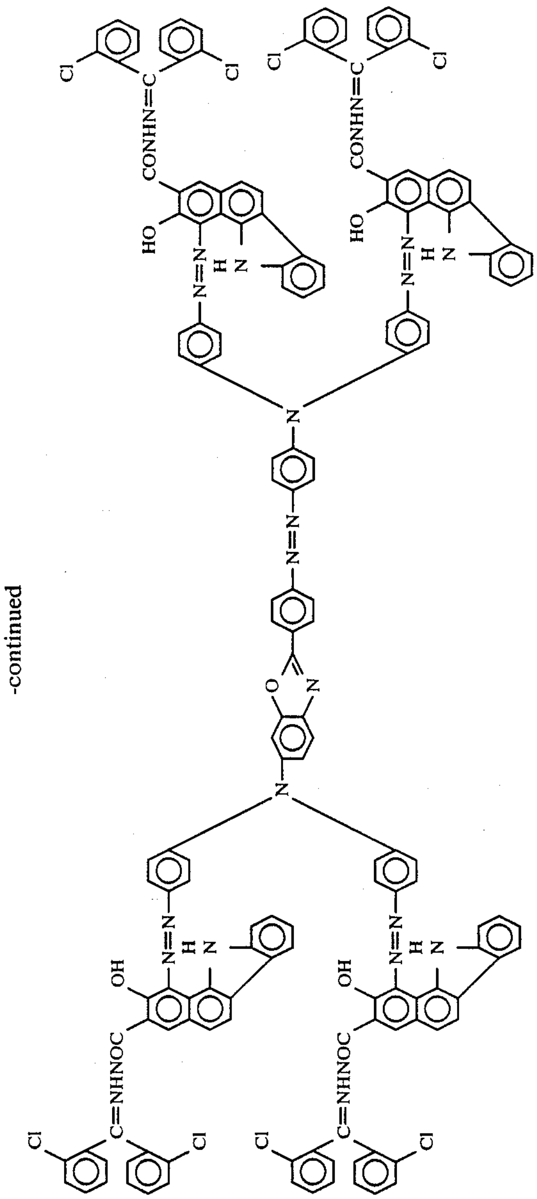
6-(49)
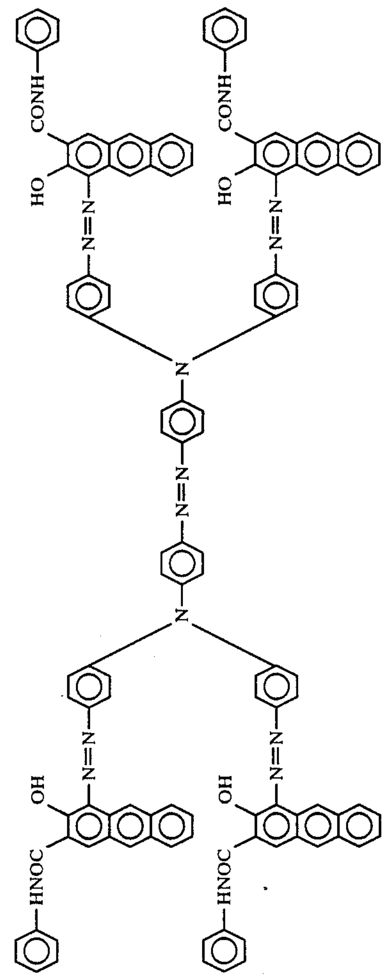

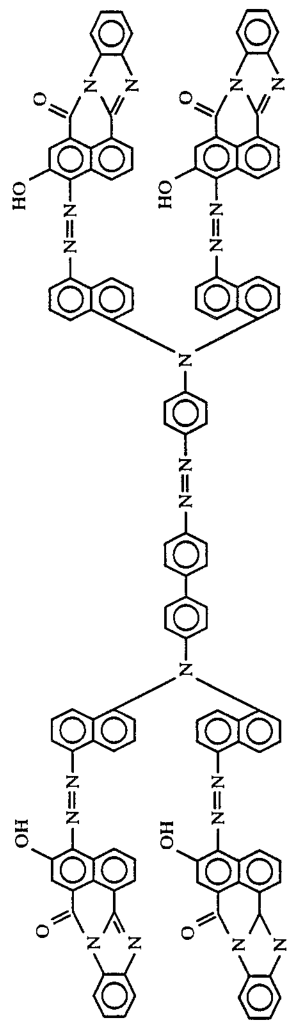
6-(50)
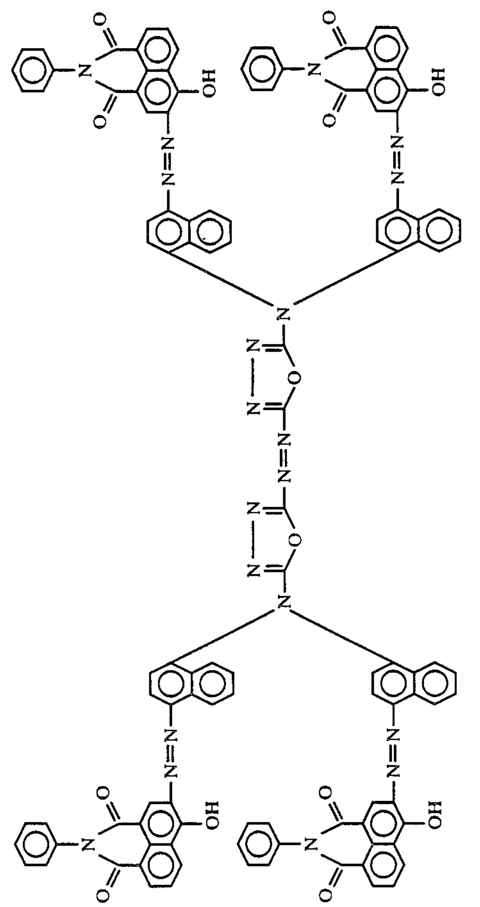
6-(51)

-continued
6-(52)
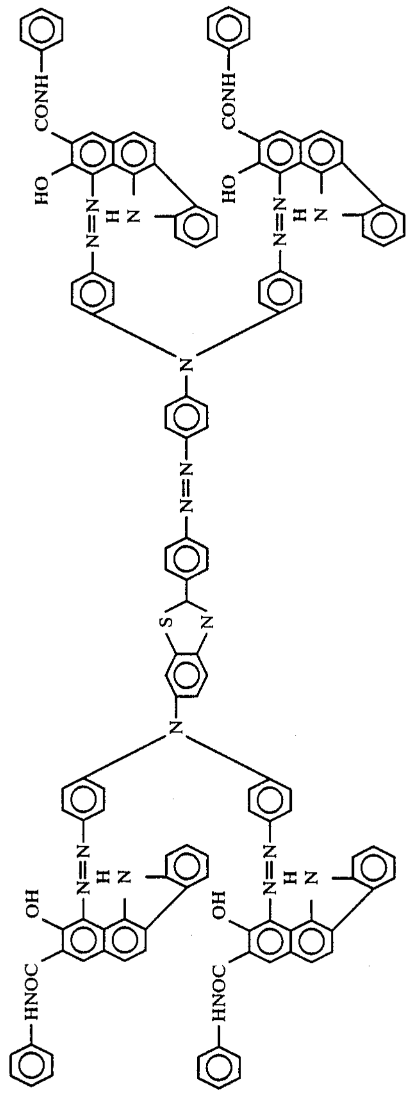
6-(53)
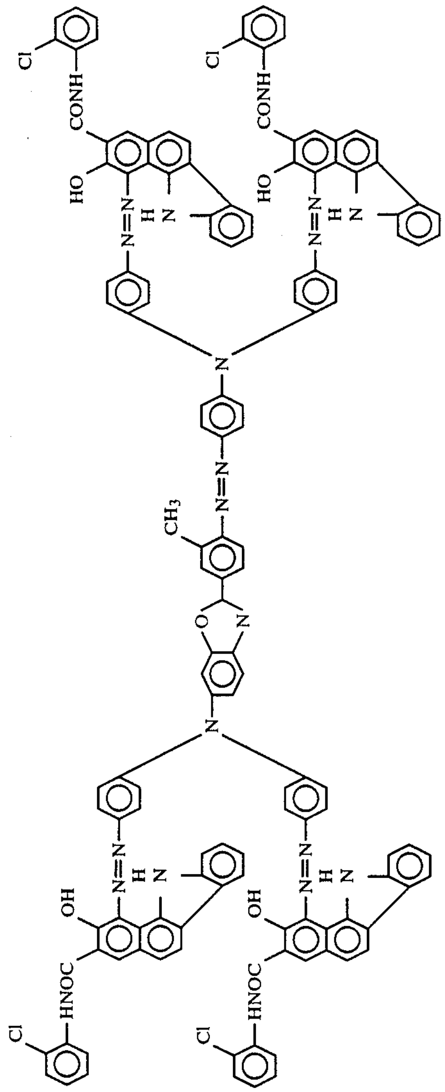

-continued
6-(54)
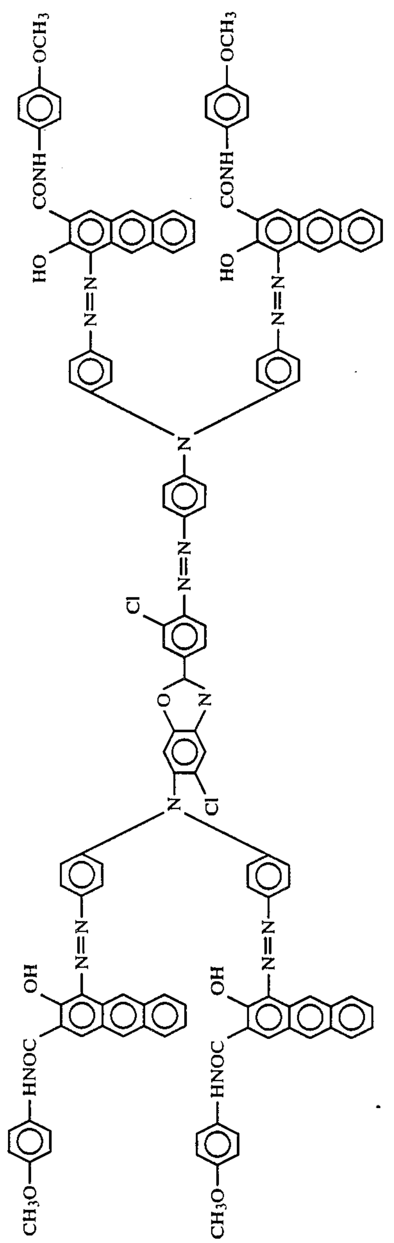
6-(55)
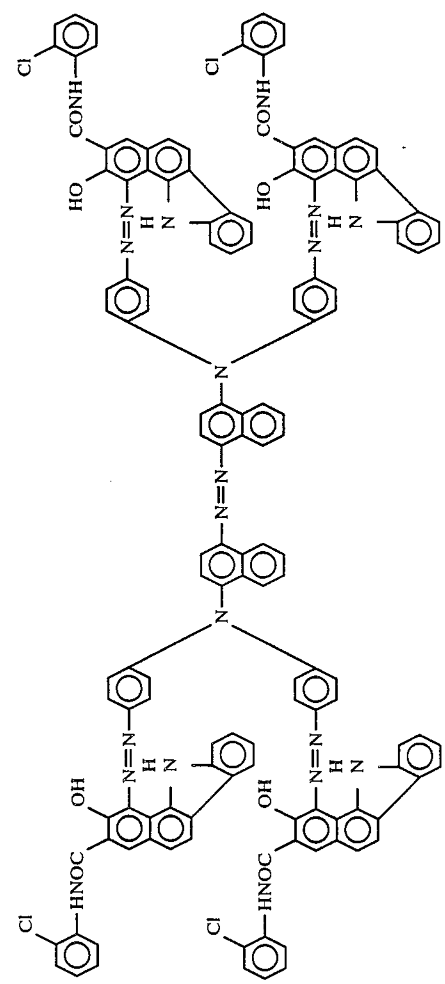

-continued
6-(56)
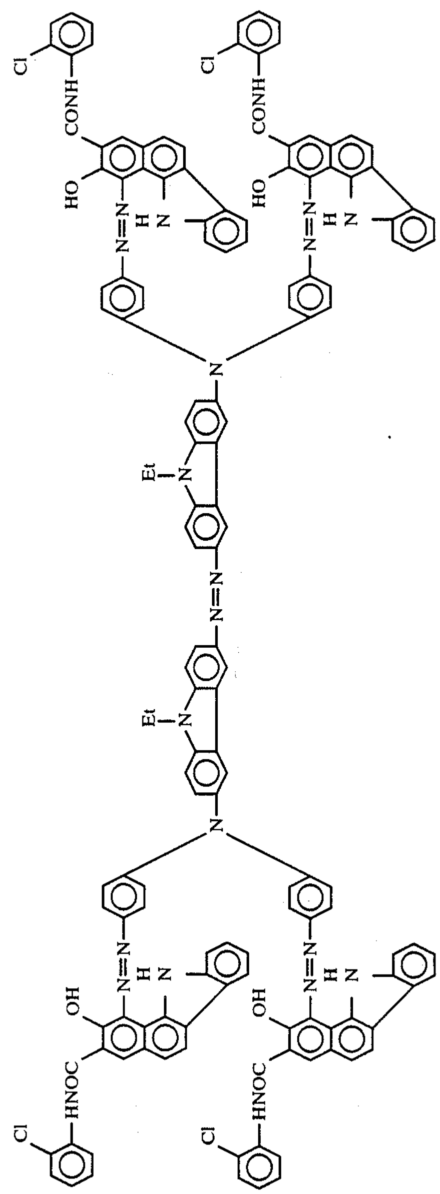
6-(57)
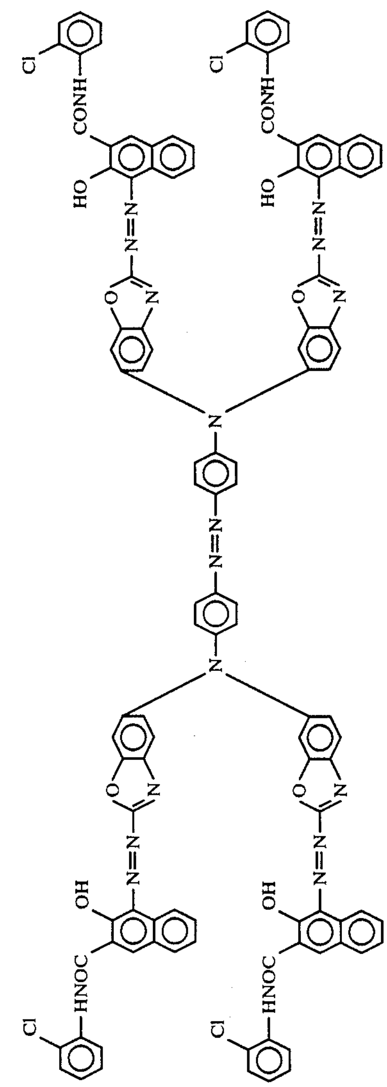

-continued
6-(58)
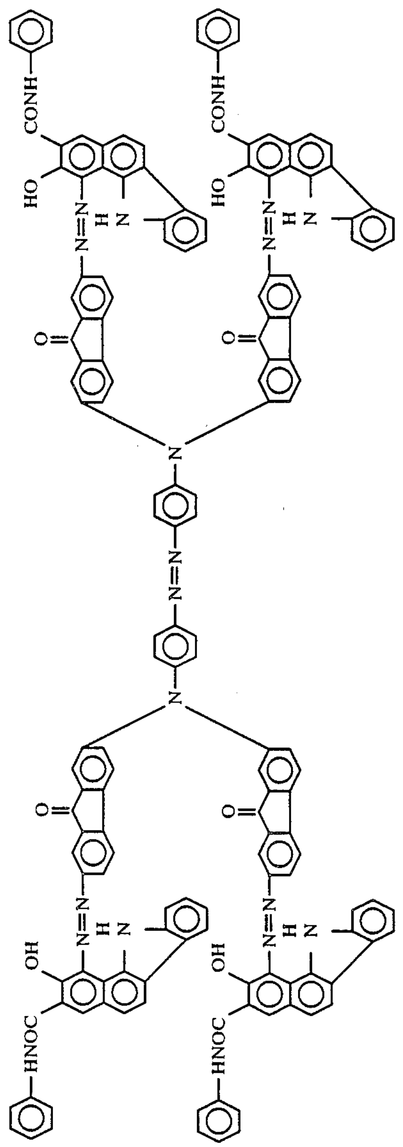
6-(59)
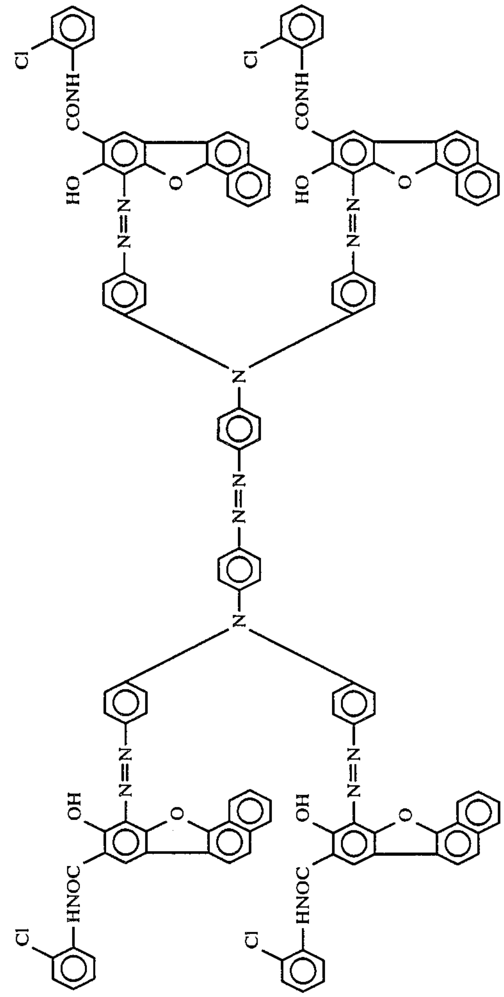

-continued
6-(60)
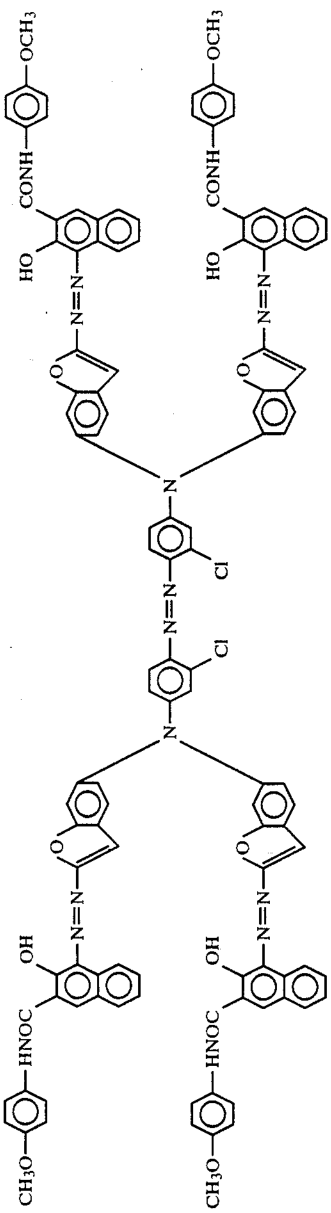
6-(61)
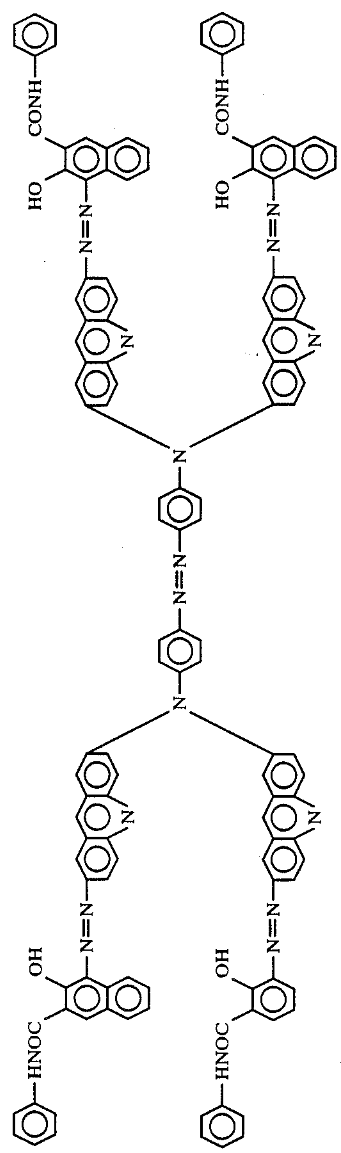

These tetrakisazo pigments can be used alone or in combination of two or more thereof.

These pigments can be readily prepared by diazozing amino groups of a compound represented, for example, by the following general formula:

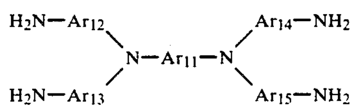

where $Ar_1$, $Ar_2$, $Ar_3$, $Ar_4$ and $Ar_5$ have the same meaning as defined before in case of the general formula (1), according to the conventional procedure, and then subjecting the resulting diazonium salt of the amino groups to aqueous coupling with a corresponding coupler in the presence of an alkali, or isolating the resulting diazonium salts of the amino groups in the form of a borofluoride or a zinc chloride complex salt, and then coupling it with a coupler in the presence of an alkali in an appropriate solvent such as N,N-dimethylformamide, dimethylsulfoxide, etc.

Typical synthesis examples of tetrakisazo pigments for use in the present invention will be given below:

SYNTHESIS EXAMPLE 1

(synthesis of said tetrakisazo pigment No. 1-1)

80 ml of water, 16.6 ml (0.190 mole) of concentrated hydrochloric acid and 6.80 g (0.014 mole) of compound having the following formula:

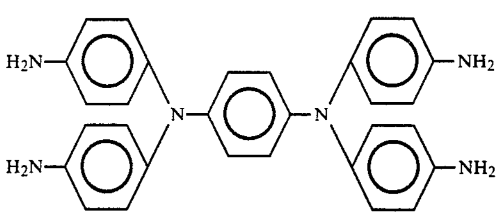

were charged into a 500-ml beaker, and cooled to a liquid temperature of 3° C. in an ice-water bath with stirring. Then, a solution of 4.0 g (0.058 mole) of sodium nitrite in 7 ml of water was dropwise added thereto over 10 minutes, while controlling the liquid temperature within a range of 3° C. to 10° C. After the dropwise addition, the mixture was further stirred at the same temperature as above for 30 minutes. Then, the reaction mixture was admixed with carbon, and filtered, whereby a diazonium solution was obtained.

Then, 700 ml of water is placed into a 2 liter beaker, and 21.0 g (0.53 mole) of sodium hydroxide was dissolved therein, and then 16.1 g (0.061 mole) of Naphthol AS (3-hydroxy-2-naphthoic anilide) was dissolved. The thus obtained coupler solution was cooled to 6° C. and added dropwise to said diazonium solution over 30 minutes while controlling the coupler solution to 6° to 10° C. Then, the mixture was stirred at room temperature for 2 hours, and left standing overnight. After the filtration of the reaction mixture, the residue was washed with water and filtered, whereby an aqueous paste containing 21.9 g of crude pigment in terms of solids was obtained. Then, the paste was four times subjected to stirring and filtration, using 400 ml of N,N-dimethylformamide at room temperature. Then, stirring and filtration were successively repeated twice with 400 ml of MEK, and then the resulting product was dried at room temperature in reduced pressure, whereby 19.0 g of purified pigment was obtained (yield: 86%).

Melting point: >250° C.

| | Elemental analysis: Calculated (%) | Found (%) |
|---|---|---|
| C | 74.98 | 74.96 |
| H | 4.38 | 4.40 |
| N | 12.49 | 12.46 |

In the foregoing, the process for synthesizing a typical pigment has been explained, and other pigments can be synthesizing in the same manner as above.

When the solubility of a coupler in an aqueous alkali solution is low, or when the coupling reaction is carried out with a readily hydrolyzable coupler such as a coupler represented by the foregoing general formula (12), it is desirable that the coupler is dissolved in a solvent such as DMF or DMAC, and the tetrazonium salt is subjected to reaction, using an organic base such as sodium acetate, pyridine, trimethylamine, triethylamine, etc., while paying attention to the hydrolysis of the coupler or reaction solvent.

SYNTHESIS EXAMPLE 2

(synthesis of tetrakisazo pigment No. 4-1)

80 ml of water and 33.2 ml (0.38 mole ) of concentrated hydrochloric acid were placed in a 500-ml beaker, and 16.35 g (0.029 mole) of an amine having the following structure (the amine was synthesized according to the process disclosed in French Pat. No. 1,398,240) was added thereto, while cooling the mixture in an ice-water bath.

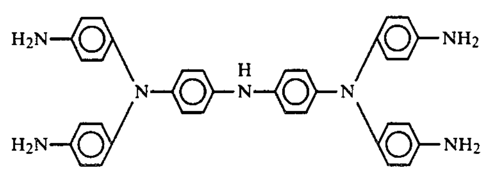

The mixture was stirred with cooling in an ice-water bath to make the liquid temperature 3° C. Then, a solution containing 8.2 g (0.122 mole) of sodium nitrite in 7 ml of water was dropwise added thereto over 10 minutes, while controlling the liquid temperature to a range of 3° to 10° C. After the dropwise addition, the mixture was further stirred at the same temperature as above for 30 minutes. Then, the reaction mixture was admixed with carbon, and filtered to obtain a tetrazonium solution.

Then, 700 ml of dimethylformamide was placed in a 2 liter beaker, and then 53.6 g (0.53 mole) of triethylamine was added thereto. Then, 32.12 g (0.122 mole) of 3-hydroxy-2-naphthoic anilide was added thereto and dissolved.

The thus prepared coupler solution was cooled to 6° C., and said tetrazonium solution was added dropwise thereto with stirring over 30 minutes, while controlling the liquid temperature to 6° to 10° C. Then, the mixture was stirred at room temperature for 2 hours, and left standing overnight. The reaction mixture was filtered, and the residue was washed with water and filtered, whereby an aqueous paste containing 41.72 g of crude pigment in terms of solids was obtained.

Then, the aqueous paste was four times subjected to stirring and filtration at room temperature, using 400 ml of N,N-dimethylformamide, then twice subjected to stirring and filtration, using 400 ml of methylethylketone, and dried at room temperature under reduced pressure, whereby 39.5 g of purified pigment was obtained (yield: 82%).

Melting point: >250° C.

| | Elemental analysis: | |
|---|---|---|
| | Calculated (%) | Found (%) |
| C | 75.21 | 75.30 |
| H | 4.43 | 4.49 |
| N | 12.65 | 12.61 |

SYNTHESIS EXAMPLE 3

(synthesis of said pentakisazo pigment No. 6-1)

80 ml of water and 33.2 ml (0.38 mole) of concentrated hydrochloric acid were placed in a 500-ml beaker, and 16.72 g (0.029 mole) of an amine having the following structural formula (the amine was synthesized according to the process disclosed in French Pat. No. 1,398,240) was added thereto while cooling the mixture in an ice-water bath:

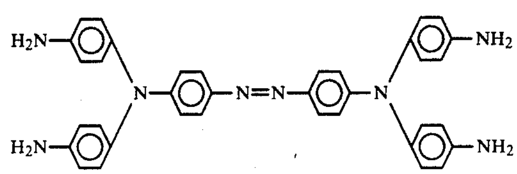

The mixture was cooled in the ice-water bath to a liquid temperature of 3° C. with stirring. Then, a solution containing 8.2 g (0.122 mole) of sodium nitrite in 7 ml of water was dropwise added thereto over 10 minutes while controlling the liquid temperature to a range of 3° to 10° C., and after the dropwise addition, the mixture was further stirred at the same temperature as above for 30 minutes. Then, the reaction mixture was admixed with carbon, and filtered to obtain an octazonium solution.

Then, 700 ml of dimethylformamide was placed in a 2 liter beaker, then 53.6 g (0.53 mole) of triethylamine was added thereto, and 32.12 g (0.122 mole) of 3-hydroxy-2-naphthoic anilide was added and dissolved.

The thus prepared coupler solution was cooled to 6° C., and said octazonium solution was dropwised added thereto over 30 minutes, while controlling the liquid temperature to 6° to 10° C., and then the mixture was stirred at room temperature for 2 hours and left standing overnight. The reaction mixture was filtered, washed with water, and filtered, whereby an aqueous paste containing 40.7 g of crude pigment in terms of solids was obtained.

Then, the aqueous paste was four times subjected to stirring and filtration at room temperature, using 400 ml of N,N-dimethylformamide and then twice subjected to stirring and filtration, using 400 ml of methylethylketone, and dried at room temperature in reduced pressure, whereby 38.83 g of purified pigment was obtained (yield: 80.0%)

Melting point: >250° C.

| | Elemental analysis: | |
|---|---|---|
| | Calculated (%) | Found (%) |
| C | 74.63 | 74.49 |
| H | 4.34 | 4.40 |
| N | 13.39 | 13.50 |

According to a preferable embodiment of the present invention, the azo pigments represented by said general formulae (1)-(6) can be used as a charge-generating substance in an electrophotographic photosensitive member whose photosensitive layer is functionally separated into a charge generation layer and a charge transport layer. The charge generation layer must contain as much said azo pigment as possible to obtain a sufficient absorbancy and also must be a thin film layer having a film thickness of 5 μm or less, preferably 0.01 to 1 μm or prevent the generated charge carriers from trapping in the charge generation layer. This is due to the fact that most of incident light quantity is absorbed in the charge generation layer to generate many charge carriers and further due to the necessity to inject the generated charge carriers into the charge transport layer without any deactivation by recombination or trapping.

The charge generation layer can be formed by dispersing said azo pigment into an appropriate binder, and coating a substrate with the dispersion or by forming a vapor-deposited film by means of a vacuum vapor-deposition apparatus. The binder for use in forming a charge generation layer by coating can be selected from a wide range of insulating resins and also from organic photoconductive polymers such as poly-N-vinylcarbazole, polyvinylanthracene, polyvinylpyrene, etc. Preferable insulating resins include polyvinylbutyral, polyarylate, (polycondensate of bisphenol A and phthalic acid, etc.), polycarbonate (bisphenol A, Z type, etc.), polyester, phenoxy resin, polyvinyl acetate, acrylic resin, polyacryl amide resin, polyamide, polyvinylpyridine, cellulose-based resin, urethane resin, epoxy resin, casein, polyvinylalcohol, polyvinylpyrrolidone, etc. It is preferable to contain 80% or less by weight, preferably 40% or less by weight, of the resin in the charge generation layer.

The solvent for dissolving the resin depends upon the species of the resin and is preferable selected from those incapable of dissolving the following charge transport layer or undercoat layer. Specifically, the solvent is organic solvents including alcohols such as methanol, ethanol, isopropanol, etc.; ketones such as acetone, methylethylketone, cyclohexanone, etc.; amides such as N,N-dimethylformamide, N,N-dimethylacetamide, etc.; sulfoxides such as dimethylsulfoxide, etc.; ethers such as tetrahydrofuran, dioxane, ethyleneglycol monomethylether, etc.; esters such as methyl acetate, ethyl acetate, butyl acetate, etc.; aliphatic halogenated hydrocarbons such as chloroform, methylene chloride, dichloroethylene, carbon tetrachloride, trichloroethylene, etc.; and aromatic hydrocarbons such as benzene, toluene, xylene, ligroin, monochlorobenzene, dichlorobenzene, etc.

Coating can be carried out by dip coating, spray coating, spinner coating, bead coating, Meyer bar coating, blade coating, roller coating, curtain coating, etc. Drying is carried out preferably by drying to the touch at room temperature and then by drying by heating. Drying by heating can be carried out at a temperature of 30° to 300° C. for 5 minutes to 2 hours at a standstill or with airing.

The charge transport layer is electrically connected to said charge generation layer, and has a function to receive charge carriers injected from the charge generation layer with an application of an electric field and transport the charge carriers to the surface, where the charge transport layer may be laminated on the charge generation layer, that is, either at the top surface or the bottom surface of the charge generation layer.

When a charge transport layer is formed on the top of the charge generation layer, a material capable of transporting charge carriers in the charge transport layer, which will be hereinafter referred to merely as a charge transporting material, is preferably substantially nonsensitive to the wavelength range of electromagnetic wave to which said charge generation layer is sensitive, because of prevention of the charge transport layer from a filter effect and the resulting decrease in the sensitivity. The electromagnetic wave herein referred to means "light beam" defined in a broad sense, including $\gamma$-rays, X-rays, ultraviolet rays, visible light beams, near-infrared rays, infrared rays, far-infrared rays, etc.

The charge transporting material includes an electron-transportable material and a hole transportable material. The electron transportable material includes electron-attracting substances such as chloroanil, bromoanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,8-trinitrothioxanthone, etc. or polymerized products of these electron-attracting substances.

The hole-transportable material includes pyrene, N-ethylcarbazole, N-isopropylcarbazole, N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine, hydrazones such as p-diethylaminobenzaldehyde,N,N-diphenylhydrazone, p-diethylaminobenzaldehyde-N-$\alpha$-naphthyl-N-phenylhydrazone, p-pyrrolidinobenzaldehyde-N,N-diphenylhydrazone, 1,3,3-trimethylindolenine-$\omega$-aldehyde-N,N-diphenylhydrazone, p-diethylbenzaldehyde-3-methylbenzthiazolinonehydrazone, etc., pyrazolines, such as 2,5-bis(p-diethylaminophenyl)-1,3,4-oxadiazole, 1-phenyl-3-(p-diethylaminostyryl)-5-(p-diethylaminophenyl)pyrazoline, 1-[quinolyl(2)]-3-(p-diethylaminostyryl)-5-(p-diethylaminophenyl)pyrazoline, 1-[pyridyl(2)]-3-(p-diethylaminostyryl)- 5-(p-diethylaminophenyl) pyrazoline, 1-[6-methoxypyridyl(2)]-3-(p-diethylaminostyryl)-5-(p-diethylaminophenyl)pyrazoline, 1-[pyridyl(3)]-3-(p-diethylaminostyryl)-5-(p-diethylaminophenyl)-pyrazoline, 1-[pyridyl(2)]-3-(p-diethylaminostyryl)-5-(p-diethylaminophenyl) pyrazoline, 1-[pyridyl(2)]-3-(p-diethylaminostyryl)-4-methyl-5-(p-diethylaminophenyl)pyrazoline, 1-[pyridyl(2)]-3-($\alpha$-methyl-p-diethylaminostyryl)-5-(p-diethylaminophenyl)pyrazoline, 1-phenyl-3-(p-diethylaminostyryl)-4-methyl-5-(p-diethylaminophenyl) pyrazoline, 1-phenyl-3-($\alpha$-benzyl-p-diethylaminostyryl)-5-(p-diethylaminophenyl)pyrazoline, spiropyrazoline, etc., oxazole-based compounds such as 2-(p-diethylaminostyryl)-6-diethylaminobenzoxazole, 2-(p-diethylaminophenyl)-4-(p-dimethylaminophenyl)-5-(2-chlorophenyl)oxazole, etc., thiazole-based compounds such as 2-(p-diethylaminostryl)-6-diethylaminobenzothiazole, etc., triarylmethane-based compounds such as bis(4-diethylamino-2-methylphenyl)-phenylmethane, etc., polyarylalkanes such as 1,1-bis(4-N,N-diethylamino-2-methylphenyl)heptane, 1,1,2,2-tetrakis-(4-N,N-dimethylamino-2-methylphenyl)ethane, etc., triphenylamine, stilbene derivatives, polycyclic aromatic compounds having a styryl group, heterocyclic compounds, poly-N-vinylcarbazole, polyvinylpyrene, polyvinylanthracene, polyvinylacridine, poly-9-vinylphenylanthracene, pyrene-formaldehyde resin, ethylcarbazole-formaldehyde resin, etc.

Besides these organic charge transportable materials, such inorganic materials as selenium, selenium-tellurium amorphous silicon, cadmium sulfide, etc. can be also used.

These charge transportable materials can be used alone or in a combination of two or more thereof.

When the charge transportable material is incapable of forming a film, a film can be formed by selecting an appropriate binder. The resin applicable as a binder includes, for example, insulating resins such as acrylic resin, polyarylate, polyester, polycarbonate (bisphenol A, Z type, etc.), polystyrene, acrylonitrile-styrene copolymer, acrylonitrile-butadiene copolymer, polyvinylbutyral, polyvinylformal, polysulfone, polyacrylamide, polyamide, chlorinated rubber, etc., and organic photoconductive polymers such as poly-N-vinylcarbazole, polyvinylanthracene, polyvinylpyrene, etc.

The charge transport layer has a limit to the transport of charge carriers, and thus cannot have a larger thickness than required, and usually 5 to 30 $\mu$m, preferably 8 to 20 $\mu$m. The charge transport layer can be formed by coating according to said appropriate coating procedure.

The photosensitive layer in a laminate structure composed of the charge generation layer and the charge transport layer is provided on a substrate having an electroconductive layer. The substrate having an electroconductive layer includes electroconductive substrates themselves, for example, aluminum, aluminum alloy, copper, zinc, stainless steel, vanadium, molybdenum, chronium, titanium, nickel, indium, gold, platinum, etc.; plastics having a layer formed by vacuum vapor deposition of aluminum, aluminum alloy, indium oxide, tin oxide, indium oxide-tin oxide alloy, etc. (e.g., polyethylene, polypropylene, polyvinyl chloride, polyethylene terephthalate, acrylic resin, polyfluoroethylene, etc.); plastics coated with electroconductive particles (e.g., carbon black, silver particles, etc.) together with an appropriate binder; plastic or paper substrates impregnated with electroconductive particles; plastics having an electroconductive polymer, etc.

An undercoat layer having a barrier function and a bonding function can be provided between the electroconductive layer and the photosensitive layer. The undercoat layer can be formed from casein, polyvinyl alcohol, nitrocellulose, ethyleneacrylate copolymer, polyamide (Nylon 6, Nylon 66, Nylon 610, copolymerized Nylon, alkoxymethylated Nylon, etc.), polyurethane, gelatin, aluminum oxide, etc. The appropriate thickness of the undercoat layer is 0.1 to 5 $\mu$m, preferably 0.5 to 3 $\mu$m.

When a photosensitive member comprising an electroconductive layer, a charge generation layer and a charge transport layer, laminated in this order, is used, and when the charge transportable material is composed of an electron transportable material, it is necessary to charge the surface of the charge transport layer into a positive polarity, and, when exposed to light after the charging, the electrons formed in the charge generation layer are injected into the charge transport layer at the exposed parts to reach the surface and neutralize the positive charges. Thus, decaying of the surface potential takes place to form an electrostatic contrast between the exposed parts and the unexposed parts. When the thus formed electrostatic latent image is developed by negatively chargeable toners, a visible image can be obtained, and directly fixed, or the toner image can be transferred onto paper or a plastic film, then developed and fixed, or the electrostatic latent image on the photosensitive member can be transferred onto an insulating layer, then developed and fixed. The kind of developing agents and procedures for development and fixation are not particularly limited, but well known developing agents and well known procedures can be utilized.

When the charge transportable material is composed of a hole transportable material on the other hand, it ia necessary to charge the surface of a charge transport layer into a negative polarity, and when exposed to light of the charging, the holes formed in the charge generation layer are injected into the charge transport layer at the exposed parts to reach the surface and neutralized the negative charge. Decaying of the surface potential takes place and an electrostatic contrast is formed between the exposed parts and the unexposed parts. It is necessary to use positively chargeable toners, in contrast to the electron transportable material, at the development.

According to another embodiment of the present invention, an electrophotographic photosensitive member containing said tetrakis-azo pigment and the charge transportable material in the same layer can be given, where a charge-transfer complex compound composed of poly-N-vinylcarbazole and trinitrofluorenone and can be used besides said charge transportable material.

The electrophotographic photosensitive member according to said embodiment can be prepared by dispersing a solution of said tetrakis-azo pigment and the charge-transfer complex compound in tetrahydrofuran into a polyester solution, and forming a film with the thus obtained coating dispersion.

The pigment for use in any of the photosensitive members is at least one pigment selected from the tetrakis-azo pigments given by the general formula (1), and the crystal form of the pigment may be amorphous or crystalline. It is also possible to use pigments of different light absorptions in combination, when required, to enhance the sensitivity of a photosensitive member, or to use at least two of the tetrakis-azo pigments given by the general formula (1) in combination to obtain a panchromatic photosensitive member, or to use it in combination with a charge generating material selected from the well known dyes and pigments.

The present electrophotographic photosensitive member is applicable not only to an electrophotographic copying machine, but also to electrophotographic applications such as a laser printer, a CRT printer, an LED printer, a liquid crystal printer, laser printing plate preparation, etc.

The present invention will be described below, referring to Examples.

EXAMPLES 1-1 to 1-40

An aluminum plate was coated with an aqueous ammoniacal solution of casein (consisting of 11.2 g of casein, 1 g of 28% aqua ammonia, and 222 ml of water) by a Meyer bar to a film thickness of 1.0 μm after drying, and dried.

Then, 5 g of said tetrakis-azo pigment No. 1-1 was added to a solution containing 2 g of butyral resin (degree of butyralization: 63% by mole) in 95 ml of ethanol, and dispersed for 2 hours in a sand mill. The previously formed casein layer was coated with the dispersion to a film thickness of 0.5 μm after drying by a Meyer bar, and dried to form a charge generation layer.

Then, 5 g of a hydrazone compound having the following structural formula:

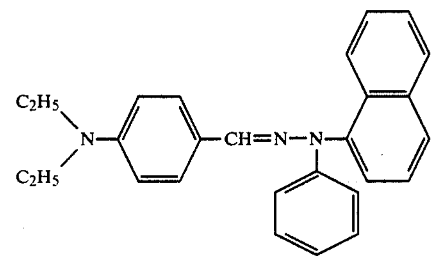

and 5 g of polymethyl methacrylate resin (number average molecular weight: 100,000) was dissolved in 70 ml of benzene, and the charge generation layer were coated with the solution to a film thickness of 12 μm after drying by a Meyer bar, and dried to form a charge transport layer. In this manner, a photosensitive member was prepared.

Likewise, photosensitive members of Examples 1-2 to 1-40 were prepared, using the tetrakis-azo pigments shown in Table 1 in place of the tetrakis-azo pigment No. 1-1.

The thus prepared electrophotographic photosensitive members were corona charged at −5 kV according to a static system with a testing apparatus for electrostatic copying paper, Model SP-428, made by Kawaguchi Denki K.K. retained in the dark for one second, and exposed to light with a light intensity of 2 luxes to determine the charging characteristics.

As the charging characteristics, a surface potential (Vo) and an amount of light exposure E1/2 (lux.sec) necessary for decaying the potential to ½ when dark decayed for one second. The results are shown in Table 7.

TABLE 7

| Example | Present tetrakis-azo pigment No. | $V_0$ (−V) | $E\frac{1}{2}$ (lux · sec) |
|---|---|---|---|
| 1-1 | 1-1 | 560 | 3.0 |
| 1-2 | 1-2 | 600 | 3.2 |
| 1-3 | 1-3 | 580 | 2.9 |
| 1-4 | 1-4 | 610 | 3.6 |
| 1-5 | 1-5 | 580 | 3.8 |
| 1-6 | 1-6 | 600 | 2.9 |
| 1-7 | 1-7 | 600 | 4.0 |
| 1-8 | 1-8 | 610 | 3.8 |
| 1-9 | 1-9 | 570 | 3.4 |
| 1-10 | 1-10 | 590 | 3.2 |
| 1-11 | 1-11 | 600 | 3.6 |
| 1-12 | 1-12 | 620 | 3.8 |
| 1-13 | 1-13 | 590 | 3.6 |
| 1-14 | 1-14 | 600 | 4.0 |
| 1-15 | 1-15 | 600 | 2.6 |
| 1-16 | 1-16 | 620 | 3.8 |
| 1-17 | 1-17 | 570 | 3.6 |
| 1-18 | 1-18 | 600 | 2.8 |
| 1-19 | 1-19 | 590 | 3.2 |
| 1-20 | 1-20 | 610 | 2.9 |
| 2-21 | 1-21 | 600 | 3.0 |

TABLE 7-continued

| Example | Present tetrakis-azo pigment No. | $V_0$ (−V) | $E\frac{1}{2}$ (lux · sec) |
|---|---|---|---|
| 1-22 | 1-22 | 580 | 4.0 |
| 1-23 | 1-23 | 570 | 3.8 |
| 1-24 | 1-24 | 600 | 3.0 |
| 1-25 | 1-25 | 610 | 4.0 |
| 1-26 | 1-26 | 610 | 3.8 |
| 1-27 | 1-27 | 570 | 4.2 |
| 1-28 | 1-28 | 580 | 4.4 |
| 1-29 | 1-29 | 600 | 3.2 |
| 1-30 | 1-30 | 600 | 3.4 |
| 1-31 | 1-31 | 600 | 2.6 |
| 1-32 | 1-32 | 610 | 2.8 |
| 1-33 | 1-33 | 580 | 3.2 |
| 1-34 | 1-34 | 620 | 3.4 |
| 1-35 | 1-35 | 600 | 3.6 |
| 1-36 | 1-36 | 570 | 2.9 |
| 1-37 | 1-37 | 600 | 3.6 |
| 1-38 | 1-38 | 610 | 3.6 |
| 1-39 | 1-39 | 600 | 3.8 |
| 1-40 | 1-40 | 590 | 4.0 |

EXAMPLES 1-41 to 1-45

Fluctuations in the potential between the light part and the dark part of the photosensitive members of Examples 1-1, 1-3, 1-4, 1-24, and 1-36 when used repeatedly were measured in the following manner.

The photosensitive member was pasted on the cylinder of an electrophotographic copying machine comprising a corona charger at −5.6 V, a light exposure optical system, a developer, a transfer charger, a discharging light exposure optical system and a cleaner, where an image could be obtained on a transfer sheet as the cylinder was driven. The initial light part potential ($V_L$) and the initial dark part potential ($V_D$) were set to about −100 V and about −600 V, respectively, in the copying machine, and after 5,000 copyings, the light part potential ($V_L$) and the dark part potential ($V_D$) were measured. The results are shown in Table 8.

TABLE 8

| Example | Photosensitive member No. Example | Initial $V_D$(−V) | Initial $V_L$(−V) | After 5,000 copyings $V_D$(−V) | After 5,000 copyings $V_L$(−V) |
|---|---|---|---|---|---|
| 1-41 | 1-1 | 600 | 100 | 620 | 120 |
| 1-42 | 1-3 | 590 | 100 | 630 | 120 |
| 1-43 | 1-4 | 590 | 110 | 630 | 130 |
| 1-44 | 1-24 | 600 | 90 | 610 | 110 |
| 1-45 | 1-36 | 610 | 90 | 620 | 120 |

The present photosensitive members had a very good stability for both $V_D$ and $V_L$, even when repeatedly used.

EXAMPLE 1-46

A coating solution prepared by dissolving 5 g of 2,4,7-trinitro-9-fluorenone and 5 g of poly-4,4'-dioxydiphenyl-2,2'-propane carbonate (molecular weight: 300,000) in 70 ml of tetrahydrofuran was applied to the charge generation layer prepared in Example 1-1 to 10 g/m$^2$ after drying, and dried. The thus obtained electrophotographic photosensitive member was subjected to determination of charging characteristics in the same manner as in Example 1-1.

The charging polarity was positive ⊕. The results are given in Table 9.

TABLE 9

| | |
|---|---|
| Vo: | ⊕560 volts |
| $E\frac{1}{2}$: | 6.2 lux · sec |

EXAMPLE 1-47

A polyvinyl alcohol film having a thickness of 0.5 μm was formed on the aluminum surface of an aluminum-vapor deposited polyethylene terephthalate film. Then, the same dispersion of the tetrakis-azo pigment as used in Example 1-1 was applied to the previously formed polyvinyl alcohol layer by coating to a thickness of 0.5 μm after drying by means of a Meyer bar, and dried to form a charge generation layer.

Then, a solution 5 g of pyrazoline compound having the following structural formula:

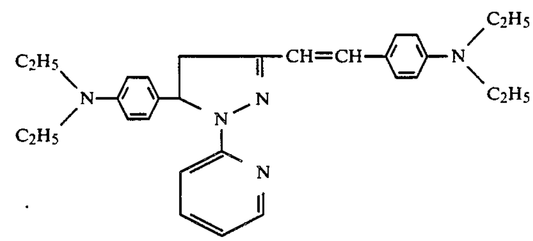

and 5 g of polyarylate resin (polycondensate of bisphenol A and terephthalic acid-isophthalic acid) in 70 ml of tetrahydrofuran was applied to the charge generation layer by coating to a thickness of 10 μm after drying, and dried to form a charge transport layer.

The charging characteristics and the durability of the thus prepared photosensitive member were determined in the same manner as in Examples 1-1 and 1-41. The results are shown in Table 10.

TABLE 10

| Vo: ⊖600 V $E\frac{1}{2}$: 4.9 lux · sec | | | |
|---|---|---|---|
| Durability: Initial | | After 5,000 copyings | |
| $V_D$ | $V_L$ | $V_D$ | $V_L$ |
| −600 V | −100 V | −610 V | −120 V |

As is obvious form Table 10, the present photosensitive member had a good sensitivity and a good potential stability when used repeatedly.

EXAMPLE 1-48

An aqueous ammoniacal solution of casein was applied to an aluminum sheet having a thickness of 100 μm and dried to form an undercoat layer having a thickness of 0.5 μm.

Then, 5 g of 2,4,7-trinitro-9-fluorenone and 5 g of poly-N-vinylcarbazole (number average molecular weight: 300,000) were dissolved in 70 ml of tetrahydrofuran to form a charge-transfer complex compound. The thus prepared charge-transfer complex compound and 1 g of said tetrakisazo pigment No. 1-19 were dispersed into a solution containing 5 g of polyester resin (Vylon, made by Toyobo K.K.) in 70 ml of tetrahydrofuran. The dispersion was applied to the undercoat layer by coating to a thickness of 12 μm after drying, and dried.

The charging characteristics of the thus prepared photosensitive member were determined in the same manner as in Example 1-1. The results are shown in Table 11. The charging polarity was ⊕.

TABLE 11

| | |
|---|---|
| Vo: | ⊕580 V |
| $E\frac{1}{2}$ | 5.6 lux · sec |

EXAMPLE 1-49

The same charge transport layer and charge generation layer as in Example 1-1 were successively laminated on the casein layer of the same aluminum substrate having the casein layer as in Example 1-1 in the same manner as in Example 1-1 except for the order of lamination to prepare a photosensitive member. The charging characteristics of the thus prepared photosensitive member were determined in the same manner as in Example 1-1. The charging polarity was ⊕. The charging characteristics are shown in Table 12.

TABLE 12

| | |
|---|---|
| Vo: | ⊕580 V |
| $E\frac{1}{2}$ | 5.0 lux · sec |

Examples 2-1 to 2-60

Photosensitive member of Example 2-1 to 2-60 were prepared in the same manner as in Example 1-1, except that the tetrakisazo pigment No. 2-1 to 2-60 shown in Table 2 were used in place of the tetrakisazo pigment No. 1-1.

The charging characteristics and light exposure (E1/2) of the thus prepared electrophotographic photosensitive members were determined in the same manner as in Example 1-1. The results are shown in Table 13.

TABLE 13

| Example | Present tetrakis-azo pigment No. | $V_0$ (−V) | $E\frac{1}{2}$ (lux · sec) |
|---|---|---|---|
| 2-1 | 2-1 | 600 | 4.1 |
| 2-2 | 2-2 | 605 | 3.1 |
| 2-3 | 2-3 | 595 | 3.5 |
| 2-4 | 2-4 | 585 | 4.3 |
| 2-5 | 2-5 | 595 | 3.0 |
| 2-6 | 2-6 | 605 | 4.0 |
| 2-7 | 2-7 | 575 | 2.8 |
| 2-8 | 2-8 | 600 | 3.5 |
| 2-9 | 2-9 | 610 | 3.0 |
| 2-10 | 2-10 | 600 | 3.3 |
| 2-11 | 2-11 | 605 | 2.5 |
| 2-12 | 2-12 | 600 | 4.4 |
| 2-13 | 2-13 | 610 | 3.9 |
| 2-14 | 2-14 | 595 | 3.3 |
| 2-15 | 2-15 | 610 | 2.8 |
| 2-16 | 2-16 | 610 | 3.5 |
| 2-17 | 2-17 | 600 | 2.3 |
| 2-18 | 2-18 | 595 | 3.3 |
| 2-19 | 2-19 | 610 | 3.9 |
| 2-20 | 2-20 | 605 | 3.9 |
| 2-21 | 2-21 | 615 | 4.5 |
| 2-22 | 2-22 | 605 | 3.0 |
| 2-23 | 2-23 | 605 | 2.9 |
| 2-24 | 2-24 | 610 | 3.2 |
| 2-25 | 2-25 | 605 | 3.5 |
| 2-26 | 2-26 | 610 | 2.5 |
| 2-27 | 2-27 | 605 | 3.3 |
| 2-28 | 2-28 | 615 | 4.0 |
| 2-29 | 2-29 | 605 | 2.5 |
| 2-30 | 2-30 | 615 | 4.0 |
| 2-31 | 2-31 | 600 | 3.6 |
| 2-32 | 2-32 | 605 | 2.6 |
| 2-33 | 2-33 | 595 | 3.0 |
| 2-34 | 2-34 | 595 | 3.8 |
| 2-35 | 2-35 | 600 | 2.5 |

TABLE 13-continued

| Example | Present tetrakis-azo pigment No. | $V_0$ (−V) | $E\frac{1}{2}$ (lux · sec) |
|---|---|---|---|
| 2-36 | 2-36 | 605 | 3.5 |
| 2-37 | 2-37 | 605 | 2.4 |
| 2-38 | 2-38 | 590 | 3.3 |
| 2-39 | 2-39 | 595 | 3.3 |
| 2-40 | 2-40 | 595 | 2.9 |
| 2-41 | 2-41 | 585 | 2.7 |
| 2-42 | 2-42 | 605 | 3.0 |
| 2-43 | 2-43 | 575 | 2.8 |
| 2-44 | 2-44 | 600 | 2.4 |
| 2-45 | 2-45 | 610 | 2.8 |
| 2-46 | 2-46 | 600 | 3.2 |
| 2-47 | 2-47 | 610 | 3.3 |
| 2-48 | 2-48 | 615 | 2.9 |
| 2-49 | 2-49 | 610 | 3.4 |
| 2-50 | 2-50 | 610 | 3.0 |
| 2-51 | 2-51 | 605 | 2.5 |
| 2-52 | 2-52 | 610 | 2.6 |
| 2-53 | 2-53 | 615 | 2.6 |
| 2-54 | 2-54 | 600 | 2.9 |
| 2-55 | 2-55 | 585 | 3.2 |
| 2-56 | 2-56 | 575 | 3.6 |
| 2-57 | 2-57 | 590 | 3.5 |
| 2-58 | 2-58 | 605 | 3.9 |
| 2-59 | 2-59 | 600 | 2.9 |
| 2-60 | 2-60 | 620 | 4.0 |

EXAMPLES 2-61 to 2-64

Light part potential ($V_L$) and dark part potential ($V_D$) of photosensitive members of Examples 2-1, 2-7, 2-37 and 2-44 were determined in the same manner as in Example 1-41. The results are shown in Table 14.

TABLE 14

| Example | Photosensitive member No. Example | Initial $V_D$ (−V) | Initial $V_L$ (−V) | After 5,000 copyings $V_D$ (−V) | After 5,000 copyings $V_L$ (−V) |
|---|---|---|---|---|---|
| 2-61 | 2-1 | 600 | 100 | 620 | 120 |
| 2-62 | 2-7 | 590 | 100 | 630 | 120 |
| 2-63 | 2-37 | 600 | 105 | 625 | 130 |
| 2-64 | 2-44 | 600 | 90 | 610 | 115 |

As is obvious from the data of Examples 2-1 to 2-64, the present photosensitive members had a considerably good electrophotographic sensitivity, and had a very good stability for $V_D$ and $V_L$ even after repeatedly used.

EXAMPLE 2-65

A coating solution prepared by dissolving 5 g of 2,4,7-trinitro-9-fluorenone and 5 g of poly-4,4′-dioxydiphenyl-2,2′-propane carbonate (molecular weight: 300,000) in 70 ml of tetrahydrofuran was applied to the charge generation layer prepared in Example 2-1 to 10 $g/m^2$ after drying, and dried. The thus obtained electrophotographic photosensitive member was subjected to determination of charging characteristics in the same manner as in Example 2-1. The charging polarity was ⊕. The results are as follows.

Vo: ⊕570 volts

E1/2: 5.0 lux.sec

EXAMPLE 2-66

A photosensitive member was prepared in the same manner as in Example 1-47, using a dispersion of azo pigment used in Example 2-1 in place of the dispersion of the azo pigment of Example 1-1.

The charging characteristics and the durability of the photosensitive member thus prepared were determined in the same manner as in Examples 2-1 and 2-61. The results are shown in Table 15.

TABLE 15

| | | |
|---|---|---|
| Charging characteristics: | Vo: | −600 V |
| | E½: | 4.2 lux · sec |
| Durability: Initial: | $V_D$: | −600 V |
| | $V_L$: | −100 V |
| After 5,000 copyings: | $V_D$: | −625 V |
| | $V_L$: | −125 V |

As is obvious from the results of Table 15, the present photosensitive member had a good sensitivity and a good potential stability when used for a long time.

EXAMPLE 2-67

A photosensitive member was prepared in the same manner as in Example 1-48, using the azo pigment No. 2-61 in place of No. 1-19.

The charging characteristics and the durability of the photosensitive member thus prepared were determined in the same manner as in Example 2-1. The charging polarity was ⊕. The results are as follows:

Vo ⊕575 V

E½ : 5.0 lux.sec

EXAMPLE 2-68

An aqueous ammoniacal solution of casein (consisting of 11.2 g of casein, 1 g of 28% ammonia and 22.2 ml of water) was applied onto an aluminum cylinder by dip coating, and dried to form an undercoat layer at a weight of 1.0 g/m². Then, one part by weight of said tetrakisazo pigment No. 2-44, one part by weight of butyral resin (Eslek BM-2, made by Sekisui Kagaku Kogyo K.K., Japan), and 30 parts by weight of isopropyl alcohol were dispersed in a ball mill dispersing machine for 4 hours. The resulting dispersion was applied to the formerly formed undercoat layer by dip coating and dried to form a charge generation layer having a thickness of 0.3 μm.

Then, one part by weight of the hydrazone compound used in Example 2-1, one part by weight of polysulfone resin (P1700 trademark of a product made by Union Carbide, USA), and 6 parts by weight of monochlorobenzene were mixed, stirred with a stirrer, and dissolved. The resulting solution was applied to the charge generation layer by dip coating, and dried to form a charge transport layer having a thickness of 12 μm.

The thus prepared member was subjected to corona discharge at −5 kV, and the surface potential was measured at that time (initial potential $V_0$). Then, the photosensitive member was left standing in a dark place for 5 seconds, and then the surface potential was measured (dark decay: Vk). The sensitivity was evaluated by measuring the necessary amount of light exposure for decaying the potential Vk to ½ when dark decayed (E ½ microjoule/cm/²), where a ternary semiconductor laser of gallium/aluminum/arsenic C power: 5 mW, oscillating wavelength: 778 nm) was used as a light source. The results are as follows:

$V_0$: −520 volts

Vk: 93%

E½: 2.0 microjoules/cm²

The foregoing photosensitive member was set in a laser beam printer (LBP-CX, trademark of a product made by Canon, Japan), an electrophotographic printer of reversal development type provided with said semiconductor laser in place of the photosensitive member of LBP-CX, and subjected to an actual image formation test under the following conditions:

surface potential after primary charging: −700 V

Surface potential after image exposure: −150 V (amount of light exposure: 3 μJ/cm²)

Transfer potential: +700 V

Polarity of developing agent: negative polarity

Process speed: 50 mm/sec

Development condition (development bias): −450 V

Image light exposure scanning system: image scanning

Light exposure before primary charge: Red whole surface light exposure at 50 lux.sec Image formation was carried out by line scanning of laser beam according to letter signals and image signals, and good prints could be obtained for to the letters and images.

EXAMPLES 3-1 to 3-60

Photosensitive members 3-1 to 3-60 were prepared in the same manner as in Example 1-1, using azo pigments Nos. 3-1 to 3-60 in place of the azo pigment No. 1-1, and the charging characteristics and the light exposure (E½) were likewise determined. The results are shown in Table 16.

TABLE 16

| Example | Present tetrakisazo pigment No. | Vo (−V) | E½ (l · s) |
|---|---|---|---|
| 3-1 | 3-1 | 580 | 4.3 |
| 3-2 | 3-2 | 585 | 3.3 |
| 3-3 | 3-3 | 575 | 3.7 |
| 3-4 | 3-4 | 565 | 4.5 |
| 3-5 | 3-5 | 575 | 3.2 |
| 3-6 | 3-6 | 585 | 4.2 |
| 3-7 | 3-7 | 570 | 3.0 |
| 3-8 | 3-8 | 590 | 3.5 |
| 3-9 | 3-9 | 585 | 3.2 |
| 3-10 | 3-10 | 580 | 4.3 |
| 3-11 | 3-11 | 590 | 2.9 |
| 3-12 | 3-12 | 565 | 4.4 |
| 3-13 | 3-13 | 590 | 4.1 |
| 3-14 | 3-14 | 575 | 3.5 |
| 3-15 | 3-15 | 590 | 3.0 |
| 3-16 | 3-16 | 590 | 3.7 |
| 3-17 | 3-17 | 595 | 3.0 |
| 3-18 | 3-18 | 580 | 3.0 |
| 3-19 | 3-19 | 570 | 3.8 |
| 3-20 | 3-20 | 585 | 4.1 |
| 3-21 | 3-21 | 595 | 4.7 |
| 3-22 | 3-22 | 585 | 3.2 |
| 3-23 | 3-23 | 600 | 3.1 |
| 3-24 | 3-24 | 590 | 3.4 |
| 3-25 | 3-25 | 585 | 3.7 |
| 3-26 | 3-26 | 590 | 2.9 |
| 3-27 | 3-27 | 585 | 3.5 |
| 3-28 | 3-28 | 595 | 4.2 |
| 3-29 | 3-29 | 590 | 2.7 |
| 3-30 | 3-30 | 600 | 3.9 |
| 3-31 | 3-31 | 580 | 3.8 |
| 3-32 | 3-32 | 575 | 2.9 |
| 3-33 | 3-33 | 575 | 3.2 |
| 3-34 | 3-34 | 575 | 4.0 |
| 3-35 | 3-35 | 580 | 2.8 |
| 3-36 | 3-36 | 585 | 3.7 |
| 3-37 | 3-37 | 575 | 3.1 |
| 3-38 | 3-38 | 575 | 3.5 |
| 3-39 | 3-39 | 570 | 3.9 |
| 3-40 | 3-40 | 575 | 3.1 |
| 3-41 | 3-41 | 570 | 3.0 |
| 3-42 | 3-42 | 585 | 3.2 |
| 3-43 | 3-43 | 560 | 3.0 |
| 3-44 | 3-44 | 575 | 2.9 |
| 3-45 | 3-45 | 595 | 3.5 |
| 3-46 | 3-46 | 585 | 3.7 |
| 3-47 | 3-47 | 590 | 3.5 |
| 3-48 | 3-48 | 600 | 3.1 |

TABLE 16-continued

| Example | Present tetrakisazo pigment No. | Vo (−V) | $E\frac{1}{2}$ (l · s) |
|---|---|---|---|
| 3-49 | 3-49 | 590 | 3.6 |
| 3-50 | 3-50 | 590 | 3.2 |
| 3-51 | 3-51 | 585 | 2.9 |
| 3-52 | 3-52 | 590 | 2.8 |
| 3-53 | 3-53 | 585 | 2.8 |
| 3-54 | 3-54 | 580 | 3.1 |
| 3-55 | 3-55 | 570 | 3.4 |
| 3-56 | 3-56 | 560 | 3.8 |
| 3-57 | 3-57 | 570 | 3.7 |
| 3-58 | 3-58 | 585 | 4.1 |
| 3-59 | 3-59 | 580 | 3.2 |
| 3-60 | 3-60 | 600 | 4.3 |

EXAMPLES 3-61 to 3-65

Fluctuations in the potential between the light part and the dark part of the photosensitive members used in Examples 3-1, 3-7, 3-37, 3-44 and 3-58 when used repeatedly were measured. The results are shown in Table 17.

TABLE 17

| Example | Photosensitive member No. | Initial | | After 5000 copyings | |
|---|---|---|---|---|---|
| | | $V_D$(−V) | $V_L$(−V) | $V_D$(−V) | $V_L$(−V) |
| 3-61 | Example 3-1 | 605 | 100 | 630 | 120 |
| 3-62 | Example 3-7 | 595 | 100 | 630 | 120 |
| 3-63 | Example 3-37 | 590 | 110 | 620 | 130 |
| 3-64 | Example 3-44 | 600 | 95 | 620 | 12.0 |
| 3-65 | Example 3-58 | 610 | 100 | 630 | 130 |

As is obvious from the data of Examples 3-1 to 3-65, the present photosensitive members had a considerably good electrophotographic sensitivity and a very good stability for $V_D$ and $V_L$ even after repeatedly used.

EXAMPLE 3-66

A coating solution containing 5 g of 2,4,7-trinitro-9-fluorenone and 5 g of poly-4,4'-dioxydiphenyl-2,2'-propanecarbonate (molecular weight: 300,000) in 70 ml of tetrahydrofuran was applied to the same charge generation layer as preprared in Example 3-1 by coating to a weight of 10 g/m² after drying, and dried.

The thus prepared electrophotographic photosensitive member was subjected to determination of charging characteristics in the same manner as in Example 3-1. The charging polarity was ⊕. The results are as follows:

$V_D$: ⊕550 volts $E\frac{1}{2}$: 5.5 lux.sec

EXAMPLE 3-67

A photosensitive member was prepared in the same manner as in Example 1-47, using the same dispersion of azo pigment as in Example 3-1 in place of the dispersion of azo pigment of Example 1-1, and the charging characteristics and the durability of the thus prepared photosensitive member were determined in the same manner as in Examples 3-1 and 3-61. The results are shown in Table 18.

TABLE 18

| | | |
|---|---|---|
| Charging characteristics | $V_D$: | ⊖575 V |
| | $E\frac{1}{2}$: | 3.8 lux · sec |
| Durability: | $V_D$: | −600 V |
| Initial | $V_L$: | −100 V |
| After 5,000 copyings | $V_D$: | −625 V |
| | $V_L$: | −130 V |

As is obvious from the results of Table 18, the present photosensitive member had a good sensitivity and a good potential stability when used repeatedly.

EXAMPLE 3-68

A photosensitive member was prepared in the same manner as in Example 1-48, using an azo pigment No. 3-55 in place of the azo pigment No. 1-19.

The charging characteristics of the thus prepared photosensitive member were determined in the same manner as in Example 3-1, where the charging polarity was ⊕.

The results are as follows:

$V_0$: +555 V $E\frac{1}{2}$: 5.6 lux.sec

EXAMPLE 3-69

A photosensitive member was prepared in the same manner as in Example 2-68, using an azo pigment No. 3-44 in place of the azo pigment No. 2-44, and $V_0$, $V_k$ and $E\frac{1}{2}$ were likewise determined. The results are as follows:

$V_0$: −520 volts $V_k$: 93%

$E\frac{1}{2}$: 2.0 microjoules/cm²

As a result of image formation test, where the light image formation was carried out by line scanning according to letter signals and image signals, it was found that good prints of both letters and images could be obtained.

EXAMPLE 4-1 to 4-60

Photosensitive members were prepared in the same manner as in Example 1-1, using azo pigments Nos. 4-1 to 4-60 in place of the azo pigment No. 1-1, and the charging characteristics and the light exposure quantity ($E\frac{1}{2}$) were likewise determined. The results are shown in Table 19.

TABLE 19

| Example | Tetrakisazo pigment No. | $V_0$ (−V) | $E\frac{1}{2}$ (l · s) |
|---|---|---|---|
| 4-1 | 4-1 | 600 | 3.8 |
| 4-2 | 4-2 | 605 | 2.0 |
| 4-3 | 4-3 | 590 | 2.6 |
| 4-4 | 4-4 | 600 | 2.6 |
| 4-5 | 4-5 | 590 | 3.0 |
| 4-6 | 4-6 | 600 | 2.3 |
| 4-7 | 4-7 | 585 | 3.3 |
| 4-8 | 4-8 | 610 | 2.0 |
| 4-9 | 4-9 | 600 | 2.4 |
| 4-10 | 4-10 | 605 | 2.6 |
| 4-11 | 4-11 | 610 | 3.6 |
| 4-12 | 4-12 | 590 | 3.1 |
| 4-13 | 4-13 | 590 | 4.0 |
| 4-14 | 4-14 | 600 | 3.9 |
| 4-15 | 4-15 | 570 | 3.1 |
| 4-16 | 4-16 | 600 | 3.7 |
| 4-17 | 4-17 | 590 | 2.5 |
| 4-18 | 4-18 | 570 | 3.4 |
| 4-19 | 4-19 | 580 | 3.7 |
| 4-20 | 4-20 | 610 | 2.5 |
| 4-21 | 4-21 | 620 | 3.2 |
| 4-22 | 4-22 | 590 | 2.5 |
| 4-23 | 4-23 | 585 | 3.4 |
| 4-24 | 4-24 | 610 | 3.5 |
| 4-25 | 4-25 | 590 | 3.3 |
| 4-26 | 4-26 | 590 | 1.9 |
| 4-27 | 4-27 | 605 | 2.2 |
| 4-28 | 4-28 | 585 | 2.0 |

TABLE 19-continued

| Example | Tetrakisazo pigment No. | $V_0$ (−V) | $E\frac{1}{2}$ (l · s) |
|---|---|---|---|
| 4-29 | 4-29 | 610 | 2.1 |
| 4-30 | 4-30 | 605 | 2.2 |
| 4-31 | 4-31 | 605 | 2.2 |
| 4-32 | 4-32 | 605 | 1.7 |
| 4-33 | 4-33 | 610 | 2.7 |
| 4-34 | 4-34 | 610 | 2.4 |
| 4-35 | 4-35 | 600 | 1.8 |
| 4-36 | 4-36 | 585 | 2.2 |
| 4-37 | 4-37 | 580 | 1.7 |
| 4-38 | 4-38 | 590 | 2.8 |
| 4-39 | 4-39 | 600 | 3.0 |
| 4-40 | 4-40 | 610 | 3.4 |
| 4-41 | 4-41 | 585 | 1.6 |
| 4-42 | 4-42 | 605 | 2.8 |
| 4-43 | 4-43 | 585 | 2.3 |
| 4-44 | 4-44 | 600 | 1.9 |
| 4-45 | 4-45 | 615 | 2.0 |
| 4-46 | 4-46 | 605 | 2.4 |
| 4-47 | 4-47 | 610 | 2.6 |
| 4-48 | 4-48 | 610 | 2.7 |
| 4-49 | 4-49 | 605 | 3.3 |
| 4-50 | 4-50 | 605 | 2.9 |
| 4-51 | 4-51 | 600 | 2.0 |
| 4-52 | 4-52 | 610 | 2.4 |
| 4-53 | 4-53 | 610 | 2.1 |
| 4-54 | 4-54 | 605 | 1.9 |
| 4-55 | 4-55 | 585 | 3.1 |
| 4-56 | 4-56 | 595 | 3.0 |
| 4-57 | 4-57 | 590 | 3.4 |
| 4-58 | 4-58 | 605 | 3.7 |
| 4-59 | 4-59 | 600 | 2.8 |
| 4-60 | 4-60 | 615 | 3.0 |

EXAMPLES 4-61 to 4-65

Fluctuations in the potential between the light part and the dark part of the photosensitive members used in Examples 4-1, 4-8, 4-22, 4-29 and 4-53, respectively, when used repeatedly were measured. The results are shown in Table 20.

TABLE 20

| Example | Photo-sensitive member No. | Initial | | After 5000 copyings | |
|---|---|---|---|---|---|
| | | $V_D$ (−V) | $V_L$ (−V) | $V_D$ (−V) | $V_L$ (−V) |
| Example 4-61 | Example 4-1 | 600 | 95 | 620 | 130 |
| Example 4-62 | Example 4-8 | 605 | 85 | 625 | 115 |
| Example 4-63 | Example 4-22 | 590 | 90 | 615 | 130 |
| Example 4-64 | Example 4-29 | 600 | 90 | 620 | 125 |
| Example 4-65 | Example 4-53 | 605 | 90 | 630 | 120 |

As is obvious from the data of Examples 4-1 to 4-65, the present photosensitive members had a considerably good electrophotographic sensitivity and a very good stability for $V_D$ and $V_L$ even after used repeatedly.

EXAMPLE 4-66

A coating solution prepared by dissolving 5 g of 2,4,7-trinitro-9-fluorenone and 5 g of poly-4,4′-dioxydiphenyl-2,2′-propane carbonate (molecular weight: 300,000) in 70 ml of tetrahydrofuran was applied to the same charge generation layer as prepared in Example 4-1 by coating to a weight of 10 g/m$^2$ after drying, and dried.

The thus prepared electrophotographic photosensitive member was subjected to determination of charging characteristics in the same manner as in Example 4-1. The charging polarity was ⊕. The results are as follows:

$V_0$: ⊕570 volts $E\frac{1}{2}$: 3.6 lux.sec

EXAMPLE 4-67

A photosensitive member was prepared in the same manner as in Example 1-47, except that the same dispersion of azo pigment as used in Example 4-1 was used in place of the dispersion of azo pigment of Example 1-1.

The charging characteristics and durability of the thus prepared photosensitive member were determined in the same manner as in Examples 4-1 and 4-61. The results are shown in Table 21.

TABLE 21

| | | |
|---|---|---|
| Charging characteristics | V: | −600 V |
| | $E\frac{1}{2}$: | 3.1 lux · sec |
| Durability: | $V_D$: | −600 V |
| Initial | $V_L$: | −100 V |
| After 5,000 copyings | $V_D$: | −625 V |
| | $V_L$: | −130 V |

As is obvious from the results of Table 21, the present photosensitive member had a good sensitivity and a good potential stability when used repeatedly.

EXAMPLE 4-68

A photosensitive member was prepared in the same manner as in Example 1-48, using the azo pigment No. 4-50 in place of the azo pigment No. 1-19. The charging characteristics of the photosensitive member thus prepared were determined, where the charging polarity was ⊕. The results are as follows:

$V_0$: ⊕585 V $V\frac{1}{2}$: 4.2 lux.sec

EXAMPLE 4-69

A photosensitive member was prepared in the same manner as in Example 2-68, using the azo pigment No. 4-34 in place of the azo pigment No. 2-44, and $V_0$, $V_k$ and $E\frac{1}{2}$ were likewise determined. The results are as follows:

$V_0$: −520 volts $V_k$: 93%

$E\frac{1}{2}$: 1.6 microjoules/cm$^2$

As a result of an image test, where the image formation was carried out by line scanning according to letter signals and image signals, it was found that good prints of both letters and images could be obtained.

EXAMPLES 5-1 to 5-60

Photosensitive members were prepared in the same manner as in Example 1-1, using azo pigments Nos. 5-1 to 5-60 in place of the azo pigment No. 1-1, and the charging characteristics and light exposure quantity ($E\frac{1}{2}$) were likewise determined. The results are shown in Table 22.

TABLE 22

| Example | Tetrakisazo pigment No. | Vo (−V) | $E\frac{1}{2}$ (l · s) |
|---|---|---|---|
| 5-1 | 5-1 | 580 | 3.4 |
| 5-2 | 5-2 | 585 | 2.1 |
| 5-3 | 5-3 | 570 | 3.1 |
| 5-4 | 5-4 | 580 | 2.7 |
| 5-5 | 5-5 | 590 | 2.1 |
| 5-6 | 5-6 | 595 | 2.2 |
| 5-7 | 5-7 | 570 | 3.6 |
| 5-8 | 5-8 | 590 | 2.9 |
| 5-9 | 5-9 | 580 | 2.8 |

TABLE 22-continued

| Example | Tetrakisazo pigment No. | Vo (−V) | $E\frac{1}{2}$ (l · s) |
|---|---|---|---|
| 5-10 | 5-10 | 575 | 3.3 |
| 5-11 | 5-11 | 565 | 3.1 |
| 5-12 | 5-12 | 565 | 2.4 |
| 5-13 | 5-13 | 575 | 3.7 |
| 5-14 | 5-14 | 600 | 1.9 |
| 5-15 | 5-13 | 600 | 2.7 |
| 5-16 | 5-16 | 580 | 3.2 |
| 5-17 | 5-17 | 590 | 1.9 |
| 5-18 | 5-18 | 580 | 2.5 |
| 5-19 | 5-19 | 570 | 2.0 |
| 5-20 | 5-20 | 570 | 2.4 |
| 5-21 | 5-21 | 585 | 2.8 |
| 5-22 | 5-22 | 590 | 3.6 |
| 5-23 | 5-23 | 585 | 3.5 |
| 5-24 | 5-24 | 580 | 3.6 |
| 5-25 | 5-25 | 600 | 3.9 |
| 5-26 | 5-26 | 580 | 3.6 |
| 5-27 | 5-27 | 565 | 2.0 |
| 5-28 | 5-28 | 600 | 2.9 |
| 5-29 | 5-29 | 590 | 2.8 |
| 5-30 | 5-30 | 605 | 2.5 |
| 5-31 | 5-31 | 605 | 1.9 |
| 5-32 | 5-32 | 585 | 2.4 |
| 5-33 | 5-33 | 575 | 2.1 |
| 5-34 | 5-34 | 585 | 3.5 |
| 5-35 | 5-35 | 580 | 1.5 |
| 5-36 | 5-36 | 585 | 2.0 |
| 5-37 | 5-37 | 575 | 1.9 |
| 5-38 | 5-38 | 610 | 2.2 |
| 5-39 | 5-39 | 600 | 2.5 |
| 5-40 | 5-40 | 595 | 1.7 |
| 5-41 | 5-41 | 565 | 2.4 |
| 5-42 | 5-42 | 595 | 2.3 |
| 5-43 | 5-43 | 605 | 2.0 |
| 5-44 | 5-44 | 585 | 3.4 |
| 5-45 | 5-45 | 580 | 3.0 |
| 5-46 | 5-46 | 585 | 1.6 |
| 5-47 | 5-47 | 595 | 2.5 |
| 5-48 | 5-48 | 575 | 1.9 |
| 5-49 | 5-49 | 605 | 2.0 |
| 5-50 | 5-50 | 575 | 3.2 |
| 5-51 | 5-51 | 600 | 3.0 |
| 5-52 | 5-52 | 605 | 1.7 |
| 5-53 | 5-53 | 590 | 1.9 |
| 5-54 | 5-54 | 565 | 1.9 |
| 5-55 | 5-55 | 600 | 1.6 |
| 5-56 | 5-56 | 570 | 1.8 |
| 5-57 | 5-57 | 595 | 2.4 |
| 5-58 | 5-58 | 580 | 2.7 |
| 5-59 | 5-59 | 605 | 2.6 |
| 5-60 | 5-60 | 610 | 2.8 |

EXAMPLES 5-61 to 5-64

Fluctuation in the potential between the light part and the dark part of the photosensitive members used in Examples 5-1, 5-8, 5-27 and 5-30 when used repeatedly were measured in the same manner as in Example 1-41. The results are shown in Table 23.

TABLE 23

| Example | Photo-sensitive member No. | Initial | | After 5000 copyings | |
|---|---|---|---|---|---|
| | | $V_D$(−V) | $V_L$(−V) | $V_D$(−V) | $V_L$(−V) |
| Example 5-61 | Example 5-1 | 600 | 100 | 630 | 125 |
| Example 5-62 | Example 5-8 | 600 | 100 | 625 | 130 |
| Example 5-63 | Example 5-27 | 590 | 100 | 620 | 125 |
| Example 5-64 | Example 5-30 | 600 | 95 | 620 | 120 |

As is obvious from the data of Examples 5-1 to 5-64, the present photosensitive members had a considerably better electrophotographic sensitivity and a very good stability for $V_D$ and $V_L$ even after used repeatedly.

EXAMPLE 5-65

A coating solution prepared by dissolving 5 g of 2,4,7-trinitro-9-fluorenone and 5 g of poly-4,4'-dioxydiphenyl-2,2'-propane carbonate (molecular weight: 300,000) in 70 ml of tetrahydrofuran was applied to the charge generation layer prepared in Example 5-1 to a weight of 10 g/m$^2$ after drying, and dried.

The thus prepared electrophotographic photosensitive member was subjected to charging measurement in the same manner as in Example 5-1, where the charging polarity was ⊕. The results are as follows:

$V_0$: +540 volts $E\frac{1}{2}$: 4.2 lux.sec

EXAMPLE 5-66

A photosensitive member was prepared in the same manner as in Example 1-47, using a dispersion of the same azo pigment as used in Example 5-1 in place of the dispersion of the azo pigment of Example 1-1.

The charging characteristics and durability of the photosensitive member thus prepared were determined in the same manner as in Examples 5-1 and 5-61. The results are shown in Table 24.

TABLE 24

| | | |
|---|---|---|
| Charging characteristics | Vo: | −570 V |
| | $E\frac{1}{2}$: | 3.0 lux · sec |
| Durability | | |
| Initial | $V_D$: | −600 V |
| | $V_L$: | −100 V |
| After 5,000 copyings | $V_D$: | −630 V |
| | $V_L$: | −130 V |

As is obvious from the results of Table 24, the foregoing photosensitive member had a good sensitivity and a good potential stability when used repeatedly.

EXAMPLE 5-67

A photosensitive member was prepared in the same manner as in Example 1-48, using the azo pigment No. 5-52 in place of the azo pigment No. 1-19. The charging characteristics and durability of the photosensitive member thus prepared were determined in the same manner as in Example 5-1, where the charging polarity was ⊕.

The results are as follows:

$V_0$: +550 V $E\frac{1}{2}$: 4.0 lux.sec

EXAMPLE 5-68

A photosensitive member was prepared in the same manner as in Example 2-68, using the azo pigment No. 5-36 in place of the azo pigment No. 2-44, and $V_0$ $V_k$ and $E\frac{1}{2}$ were likewise measured.

The results are as follows:

$V_0$: −520 volts $V_k$: 94%

$E\frac{1}{2}$: 1.8 microjoules/cm$^2$

In an image formation test, good prints of both letters and images were obtained.

EXAMPLE 6-1 to 6-60

Photosensitive members were prepared in the same manner as in Example 1-1, using azo pigments Nos. 6-1 to 6-61 in place of the azo pigment No. 1-1, and the charging characteristics and light exposure quantity ($E\frac{1}{2}$) were likewise measured. The results are shown in Table 25.

TABLE 25

| Example | Pentakisazo pigment No. | $V_D$ (−V) | $E\frac{1}{2}$ (l · s) |
|---|---|---|---|
| 6-1 | 6-1 | 600 | 3.5 |
| 6-2 | 6-2 | 605 | 2.2 |
| 6-3 | 6-3 | 590 | 3.1 |
| 6-4 | 6-4 | 600 | 2.9 |
| 6-5 | 6-5 | 610 | 2.3 |
| 6-6 | 6-6 | 615 | 2.2 |
| 6-7 | 6-7 | 585 | 3.2 |
| 6-8 | 6-8 | 610 | 2.3 |
| 6-9 | 6-9 | 600 | 2.2 |
| 6-10 | 6-10 | 590 | 3.0 |
| 6-11 | 6-11 | 580 | 3.3 |
| 6-12 | 6-12 | 580 | 2.7 |
| 6-13 | 6-13 | 590 | 3.9 |
| 6-14 | 6-14 | 610 | 2.3 |
| 6-15 | 6-15 | 615 | 3.7 |
| 6-16 | 6-16 | 600 | 3.4 |
| 6-17 | 6-17 | 610 | 2.1 |
| 6-18 | 6-18 | 600 | 2.8 |
| 6-19 | 6-19 | 585 | 2.4 |
| 6-20 | 6-20 | 590 | 2.3 |
| 6-21 | 6-21 | 580 | 3.8 |
| 6-22 | 6-22 | 600 | 3.9 |
| 6-23 | 6-23 | 605 | 4.0 |
| 6-24 | 6-24 | 590 | 3.8 |
| 6-25 | 6-25 | 590 | 3.9 |
| 6-26 | 6-26 | 600 | 3.6 |
| 6-27 | 6-27 | 585 | 2.6 |
| 6-28 | 6-28 | 615 | 2.8 |
| 6-29 | 6-29 | 605 | 3.0 |
| 6-30 | 6-30 | 600 | 2.5 |
| 6-31 | 6-31 | 600 | 2.2 |
| 6-32 | 6-32 | 605 | 2.5 |
| 6-33 | 6-33 | 600 | 2.1 |
| 6-34 | 6-34 | 605 | 3.7 |
| 6-35 | 6-35 | 605 | 1.6 |
| 6-36 | 6-36 | 610 | 2.3 |
| 6-37 | 6-37 | 600 | 1.8 |
| 6-38 | 6-38 | 610 | 1.9 |
| 6-39 | 6-39 | 605 | 2.3 |
| 6-40 | 6-40 | 615 | 1.9 |
| 6-41 | 6-41 | 600 | 2.0 |
| 6-42 | 6-42 | 605 | 2.3 |
| 6-43 | 6-43 | 610 | 1.8 |
| 6-44 | 6-44 | 605 | 3.7 |
| 6-45 | 6-45 | 600 | 3.5 |
| 6-46 | 6-46 | 605 | 1.6 |
| 6-47 | 6-47 | 600 | 2.3 |
| 6-48 | 6-48 | 595 | 1.7 |
| 6-49 | 6-49 | 605 | 2.6 |
| 6-50 | 6-50 | 580 | 3.3 |
| 6-51 | 6-51 | 590 | 2.9 |
| 6-52 | 6-52 | 600 | 1.8 |
| 6-53 | 6-53 | 605 | 2.1 |
| 6-54 | 6-54 | 580 | 1.8 |
| 6-55 | 6-55 | 590 | 1.9 |
| 6-56 | 6-56 | 580 | 1.8 |
| 6-57 | 6-57 | 610 | 2.4 |
| 6-58 | 6-58 | 600 | 2.5 |
| 6-59 | 6-59 | 605 | 3.0 |
| 6-60 | 6-60 | 570 | 3.9 |

EXAMPLES 6-61 to 6-64

Fluctuations in the potential between the light part and the dark part of the photosensitive members used in Examples 6-1, 6-8, 6-24 and 6-31 when used repeatedly were neasured in the same manner as in Example 1-41. The results are shown in Table 26.

TABLE 26

| Example | Photo-sensitive member No. | Initial | | After 5000 copyings | |
|---|---|---|---|---|---|
| | | $V_D$ (−V) | $V_L$ (−V) | $V_D$ (−V) | $V_L$ (−V) |
| Example 6-61 | Example 6-1 | 600 | 105 | 630 | 125 |
| Example 6-62 | Example 6-8 | 610 | 100 | 635 | 120 |
| Example 6-63 | Example 6-24 | 590 | 100 | 620 | 125 |
| Example 6-64 | Example 6-31 | 600 | 95 | 620 | 120 |

As is obvious from the data of Examples 6-1 to 6-64, the present photosensitive members had a considerably good electrophotographic sensitivity and a very good stability for $V_D$ and $V_L$ when used repeatedly.

EXAMPLE 6-65

A coating solution prepared by dissolving 5 g of 2,4,7-trinitro-9-fluorenone and 5 g of poly-4,4-dioxydiphenyl-2,2'-propane carbonate (molecular weight: 300,000) in 70 ml of tetrahydrofuran was applied to the charge generation layer prepared in Example 6-1 to a weight of 10 g/m$^2$ after drying, and dried.

The thus prepared electrophotographic photosensitive member was subjected to charging measurement in the same manner as in Example 6-1, where the charging polarity was ⊕. The results are shown in Table 27.

TABLE 27

| | |
|---|---|
| Vo: | +550 V |
| $E\frac{1}{2}$: | 4.3 lux · sec |

EXAMPLE 6-66

A photosensitive member was prepared in the manner as in Example 1-47, using a dispersion of the same azo pigment as in Example 6-1 in place of the dispersion of the azo pigment of Example 1-1.

The charging characteristics and dulability of the photosensitive member thus prepared were measured in the same manner as in Examples 6-1 and 6-61. The results are shown in Table 28.

TABLE 28

| Vo: −585 V $E\frac{1}{2}$: 3.2 lux · sec | | | |
|---|---|---|---|
| Initial | | After 5,000 copyings | |
| $V_D$ | $V_L$ | $V_D$ | $V_L$ |
| −600 V | −100 V | −625 V | −130 V |

As is obvious from the results of Table 28, the present photosensitive member had a good sensitivity and a good potential stability when used repeatedly.

EXAMPLE 6-67

A photosensitive member was prepared in the same manner as in Example 1-48, using the azo pigment No. 6-52 in place of the azo pigment No. 1-19, and the charging characteristics and durability of the photosensitive member thus prepared were measured in the same manner as in Example 6-1, where the charging polarity was ⊕. The results are shown in Table 29.

TABLE 29

| | |
|---|---|
| Vo: ⊕560 V | $E\frac{1}{2}$: 4.2 lux · sec |

EXAMPLE 6-68

A photosensitive member was prepared in the same manner as in Example 2-68, using the azo pigment No. 6-36 in place of the azo pigment No. 2-44, and $V_0$, $V_k$ and $E\frac{1}{2}$ were likewise measured. The results are as follows:

$V_0$: −520 volts $V_k$: 92%

$E\frac{1}{2}$: 1.4 microjoules/cm$^2$

As a result of an image formation test, it was found that good points of letters and images could be obtained.

We claim:

1. An electrophotographic photosensitive member comprising a photosensitive layer containing an azo pigment selected from the following general formulae (1) to (6):

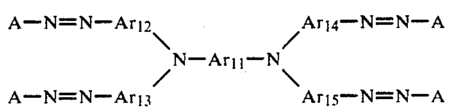
(1)

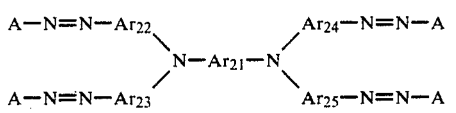
(2)

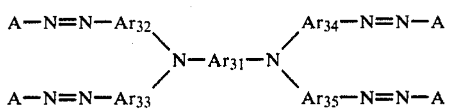
(3)

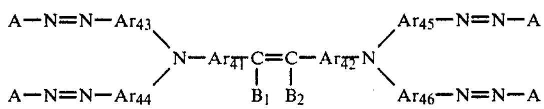
(4)

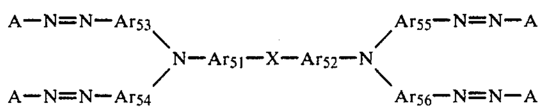
(5)

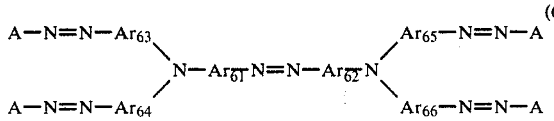
(6)

wherein $Ar_{11}$ to $Ar_{15}$ represent arylene groups, each of which may has a substituent; $Ar_{21}$ represents a biphenylene group having a substituent, a biarylene group, a terphenylene group or a divalent condensed polycyclic aromatic ring group, each of the latter three of which may have a substituent; $Ar_{31}$ is a divalent organic group containing a heterocyclic group which may have a substituent; $Ar_{41}$ represents a divalent organic group containing at least one group selected from a phenylene group having a substituent (or an unsubstituted phenylene group when one of $B_1$ and $B_2$ is a halogen atom, a trifluoromethyl group, or an alkyl group, an aryl group or an aralkyl group, each of the latter three of which may have a substituent), another arylene group other than phenylene group which may have a substituent, a divalent condensed polycyclic group and a divalent heterocyclic group; $Ar_{22}$ to $Ar_{25}$, $Ar_{33}$ to $Ar_{35}$, $Ar_{42}$ to $Ar_{46}$, $Ar_{51}$ to $Ar_{56}$, and $Ar_{61}$ to $Ar_{66}$ represent divalent organic groups containing at least one group selected from arylene groups, divalent condensed aromatic ring groups, and divalent heterocyclic groups, each of which may have a substituent; A represents a coupler residue having a phenolic OH group; $B_1$ and $B_2$ each represent a hydrogen atom, a halogen atom, a trifluoromethyl group, a cyano group, an alkyl group, an aryl group or an aralkyl group, each of the latter three of which may have a substituent; X represents NR, O, S, SO2 or C═O; R represents a hydrogen atom, a nitroso group, an alkyl group, an aralkyl group, an aryl group, an acyl group, or a heterocyclic group, each of the latter five of which may have a substituent.

2. An electrophotographic photosensitive member according to claim 1, wherein the group A in the general formulae (1) to (6) is represented by the following general formulae (7) to (13)

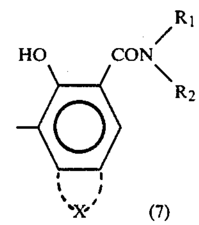
(7)

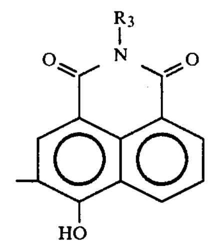
(8)

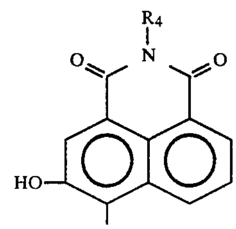
(9)

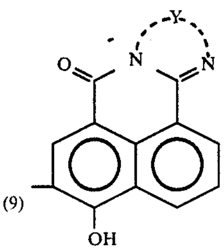
(10)

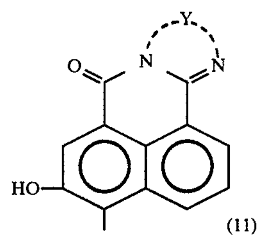
(11)

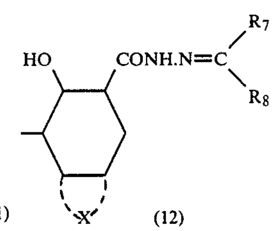
(12)

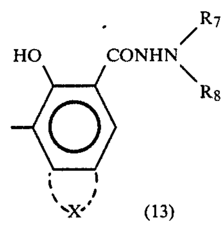
(13)

wherein X is a residue forming a polycyclic aromatic ring or a heterocyclic ring through condensation with a benzene ring; $R_1$ and $R_2$ are hydrogen atoms and alkyls, aralkyls, aryls and heterocyclic groups each of which may have a substituent, or residues forming conjointly a cyclic amino group together with a nitrogen atom; $R_3$ and $R_4$ are alkyls, aralkyls, and aryls, each of which may have a substituent; Y is a divalent group of aromatic hydrocarbon or a residue forming a divalent group of heterocyclic together with a nitrogen atom; $R_5$ and $R_6$ are hydrogen atoms, alkyls, aralkyls, aryls and heterocyclic groups, each of which may have a substituent; or a residue forming a 5 or 6-membered ring therefrom together with a bonding carbon, and $R_7$ and $R_8$ are hydrogen atoms, alkyls, aralkyls, aryls and heterocyclic groups, each of which may have a substituent, or a residue forming a 5 or 6-membered ring therefrom together with the bonding nitrogen atom.

3. An electrophotographic photosensitive member according to claim 1, wherein the photosensitive layer is of a functionally separated type composed of a charge generation layer and a charge transport layer, the charge generation layer containing an azo pigment represented by said general formulae (1) to (6).

4. An electrophotographic photosensitive member according to claim 2, wherein in the general formula (7) $R_1$ is a hydrogen atom and $R_2$ is a substituted phenyl represented by the following general formula:

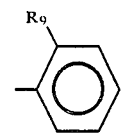

wherein $R_9$ is a substituent selected from a halogen atom, nitro, cyano, trifluoromethyl and acyl.

5. An electrophotographic photosensitive member according to claim 2, wherein in the general formula (7), $R_1$ is a hydrogen atom; $R_2$ is a phenyl group which may have a substituent; and X forms a benzcarbazolyl group together with a benzene ring.

* * * * *

UNITED STATES PATENT AND TRADEMARK OFFICE
CERTIFICATE OF CORRECTION

PATENT NO. : 4,666,810

DATED : May 19, 1987

INVENTOR(S) : SHOJI UMEHARA, ET AL.

It is certified that error appears in the above-identified patent and that said Letters Patent is hereby corrected as shown below:

COLUMN 2

Line 49, "substituent," should read --substituent),--.
Line 56, "group a" should read --group, a--.
Line 62, "anyl" should read --aryl--.

COLUMN 3

Line 8, "$Ar_1$ to $Ar_5$" should read --$Ar_{11}$ to $Ar_{15}$--.
Line 27, "anthraguinone," should read --anthraquinone,--.

COLUMN 4

Line 54, "5 or" should read --5- or--.
Line 55, "members" should read --membered--.
Line 55, "atom, $R_7$" should read --atom; $R_7$--.
Line 58, "5 or" should read --5- or--.

COLUMN 5

Line 29, "5 or" should read --5- or--.

COLUMN 6

Line 4, "5" should read --5- --.
Line 5, "5 or" should read --5- or--.
Line 11, "example carbazole," should read --example, carbazole,--.
Line 14, "(12)" should read --(11)--.
Line 21, "semi conductor" should read --semi-conductor--.

UNITED STATES PATENT AND TRADEMARK OFFICE
CERTIFICATE OF CORRECTION

PATENT NO. : 4,666,810
DATED : May 19, 1987
INVENTOR(S) : SHOJI UMEHARA, ET AL.

It is certified that error appears in the above-identified patent and that said Letters Patent is hereby corrected as shown below:

<u>COLUMNS 7-46/TABLES I-(1) through I-(41)</u>

Lines 33-35, "N- 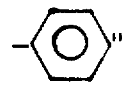" should read --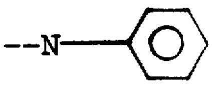--.

<u>COLUMN 57</u>

TABLE 2-(17), "HC=NHNOC" should read --CH=NHNOC--.

<u>COLUMN 83</u>

TABLE 2-(46), C=NHNOC" should read --C(CH$_3$)=NHNOC--.

<u>COLUMN 84</u>

TABLE 2-(47), "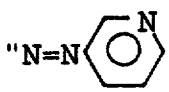" should read --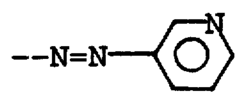--.

<u>COLUMN 95</u>

TABLE 2-(60), "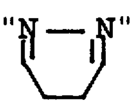" should read -- 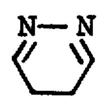 (four occurrences)--.

<u>COLUMN 149</u>

TABLE 3-(53), "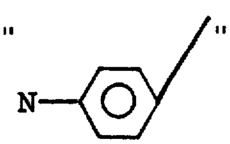" should read --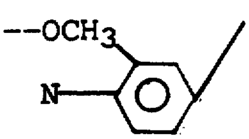--.

UNITED STATES PATENT AND TRADEMARK OFFICE

CERTIFICATE OF CORRECTION

PATENT NO. : 4,666,810

DATED : May 19, 1987

INVENTOR(S) : SHOJI UMEHARA, ET AL.

It is certified that error appears in the above-identified patent and that said Letters Patent is hereby corrected as shown below:

COLUMN 153

TABLE 3-(57), " 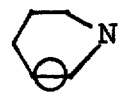 " should read -- 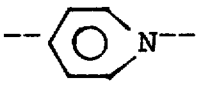 --.

COLUMN 153

TABLE 3-(57), " 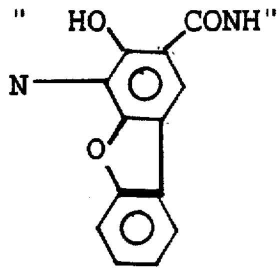 " should read -- 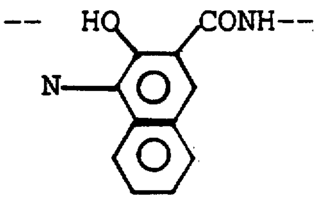 --.

COLUMN 155

TABLE 3-(59), "  " should read -- 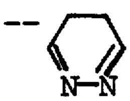 --.

COLUMN 197

TABLE 4-(51), " 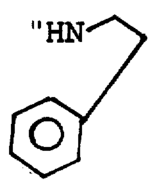 " should read -- 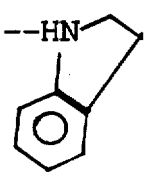 --.

UNITED STATES PATENT AND TRADEMARK OFFICE
CERTIFICATE OF CORRECTION

PATENT NO. : 4,666,810

DATED : May 19, 1987

INVENTOR(S) : SHOJI UMEHARA, ET AL.

It is certified that error appears in the above-identified patent and that said Letters Patent is hereby corrected as shown below:

COLUMN 198

TABLE 4-(52), " 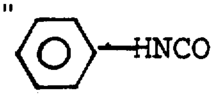

" should read -- 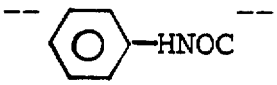

--.

COLUMN 205

TABLE 4-(60), " 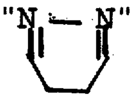

" should read -- 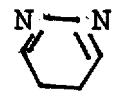

(four occurrences)--.

COLUMNS 157-205/TABLES 4-(1) through 4-(60)

Lines 33-35, "CH= =" should read --CH═══--.

COLUMNS 233-236

COLUMNS 235 and 236 should be exchanged with COLUMNS 233 and 234.

COLUMN 241

TABLE 5-(46), "HC=NHNOC" should read --CH=NHNOC--

COLUMN 207-256

In TABLES "5-(1)" through "5-(61)" the space at the center of each formula should be closed up.

UNITED STATES PATENT AND TRADEMARK OFFICE

CERTIFICATE OF CORRECTION

PATENT NO. : 4,666,810

DATED : May 19, 1987

INVENTOR(S) : SHOJI UMEHARA, ET AL.

It is certified that error appears in the above-identified patent and that said Letters Patent is hereby corrected as shown below:

COLUMN 295

TABLE 6-(50), " 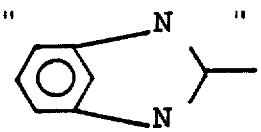 " should read -- 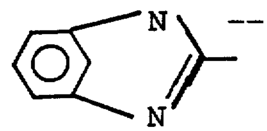 --.

COLUMN 307

Line 12, "$Ar_1$, $Ar_2$, $Ar_3$, $Ar_4$ and $Ar_5$" should read --$Ar_{11}$, $Ar_{12}$, $Ar_{13}$, $Ar_{14}$ and $Ar_{15}$--.

COLUMN 310

Line 18, "μm or" should read --μm to--.

COLUMN 311

Line 25, "hole transportable" should read --hole-transportable--.

COLUMN 313

Line 19, "ia" should read --is--.
Line 24, "neutralized" should read --neutralize--.

COLUMN 314

Line 26, "were" should read --was--.
Line 39, "Denki K.K. retained" should read --Denki K.K., retained--.
Lines 67-68, "1-20<br>2-21" should read --1-20<br>1-21--.

UNITED STATES PATENT AND TRADEMARK OFFICE
CERTIFICATE OF CORRECTION

PATENT NO. : 4,666,810
DATED : May 19, 1987
INVENTOR(S) : SHOJI UMEHARA, ET AL.

It is certified that error appears in the above-identified patent and that said Letters Patent is hereby corrected as shown below:

COLUMN 316

Line 46, "form" should read --from--.

COLUMN 317

Line 27, "member" should read --members--.
Line 29, "pigment No." should read --pigment Nos.--.

COLUMN 318

Line 46, "after" should read --when--.

COLUMN 319

Line 23, "Vo 575 V" should read --$V_O$: 575 V--.

COLUMN 320

Line 3, "surface" should read --Surface--.
Line 16, "to" should be deleted.

COLUMN 321

Line 30, "12.0" should read --120--.
Line 36, "after" should read --when--.
Line 43, "preprared" should read --prepared--.
Line 51, "$V_D$: ⊕ 550 volts" should read --$V_O$: ⊕ 550 volts--.

UNITED STATES PATENT AND TRADEMARK OFFICE
CERTIFICATE OF CORRECTION

PATENT NO. : 4,666,810

DATED : May 19, 1987

INVENTOR(S) : SHOJI UMEHARA, ET AL.

It is certified that error appears in the above-identified patent and that said Letters Patent is hereby corrected as shown below:

COLUMN 322

Line 35, "EXAMPLE 4-1 to 4-60" should read --EXAMPLES 4-1 to 4-60--.

COLUMN 323

Line 56, "after" should read --when--.

COLUMN 324

Line 17, "V: -600 V" should read --$V_D$: 600 V--.
Line 35, "V 1/2: 4.2 lux.sec" should read --E 1/2: 4.2 lux.sec--.

COLUMN 326

Line 2, "after" should read --when--.
Line 55, "$V_0$ $V_k$" should read --$V_O$, $V_k$--.
Line 63, "EXAMPLE 6-1 to 6-60" should read --EXAMPLES 6-1 to 6-60--.

COLUMN 327

Line 60, "neasured" should read --measured--.

COLUMN 328

Line 37, "the man-" should read --the same man- --.
Line 41, "dulability" should read --durability--.

UNITED STATES PATENT AND TRADEMARK OFFICE

CERTIFICATE OF CORRECTION

PATENT NO. : 4,666,810 Page 8 of 9

DATED : May 19, 1987

INVENTOR(S) : SHOJI UMEHARA, ET AL.

It is certified that error appears in the above-identified patent and that said Letters Patent is hereby corrected as shown below:

COLUMN 329

Line 51, "has" should read --have--.
Line 66, "$Ar_{33}$ to $Ar_{35}$," should read --$Ar_{32}$ to $Ar_{35}$,--.

COLUMN 330

Line 9, "SO2" should read --$SO_2$--.

Line 16, "(13)" should read --(13):--.
Line 40, "

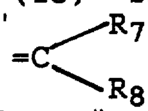

" should read --

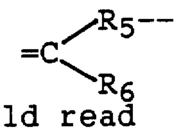

--.

Lines 39-42, "

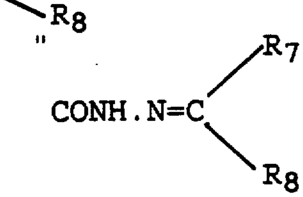

" should read --

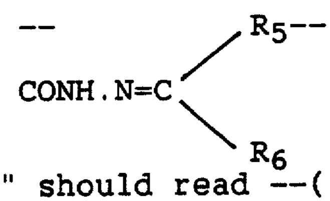

--.

Line 46, "(11)" should read --(12)--.
Line 46, "(12)" should read --(11)--.
Line 67, "a divalent group of heterocyclic" should read --a divalent heterocyclic group--.

UNITED STATES PATENT AND TRADEMARK OFFICE
CERTIFICATE OF CORRECTION

PATENT NO. : 4,666,810

DATED : May 19, 1987

INVENTOR(S) : SHOJI UMEHARA, ET AL.

It is certified that error appears in the above-identified patent and that said Letters Patent is hereby corrected as shown below:

COLUMN 331

Line 2, "5 or" should read --5- or--.
Line 3, "carbon, and" should read --carbon; and--.
Line 7, "5 or" should read --5- or--
Line 17, "(7)" should read --(7),--.

Signed and Sealed this

Sixteenth Day of February, 1988

Attest:

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,666,810

DATED : May 19, 1987

INVENTOR(S) : Shoji Umehara, et al

It is certified that error appears in the above-identified patent and that said Letters Patent is hereby corrected as shown below:

Columns 97-156/Tables 3-(1) through 3-(60)

Lines 33-35 should read --

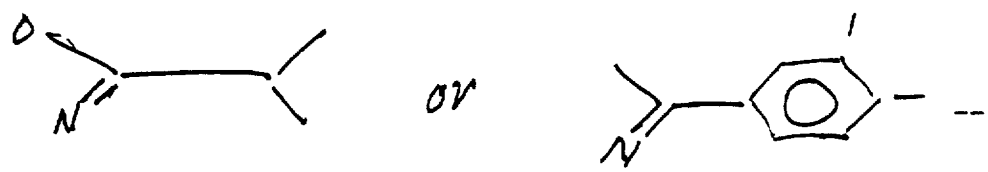

Signed and Sealed this

Twenty-fifth Day of October, 1988

*Attest:*

DONALD J. QUIGG

*Attesting Officer* — *Commissioner of Patents and Trademarks*